US012739785B2

(12) United States Patent
Khoshkholgh Dashtaki et al.

(10) Patent No.: US 12,739,785 B2
(45) Date of Patent: Sep. 15, 2026

(54) POSITIONING IN NON-TERRESTRIAL NETWORKS

(71) Applicant: Ofinno, LLC, Reston, VA (US)

(72) Inventors: Mohammad Ghadir Khoshkholgh Dashtaki, Reston, VA (US); Ali Cagatay Cirik, Chantilly, VA (US); Esmael Hejazi Dinan, McLean, VA (US); Hua Zhou, Vienna, VA (US); Gautham Prasad, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/446,333

(22) Filed: Jan. 12, 2026

(65) Prior Publication Data

US 2026/0143463 A1 May 21, 2026

Related U.S. Application Data

(63) Continuation of application No. PCT/US2024/037810, filed on Jul. 12, 2024.

(Continued)

(51) Int. Cl.
*H04W 24/10* (2009.01)
*H04B 17/364* (2015.01)

(Continued)

(52) U.S. Cl.
CPC ........ *H04W 64/006* (2013.01); *H04B 17/364* (2015.01); *H04L 43/0864* (2013.01); *H04W 24/10* (2013.01); *H04W 36/083* (2023.05)

(58) Field of Classification Search
CPC ..... H04W 64/00; H04W 36/08; H04B 17/364
See application file for complete search history.

(56) References Cited

U.S. PATENT DOCUMENTS 12,219,417 B1 2/2025 Watts et al.
2021/0360578 A1* 11/2021 Manolakos ........... G01S 5/0236

(Continued)

FOREIGN PATENT DOCUMENTS

WO 2024/170171 A1 8/2024
WO 2024/211465 A1 10/2024

OTHER PUBLICATIONS

R2-2305790; 3GPP TSG RAN WG2 Meeting #122; Incheon, Korea, May 22-26, 2023; Agenda item: 7.7.3; Source: Samsung; Title: Remaining issues on Network Verified UE Location; WID/SID: NR_NTN_enh-Core; Document for: Discussion and Decision.

(Continued)

*Primary Examiner* — Michael T Vu
(74) *Attorney, Agent, or Firm* — Patrick Moon; Kavon Nasabzadeh; Jacob L. Mangan

(57) ABSTRACT

A wireless device receives, from a base station, a system information block (SIB) indicating time information for when a cell, provided via non-terrestrial network, stops serving an area. The wireless device receives, from a location management function (LMF), a provide assistance data message, for a multi-round transmission time (RTT) positioning, indicating at least one downlink positioning reference signal (DL PRS) resource. The wireless device starts a measurement period for measuring user-equipment (UE) reception-transmission (Rx–Tx) time difference measurements. The wireless device initiates, based on the time information indicated by the SIB, a satellite switch, wherein the satellite switch is to switch satellites without changing a physical cell identifier (PCI). In response to the satellite switch occurring during the measurement period, the wireless device suspends, during an interruption time for the satellite switch, measuring the at least one DL PRS resource.

20 Claims, 53 Drawing Sheets

Related U.S. Application Data

(60) Provisional application No. 63/526,423, filed on Jul. 12, 2023.

(51) Int. Cl.
*H04L 43/0864* (2022.01)
*H04W 36/08* (2009.01)
*H04W 64/00* (2009.01)

(56) References Cited

U.S. PATENT DOCUMENTS

| | | | | |
|---|---|---|---|---|
| 2022/0069962 | A1 | 3/2022 | Bao et al. | |
| 2023/0087450 | A1* | 3/2023 | Yerramalli | G01S 5/14 342/59 |
| 2024/0089772 | A1 | 3/2024 | Chen et al. | |
| 2024/0430761 | A1* | 12/2024 | Jeong | H04W 36/00835 |
| 2025/0071724 | A1 | 2/2025 | Huang et al. | |

OTHER PUBLICATIONS

R2-2305940; 3GPP TSG-RAN WG2 Meeting #122; Incheon, South Korea, May 22-26, 2023; R2-2302794; Agenda item: 7.7.3; Source: Nokia, Nokia Shanghai Bell; Title: Network verified UE location; WID/SID: NR_NTN_enh-Core—Release 18; Document for: Discussion and Decision.

R2-2306244; 3GPP TSG-RAN WG2 Meeting#122; Incheon, Korea, May 22-26, 2023; Source: ZTE corporation, Sanechips; Title: Consideration on NW verified UE location and CE; Agenda item: 7.7.3; Document for: Discussion and Decision.

R2-2306377; 3GPP TSG-RAN WG2 #122; Incheon, South Korea—May 23-27, 2023; Title: Discussion on Network Verified UE Location; Source: TCL Communication Ltd.; Document for: Discussion.

R4-2412662; 3GPP TSG-RAN4 Meeting #112; Maastricht, The Netherlands, Aug. 19-23, 2024; CR-Form-v12.3; Change Request; 38.133 CR 4858 rev—Current version: 18.6.0; Title: CR on Rx-Tx measurement requirements for NTN.

R4-2411135; 3GPP TSG-RAN4 Meeting #112; Maastricht, Netherlands, Aug. 19-Aug. 23, 2024; CR-Form-v12.3; Change Request; 38.101-5 CR 0101 rev—Current version: 18.6.0; Title: (NR_NTN_enh-Core)CR for TS 38.101-5, Correction on ACS requirement for mobile VSAT and fixed VSAT.

R4-2411185; 3GPP TSG-RAN4 Meeting #112; Maastricht, Netherlands, Aug. 19-Aug. 23, 2024; CR-Form-v12.3; Change Request; 38.101-5 CR 0103 rev—Current version: 18.6.0; Title: (NR_NTN_enh-Core) CR to TS 38.101-5: clarification of the additional requirements for n512 + additional fixes.

R4-2412046; 3GPP TSG-RAN4 Meeting #112; Maastricht, Netherlands, Aug. 19-23, 2024; CR-Form-v12.3; Change Request; 38.101-5 CR 0107 rev Current version: 18.6.0; Title: CR on log formula for FR2-NTN UE RF requirement.

R4-2412480; 3GPP TSG-RAN4 Meeting #112; Maastricht, Netherlands, Aug. 19-Aug. 23, 2024; CR-Form-v12.3; Change Request; 38.101-5 CR 0111 rev—Current version: 18.6.0; Title: (NR_NTN_enh-Core) CR to correct the definition of cross-polarized transmission—TS38. 101-5.

R4-2413491; 3GPP TSG-RAN WG4 Meeting # 112; Maastricht , NL, Aug. 19-23, 2024; CR-Form-v12.3; Change Request; 38.101-5 CR 0112 rev 1 Current version: 18.6.0; Title: Maintenance CR for NTN VSAT in Ka-band.

R4-2413033; 3GPP TSG-RAN4 Meeting #112; Maastricht, Netherlands, Aug. 19-Aug. 23, 2024; CR-Form-v12.3; Change Request; 38.101-5 CR 0119 rev—Current version: 18.6.0; Title: (NR_NTN_enh-Core) CR for TS 38. 101-5 to clarify the applicability for different requirements (R18).

R4-2411133; 3GPP TSG-RAN4 Meeting #112; Maastricht, Netherlands, Aug. 19-Aug. 23, 2024; CR-Form-v12.3; Change Request; 38.108 CR 0080 rev—Current version: 18.3.0; Title: (NR_NTN_enh-Core)CR for TS 38.108, Correction on general SAN transmitter spurious emission limits for SAN type 2-O.

R4-2412302; 3GPP TSG-RAN4 Meeting # 112; Maastricht, Netherlands, Aug. 19-23, 2024; CR-Form-v12.3; Change Request; 38.108 CR 0087 rev—Current version: 18.3.0; Title: CR for 38.108 on RF FR2-NTN FRC alignments.

R4-2412238; 3GPP TSG-RAN4 Meeting # 112; Maastricht, NL, Aug. 19-23, August; CR-Form-v12.3; Change Request; 38.133 CR 4803 rev—Current version: 18.6.0; Title: ( NR_NTN_enh-Core) Formal CR on interruption time in handover delay for NR SAN FR2-NTN—NR SAN FR2-NTN Handover.

R4-2403052; 3GPP TSG-RAN WG4 Meeting #112; Maastricht, Netherlands, Aug. 19-23, 2024; CR-Form-v12.3; Change Request; 38.133 CR 4892 rev—Current version: 18.6.0; Title: (NR_NTN_enh-Core) Modify the NR NTN RRC Re-establishment requirements.

R4-2412303; 3GPP TSG-RAN4 Meeting # 112; Maastricht, Netherlands, Aug. 19-23, 2024; CR-Form-v12.3; Change Request; 38.181 CR 0039 rev—Current version: 18.2.0; Title: CR for 38.181 on RF FR2-NTN FRC alignments.

RP-242177; 3GPP TSG-RAN Meeting #105; Melbourne, Australia, Sep. 9-Sep. 12, 2024; Source: RAN4; Title: RAN4 CRs to Maintenance for Closed WIs/SIs for REL-18 and earlier—Batch 29; Agenda item: 14; Document for: Approval.

3GPP TS 38.133 V18.1.0 (Mar. 2023); Technical Specification; 3rd Generation Partnership Project; Technical Specification Group Radio Access Network; NR; Requirements for support of radio resource management; (Release 18).

International Search Report and Written Opinion of the International Searching authority mailed Nov. 7, 2024, in International Application No. PCT/US2024/037810.

3GPP TS 38.133 V17.5.0 (Mar. 2022); Release 17; "Foreword", 3GPP Draft; DRAFT_38133-H50, 3rd Generation Partnership Project (3GPP), Mobile Competence Centre; 650, Route Des Lucioles; F-06921 Sophia-Antipolis Cedex; France.

R4-2308673; 3GPP TSG-RAN WG4 Meeting #107; Incheon, KR, May 22-26, 2023; Title: Discussion on RRM requirements for Rel-18 NTN; Source: Huawei, HiSilicon; Agenda item: 8.27.5; Document for: Discussion.

R2-2305937; 3GPP RAN WG2 Meeting #122; Incheon, Republic of Korea, May 22-25, 2023; Agenda Item: 7.7.4.2; Source: InterDigital; Title: Satellite switching without PCI change; Document for: Discussion, Decision.

R4-2307904; 3GPP TSG RAN WG4 Meeting #107; Incheon, Republic of Korea, May 22-May 26, 2023; Source: Ericsson; Title: RRM requirements for NR NTN enhancement; Agenda Item: 8.27.5; Document for: Discussion.

3GPP TS 37.355 V17.4.0 (Mar. 2023); Technical Specification; 3rd Generation Partnership Project; Technical Specification Group Radio Access Network; LTE Positioning Protocol (LPP); (Release 17).

3GPP TS 38.211 V17.4.0 (Dec. 2022); Technical Specification; 3rd Generation Partnership Project; Technical Specification Group Radio Access Network; NR; Physical channels and modulation; (Release 17).

3GPP TS 38.212 V17.5.0 (Mar. 2023); Technical Specification; 3rd Generation Partnership Project; Technical Specification Group Radio Access Network; NR; Multiplexing and channel coding; (Release 17).

3GPP TS 38.213 V17.5.0 (Mar. 2023); Technical Specification; 3rd Generation Partnership Project; Technical Specification Group Radio Access Network; NR; Physical layer procedures for control; (Release 17).

3GPP TS 38.214 V17.5.0 (Mar. 2023); Technical Specification; 3rd Generation Partnership Project; Technical Specification Group Radio Access Network; NR; Physical layer procedures for data; (Release 17).

3GPP TS 38.300 V17.1.0 (Jun. 2022); Technical Specification; 3rd Generation Partnership Project; Technical Specification Group Radio Access Network; NR; NR and NG-RAN Overall Description; Stage 2; (Release 17).

3GPP TS 38.305 V17.4.0 (Mar. 2023); Technical Specification; 3rd Generation Partnership Project; Technical Specification Group Radio Access Network; NG Radio Access Network (NG-RAN); Stage 2 functional specification of; User Equipment (UE) positioning in NG-RAN; (Release 17).

(56) References Cited

OTHER PUBLICATIONS

3GPP TS 38.321 V17.4.0 (Mar. 2023); Technical Specification; 3rd Generation Partnership Project; Technical Specification Group Radio Access Network; NR; Medium Access Control (MAC) protocol specification; (Release 17).
3GPP TS 38.331 V17.4.0 (Mar. 2023); Technical Specification; 3rd Generation Partnership Project; Technical Specification Group Radio Access Network; NR; Radio Resource Control (RRC) protocol specification; (Release 17).
3GPP TS 38.413 V17.4.0 (Mar. 2023); Technical Specification; 3rd Generation Partnership Project; Technical Specification Group Radio Access Network; NG-RAN; NG Application Protocol (NGAP); (Release 17).
3GPP TS 38.455 V17.4.0 (Mar. 2023); Technical Specification; 3rd Generation Partnership Project; Technical Specification Group Radio Access Network; NG-RAN; NR Positioning Protocol A (NRPPa); (Release 17).
R1-1908117; 3GPP TSG RAN WG1 Meeting #98; Prague, Czech Republic, Aug. 26-30, 2019; Agenda Item: 7.2.10.4; Source: Huawei, HiSilicon; Title: Physical layer procedure for NR positioning; Document for: Discussion and Decision.
R1-1909280; 3GPP TSG RAN WG1 #98; Prague, Czech Republic, Aug. 26-30, 2019; Agenda item: 7.2.10.3; Source: Qualcomm Incorporated; Title: UE & TRP measurements for NR Positioning; Document for: Discussion and Decision.
R1-1909643; 3GPP TSG-RAN WG1 Meeting #98; Prague, Czech Republic, Aug. 26-30, 2019; Agenda item: 7.2.10.4; Source: Qualcomm Incorporated; Title: Summary #2 of 7.2.10.4: PHY procedures for positioning measurements; Document for: Discussion and Decision.
R1-1909737; 3GPP TSG RAN WG1 Meeting #98; Prague, Czech Republic, Aug. 26-30, 2019; (Revision of R1-1909637); Source:CATT; Title: Summary #3 of UE and gNB measurements for NR Positioning; Agenda Item: 7.1.10.3; Document for: Discussion and Decision.
R1-1911627; 3GPP TSG-RAN WG1 Meeting #98bis; Chongqing, China, Oct. 14-20, 2019; Agenda item: 7.2.10.4; Source: Qualcomm Incorporated; Title: Summary #2 of 7.2.10.4: PHY procedures for positioning measurements; Document for: Discussion and Decision.
R1-1913447; 3GPP TSG RAN WG1 #99; Reno, Nevada, USA, Nov. 18-22, 2019; Source: CATT; Title: Summary #2 of UE and gNB measurements for NR Positioning; Agenda Item: 7.2.10.1; Document for: Discussion and Decision.
R1-2304435; 3GPP TSG RAN WG1 #113; Incheon, Korea, May 22-26, 2023; Agenda item: 9.9.2; Source: Nokia, Nokia Shanghai Bell; Title: Aspects related to network verified UE location for NR over NTN; Document for: Discussion and Decision.
R1-2304497; 3GPP TSG RAN WG1 #113; Incheon, Korea, May 22-May 26, 2023; Source: vivo; Title: Discussions on remaining issues of UE location verification in NR NTN; Agenda Item: 9.9.2; Document for: Discussion and Decision.
R1-2304610; 3GPP TSG RAN WG1 #113; Incheon, Korea, May 22-May 26, 2023; Agenda Item: 9.9.2; Source: Thales; Title: Discussion on network verified UE location in NR NTN; Document for: Discussion and decision.
R1-2304633; 3GPP TSG-RAN WG1 Meeting #113; Incheon, Korea, May 22-26, 2023; Agenda Item: 9.9.2; Source: Huawei, HiSilicon; Title: Discussion on network-verified UE location for NR NTN; Document for: Discussion and Decision.
R1-2304752; 3GPP TSG RAN WG1 #113; Incheon, Korea, May 22-May 26, 2023; Agenda Item: 9.9.2; Source: CATT; Title: Further discussion on Network verified UE location for NR NTN; Document for: Discussion and Decision.
R1-2304816; 3GPP TSG RAN WG1 #113; Incheon, Korea, May 22-May 26, 2023; Source: Intel Corporation; Title: On network verified UE location for NR NTN; Agenda item: 9.9.2; Document for: Discussion and Decision.
R1-2304917; 3GPP TSG RAN WG1 #113; Incheon, Korea, May 22-May 26, 2023; Agenda item: 9.9.2; Source: Xiaomi; Title: Discussion on the network verified location for NR NTN; Document for: Discussion.
R1-2305048; 3GPP TSG RAN WG1 #113; Incheon, Korea. May 22-26, 2023; Agenda Item: 9.9.2; Source: Sony; Title: On network verified UE location for NR NTN; Document for: Discussion and decision.
R1-2305260; 3GPP TSG RAN WG1 #113; Incheon, Korea, May 22-May 26, 2023; Agenda Item: 9.9.2; Source: Apple; Title: Network Verified UE Location; Document for: Discussion/Decision.
R1-2305353; 3GPP TSG RAN WG1 #113; Incheon, Korea, May 22-May 26, 2023; Agenda item: 9.9.2; Source: Qualcomm Incorporated; Title: Network verified UE location for NR NTN; Document for: Discussion/Decision.
R1-2305391; 3GPP TSG RAN WG1 #113; Incheon, Korea, May 22-May 26, 2023; Agenda item: 9.9.2; Source: LG Electronics; Title: Discussion on network verified UE location for NR NTN; Document for: Discussion and Decision.
R1-2305437; 3GPP TSG RAN WG1 #113; Incheon, Korea, May 22-26, 2023; Source: OPPO; Title: Discussion on network verified UE location for NR NTN; Agenda Item: 9.9.2; Document for: Discussion and Decision.
R1-2305530; 3GPP TSG RAN WG1 Meeting #113; Incheon, Korea, May 22-May 26, 2023; Agenda item: 9.9.2; Source: Samsung; Title: Network verified UE location for NR NTN; Document for: Discussion and Decision.
R1-2305557; 3GPP TSG RAN WG1 #113; Incheon, Korea, May 22-May 26, 2023; Source: ZTE; Title: Discussion on network verified UE location for NR NTN; Agenda Item: 9.9.2; Document for: Discussion.
R1-2305612; 3GPP TSG RAN WG1 #113; Incheon, KR, May 22-May 26, 2023; Source: NTT DOCOMO, Inc.; Title: Discussion on Network verified UE location for NR NTN; Agenda Item: 9.9.2; Document for: Discussion/Decision.
R1-2305641; 3GPP TSG RAN WG1 Meeting #113; Incheon, South Korea, May 22-May 26, 2023; Agenda Item: 9.9.2; Source: MediaTek Inc.; Title: Network verified UE location for NR NTN; Document for: Discussion and Decision.
R1-2305678; 3GPP TSG-RAN WG1 Meeting #113; Incheon, South Korea May 23-27, 2023; Agenda Item: 9.9.2; Source: TCL Communication Ltd.; Title: Further Discussion on Network Verified UE Location; Document for: Discussion and Decision.
R1-2305681; 3GPP TSG RAN WG1 #113; Meeting, Incheon, May 22-May 26, 2023; Source: Panasonic; Title: Discussion on Network-verified UE location for NR NTN; Agenda Item: 9.9.2; Document for: Discussion and decision.
R1-2305745; 3GPP TSG RAN WG1#113; Incheon, Korea, May 22-May 26, 2023; Agenda item: 9.9.2; Source: Lenovo; Title: On NTN NW verified UE location; Document for: Discussion.
R1-2305801—final; 3GPP TSG RAN WG1 #113; Incheon, Korea, May 22-May 26, 2023; Agenda item: 9.9.2; Source: ETRI; Title: Discussion on Network verified UE location for NR NTN; Document for: Discussion/Decision.
R1-2305848; 3GPP TSG RAN WG1 #113; Incheon, Korea, May 22-26, 2023; Source: Sharp; Title: Network verified UE location for Rel-18 NR NTN; Agenda Item: 9.9.2; Document for: Discussion and Decision.
R1-2305918; 3GPP TSG-RAN WG1 Meeting #113; Incheon, Korea, May 22-May 26, 2023; Agenda Item: 9.9.2; Source: Ericsson; Title: On Network verified UE location in NR NTN; Document for: Discussion.
R2-2211129_S2-2209589; 3GPP TSG RAN WG2#120; Toulouse, Nov. 14-18, 2022; S2-2209589; 3GPP TSG-SA WG2 Meeting #153E (e-meeting); Oct. 10-17, 2022, Electronic meeting; Title: Response LS on LCS framework for Network verified UE location (NTN).
R2-2211132; 3GPP TSG RAN WG2#120; Toulouse, Nov. 14-18, 2022; S2-2209684; 3GPP TSG SA WG2 Meeting #153E (e-meeting); Oct. 10-17, 2022; Title: LS on Satellite coverage data transfer to a UE using UP versus CP.
R2-2304735; 3GPP TSG RAN WG2 Meeting #121bis-e; Online, Apr. 17-Apr. 26, 2023; (Revision of R2-2211373); Agenda Item: 8.7.3; Source: MediaTek Inc.; Title: On Network Verified UE Location in NR NTN.

(56) References Cited

OTHER PUBLICATIONS

R2-2304811; 3GPP TSG-RAN2 Meeting #122; Incheon, KR, May 22-26, 2023; Source: Huawei, Turkcell, HiSilicon; Title: Discussion on the network verified UE location; Agenda Item: 7.7.3; Document for: Discussion and decision.

R2-2305033; 3GPP TSG-RAN WG2 #122; Incheon, KR, May 22-26, 2023; Agenda Item: 7.7.3; Source: Ericsson; Title: Discussion on network verified UE location; Document for: Discussion, Decision.

R2-2305194; 3GPP TSG-RAN WG2 Meeting #122; Incheon, Korea: May 22-26, 2023; Agenda item: 7.7.3; Source: Qualcomm Incorporated; Title: Single satellite Multi-RTT based positioning; Document for: Discussion and Decision.

R2-2305249; 3GPP TSG RAN WG2 Meeting #122; Incheon, Korea, May 22-26, 2023; Agenda item: 7.7.3; Source: Quectel; Title: Discussion on multiple-RTT based positioning in NTN; Document for: Discussion and Decision.

R2-2305393; 3GPP TSG-RAN WG2 Meeting#122; Incheon, Korea, May 22-26, 2023; Agenda item: 7.7.3; Source: Lenovo; Title: Discussion on NTN NW verified UE location; Document for: Discussion.

R2-2305408; 3GPP TSG RAN WG2 #122; Incheon, KR, May 22-May 26, 2023; revision of R2-2303261; Agenda Item: 7.7.3; Source: Thales; Title: Discussion on network verified UE location in NR NTN; Document for: Discussion and decision.

R2-2305596; 3GPP TSG-RAN WG2 Meeting #122; Incheon, Korea, May 22-26, 2023; Agenda Item: 7.7.3; Source: CMCC; Title: Network verified UE location; Document for: Discussion, Decision.

R2-2305673; 3GPP TSG RAN WG2 #122; Inchon, May 22-26, 2023; Agenda Item: 7.7.3; Source: Xiaomi; Title: Discussion on network verified UE location; Document for: Discussion and Decision.

ETSI TS 138 300 V17.4.0 (Apr. 2023); 5G; NR; NR and NG-RAN Overall description; Stage-2; (3GPP TS 38.300 version 17.4.0 Release 17).

European Office Action mailed Jul. 14, 2026 in EP Patent Application No. 24751885.5.

* cited by examiner

Logical Channels

Transport Channels

Physical Channels

Physical Signals

PCCH BCCH CCCH DCCH DTCH

PCH BCH DL-SCH

PBCH PDSCH PDCCH

DCI

PSS/SSS CSI-RS DM-RS PT-RS

Downlink

CCCH DCCH DTCH

UL-SCH RACH

PUSCH PUCCH PRACH

UCI

DM-RS PT-RS SRS

Uplink

```
RequestCapabilities-r9-IEs ::= SEQUENCE {
  commonIEsRequestCapabilities
  ...,
  [[...]],
  [[nr-ECID-RequestCapabilities-r16
    nr-Multi-RTT-RequestCapabilities-r16
    nr-DL-AoD-RequestCapabilities-r16
    nr-DL-TDOA-RequestCapabilities-r16
    nr-UL-RequestCapabilities-r16 ]]
}
```

FIG. 18A

```
ProvideCapabilities-r9-IEs ::= SEQUENCE {
  commonIEsProvideCapabilities
  ...,
  [[nr-ECID-ProvideCapabilities-r16
    nr-Multi-RTT-ProvideCapabilities-r16
    nr-DL-AoD-ProvideCapabilities-r16
    nr-DL-TDOA-ProvideCapabilities-r16
    nr-UL-ProvideCapabilities-r16        ]]
}
```

FIG. 18B

```
RequestAssistanceData-r9-IEs ::= SEQUENCE {
  ...,
  [[nr-Multi-RTT-RequestAssistanceData-r16
    nr-DL-AoD-RequestAssistanceData-r16
    nr-DL-TDOA-RequestAssistanceData-r16
  ]]
}
NR-Multi-RTT-RequestAssistanceData-r16 ::= SEQUENCE {
  nr-PhysCellID-r16        NR-PhysCellID-r16
  nr-AdType-r16
  ...,
  [[
  nr-on-demand-DL-PRS-Request-r17
  nr-DL-PRS-ExpectedAoD-or-AoA-Request-r17
  pre-configured-AssistanceDataRequest-r17
  ]]
}
```

FIG. 18C

```
CommonIEsRequestLocationInformation ::= SEQUENCE {
  LocationInformationType,
  triggeredReporting     TriggeredReportingCriteria
  periodicalReporting    PeriodicalReportingCriteria
  additionalInformation    AdditionalInformation
  scheduledLocationTime-r17
...,
}
TriggeredReportingCriteria ::=     SEQUENCE {
  cellChange                   BOOLEAN,
  reportingDuration              ReportingDuration,
}

PeriodicalReportingCriteria ::=    SEQUENCE {
  reportingAmount
  reportingInterval
}


ResponseTime ::= SEQUENCE {
  time
  responseTimeEarlyFix-r12
  unit-r15
}

ScheduledLocationTime-r17 ::= SEQUENCE {
  utcTime-r17
  gnssTime-r17
  networkTime-r17
  relativeTime-r17  INTEGER (1..1024)
}
```

FIG. 19

```
NR-Multi-RTT-ProvideAssistanceData-r16 ::= SEQUENCE {
   nr-DL-PRS-AssistanceData-r16
   nr-SelectedDL-PRS-IndexList-r16
   ...,
   [[
   nr-On-Demand-DL-PRS-Configurations-r17
   nr-On-Demand-DL-PRS-Configurations-Selected-
IndexList-r17
   assistanceDataValidityArea-r17 AreaID-CellList-r17
   ]]
}
NR-DL-TDOA-ProvideAssistanceData-r16 ::= SEQUENCE {
   nr-DL-PRS-AssistanceData-r16
   nr-SelectedDL-PRS-IndexList-r16
   ...,
   [[
   nr-On-Demand-DL-PRS-Configurations-r17
   nr-On-Demand-DL-PRS-Configurations-Selected-
IndexList-r17
   assistanceDataValidityArea-r17 AreaID-CellList-r17
   ]]
}
AreaID-CellList-r17 ::= SEQUENCE
(SIZE(1..maxCellIDsPerArea-r17)) OF NR-Cell-IDs-r17
NR-Cell-IDs-r17 ::= SEQUENCE {
   nr-CellGlobalID-r17
   nr-PhysCellID-r17
   nr-ARFCN-r17
}
```

FIG. 20A

```
NR-Multi-RTT-RequestAssistanceData-r16 ::= SEQUENCE {
   nr-PhysCellID-r16
   nr-AdType-r16
   [[
   nr-on-demand-DL-PRS-Request-r17
   nr-DL-PRS-ExpectedAoD-or-AoA-Request-r17
   pre-configured-AssistanceDataRequest-r17
   ]]
}
```

FIG. 20B

```
NR-DL-PRS-AssistanceData-r16 ::= SEQUENCE {
  nr-SSB-Config-r16
  nr-DL-PRS-ReferenceInfo-r16     DL-PRS-ID-Info-r16,
  nr-DL-PRS-AssistanceDataList-r16  SEQUENCE (SIZE
  (1..nrMaxFreqLayers-r16)) OF NR-DL-PRS-
                            AssistanceDataPerFreq-r16,
}
NR-DL-PRS-AssistanceDataPerFreq-r16 ::= SEQUENCE {
  nr-DL-PRS-PositioningFrequencyLayer-r16
  nr-DL-PRS-AssistanceDataPerFreq-r16 SEQUENCE (SIZE
(1..nrMaxTRPsPerFreq-r16)) OF
                                      NR-DL-PRS-
AssistanceDataPerTRP-r16,
}
NR-DL-PRS-AssistanceDataPerTRP-r16 ::= SEQUENCE {
  dl-PRS-ID-r16
  nr-PhysCellID-r16
  nr-CellGlobalID-r16
  nr-ARFCN-r16
  nr-DL-PRS-SFN0-Offset-r16  NR-DL-PRS-SFN0-Offset-r16,
  nr-DL-PRS-ExpectedRSTD-r16    INTEGER (-3841..3841),
  nr-DL-PRS-ExpectedRSTD-Uncertainty-r16 INTEGER
(0..246),
  nr-DL-PRS-Info-r16       NR-DL-PRS-Info-r16,
  prs-OnlyTP-r16
  nr-DL-PRS-ExpectedAoD-or-AoA-r17
}
NR-DL-PRS-SFN0-Offset-r16 ::= SEQUENCE {
  sfn-Offset-r16           INTEGER (0..1023),
  integerSubframeOffset-r16  INTEGER (0..9),
}
```

FIG. 21A

```
DL-PRS-ID-Info-r16 ::= SEQUENCE {
  dl-PRS-ID-r16
  nr-DL-PRS-ResourceID-List-r16 SEQUENCE (SIZE
(1..nrMaxResourceIDs-r16)) OF
                                NR-DL-PRS-ResourceID-r16
  nr-DL-PRS-ResourceSetID-r16
}
```

FIG. 21B

```
NR-DL-PRS-Info-r16 ::= SEQUENCE {
  nr-DL-PRS-ResourceSetList-r16   SEQUENCE (SIZE
(1..nrMaxSetsPerTrpPerFreqLayer-r16)) OF NR-DL-PRS-
                                          ResourceSet-r16,
}

NR-DL-PRS-ResourceSet-r16 ::= SEQUENCE {
  nr-DL-PRS-ResourceSetID-r16
  dl-PRS-Periodicity-and-ResourceSetSlotOffset-r16
  dl-PRS-ResourceRepetitionFactor-r16
  dl-PRS-ResourceTimeGap-r16
  dl-PRS-NumSymbols-r16
  dl-PRS-MutingOption1-r16
  dl-PRS-MutingOption2-r16
  dl-PRS-ResourcePower-r16
  dl-PRS-ResourceList-r16
}

NR-DL-PRS-Resource-r16 ::= SEQUENCE {
  nr-DL-PRS-ResourceID-r16      NR-DL-PRS-ResourceID-
r16,
  dl-PRS-SequenceID-r16
  dl-PRS-CombSizeN-AndReOffset-r16
  dl-PRS-ResourceSlotOffset-r16
  dl-PRS-ResourceSymbolOffset-r16
  dl-PRS-QCL-Info-r16           DL-PRS-QCL-Info-r16
}

DL-PRS-QCL-Info-r16 ::= CHOICE {
  ssb-r16               SEQUENCE {
    pci-r16                 NR-PhysCellID-r16,
    ssb-Index-r16           INTEGER (0..63),
    rs-Type-r16             ENUMERATED {typeC, typeD,
typeC-plus-typeD}
  },
  dl-PRS-r16            SEQUENCE {
    qcl-DL-PRS-ResourceID-r16
    qcl-DL-PRS-ResourceSetID-r16
  }
}
```

FIG. 22

| Elementary procedure (EP) | Initiating message | Response message (for successful outcome) | Response message (for unsuccessful outcome) |
|---|---|---|---|
| E-CID measurement initiation | E-CID MEASUREMENT INITIATION REQUEST | E-CID MEASUREMENT INITIATION RESPONSE | E-CID MEASUREMENT INITIATION FAILURE |
| OTDOA information exchange | OTDOA INFORMATION REQUEST | OTDOA INFORMATION RESPONSE | OTDOA INFORMATION FAILURE |
| Positioning information exchange | POSITIONING INFORMATION REQUEST | POSITIONING INFORMATION RESPONSE | POSITIONING INFORMATION FAILURE |
| TRP information exchange | TRP INFORMATION REQUEST | TRP INFORMATION RESPONSE | TRP INFORMATION FAILURE |
| measurement | MEASUREMENT REQUEST | TRP INFORMATION RESPONSE | TRP INFORMATION FAILURE |
| Positioning activation | POSITIONING ACTIVATION REQUEST | POSITIONING ACTIVATION RESPONSE | POSITIONING ACTIVATION FAILURE |
| PRS configuration exchange | PRS CONFIGURATION REQUEST | PRS CONFIGURATION RESPONSE | PRS CONFIGURATION FAILURE |
| Measurement pre-configuration | MEASREUEMNT RPECONFIGURATION REQUEST | MEASREUEMNT RPECONFIGURATION RESPONSE | MEASREUEMNT RPECONFIGURATION REFUSE |

FIG. 25

| Elementary element (EP) | Initiating message |
|---|---|
| E-CID measurement failure indication | E-CID MEASUREMENT FAILURE INDICATION |
| E-CID measurement report | E-CID MEASUREMENT REPORT |
| E-CID measurement termination | E-CID MEASUREMENT TERMINATION |
| Error indication | OTDOA information exchange |
| Assistance information control | ASSISTANCE INFORMATION CONTROL |
| Assistance information feedback | ASSISTANCE INFORMATION FEEDBACK |
| Positioning information update | POSITIONING INFORMATION UPDATE |
| Measurement report | MEASUREMENT REPORT |
| Measurement update | MEASUREMENT UPDATE |
| Measurement abort | MEASUREMENT ABORT |
| Measurement failure indication | MEASUREMENT FAILURE INDICATION |
| Positioning Deactivation | POSITIONING DEACTIVATION |
| Measurement Activation | MEASUREMENT ACTIVATION |

FIG. 26

| function | Elementary procedure(s) (EPs) |
|---|---|
| E-CID location information transfer | A) E-CID measurement initiation<br>B) E-CID measurement failure indication<br>C) E-CID measurement report<br>D) E-CID measurement termination |
| OTDOA information transfer | OTDOA information exchange |
| Assistance information transfer | A) assistance information control<br>B) assistance information feedback |
| Reporting of general error situations | Error indication |
| Positioning information transfer | A) positioning information exchange<br>B) positioning information update<br>C) positioning activation<br>D) positioning deactivation |
| TRP information transfer | TRP information exchange |
| Measurement information transfer | A) Measurement<br>B) Measurement update<br>C) Measurement report<br>D) Measurement abort<br>D) Measurement failure indication |
| PRS information transfer | PRS configuration exchange |
| Measurement pre-configuration information transfer | A) Measurement pre-configuration<br>B) Measurement activation |

FIG. 27

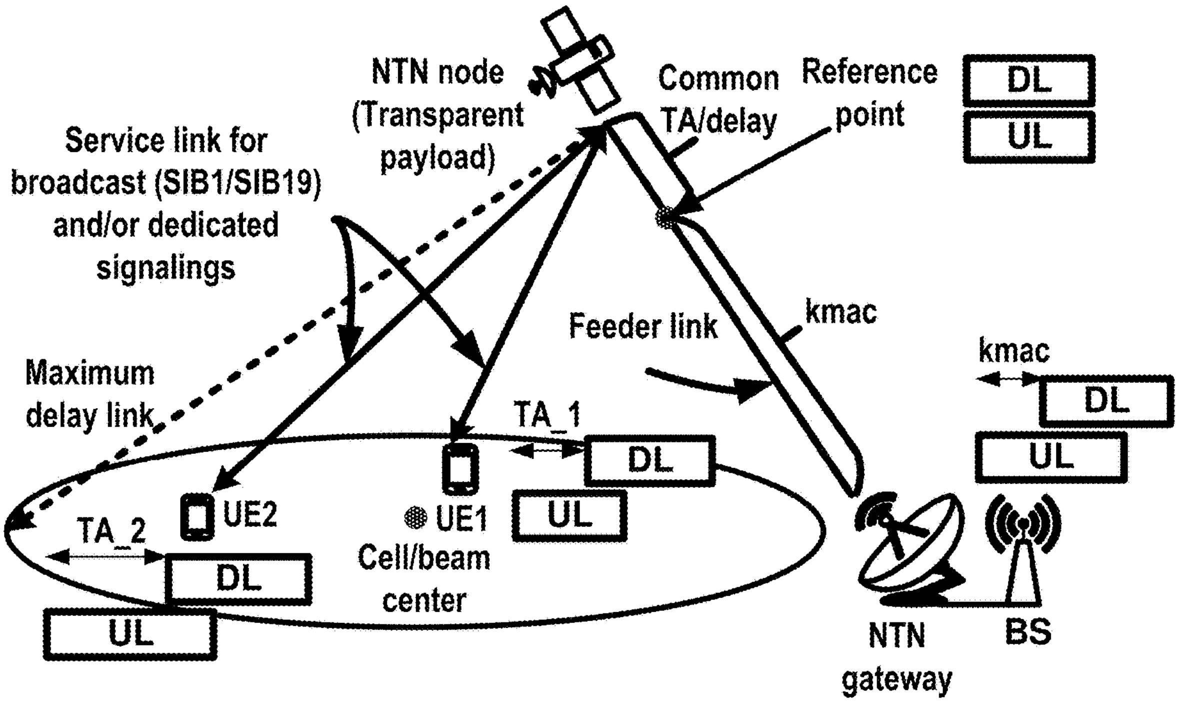

FIG. 29A

```
SIB19-r17 ::=
SEQUENCE {
   ntn-Config-r17
  t-Service-r17
   referenceLocation-
  r17
    distanceThresh-
  r17
    ntn-
  NeighCellConfigList
  -r17
  lateNonCriticalExte
  nsion
}
```

2500

```
NTN-NeighCellConfig-r17 ::=
SEQUENCE{
        ntn-Config-r17
        carrierFreq-r17
        physCellId-r17
}
```

2520

```
NTN-Config-r17 ::=SEQUENCE {
    epochTime-r17
    ntn-
UlSyncValidityDuration-r17
    cellSpecificKoffset-r17
    kmac-r17
    ta-Info-r17
    ntn-PolarizationDL-r17
    ntn-PolarizationUL-r17
    ephemerisInfo-r17
    ta-Report-r17
}
```

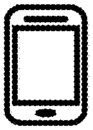
UE

Suspending/halting, during a positioning procedure (for UE location verification) and until location of the wireless device being verified, (all) UL/DL transmissions that are not related/ associated with the ongoing positioning procedure (e.g., only transmitting SRS for positioning and LPP messages or receiving DL PRS resources and LPP messages)

FIG. 35A

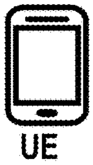
UE

Suspending/halting, in response to/after transmitting an LPP provide location information message to location server (e.g., during the positioning procedure for UE location verification) and until location of the wireless device being verified, (all) UL/DL transmissions that are not related/ associated with the ongoing positioning procedure (e.g., only transmitting SRS for positioning and LPP messages or receiving DL PRS resources and LPP messages)

FIG. 35B

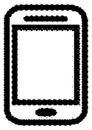
UE flushing, in response to starting a positioning procedure (for UE location verification), one or more UL/DL HARQ buffers of plurality of HARQ buffers, wherein one or more UL/DL HARQ buffers are not associated with the ongoing positioning procedure (e.g., not used for transmitting/ receiving LPP messages)

FIG. 35C

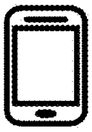
UE flushing, in response to transmitting an LPP provide location information message to location server (e.g., during the positioning procedure for UE location verification) , one or more UL/DL HARQ buffers of plurality of HARQ buffers, wherein one or more UL/DL HARQ buffers are not associated with the ongoing positioning procedure (e.g., not used for transmitting/receiving LPP messages)

FIG. 35D

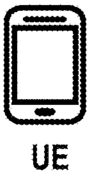

Receiving, from a location server, at least one LPP message (e.g., an LPP request location information and/or an LPP provided assistance data) and starting a positioning procedure

↓

In response to/after receiving the at least one LPP message and a validity duration of NTN assistance data (of a cell of the NTN, e.g., serving cell) being running (e.g., UL synchronization of the cell being obtained), starting a (positioning) measurement period from a first/earliest (configured/activated) MG/PPW instance that is aligned with DL-PRS resources in the assistance data (e.g., indicated via the LPP assistance data message)

FIG. 38A

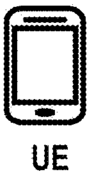

Receiving, from a location server, at least one LPP message (e.g., an LPP request location information and/or an LPP provided assistance data)

↓

In response to/after the at least one LPP message and a validity duration of NTN assistance data (of a cell of the NTN, e.g., serving cell) being expired/stopped (e.g., UL synchronization of the cell being lost), starting, after obtaining UL synchronization of the cell (starting the validity timer), a (positioning) measurement period from a first/ earliest (configured/activated) MG/PPW instance that is aligned with DL-PRS resources in the assistance data (e.g., indicated via the LPP assistance data message)

FIG. 38B

Receiving, from a location server via a cell of NTN, at least one LPP message (e.g., an LPP request location information and/or an LPP provided assistance data) and starting a positioning procedure Starting, in response to/after the at least one LPP message, at least one (positioning) measurement period (corresponding to positioning procedure), e.g., from/after a first/earliest (configured/activated) MG/PPW instance that is aligned with DL-PRS resources in the assistance data Restarting, in response to (or after) occurring an NTN event, the at least one (positioning) measurement period, wherein the NTN event is at least one of:

- 1st NTN event, e.g., an expiry of validity duration of the cell and/or losing UL synchronization of the cell
- 2nd NTN event, e.g., calculating/determining/updating open-loop TA value in response to acquiring SIB19 via the cell while the validity duration of the cell is running
- 3rd NTN event, e.g., (autonomously) updating the open-loop TA value using the acquired SIB19 of the cell while the validity duration of the cell is running
- 4th NTN event, e.g., switching (with unchanged PCI of the cell) from a 1st NTN node of the cell to a 2nd NTN node of the cell for a serving link switch/as a service link

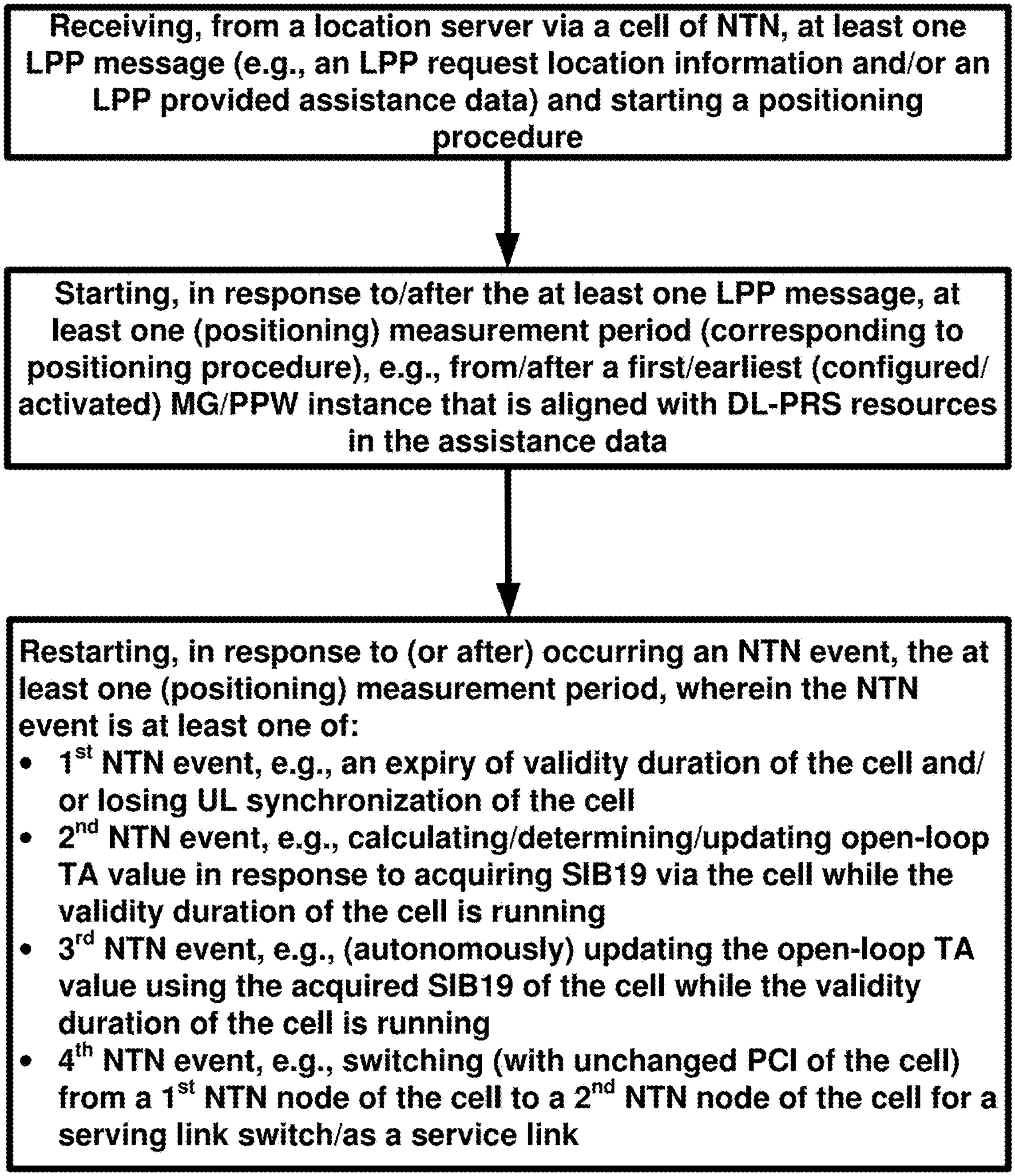

FIG. 46

Receiving, from a location server via a cell of NTN, at least one LPP message (e.g., an LPP request location information and/or an LPP provided assistance data)

Starting, in response to/after the at least one LPP message, at least one (positioning) measurement period, e.g., from/after a first/earliest (configured/activated) MG/PPW instance that is aligned with DL-PRS resources in the assistance data When a 1st NTN event occurs (e.g., due to losing UL synchronization of the cell, e.g., an expiry of the validity timer of the cell), restarting the at least one (positioning) measurement period after obtaining UL synchronization of the cell (e.g., starting the validity timer of the cell)

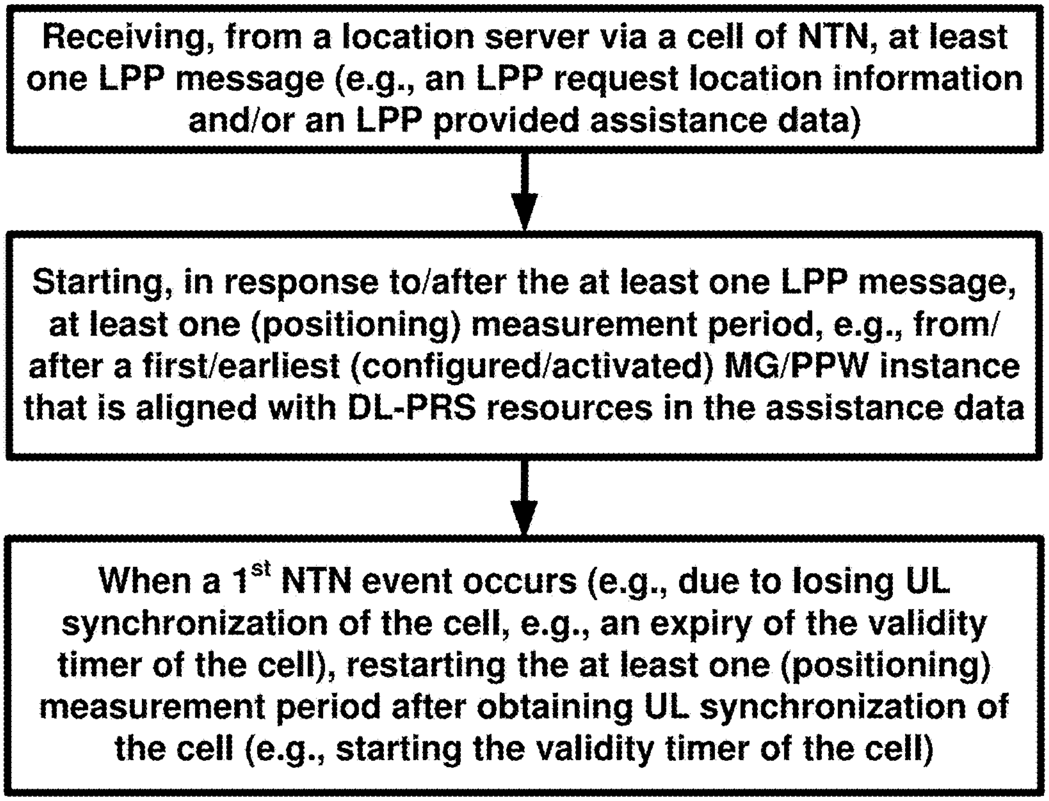

FIG. 47A

Receiving, from a location server via a cell of NTN, at least one LPP message (e.g., an LPP request location information and/or an LPP provided assistance data)

Starting, in response to/after the at least one LPP message, at least one (positioning) measurement period, e.g., from/after a first/earliest (configured/activated) MG/PPW instance that is aligned with DL-PRS resources in the assistance data When a 4th NTN event occurs (e.g., due to switching from a 1st NTN node of the cell to a 2nd NTN node of the cell for a serving link switch without changed PCI of the cell), restarting the at least one (positioning) measurement period after obtaining UL (and/or DL) synchronization of the 2nd NTN node

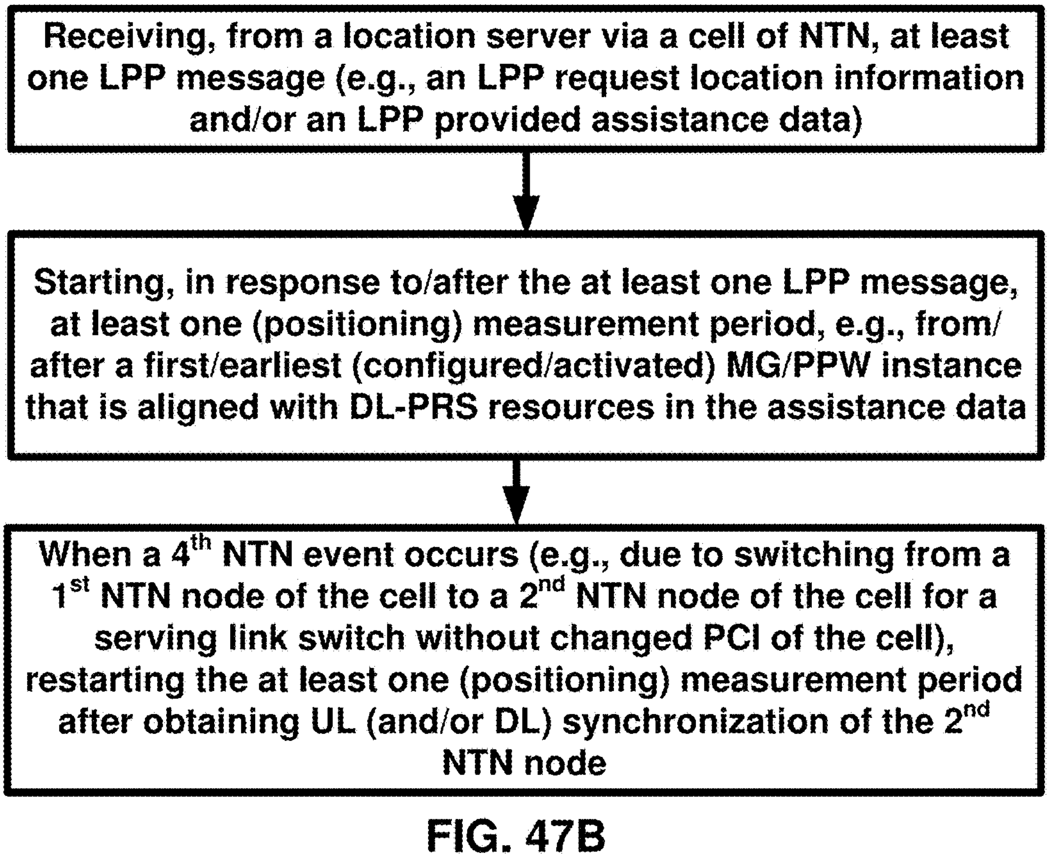

FIG. 47B

Receiving, from a location server via a cell of NTN, at least one LPP message (e.g., an LPP request location information and/or an LPP provided assistance data)

↓

Starting, in response to/after the at least one LPP message, at least one (positioning) measurement period (e.g., UE Rx-Tx time difference measurement period), e.g., from/after a first/earliest (configured/activated) MG/PPW instance that is aligned with DL-PRS resources in the assistance data

↓

In response to starting an interruption window (e.g., a 1st NTN event being occurred or a 4th NTN event being occurred), restarting the at least one (positioning) measurement period based on a length of the interruption window being larger than a 1st threshold (e.g., 160 ms)

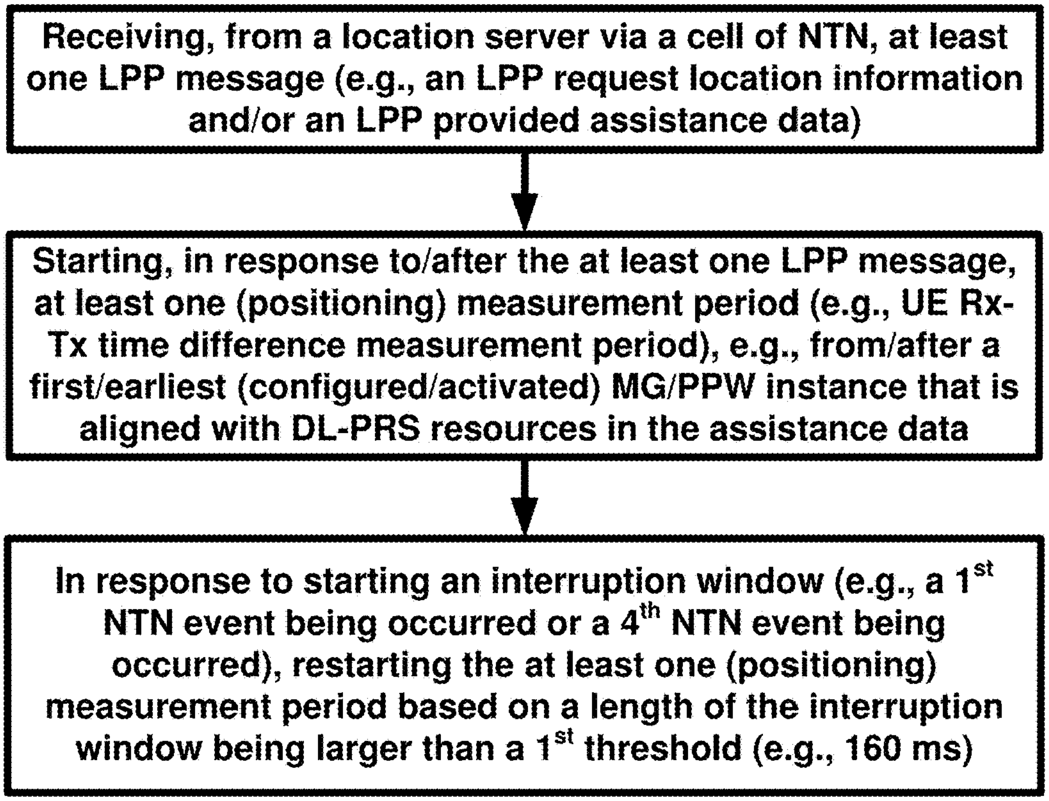

FIG. 48A

Receiving, from a location server via a cell of NTN, at least one LPP message (e.g., an LPP request location information and/or an LPP provided assistance data)

↓

Starting, in response to/after the at least one LPP message, at least one (positioning) measurement period (e.g., UE Rx-Tx time difference measurement period), e.g., from/after a first/earliest (configured/activated) MG/PPW instance that is aligned with DL-PRS resources in the assistance data

↓

In response to starting an interruption window (e.g., a 1st NTN event being occurred or a 4th NTN event being occurred), restarting the at least one (positioning) measurement period based on a time to measuring/receiving a latest DL PRS resource being greater than a 2nd threshold (e.g., 160 ms)

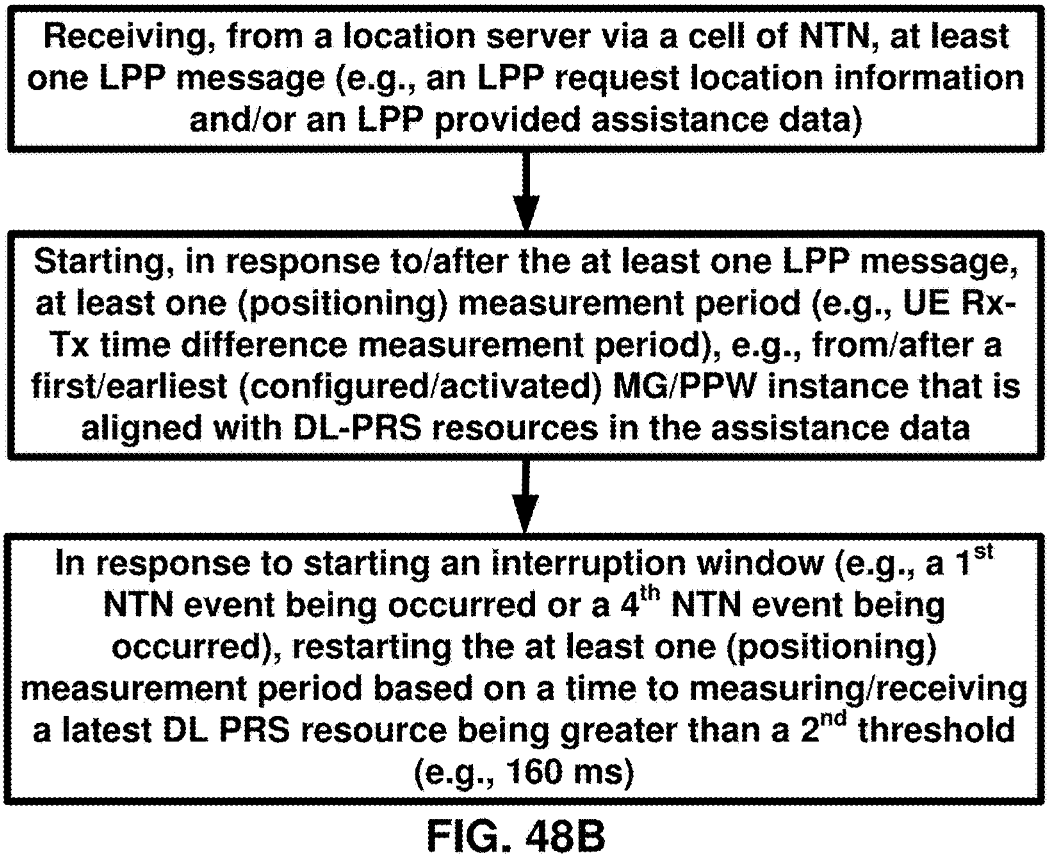

FIG. 48B

Receiving, from a location server via a cell of NTN, at least one LPP message (e.g., a LPP request location information and/or an LPP provided assistance data) and starting a positioning procedure Starting, in response to/after the at least one LPP message, a (positioning) measurement period of the positioning procedure, e.g., from/after a first/earliest (configured/activated) MG/PPW instance that is aligned with DL-PRS resources in the assistance data

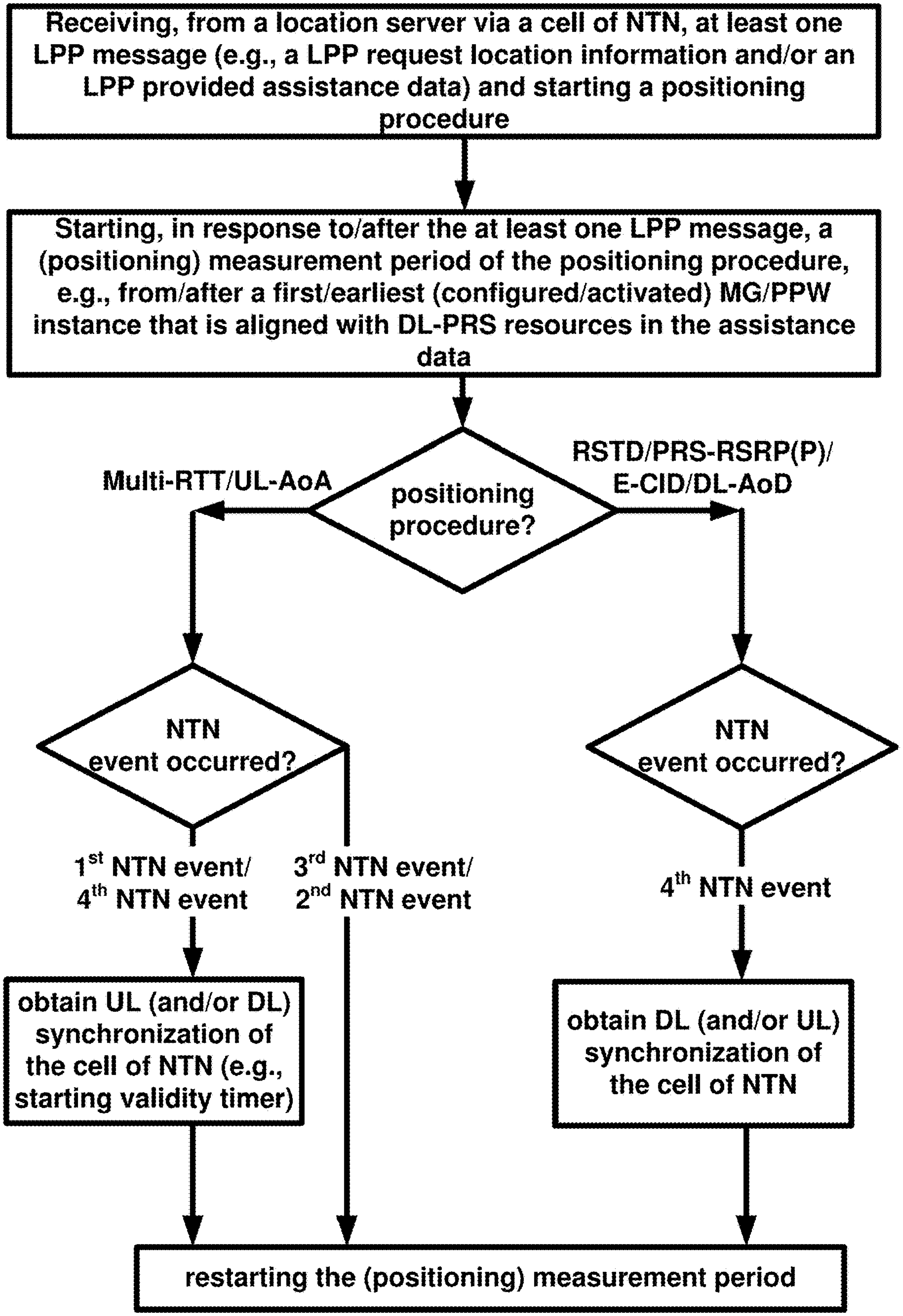

FIG. 49

POSITIONING IN NON-TERRESTRIAL NETWORKS

CROSS-REFERENCE TO RELATED APPLICATIONS

This application is a continuation of International Application No. PCT/US2024/037810, filed Jul. 12, 2024, which claims the benefit of U.S. Provisional Application No. 63/526,423, filed Jul. 12, 2023, all of which are hereby incorporated by reference in their entireties.

BRIEF DESCRIPTION OF THE DRAWINGS

Examples of several of the various embodiments of the present disclosure are described herein with reference to the drawings.

FIG. 18A shows an example of request capabilities message.

FIG. 18B shows an example of provide capabilities message.

FIG. 18C shows an example of request assistance data message.

FIG. 19 shows an example of configuration parameters of a request location information.

FIG. 20A shows an example of configuration parameters of a provided assistance data message.

FIG. 20B shows an example of configuration parameters of a request assistance data message.

FIG. 21A shows an example of configuration parameters of downlink (DL) positioning reference signal (PRS).

FIG. 21B shows an example of configuration parameters of downlink (DL) positioning reference signal (PRS).

FIG. 22 shows an example of configuration parameters of downlink (DL) positioning reference signal (PRS).

FIG. 25 and FIG. 26 show examples of NRPPa messages and corresponding NRPPa elementary procedures.

FIG. 27 shows an example of NRPPa functions.

FIG. 29A shows an example of an NTN.

FIG. 29B shows an example of (NTN) assistance information for maintenance of UL synchronization at a wireless device in an NTN.

FIG. 35A illustrates an example flowchart of UL/DL communications during a positioning procedure for UE location verification as per an aspect of the present disclosure.

FIG. 35B illustrates an example flowchart of UL/DL communications during a positioning procedure for UE location verification as per an aspect of the present disclosure.

FIG. 35C illustrates an example flowchart of UL/DL communications during a positioning procedure for UE location verification as per an aspect of the present disclosure.

FIG. 35D illustrates an example flowchart of UL/DL communications during a positioning procedure for UE location verification as per an aspect of the present disclosure.

FIG. 38A illustrates an example flowchart of positioning procedure in a non-terrestrial network per an aspect of the present disclosure.

FIG. 38B illustrates an example flowchart of positioning procedure in a non-terrestrial network per an aspect of the present disclosure.

FIG. 46 illustrates an example flowchart of positioning procedure in a non-terrestrial network per an aspect of the present disclosure.

FIG. 47A illustrates an example flowchart of positioning procedure in a non-terrestrial network per an aspect of the present disclosure.

FIG. 47B illustrates an example flowchart of positioning procedure in a non-terrestrial network per an aspect of the present disclosure.

FIG. 48A illustrates an example flowchart of positioning procedure in a non-terrestrial network per an aspect of the present disclosure.

FIG. 48B illustrates an example flowchart of positioning procedure in a non-terrestrial network per an aspect of the present disclosure.

FIG. 49 illustrates an example flowchart of positioning procedure in a non-terrestrial network per an aspect of the present disclosure.

DETAILED DESCRIPTION

Figure 1A:
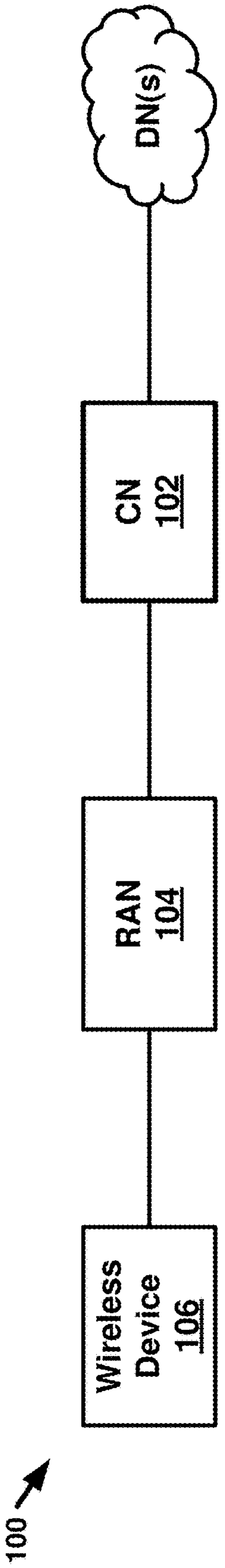
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
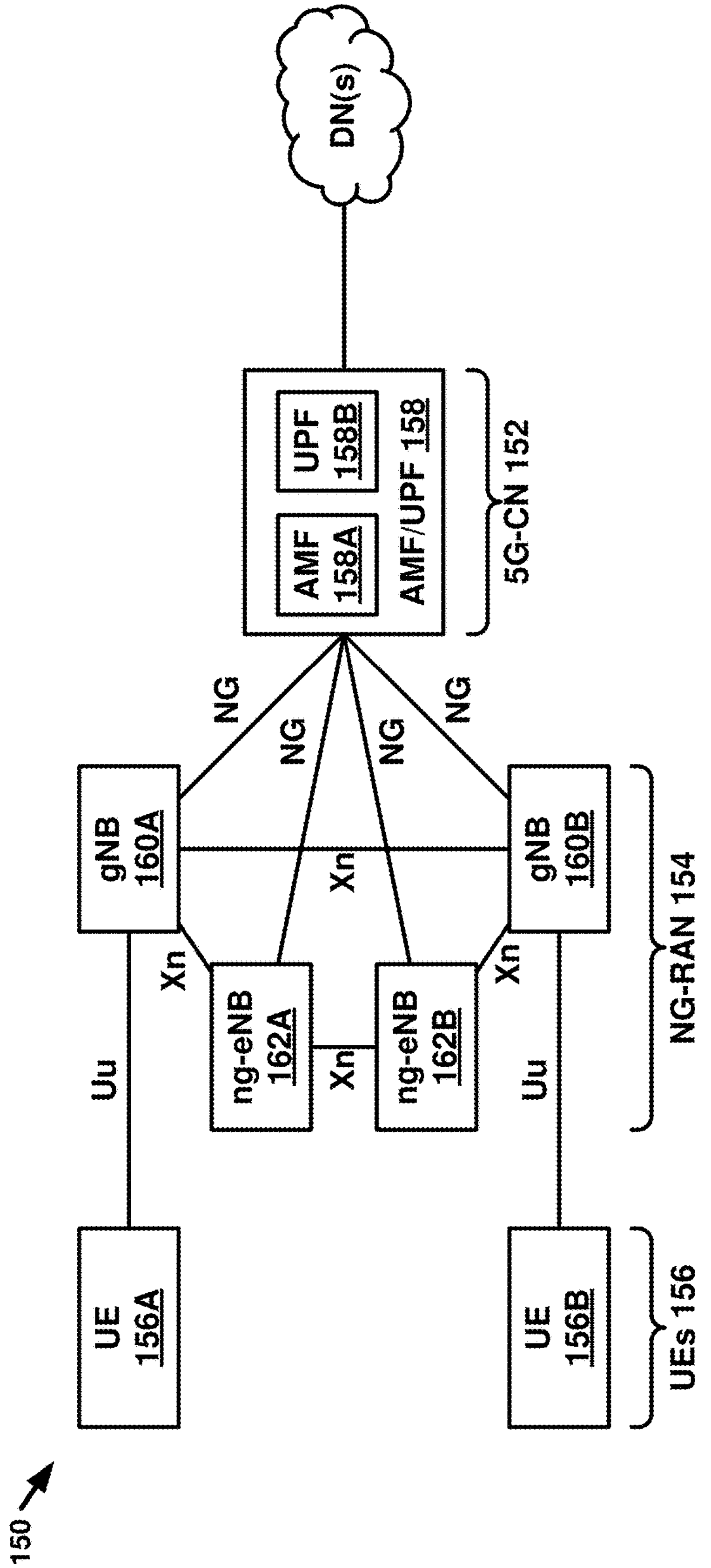

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
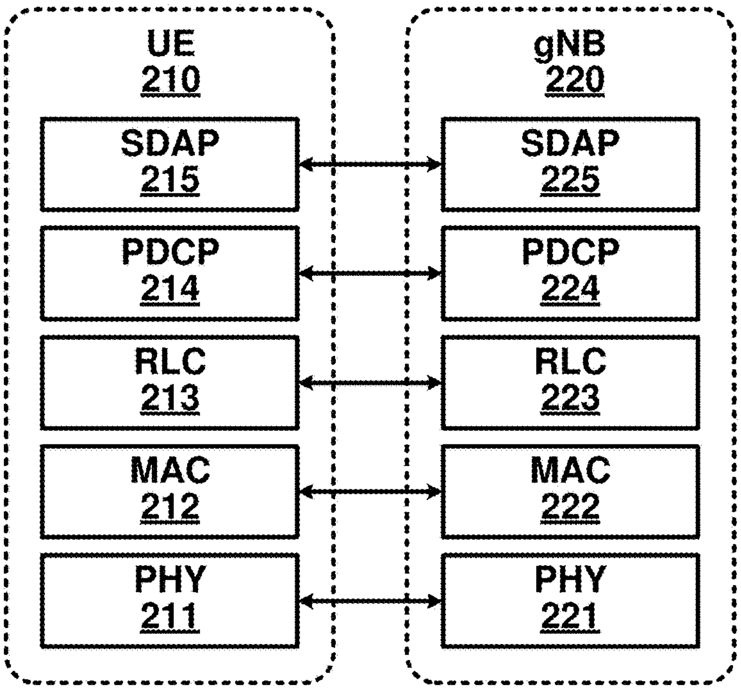
FIG. 2A and FIG. 2B respectively illustrate a New Radio (NR) user plane and control plane protocol stack.
Figure 2B:
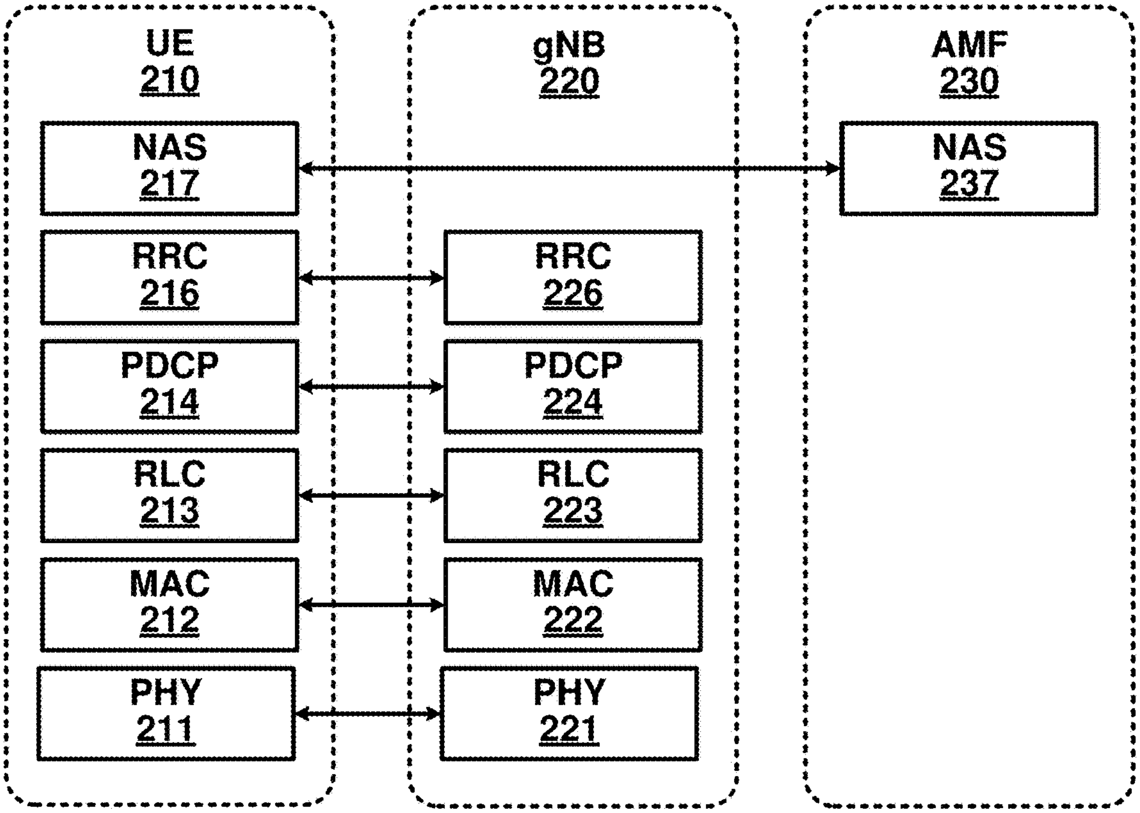

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
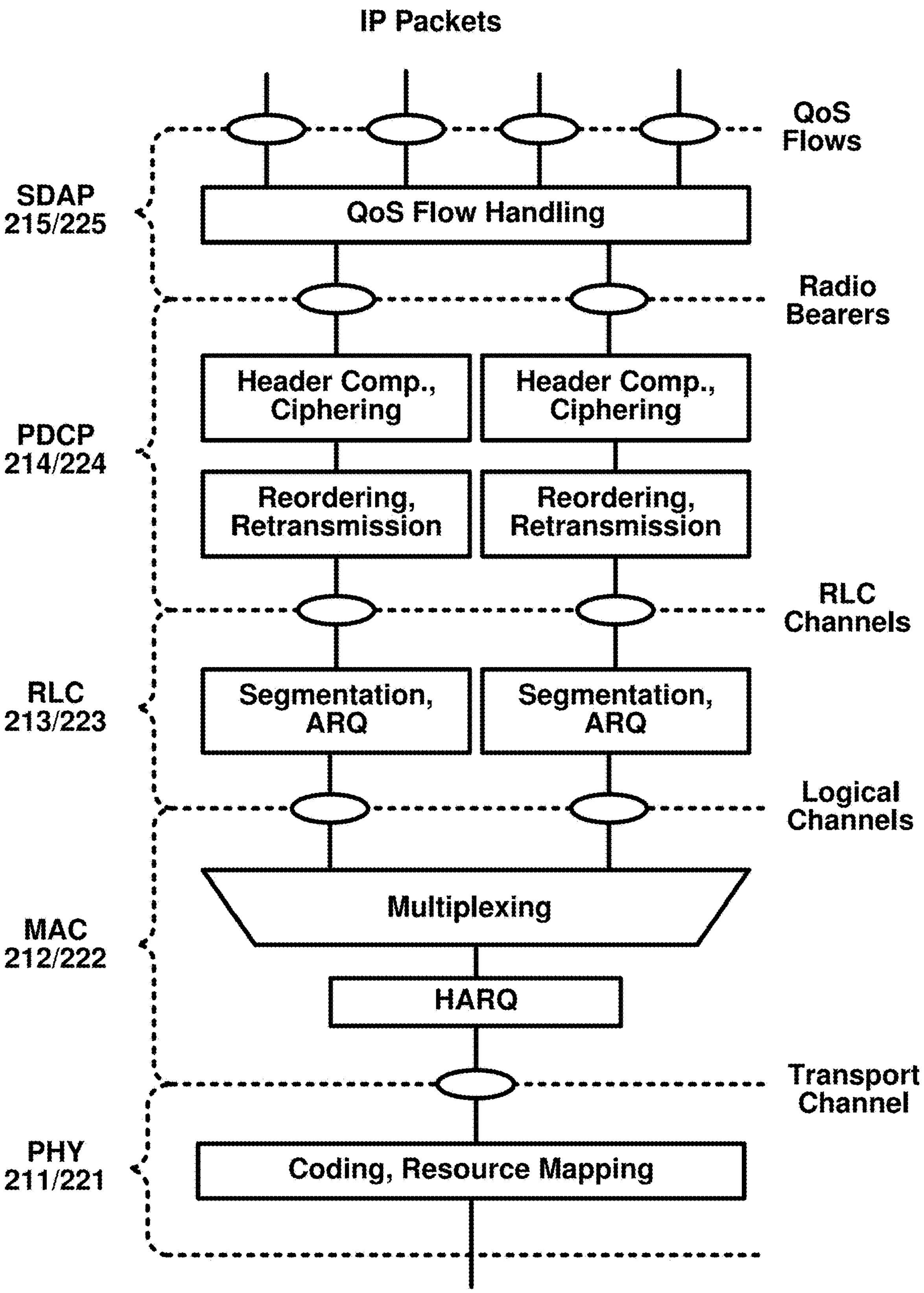
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
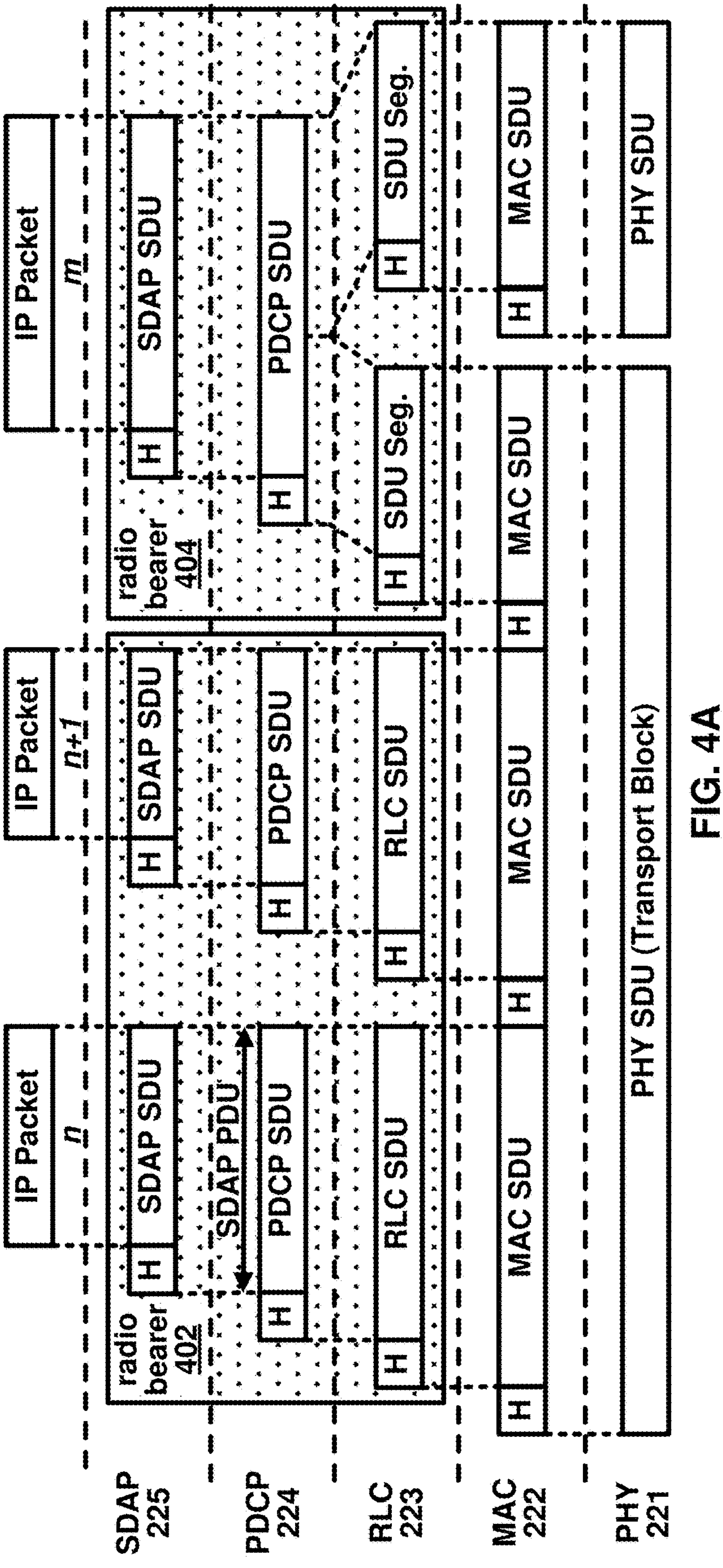
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
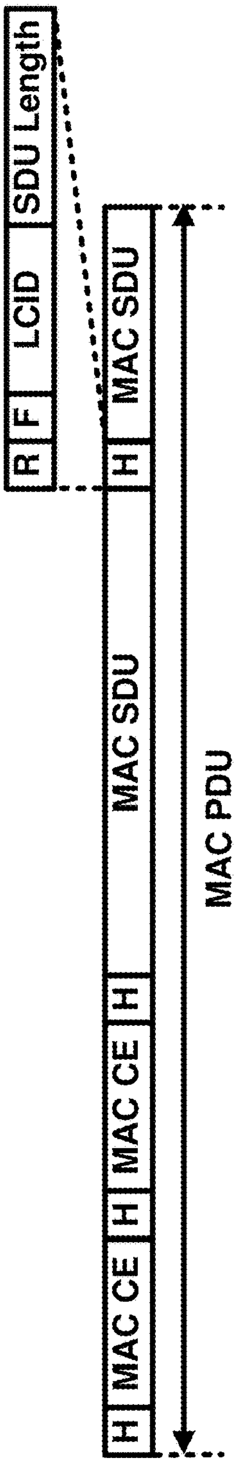
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
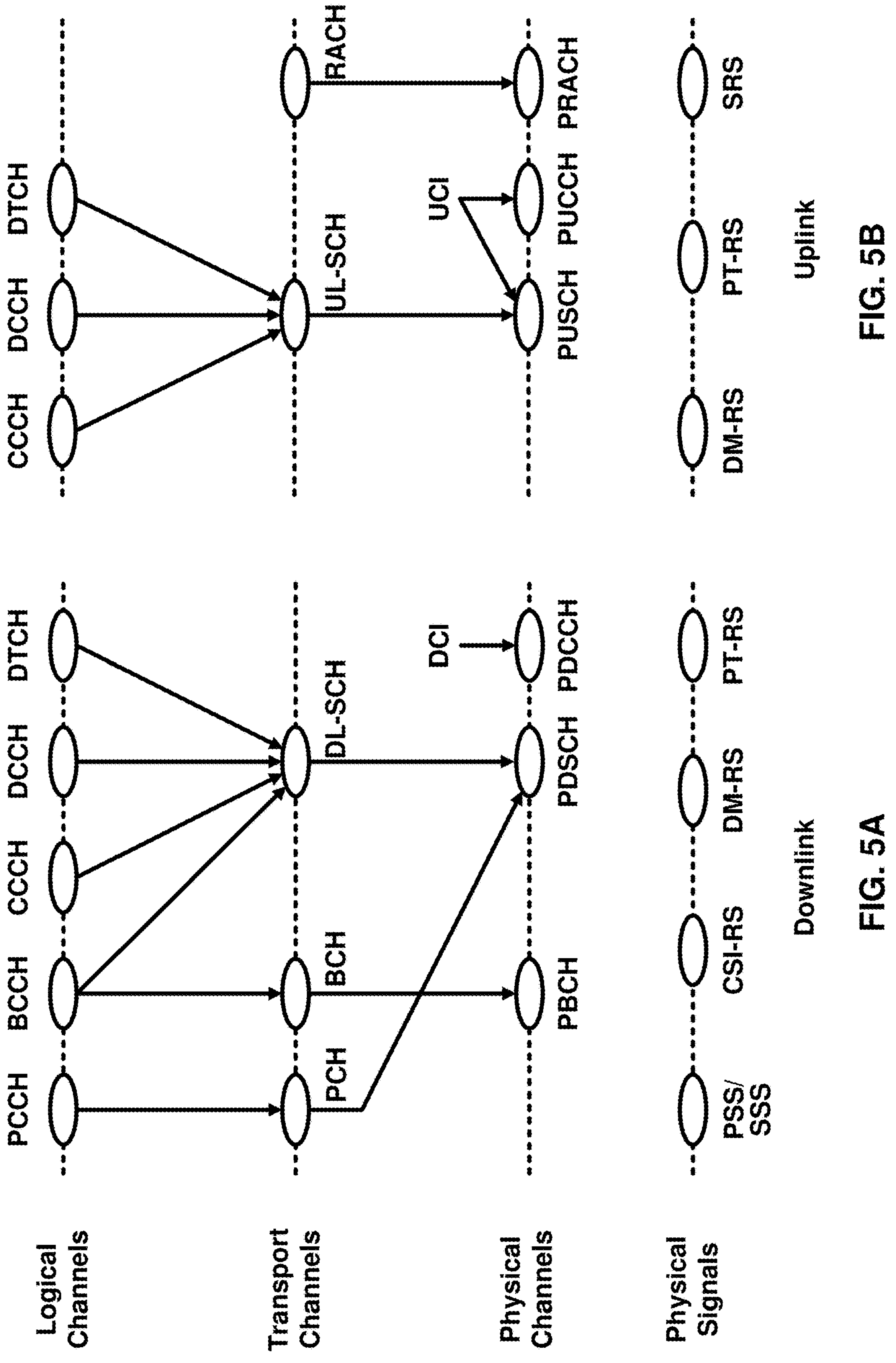
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR includes, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR includes, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR includes, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
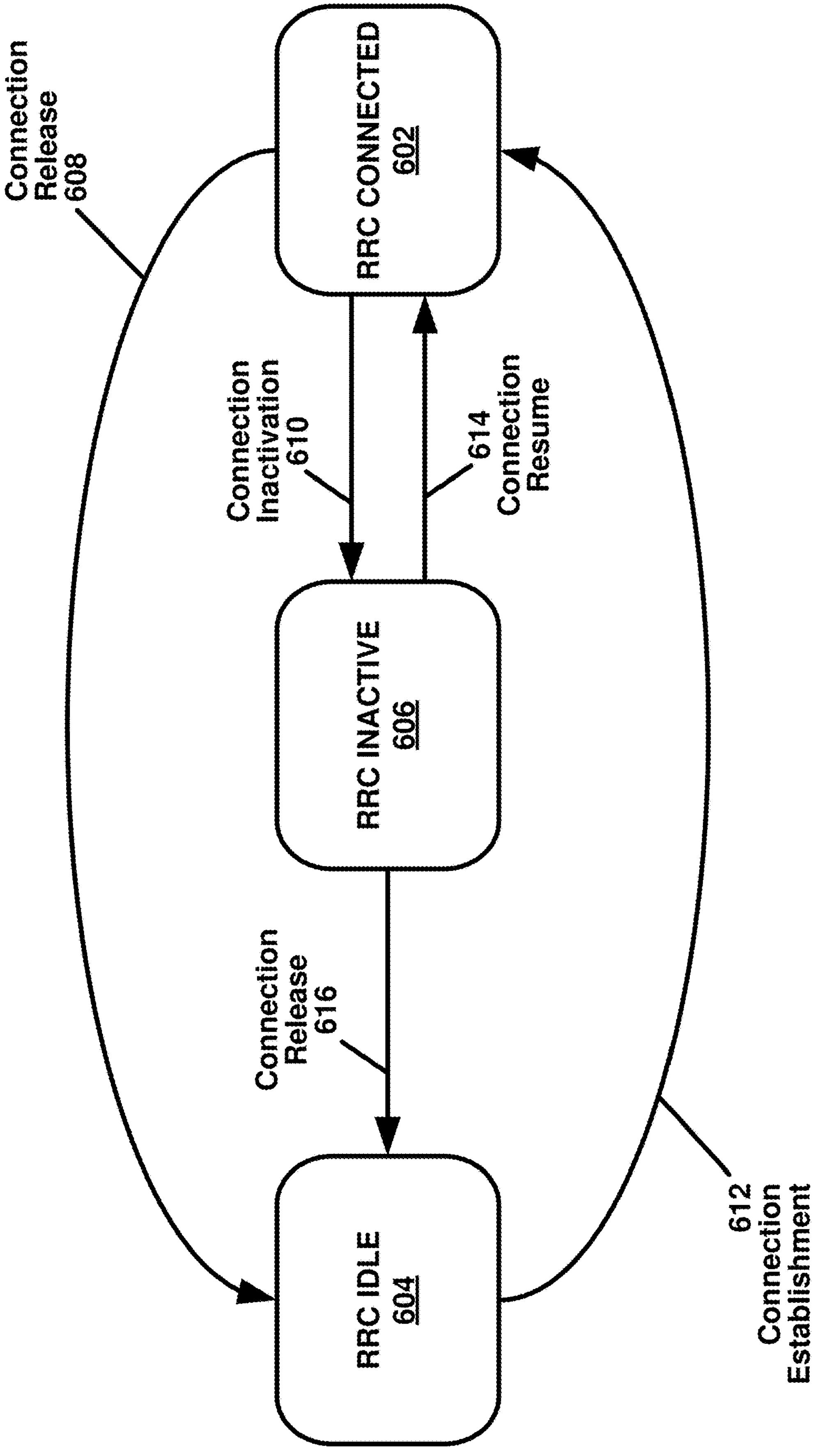
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split into two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
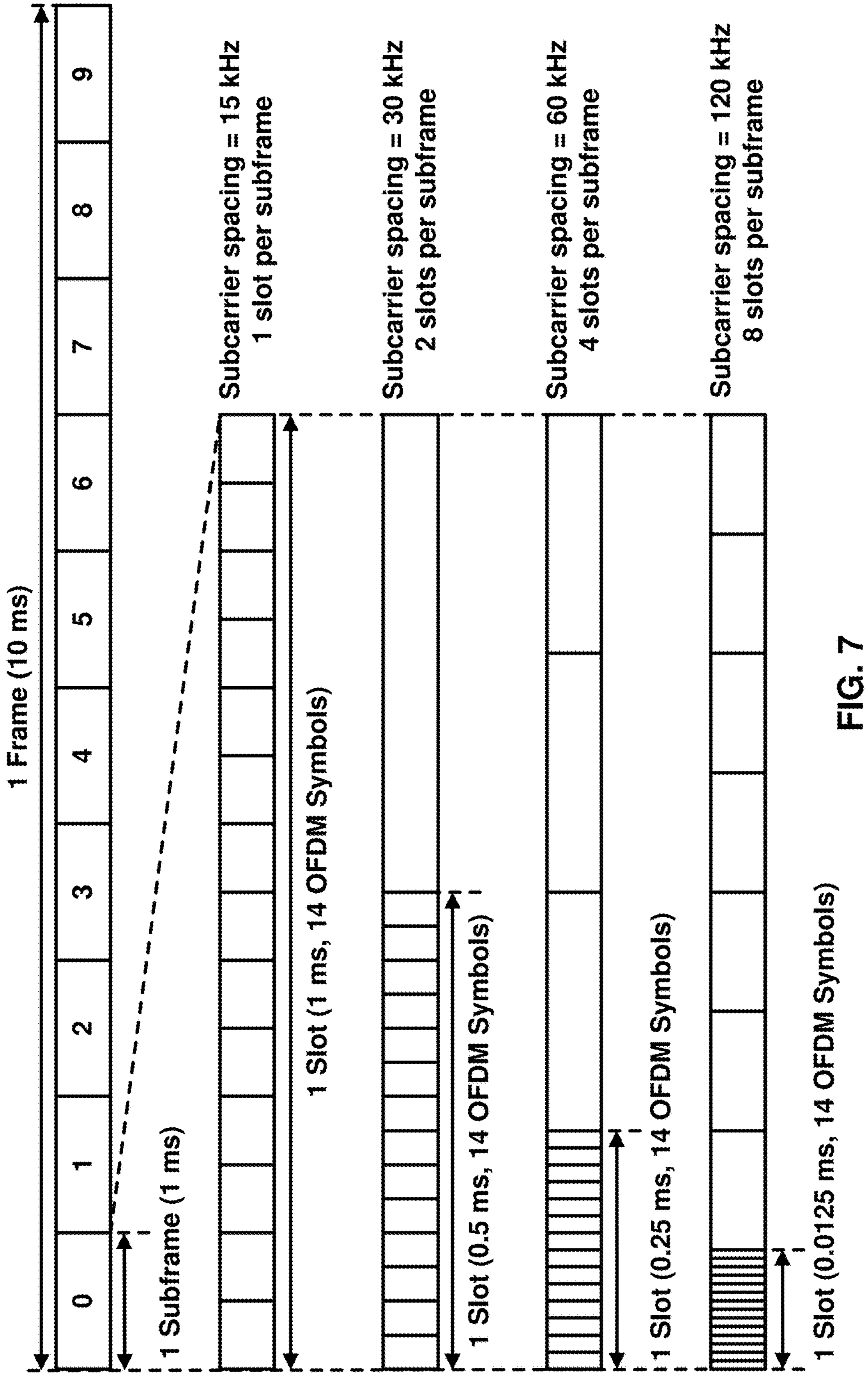
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 kHz/4.7 μs; 30 kHz/2.3 μs; 60 kHz/1.2 μs; 120 kHz/0.59 μs; and 240 kHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
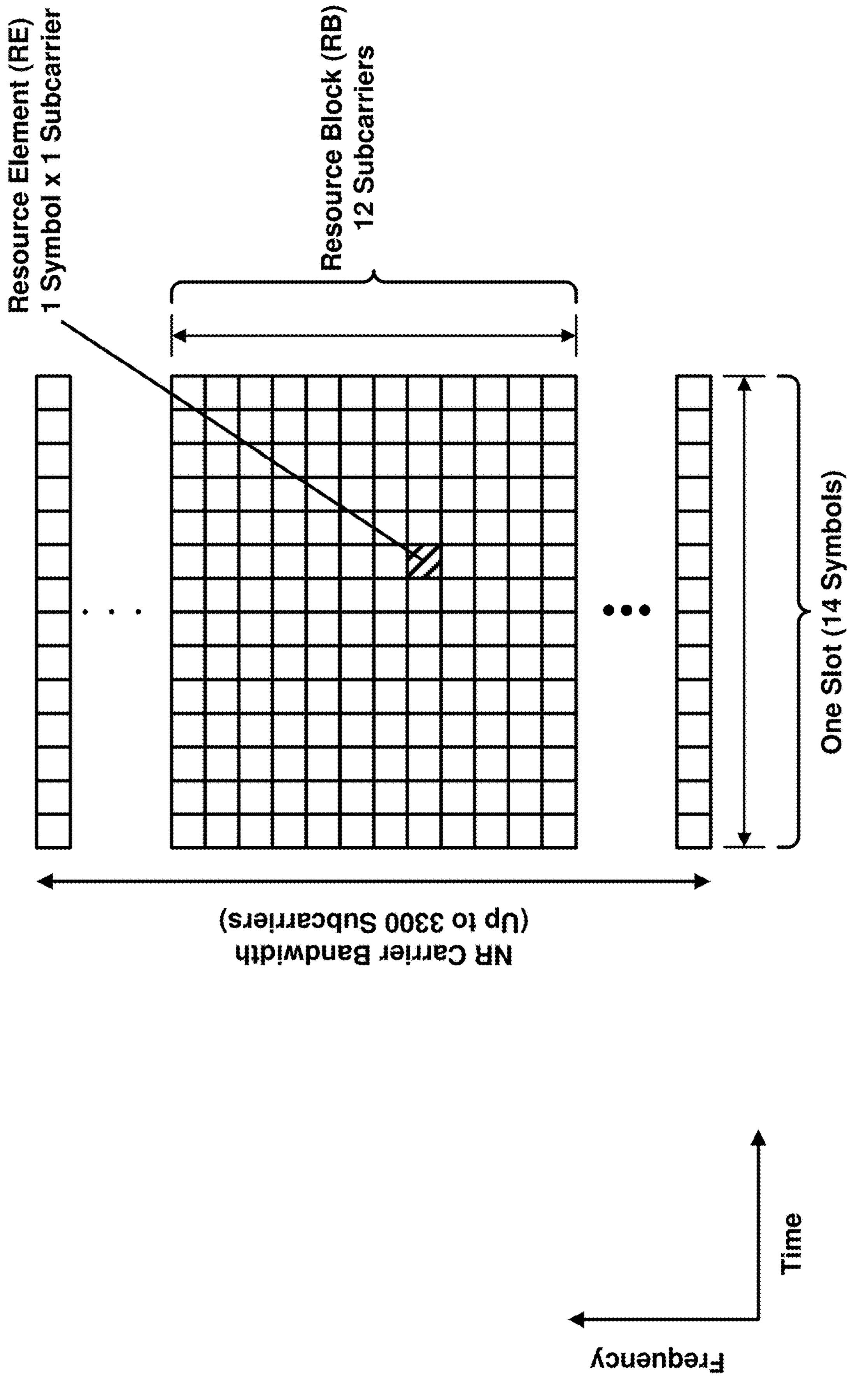
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
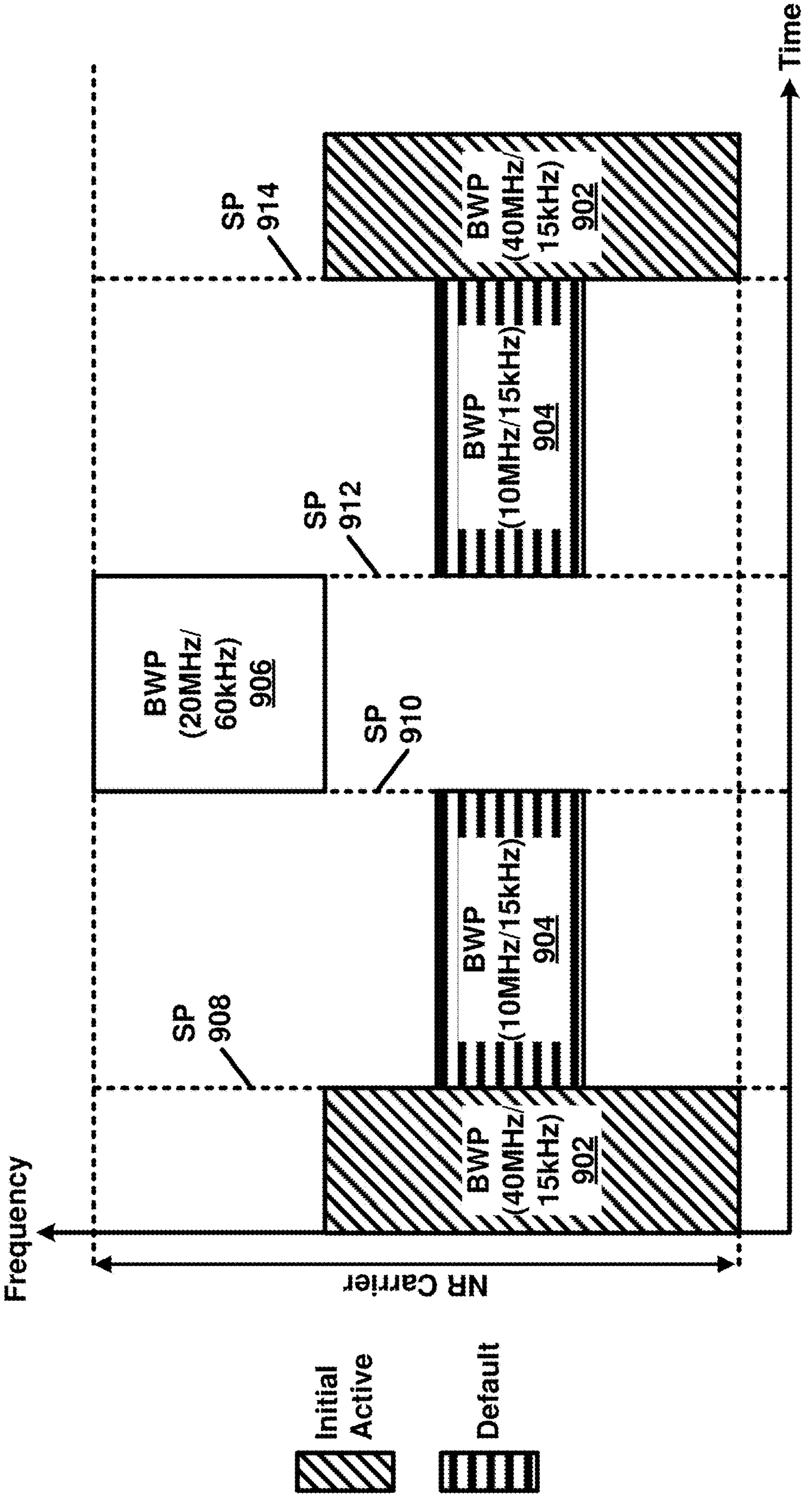
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
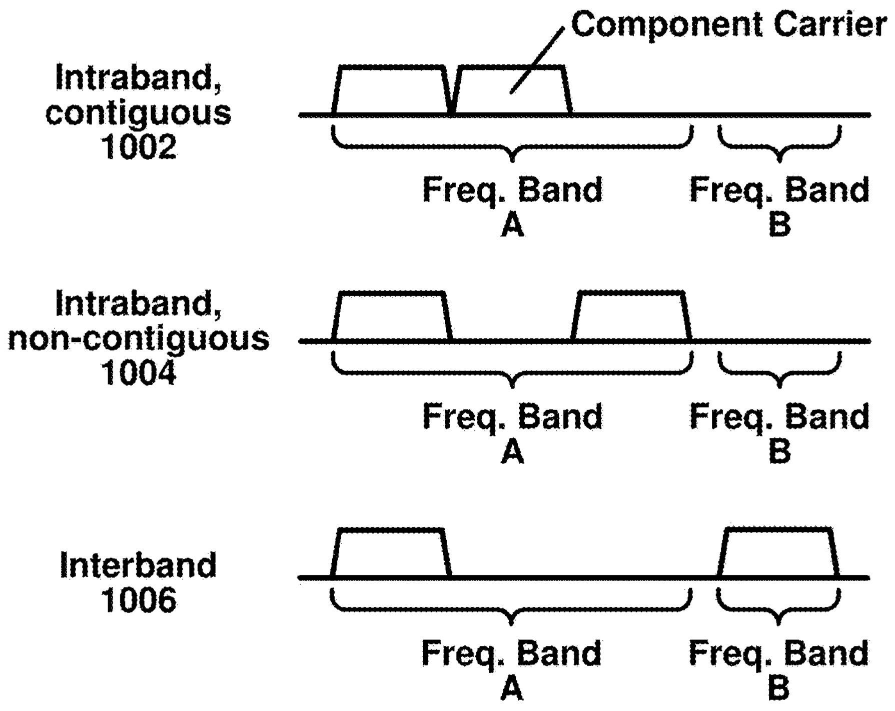
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
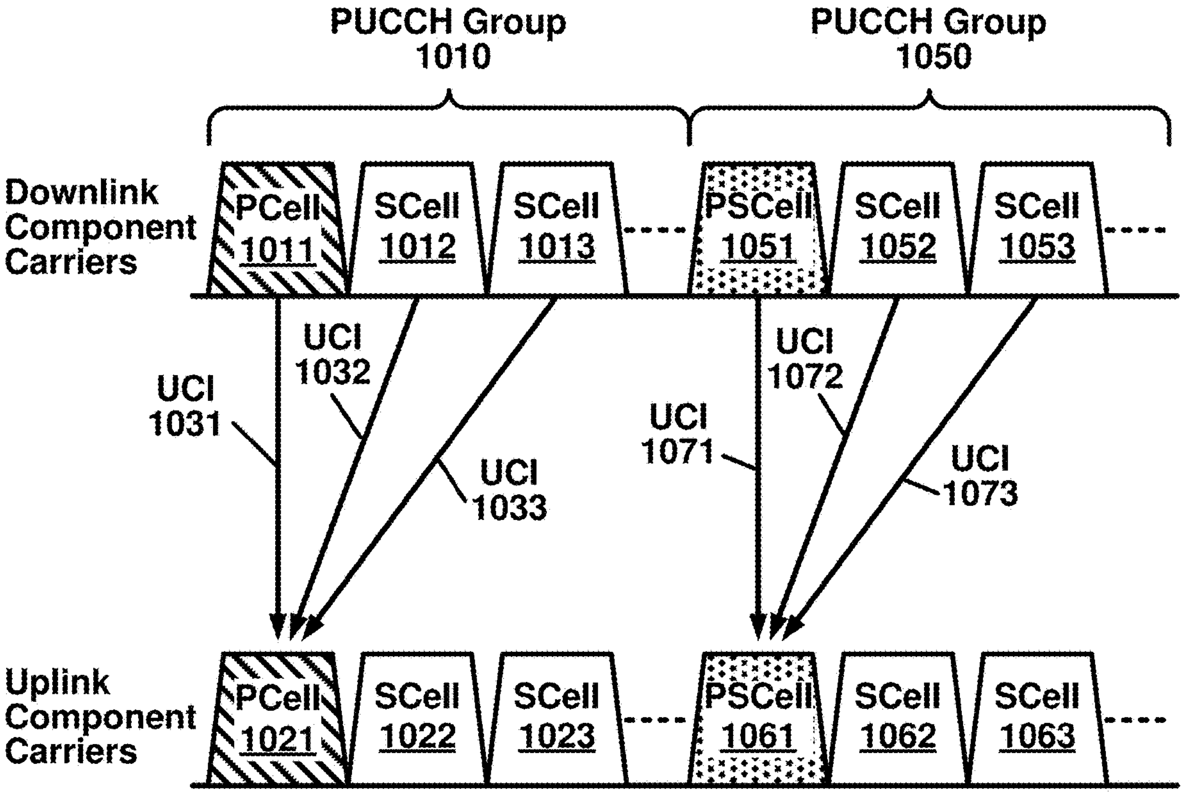
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
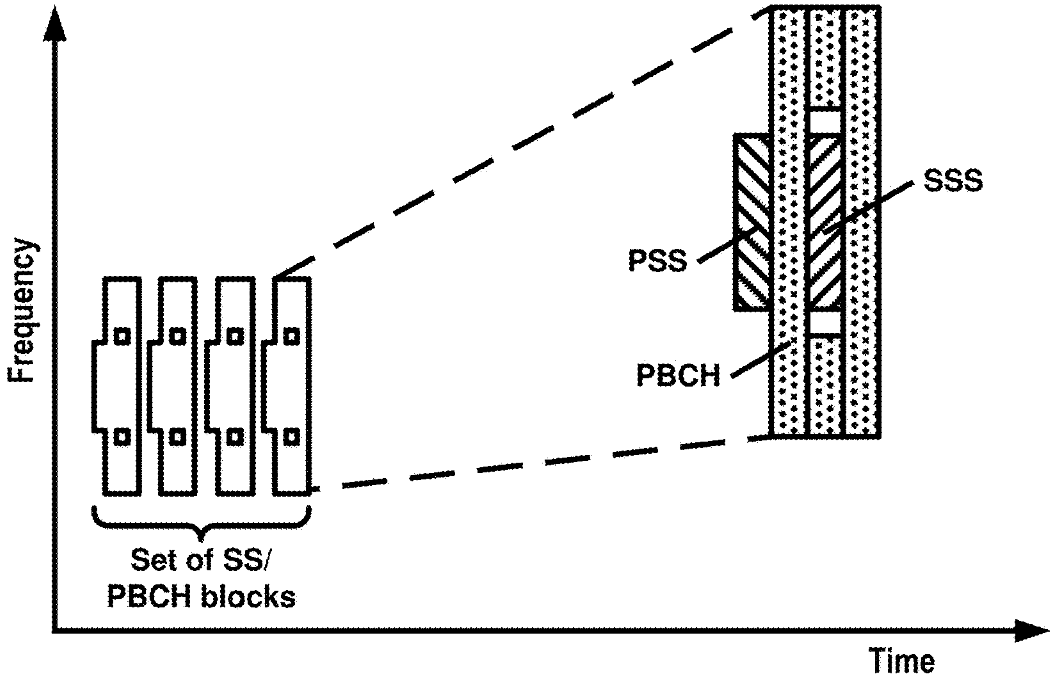
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
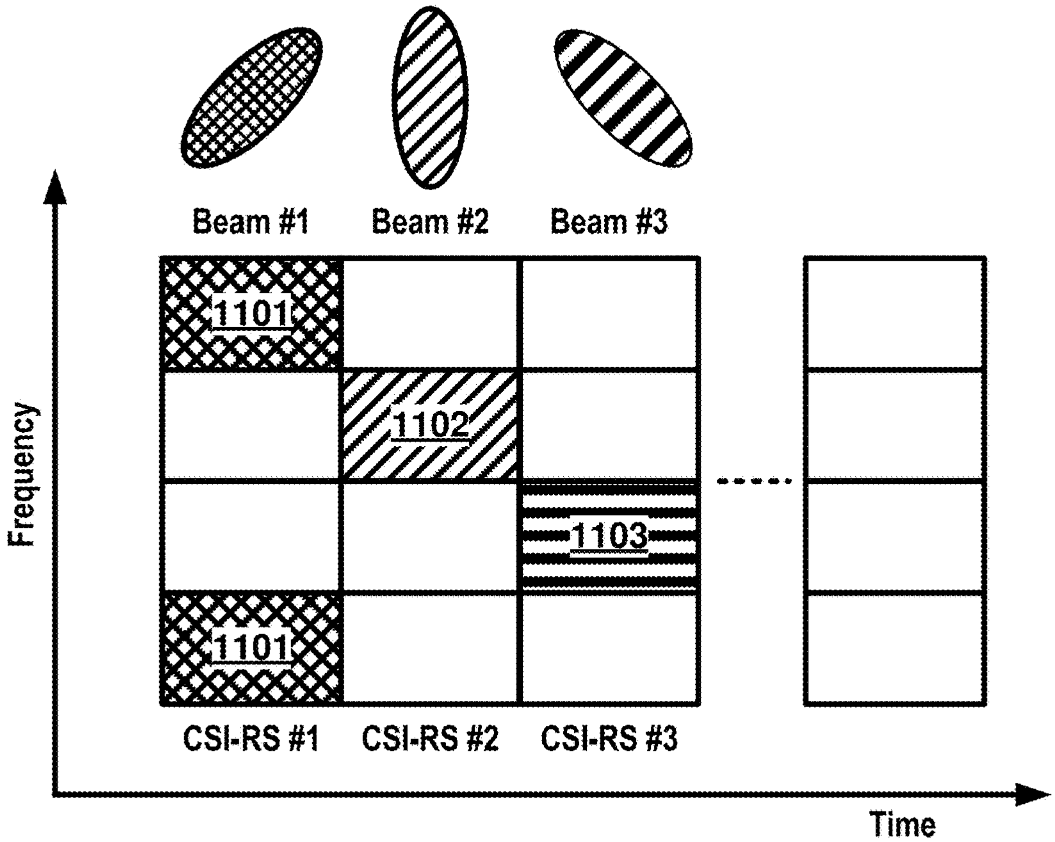
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figure 12A:
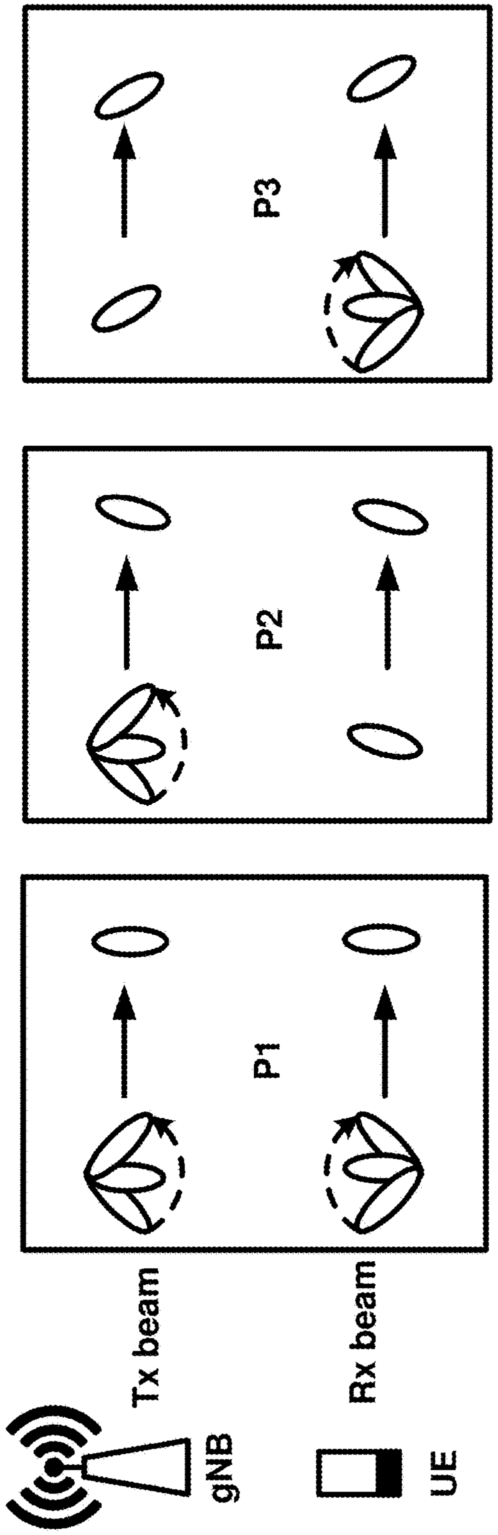
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counterclockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

Figure 12B:
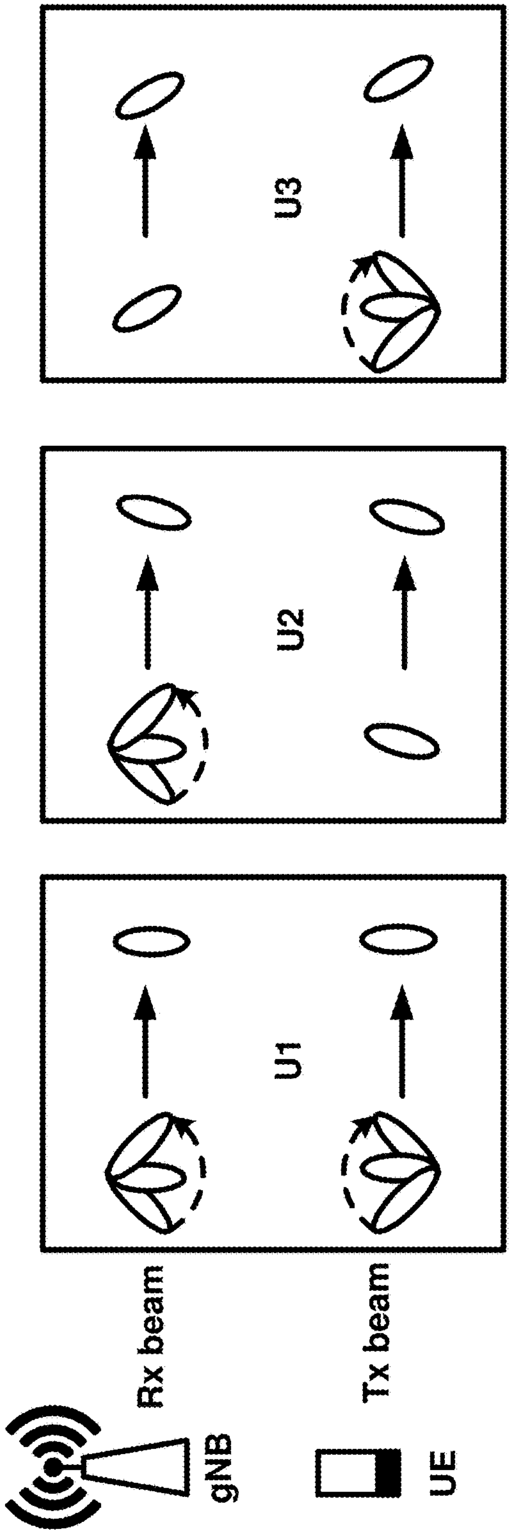

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
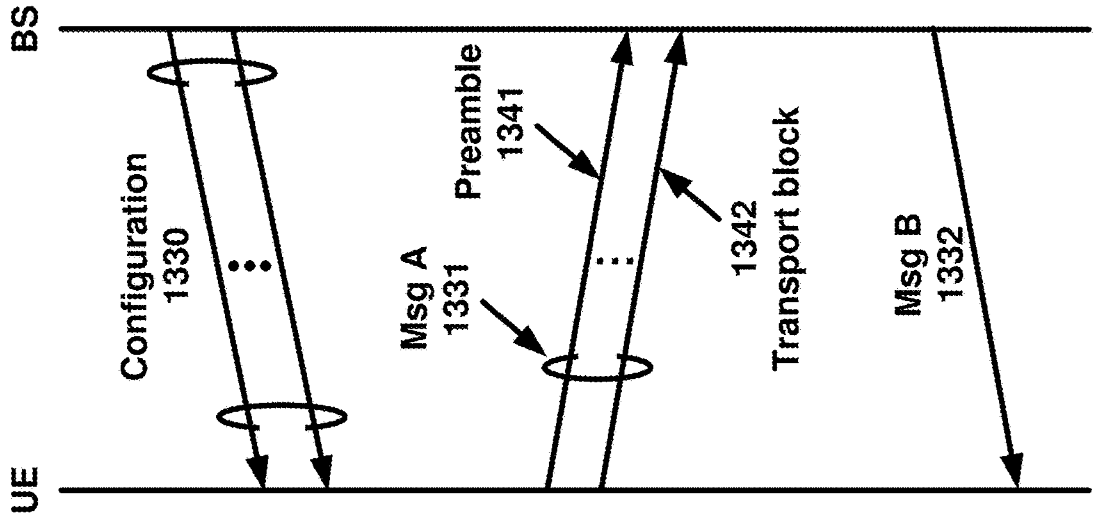
FIG. 13A, FIG. 13B, and FIG. 13C respectively illustrate a four-step contention-based random access procedure, a two-step contention-free random access procedure, and another two-step random access procedure.
Figure 13B:
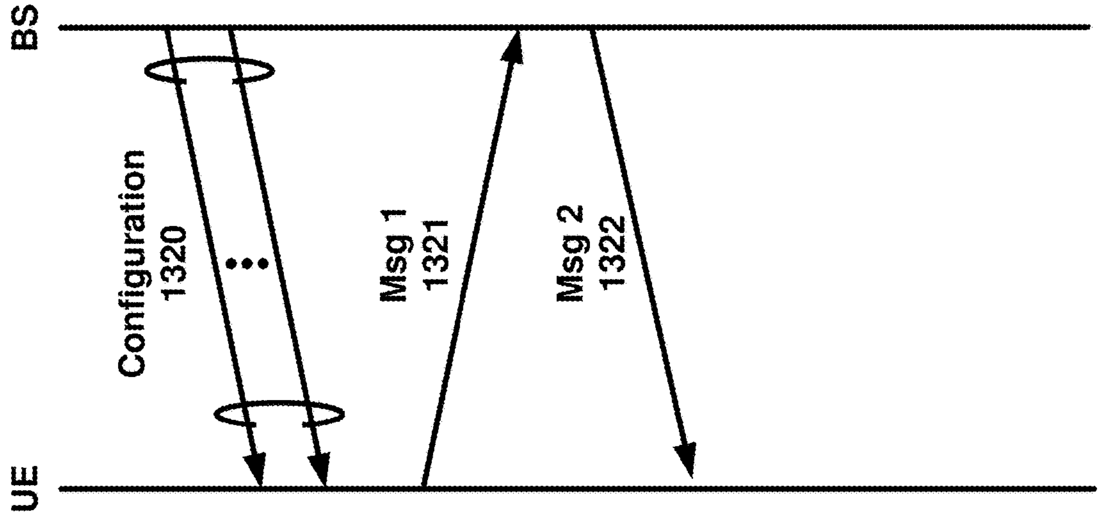
Figure 13A:
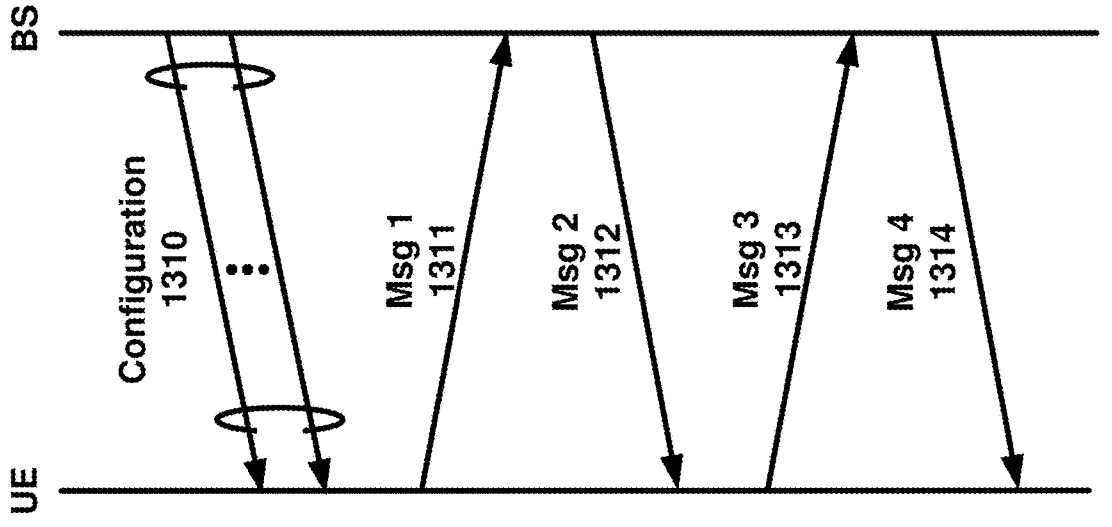

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RA CH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-Response Window) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$RA\text{-}RNTI=1+s\_id+14\times t\_id+14\times 80\times f\_id+14\times 80\times 8\times ul\_carrier\_id$, where s_id may be an index of a first OFDM symbol of the PRACH occasion (e.g., $0\leq s\_id<14$), t_id may be an index of a first slot of the PRACH occasion in a system frame (e.g., $0\leq t\_id<80$), f_id may be an index of the PRACH occasion in the frequency domain (e.g., $0\leq f\_id<8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-Response Window) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
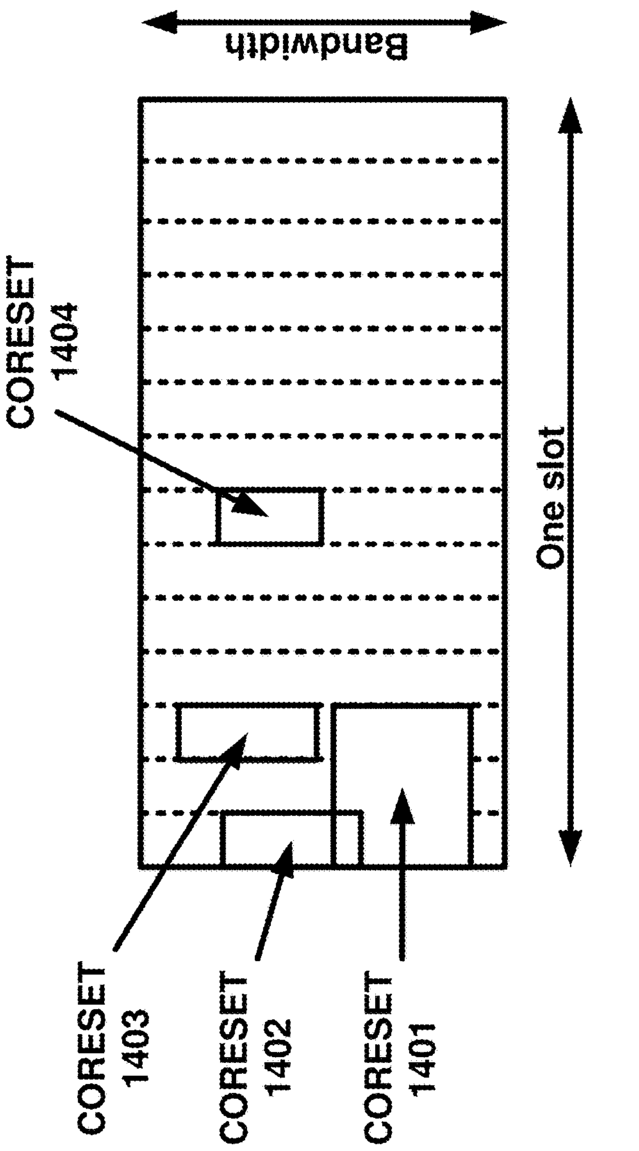
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
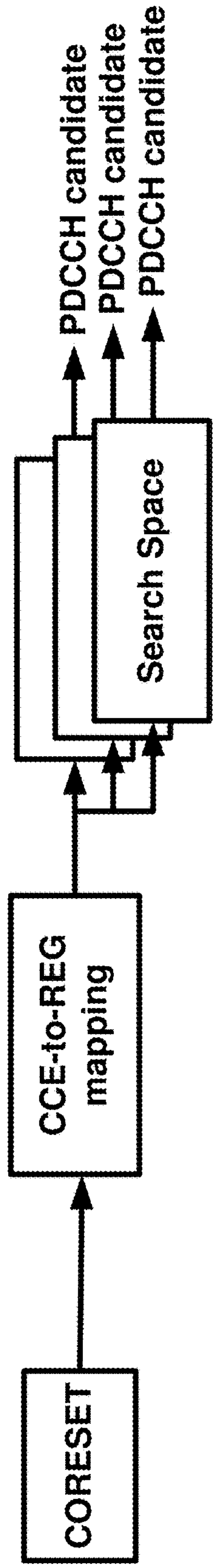
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
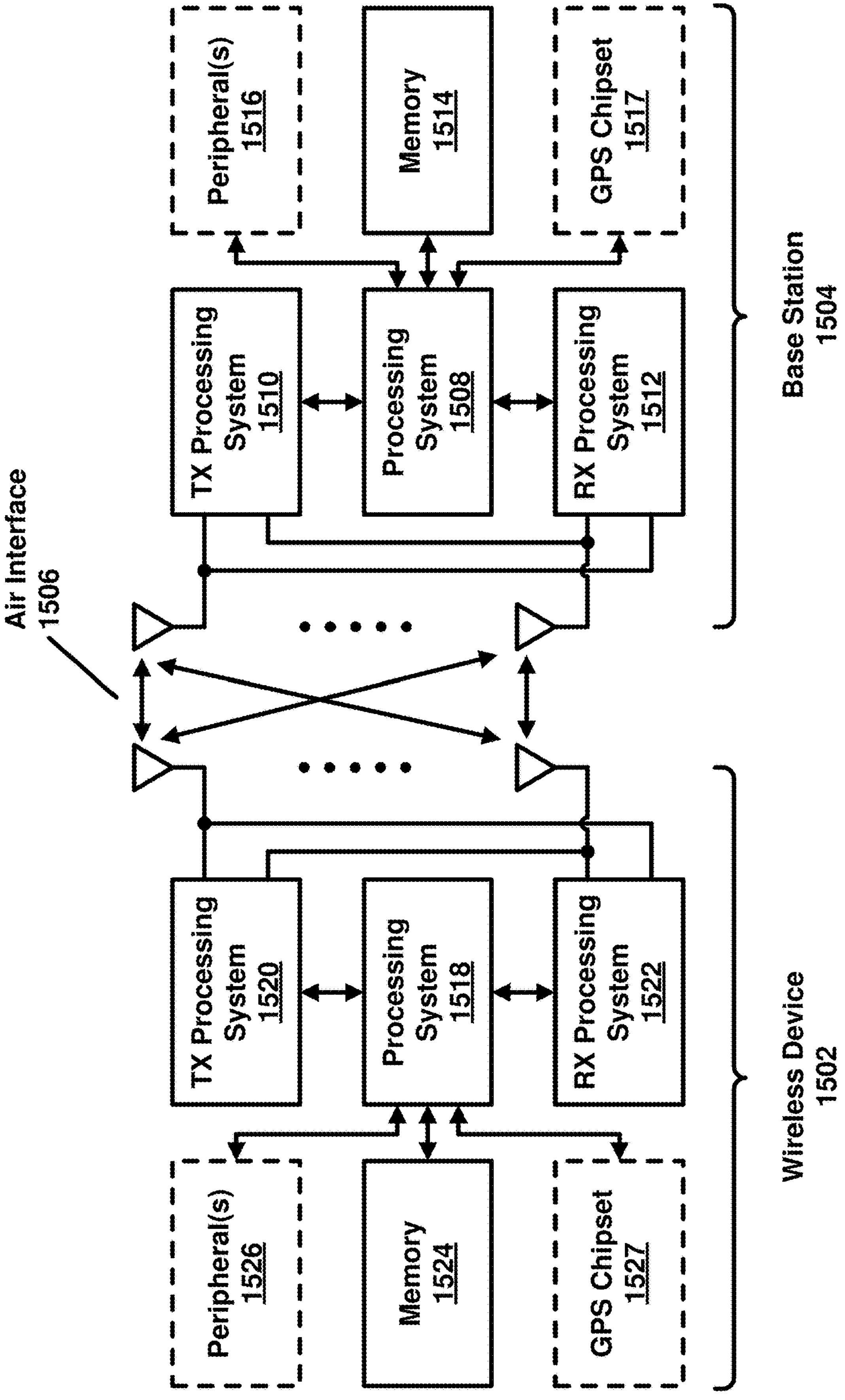
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
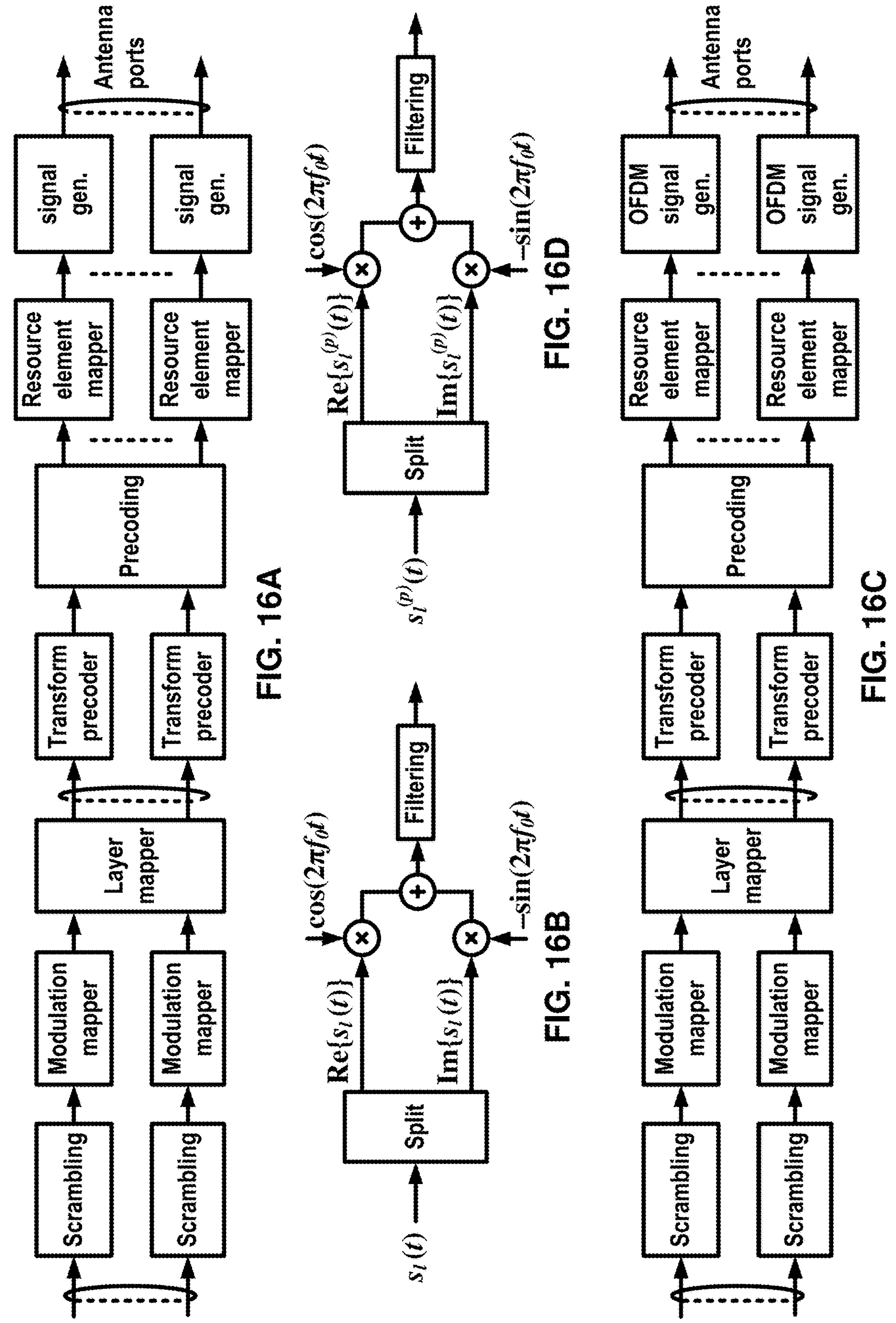
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual connectivity) via the plurality of cells. The one or more messages (e.g. as a part of the configuration parameters) may comprise parameters of physical, MAC, RLC, PCDP, SDAP, and RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17A:
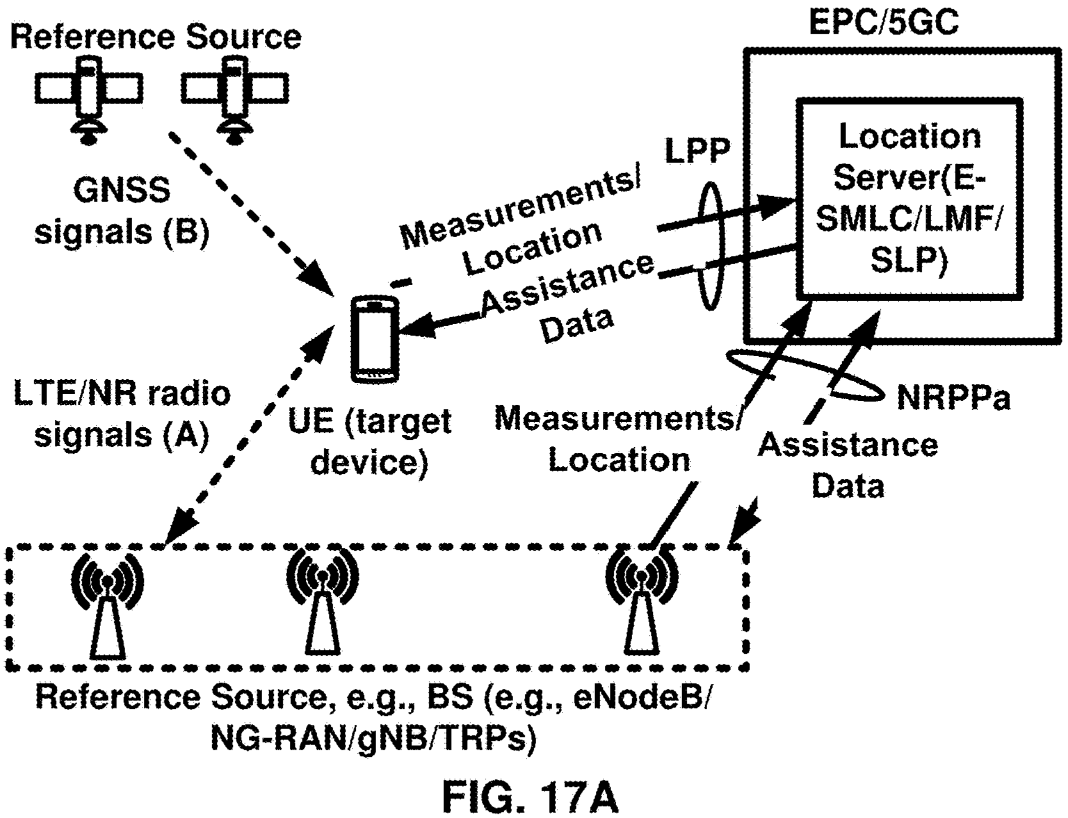
FIG. 17A illustrates an example of positioning as per an aspect of an embodiment of the present disclosure.

FIG. 17A illustrates an example of positioning as per an aspect of an embodiment of the present disclosure. The AMF may receive a request for a location service associated with a wireless device (e.g., a particular target UE, e.g., a Positioning Reference Unit (PRU)) from another entity (e.g., Gateway Mobile Location Centre (GMLC) or the wireless device). In another example, the AMF itself may decide to initiate the location service corresponding to the wireless device (e.g., on behalf of the wireless device, e.g., for an IMS emergency call from the wireless device). The AMF may send a location services request to a location server, e.g., location management function (LMF), e.g., via NL1 interface. The NL1 interface between the LMF and the AMF may be transparent to the (all) wireless device and/or the base station. The LMF processes the location services request which may include transferring/transmitting assistance data to the wireless device to assist with UE-based and/or UE-assisted positioning and/or may include positioning of the wireless device. The LMF may return/transmit/send a result of the location service (e.g., measurements/location data/information, e.g., a position estimate for the wireless device) back to the AMF. In the case of the location service requested by an entity other than the AMF (e.g., the GMLC or the wireless device), the AMF may return/transmit/send the location service result to the entity. The LMF may have a proprietary signaling connection to a secure user plane location (SUPL) location platform (SLP). The SLP is the SUPL entity responsible for positioning over the user plane.

In some implementations, when the AMF receives the location service request in case the wireless device is in a CM-IDLE state, the AMF may establish a signaling connection with the wireless device and assign a specific serving gNB or ng-eNB. The wireless device may be in the RRC connected state/mode before the beginning of a positioning procedure. For example, the wireless device may transit from the RRC idle state to the RRC connected state to perform the positioning procedure (corresponding to the location service). In other implementations, the wireless device may transmit to the RRC inactive state to perform the positioning procedure.

As shown in FIG. 17A, positioning the wireless device (e.g., the positioning procedure) may involve/comprise (signal) measurements (e.g., GNSS signals and/or LTE/NR radio signals) and position estimate (e.g., the location) and optional velocity computation based on the (signal) measurements. Although not shown in FIG. 17A, the measurements may be performed/made by the wireless device and/or by a (serving/non-serving) base station (e.g., ng-eNB or gNB). The measurements may be positioning measurements or non-positioning measurements (e.g., SSB/CSI-RS/TRS measurements).

FIG. 17A may show an example of an LTE positioning protocol (LPP) configuration between a location server (an Enhanced Serving Mobile Location Centre (E-SMLC), the LMF or the SLP), resided in core network (e.g., EPC or 5GC), and a wireless device (e.g., target device, e.g., a UE or a SUPL Enabled Terminal (SET)). The LPP configuration may be used to position the wireless device using position-related measurements (e.g., GNSS signals and/or LTE/NR radio signals) obtained by one or more reference sources. The one or more reference resources may comprise one or more base stations (e.g., eNodeB/NG-RAN node/gNB), transmitting LTE/NR radio signals, and/or Global Navigation Satellites Systems (GNSSs) transmitting general radio navigation signals (GNSS signals). The GNSSs systems may comprise at least one of the following: GPS, Modernized GPS, Galileo, GLONASS, and BeiDou Navigation Satellite System (BDS). Regional navigation satellite systems include Quasi Zenith Satellite System (QZSS), and NAVigation with Indian Constellation (NavIC). The one or more reference resources may comprise one or more transmission points (TPs) and/or transmission reception points (TRPs). Example of FIG. 17A may show an example of the configuration as applied to the control-plane and/or user-plane location solutions for E-UTRAN and NG-RAN.

A positioning session (e.g., an LPP session, see FIG. 17B for an example) may be used between the location server and the wireless device in order to obtain (e.g., by the wireless device and/or the base station and/or the location server) location related measurements or a location estimate or to transfer assistance data. A single positioning session (e.g., a single LPP session) may be used to support a single location request (e.g., for a single MT-LR, MO-LR or NI-LR). Multiple positioning sessions (e.g., multiple LPP sessions) may be used between the wireless device and the location server to support multiple different location requests. An (or each) positioning session may comprise one or more positioning transactions (e.g., one or more LPP transactions), with each positioning transaction performing a single operation/function/procedure (a capability exchange procedure/operation, an assistance procedure/operation, and/or a location information transfer operation/procedure). The positioning transactions within the positioning session may occur serially or in parallel. Positioning transactions may be indicated at the LPP protocol level with a transaction ID in order to associate one or more positioning messages (e.g., LPP messages) with one another (e.g., a request message and a response message). For example, the positioning session may correspond to (or associated with) the positioning procedure. The positioning session may be for performing the positioning procedure by the wireless device and/or the base station and/or the location server.

LPP messages are carried as transparent (LPP) PDUs across intermediate network interfaces using the appropriate protocols (e.g., NGAP over the NG-C interface, NAS/RRC over the LTE-Uu and NR-Uu interfaces). The RRC protocol may provide transport for the LPP messages over the NR-Uu/LTE-Uu interfaces and/or configuring the wireless device with SRS resources/resource sets for positioning (e.g., via one or more SRS configuration parameters). The activation/deactivation of configured semi-persistent SRS resource sets may be via MAC protocol over the NR-Uu/LTE-Uu interfaces.

A positioning transaction of the positioning session (e.g., an LPP transaction of the LPP session) may comprise communicating/exchanging (transmitting/receiving) the one or more positioning messages (e.g., the LPP messages comprising LPP PDUs) between the location server and the wireless device (e.g., based on LTE-Uu/NR-Uu interface). For example, the location server may interact (e.g., for transmitting/receiving the one or more positioning messages) with the wireless device based on the LPP. The wireless device may exchange/communicate with the location server (e.g., receive or transmit) the LPP messages (or the one or more positioning messages) via the base station based on/via/using NAS/RRC messages/protocol (e.g., RRC DL information transfer and/or RRC UL information transfer) over the LTE-Uu and NR-Uu interfaces. The LPP PDUs of the LPP messages (carried by the RRC DL information transfer and/or RRC UL information transfer) may be transparent to the base station (e.g., the base station may not attempt to decode the LPP messages). The base station may transmit/send the LPP messages received from the wireless device (using/based on the RRC/NAS messages/protocol) to the core network (AMF/LMF) using a format/protocol (e.g., NGAP messages, e.g., NGAP downlink NAS transport and/or NGAP uplink NAS transport). The base station may transmit/send the LPP messages received from the core network (AMF/LMF) to the wireless device using/based on the RRC/NAS messages/protocol (e.g., NGAP messages, e.g., NGAP downlink NAS transport and/or NGAP uplink NAS transport). The NGAP uplink/downlink NAS transport messages may comprise LPP PDUs of the LPP messages.

The one or more positioning messages may comprise assistance data messages/information (e.g., to set up the wireless device to perform positioning measurements) and/or measurements (A, B, or A+B)/locations messages. The wireless device may receive the assistance data messages/information based on/via LPP messages/signaling and/or RRC messages and/or (RRC) broadcasting (e.g., at least one positioning System Information Block (posSIB or SIBpos)).

The positioning procedure may comprise one or more RRC procedures for positioning. The one or more RRC procedures may comprise a UE Positioning Assistance Information procedure (used by wireless device to report the UE Positioning Assistance Information for UL-TDOA, e.g., to report association between UL-SRS resources for positioning and the UE Tx TEG ID); and/or a location measurement indication procedure (used by the wireless device to request measurement gaps for OTDOA RSTD measurements, for subframe and slot timing detection for inter-RAT E-UTRA RSTD measurements, or for NR DL-PRS measurements). The one or more RRC procedures for positioning may comprise communicating one or more RRC message between the wireless device and the base station. The one or more RRC messages may comprise the RRC reconfiguration message; and/or an RRC Location Measurement Indication message; and/or (RRC) UE Positioning Assistance Info message; and/or (RRC) Inter-frequency RSTD measurement indication; and/or RRC system information message (e.g., SIBpos). For example, the base station may broadcast assistance data information/messages, received from the location server (e.g., via NRPPa messages of the one or more positioning messages), in positioning System Information messages. The one or more positioning messages may comprise posSIBs.

The wireless device may receive one or more configuration parameters (e.g., via a service cell and/or a base station). The one or more configuration parameters may comprise configurations indicated by the LLP messages (e.g., the one or more positioning messages) and/or the positioning SIBs and/or the one or more RRC messages and/or other SIBs (e.g., SIBx, x=1, 2, . . . , 19, . . . ).

An NG-RAN node (e.g., a base station of the one or more base stations) may control/manage several TRPs/TPs, such as remote radio heads, or DL-PRS-only TPs for support of PRS-based Terrestrial Beacon System (TBS). A gNB-DU may include TRP functionality where the TRP functionality may support functions for a TP, RP or both TP and RP. For example, a gNB-DU which includes TRP functionality may not offer cell services to the wireless device.

As shown in FIG. 17A, the location server may interact with a base station (e.g., gNB) in order to obtain location related information to support the positioning procedure (e.g., an NR RAT-Dependent positioning method/procedure), e.g., via NR Positioning Protocol A (NRPPa). The assistance data may comprise the location related information. For example, the location related information may comprise timing information for a TRP (e.g., in relation to either absolute GNSS time or timing of other TRPs) and information about the supported cells and TRPs including PRS schedule. The TRP may be a reference TRP (e.g., an assistance data reference TRP) or a neighbor TRP (e.g., non-assistance data reference TRP). The reference TRP may be the serving TRP. The reference TRP may be a serving TRP that the wireless device is able to determine/obtain corresponding frame configuration (e.g., DL/UL frame configuration, e.g., SFN).

In some examples, the LMF may determine one or more positioning methods for the wireless device. The one or more positioning methods (or procedures) may be at least one of the following: network-assisted GNSS methods; observed time difference of arrival (OTDOA) positioning based on LTE signals; enhanced cell ID (E-CID/ECID) methods based on LTE signals; WLAN positioning; Bluetooth positioning; terrestrial beacon system (TBS) positioning; sensor based methods (e.g., barometric Pressure Sensor and/or motion sensor; NR enhanced cell ID methods (NR E-CID) based on NR signals; Multi-Round Trip Time Positioning (Multi-RTT based on NR signals); Downlink Angle-of-Departure (DL-AoD) based on NR signals; Downlink Time Difference of Arrival (DL-TDOA) based on NR signals; Uplink Time Difference of Arrival (UL-TDOA) based on NR signals; and/or Uplink Angle-of-Arrival (UL-AoA), including A-AoA and Z-AoA based on NR signals; carrier phase (difference).

The DL-AoD positioning method/procedure may use measured DL-PRS-RSRP (and optionally DL-PRS-RSRPP) of downlink signals (e.g., DL PRSs) received from multiple TPs/TRPs (e.g., the one or more TRPs), at the wireless device. The DL-TDOA positioning method may use measured DL Reference Signal Time Difference (RSTD) (and optionally DL-PRS-RSRP and/or DL-PRS-RSRPP) of the downlink signals received from multiple TPs/TRPs, at the wireless device. The UL-TDOA positioning method may use UL-RTOA (and optionally UL-SRS-RSRP and/or UL-SRS-RSRPP) at multiple RPs/TRPs of uplink signals (e.g., SRS) transmitted from wireless device. The UL-AoA positioning method may use measured azimuth angle of arrival (A-AoA) and zenith angle of arrival (Z-AoA) at multiple RPs/TRPs of uplink signals (SRS) transmitted from the wireless device. The Multi-RTT positioning method may use measured UE Rx−Tx time difference measurements (and optionally DL-PRS-RSRP and/or DL-PRS-RSRPP) of the downlink signals received from multiple (e.g., one or more or at least one) TRPs (e.g., comprising the reference TRP and/or neighbor TRPs), measured by the wireless device and/or the measured gNB Rx−Tx time difference measurements (and optionally UL-SRS-RSRP and/or UL-SRS-RSRPP) at multiple TRPs of the uplink signals transmitted from wireless device.

The measurements (e.g., to perform the positioning procedure of the one or more positioning procedures) at the wireless device may comprise the DL-PRS-RSRP measurement(s) of the (received) downlink signals and/or the DL-PRS-RSRPP measurement(s) of the (received) downlink signals and/or the DL RSTD measurement(s) of the received signals and/or the UE Rx−Tx time difference measurements of the received signals. The measurements of the downlink signals at the wireless device may be based on the assistance data (received from the positioning server).

The measurements (e.g., to perform the positioning procedure) at the base station(s)/RPs/TRPs may comprise the UL-SRS-RSRP measurement(s) of uplink signals (e.g., SRS) and/or the UL-SRS-RSRPP measurement(s) of the uplink signals and/or the gNB Rx−Tx time difference measurements and/or UL-RTOA measurements of the uplink signals and/or A-AoA and Z-AoA measurements of the uplink signals.

The positioning procedure (e.g., at the wireless device and/or the base station) may be a hybrid positioning using the one or more positioning methods from the list of positioning methods above. The positioning procedure may be a UE-based positioning procedure, a UE-assisted/LMF-based positioning procedure, and/or an NG-RAN node assisted positioning procedure.

For example, the positioning procedure may require the base station (e.g., gNB) measurements. The NG-RAN (e.g., the base station) may utilize the one or more positioning methods (e.g., listed above) in order to determine the position of the wireless device. As shown in FIG. 17A, as part of the positioning procedure, the LMF may interact/communicate with the base station via the NRPPa to support the positioning method (or procedure), e.g., by transmitting/receiving the one or more positioning messages. The one or more positioning messages may comprise NRPPa messages.

Figure 17B:
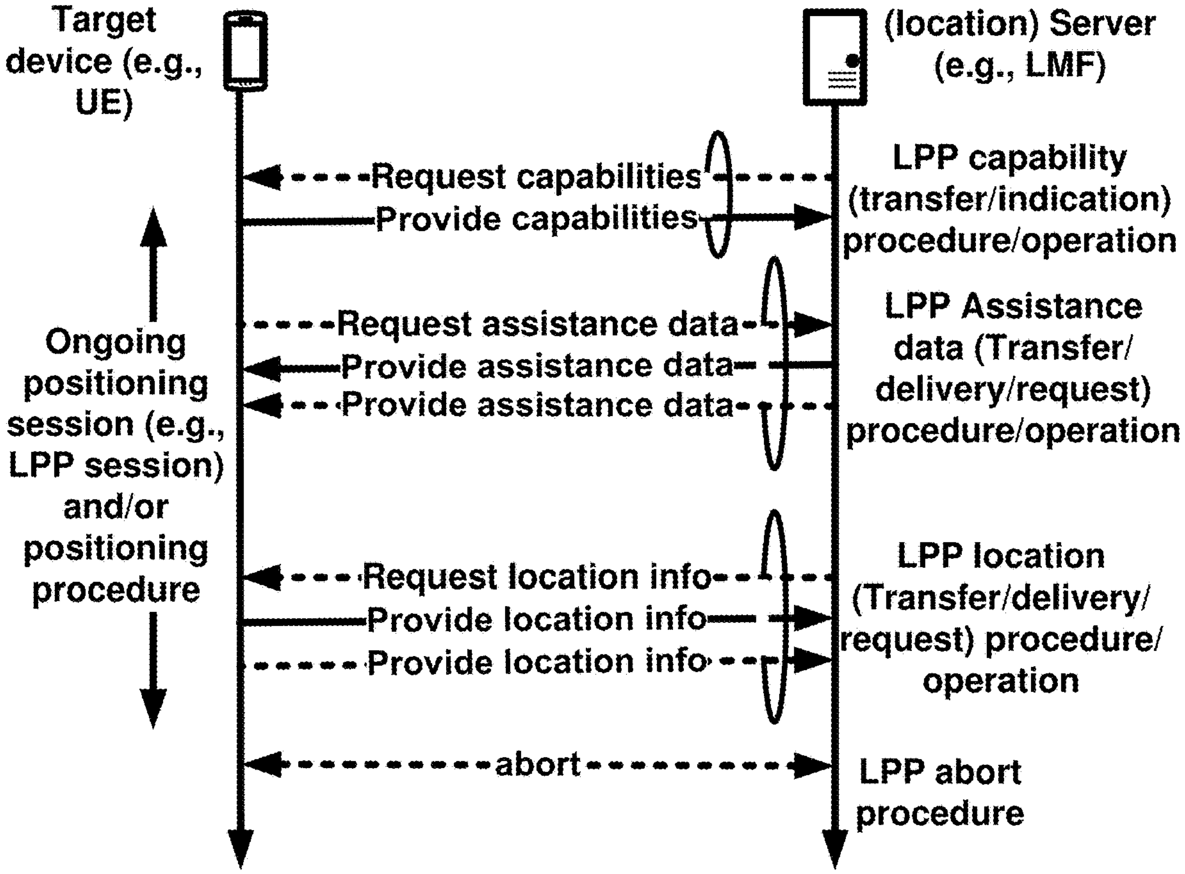
FIG. 17B shows an example of LPP messages and LPP procedures as per an aspect of an embodiment of the present disclosure.

FIG. 17B shows an example of LPP messages and LPP procedures as per an aspect of an embodiment of the present disclosure. The interaction/communication between the wireless device and the location server may comprise communicating LPP messages of the one or more positioning messages, e.g., during the (ongoing) positioning procedure. As shown in FIG. 17B, the positioning procedure (and/or the positioning session) may comprise at least one of the following: a capability procedure (e.g., an LPP capability procedure); and/or an (LPP) assistance data procedure; and/or a location procedure (e.g., an LPP location procedure); and/or an (LPP) abort (or cancel or terminate) procedure. The purpose of the abort procedure may be to allow the wireless device or the location server to abort the (ongoing) positioning procedure (e.g., cancellation of a location request by an LCS client). For example, the abort procedure may stop (or terminate or finish) the (ongoing) positioning procedure.

The capability procedure may be (or comprise) an LPP capability transfer procedure. The server may send/transmit request capabilities (e.g., RequestCapabilities) message of the one or more positioning messages to the wireless device. For example, the wireless device may transmit provide capabilities (e.g., ProvideCapabilities) message to the location server (e.g., in response to the request capabilities message). Upon receiving the RequestCapabilities message, the wireless device may generate the ProvideCapabilities message. For each positioning method for which a request for capabilities is included RequestCapabilities message and if the wireless device supports the requested positioning method, the wireless device may include the capabilities of the wireless device for the supported positioning method in the ProvideCapabilities message. In some implementations, the capability procedure may be an LPP capability indication procedure allowing the wireless device to provide unsolicited capabilities (e.g., to transmit the ProvideCapabilities message) to the location server, e.g., without receiving the request capability message.

The assistance data procedure may comprise one or more (LPP) procedures related to assistance data transfer. The assistance data procedure may enable/allow the wireless device to request assistance data (e.g., by transmitting a request assistance data message of the one or more positioning messages) from the location server to assist in positioning corresponding to the positioning procedure. The location server may respond with a provide assistance data (e.g., ProvideAssistanceData) message (of the one or more positioning messages) to the wireless device containing/comprising (requested) assistance data. The assistance data procedure may be a periodic assistance data transfer procedure. In some examples, the assistance data procedure may be a periodic assistance data transfer with update procedure. The assistance data procedure may enable/allow the location server to transfer assistance data to the wireless device in the absence of a request of assistance data (e.g., without receiving a request assistance data message), e.g., an assistance data delivery procedure.

For example, assistance data that may be transferred from the location server to the wireless device (e.g., via the one or more positioning messages) may comprise at least one of the following: cell information (e.g., Physical cell IDs (PCIs), global cell IDs (GCIs), and PRS IDs, ARFCNs of candidate NR TRPs for measurement); and/or Timing relative to the TRP of the candidate NR TRPs; and/or DL-PRS configuration of candidate NR TRPs (e.g., as shown in FIG. 21A); and/or SSB information of the (one or more) TRPs (the time/frequency occupancy of SSBs); and/or PRS-only TP indication; On-Demand DL-PRS-Configurations; Validity Area of the Assistance Data. The candidate NR TRPs may comprise the one or more TRPs.

The location procedure may comprise procedures related to location information transfer/report. The location procedure may enable/allow the location server to request location measurement data (or positioning measurements or measurements or positioning measurement data) and/or a location estimate from the wireless device. The location server may send a request location information (e.g., RequestLocationInformation) message (of the one or more positioning messages) to the wireless device to request location information (e.g., indicating a type of location information needed and potentially an associated QoS). The request location information message may indicate a request for the location information/position (or measurements of the positioning procedure) of the wireless device. The wireless device may (in response to the request location information message) send/transmit a provide location information (e.g., ProvideLocationInformation) message (of the one or more positioning messages) to the location server to transfer the location information data (or simply location data or location information or location). For example, the location procedure may enable/allow the wireless device to transfer/transmit/send the (unsolicited) location measurement data and/or the location estimate to the location server in the absence of a request of location measurement data from the location server, e.g., the location information delivery procedure. The location procedure may comprise (periodically) transmitting/sending location information report(s) (e.g., comprising the location information data) to the location server by the wireless device.

FIG. 18A shows an example of request capabilities message. The request capabilities message (of the one or more positioning messages) may indicate types of capability needed for the ongoing positioning procedure. The RequestCapabilities message body in a LPP message (e.g., the request capabilities message) of the LPP messages is used by the location server to request the wireless device capability information for LPP and the supported individual positioning methods. The request capabilities message may comprise RequestCapabilities-r9-IEs indicating one or more capabilities, e.g., common request capabilities (e.g., commonIEsRequestCapabilities), and/or NR ECID request capabilities (e.g., nr-ECID-RequestCapabilities-r16), and/or NR multi-RTT request capabilities (e.g., nr-Multi-RTT-RequestCapabilities-r16), and/or NR DL TDOA request capabilities (e.g., nr-DL-TDOA-RequestCapabilities-r16), and/or NR UL request capabilities (e.g., nr-UL-RequestCapabilities-r16), and/or the like. The RequestCapabilities-r9-les may indicate other capabilities (e.g., a-gnss-RequestCapabilities and/or wlan-RequestCapabilities-r13, and/or the like) not shown in FIG. 18A.

FIG. 18B shows an example of provide capabilities message. The provide capabilities message (of the one or more positioning messages) may indicate types of capability needed for the ongoing positioning procedure (e.g., for each positioning method whose capabilities are to be indicated or requested by the request capabilities). The ProvideCapabilities message body in an LPP message (e.g., the provide capabilities message) may indicate the LPP capabilities of the wireless device to the location server. The provide capabilities message may comprise ProvideCapabilities-r9-les indicating one or more capabilities, e.g., common provide capabilities (e.g., commonIEsProvideCapabilities), and/or NR ECID request capabilities (e.g., nr-ECID-ProvideCapabilities-r16), and/or NR multi-RTT request capabilities (e.g., nr-Multi-RTT-ProvideCapabilities-r16), and/or NR DL TDOA request capabilities (e.g., nr-DL-TDOA-ProvideCapabilities-r16), and/or NR UL request capabilities (e.g., nr-UL-ProvideCapabilities-r16), and/or the like. The ProvideCapabilities-r9-les may indicate other capabilities (e.g., a-gnss-ProvideCapabilities and/or wlan-ProvideCapabilities-r13, and/or the like) not shown in FIG. 18A.

FIG. 18C shows an example of request assistance data message. The request assistance data message (of the one or more positioning messages) may comprise RequestAssistanceData-r9-les comprising at least one of the following, e.g., common request assistance data (e.g., commonIEsRequestAssistanceData), and/or NR multi-RTT request assistance data (e.g., nr-Multi-RTT-RequestAssistanceData-r16), and/or NR DL TDOA request assistance data (e.g., nr-DL-TDOA-RequestAssistanceData-r16), and/or NR DL AoD request assistance data (e.g., nr-DL-AoD-RequestAssistanceData-r16), and/or the like. For example, the request assistance data message (e.g., CommonIEsRequestAssistanceData) may comprise/indicate a primary cell ID/index (e.g., primaryCellID) indicating a primary cell of the wireless device. A provide assistance data message (of the one or more positioning messages) may comprise ProvideAssistanceData-r9-les comprising at least one of the following, e.g., common provide assistance data (e.g., commonIEsProvideAssistanceData), and/or NR multi-RTT provide assistance data (e.g., nr-Multi-RTT-ProvideAssistanceData-r16, see FIG. 20A for an example), and/or NR DL TDOA provide assistance data (e.g., nr-DL-TDOA-ProvideAssistanceData-r16), and/or NR DL AoD provide assistance data (e.g., nr-DL-AoD-ProvideAssistanceData-r16), and/or the like.

A request location information message (of the one or more positioning messages) may comprise RequestLocationInformation-r9-les comprising at least one of the following, e.g., common request location information (e.g., commonIEsRequestLocationInformation, see FIG. 19 for an example), and/or NR multi-RTT request location information (e.g., nr-Multi-RTT-RequestLocationInformation-r16), and/or NR DL TDOA request location information (e.g., nr-DL-TDOA-RequestLocationInformation-r16), and/or NR DL AoD request location information (e.g., nr-DL-AoD-RequestLocationInformation-r16), and/or the like.

FIG. 19 shows an example of configuration parameters of a request location information. The request location information may comprise the common request location information (e.g., commonIEsRequestLocationInformation). As shown in FIG. 19, the common request location information (e.g., commonIEsRequestLocationInformation) may comprise at least one of the following: locationInformationType (e.g., whether the location server requires the location estimate or the measurements); and/or a triggered reporting (e.g., triggeredReporting); and/or a periodic reporting (e.g., periodicalReporting); and/or an additional information; and/or a response time (e.g., responseTime or responseTimeNB); and/or a scheduled location time (e.g., scheduledLocationTime).

The additional information may indicate whether the wireless device is allowed to transmit/send additional information (e.g., besides requested information) to the location server. If the additional information indicates 'onlyReturnInformationRequested', the wireless device may not return (or transmit) any additional information to the location server. If additional information indicates 'mayReturnAdditionalInformation', the wireless device may return (or transmit) additional information to the location server. The additional information may comprise a velocity (e.g., corresponding to the location estimate) and/or E-CID measurements.

The triggered reporting may indicate that triggered reporting is requested (by the location service). For example, the triggered reporting may indicate/configure one or more reporting triggers/criteria (e.g., via TriggeredReportingCriteria) for (performing/triggering) the location (transfer/delivery) procedure. The triggered reporting may comprise cellChange and reportingDuration. If the cellChange field of the triggered reporting is set to TRUE, the wireless device may transmit the (requested) location information each time the primary cell changes (e.g., due to handover procedure), e.g., the one or more reporting triggers may comprise the (primary) cell change. The reportingDuration may indicate a maximum duration of the triggered reporting (e.g., in seconds/milliseconds). A value of zero of the reportingDuration may indicate an unlimited (i.e., "infinite") duration. In an example, the wireless device may continue transmitting/sending the location information (or the location data/positioning measurements) to the location server (e.g., based on the one or more reporting triggers) for the reportingDuration or until the ongoing positioning procedure being aborted/canceled/stopped (e.g., in response to the abort message or an error message of the one or more positioning message). The wireless device may ignore the triggeredReporting field of the commonIEsRequestLocationInformation if the commonIEsRequestLocationInformation comprises/configures at least one of the following: the perioding reporting (e.g., periodicalReporting IE) and/or the response time (e.g., responseTime IE or responseTimeNB IE).

The periodic reporting (e.g., periodicalReporting) may indicate that periodic reporting (of the location information data/measurements) is requested by the location server. The periodic reporting may comprise a reporting amount (e.g., reportingAmount) and/or a reporting interval (e.g., reportingInterval). The reporting amount may indicate a number of the (periodic) location information data/reports. If the reportingAmount is 'infinite/indefinite', the wireless device may continue periodic reporting of the location information (to the location server) until the abort message is received from the location server. The reporting interval may indicate an interval between the (consecutive) location information reports and/or a response time requirement for a first/starting/initial/earliest location information report. For example, the location information reports (or measurement reports) may contain no measurements or no location estimate when a reporting interval (reportingInterval) expires before the wireless device is able to obtain new measurements or obtain a new location estimate.

The response time may comprise at least one of the following: a time; and/or a responseTimeEarlyFix; and/or a unit. The time may indicate a maximum/largest/greatest response time (e.g., based on the indicated unit or seconds) as measured between receipt of the RequestLocationInformation message and transmission of the ProvideLocationInformation message. The responseTimeEarlyFix may indicate a maximum/largest/greatest response time (e.g., based on the indicated unit or seconds) as measured between receipt of the RequestLocationInformation message and transmission of the ProvideLocationInformation message containing an early location measurements or an early location estimate.

The scheduledLocationTime may indicate that the wireless device is requested (by the location server) to obtain the location information data (or the positioning/location measurements or location estimate) valid at the scheduledLocationTime $T_{scheduledLocationTime}$. $T_{scheduledLocationTime}$ may be in UTC format, or GNSS system time, or a network time (e.g., networkTime, e.g., in a E-UTRA or NR network time, or a relativeTime (e.g., $T_{scheduledLocationTime}$ in seconds from current time, where current time is defined as the time the CommonIEsRequestLocationInformation is received). The NR network time may be based on system frame number (nr-SFN) and/or a (physical) cell ID/identity (e.g., nr-PhysCellID, nr-ARFCN, nr-CellGlobalID) and/or a slot number (e.g., nr-Slot for an indicated subcarrier spacing (SCS)), e.g., the NR network time may be nr-SFN+nr-Slot.

The provide location information message may comprise ProvideLocationInformation-r9-Ies comprising at least one of the following, e.g., common provide location information (e.g., commonIEsProvideLocationInformation), and/or NR multi-RTT provide location information (e.g., nr-Multi-RTT-ProvideLocationInformation-r16), and/or NR DL TDOA provide location information (e.g., nr-DL-TDOA-ProvideLocationInformation-r16), and/or NR DL AoD provide location information (e.g., nr-DL-AoD-ProvideLocationInformation-r16), and/or the like.

For example, the provide location information message (e.g., IE NR-Multi-RTT-ProvideLocationInformation) may comprise signal measurement information configuration(s) (e.g., NR-Multi-RTT-SignalMeasurementInformation and/or NR-DL-TDOA-SignalMeasurementInformation-r16 and/or NR-DL-AoD-SignalMeasurementInformation-r16 and/or the like). The signal measurement information configurations may comprise at least one of the following: nr-NTA-Offset (e.g., $N_{TAoffset}$ used by the wireless device); and/or SRS for Positioning Resources associated with a UE Tx time error group (TEG); and/or a list of multi-RTT measurement elements (e.g., nr-Multi-RTT-MeasList-r16 or nr-AdditionalPathListExt-r17). Each multi-RTT measurement element (e.g., NR-Multi-RTT-MeasElement-r16 or NR-Multi-RTT-AdditionalMeasurementElement-r16) of the list of multi-RTT measurement elements may comprise at least one of the following: associated/corresponding nr-UE-RxTxTimeDiff (indicating a UE Rx−Tx time difference measurement); and/or associated/corresponding PRS configuration (e.g., comprising dl-PRS-ID and/or a DL-PRS Resource Set ID and a DL-PRS Resources ID); and/or associated/corresponding additional measurements (e.g., nr-DL-PRS-RSRP-Result-r16); and/or associated/corresponding time stamp (e.g., nr-TimeStamp-r16). The dl-PRS-ID and/or the DL-PRS Resource Set ID and the DL-PRS Resources ID may uniquely identify a DL-PRS Resource. The dl-PRS-ID may be associated with multiple DL-PRS Resource Sets associated with a single TRP (e.g., the reference TRP or a neighbor TRP). Each TRP (e.g., the reference TRP or a neighbor TRP) may only be associated with one the dl-PRS-ID. Each multi-RTT measurement element may correspond to a path (a first/initial detected path or an additional detected path) and/or the TEG. Each multi-RTT measurement element may comprise accompanied DL-PRS RSRP measurements and/or LOS-NLOS indicator.

The UE Rx−Tx (or reception-transmission) time difference measurement may be measured/calculated/determined (by the wireless device) as $T_{UE-RX}-T_{UE-TX}$, wherein $T_{UE-RX}$ is the received timing of downlink subframe #i (at the wireless device) from a TRP/TP (e.g., corresponding to the PRS configuration identified by the dl-PRS-ID and/or the DL-PRS Resource Set ID and the DL-PRS Resources ID) defined by the first detected path in time and $T_{UE-TX}$ is the transmit timing of uplink subframe #j (at the wireless device) that is closest in time to the subframe #i received from the TP/TP. The wireless device may (corresponding to the first detected path) receive/measure DL PRS of the PRS configuration (e.g., corresponding to the dl-PRS-ID and/or the DL-PRS Resource Set ID and the DL-PRS Resources ID) during/within downlink subframe #i. The wireless device may transmit SRS (for positioning) during/with the uplink subframe #j.

FIG. 20A shows an example of configuration parameters of the provide assistance data message. The provide assistance data message (of the one or more positioning message) may comprise the multi-RTT provide assistance data (NR-Multi-RTT-ProvideAssistanceData) message and/or the DL-TDOA provide assistance data (NR-DL-TDOA-ProvideAssistanceData) message. As shown in FIG. 20A, the provide assistance data message may comprise a cell list of a network area (e.g., IE AreaID-CellList). The cell list of the network area may provide (NR) Cell-IDs (e.g., nr-PhysCellID-r17) of the multiple TRPs belonging to the network area where the (associated) assistance data are valid (e.g., indicated by the corresponding provide assistance data message). The provide assistance data message may comprise one or more PRS configuration parameters. The one or more PRS configuration parameters may comprise at least one of the following: DL PRS assistance data (e.g., nr-DL-PRS-AssistanceData-r16) and/or nr-SelectedDL-PRS-IndexList (indicating DL-PRS Resources applicable for the NR-Multi-RTT-ProvideAssistanceData message) and/or nr-On-Demand-DL-PRS-Configurations (indicating a set of available DL-PRS configurations requested by the wireless device on-demand) and/or nr-On-Demand-DL-PRS-Configurations-Selected-IndexList (indicating available on-demand DL-PRS configurations applicable for the NR-Multi-RTT-ProvideAssistanceData message). For example, the wireless device may request the nr-On-Demand-DL-PRS-Configurations by transmitting the request assistance data message (e.g., NR-Multi-RTT-RequestAssistanceData-r16) to the location server. If DL PRS assistance data (e.g., nr-DL-PRS-AssistanceData-r16) is absent but the nr-SelectedDL-PRS-IndexList field is present, the nr-DL-PRS-AssistanceData may be provided in IE NR-DL-TDOA-ProvideAssistanceData or NR-DL-AoD-ProvideAssistanceData.

FIG. 20B shows an example of configuration parameters of the request assistance data message. For example, the request assistance data message may comprise the NR-Multi-RTT-RequestAssistanceData-r16. Although not shown in FIG. 20B, similar configurations (to the configurations of the FIG. 20B) for NR-DL-TDOA-RequestAssistanceData and/or NR-DL-AoD-RequestAssistanceData or the like may exist. The request assistance data message may comprise at least one of the following: nr-PhysCellID (e.g., the NR physical cell identity of the (current) primary cell of the wireless device); and/or nr-AdType (e.g., indicating the requested assistance data and/or configuration: nr-DL-PRS-AssistanceData, for PRS assistance data, or UL SRS configuration, for SRS configuration); and/or the nr-on-demand-DL-PRS-Request-r17; and/or the nr-DL-PRS-ExpectedAoD-or-AoA-Request-r17 (indicating that IE NR-DL-PRS-ExpectedAoD-or-AoA in NR-DL-PRS-AssistanceData is requested); and/or the pre-configured-AssistanceDataRequest-r17 (indicating that the wireless device requests pre-configured assistance data with the area validity, e.g., the network area); and/or the like. For example, when the nr-AdType of the request assistance data message indicates nr-DL-PRS-AssistanceData, the wireless device/base station may request (from the location server) configuration of the PRS for the positioning procedure.

FIG. 21A, FIG. 21B, and FIG. 22 show examples of configuration parameters of downlink (DL) positioning reference signal (PRS). For example, the one or more configuration parameters may comprise the configuration parameters of the DL PRS (e.g., one or more PRS configuration parameters). The one or more PRS configuration parameters may comprise one or more DL PRS resource set configuration(s) (e.g., indicated by IE NR-DL-PRS-ResourceSet and NR-DL-PRS-Resource in FIG. 22). The one or more DL PRS resource set configuration(s) may configure one or more DL PRS resource sets. The one or more DL PRS resource sets may comprise one or more collections (or lists or sets or subsets) of DL PRS resource sets. Each collection of DL PRS resource sets (of the one or more collections of DL PRS resource sets) may correspond to (or associated with) a DL PRS positioning frequency layers of one or more DL PRS positioning frequency layers. A collection of DL PRS resource sets may comprise one or more first DL PRS resource sets (e.g., configured via nr-DL-PRS-ResourceSetList of the nr-DL-PRS-Info), e.g., corresponding to a TRP (e.g., the reference TRP or a neighbor TRP), e.g., DL PRS resources sets of the TRP. For example, a DL PRS resource set of the one or more DL PRS resource sets may correspond to a (unique) nr-DL-PRS-ResourceSetID).

The one or more PRS configuration parameters may configure/indicate DL-PRS configuration (e.g., PRS resources and/or PRS resource sets) corresponding to the multiple (e.g., the one or more) TRPs (e.g., comprising the reference TRP and/or at least one neighbor TRP). The DL PRS assistance data (e.g., nr-DL-PRS-AssistanceData-r16) may (implicitly or explicitly) indicate/configure the assistance data reference TRP (e.g., the reference TRP) and/or the at least one neighbor TRP.

As shown in FIG. 21A, the DL PRS assistance data comprises IE nr-DL-PRS-ReferenceInfo that indicates ID(s) of the reference TRP. FIG. 21B shows configuration parameter(s) of a PRS reference information (e.g., the IE DL-PRS-ID-Info). For example, the IE DL-PRS-ID-Info may configure/indicate one or more IDs (or indexes or identifications or indices) of the reference TRPs' PRS Resource(s) and/or PRS resource set(s) of the one or more PRS resource sets. The one or more IDs may indicate IDs of PRS Resource(s) and/or PRS resource set(s) that are associated with the reference TRP. The DL-PRS-ID-Info (e.g., via nr-DL-PRS-ResourceID-List-r16) indicates/configures a list of DL-PRS Resource IDs under a same DL-PRS Resource Set (e.g., indicated/configured by nr-DL-PRS-ResourceSetID-r16), e.g., a list of PRS resource(s) that are associated with a PRS resource set with index/ID of nr-DL-PRS-ResourceSetID-r16. The wireless device may, using the IE DL-PRS-ID-Info (e.g., dl-PRS-ID and/or the one or more IDs and/or the nr-DL-PRS-ResourceSetID), determine/distinguish/identify the reference TRP. The wireless device may use DL PRS resource(s) corresponding to the IE DL-PRS-ID-Info as a reference for the DL RSTD, DL PRS-RSRP, DL PRS-RSRPP, and UE Rx−Tx time difference measurements. In some examples, the wireless device may use different DL PRS resources or a different DL PRS resource set (e.g., than the DL PRS resource(s) corresponding to the IE DL-PRS-ID-Info) to determine the reference for the RSTD measurement. If the wireless device chooses to use a different reference than indicated by the IE DL-PRS-ID-Info, the wireless device may report/transmit (e.g., via the LPP messages, e.g., the provided location info message) to the location server the dl-PRS-ID, the DL PRS resource ID(s) or the DL PRS resource set ID used to determine the reference.

As shown in FIG. 21A, the one or more PRS configuration parameters (e.g., the DL PRS assistance data (e.g., nr-DL-PRS-AssistanceData-r16)) may configure/indicate (e.g., via nr-DL-PRS-AssistanceDataList-r16) one or more DL PRS positioning frequency layers (e.g., via IE nr-DL-PRS-AssistanceDataList). Each DL PRS positioning frequency layer (of the one or more DL PRS positioning frequency layers) may define/configure/indicate a collection of DL PRS resource sets of the one or more collections of DL PRS resource sets (e.g., via nr-DL-PRS-Info in NR-DL-PRS-AssistanceDataPerTRP). For example, NR-DL-PRS-PositioningFrequencyLayer may comprise common parameters that are shared across the collection of the DL PRS resource sets per each frequency layer. In an example, a DL PRS positioning frequency layer (e.g., that is configured by NR-DL-PRS-PositioningFrequencyLayer) may configure/ indicate at least one of the following: dl-PRS-Subcarrier-Spacing (indicating a subcarrier spacing for a (corresponding) DL PRS resource; and/or a dl-PRS-CyclicPrefix indicating a cyclic prefix for the DL PRS resource; and/or dl-PRS-PointA indicating an absolute frequency of a reference resource block; and/or dl-PRS-ResourceBandwidth indicating a number of PRBs allocated for the DL-PRS Resource (allocated DL-PRS bandwidth); and/or the like.

As shown in FIG. 21A, a dl-PRS-ID corresponding to a DL PRS positioning frequency layer (e.g., via NR-DL-PRS-AssistanceDataPerTRP of the NR-DL-PRS-AssistanceData-PerFreq) may correspond (or associate with) multiple DL PRS resource sets (or a collection of DL PRS resource sets) via IE DL-PRS-Info.

As shown in FIG. 22, a DL PRS resource set (with/corresponding to nr-DL-PRS-ResourceSetID), e.g., of the multiple DP PRS resource sets (or the collection of DL PRS resource sets), may comprise of a list of DL PRS resource(s) (e.g., via IE dl-PRS-ResourceList). The DL PRS resource set may correspond to a dl-PRS-ID and/or nr-PhysCellID (and/or nr-CellGlobalID and/or nr-ARFCN) as indicated by the NR-DL-PRS-AssistanceDataPerTRP in FIG. 21A. Each DL PRS resource of the list of DL PRS resource(s) may correspond to a nr-DL-PRS-ResourceID and/or an associated spatial transmission filter (e.g., configured by dl-PRS-QCL-Info). The wireless device may expect that one of these dl-PRS-ID along with a nr-DL-PRS-ResourceSetID and a nr-DL-PRS-ResourceID-r16 uniquely identify a DL PRS resource (and/or an associated TRP).

For example, the dl-PRS-QCL-Info may configure/indicate SSB(s) (or other RS signal(s)) that are quasi-collocated with a DL PRS resource of the list of DL PRS resource(s) and/or a type of the QCL (e.g., rs-Type). For example, the dl-PRS-QCL-Info may indicate physical cell ID of the SSB(s).

In some examples, the DL PRS (corresponding to a DL PRS resource set or a DL PRS resource) is transmitted via/from a serving cell (e.g., a TRP of the serving cell, e.g., the reference TRP or a neighbor TRP) or a non-serving cell (e.g., a TRP of the non-serving cell, e.g., a neighbor TRP). If nr-PhysCellID or nr-CellGlobalID is provided, and if nr-PhysCellID, nr-CellGlobalID and nr-ARFCN associated with the dl-PRS-ID, if provided, are the same as the corresponding information of a serving cell, the wireless device may assume/determine that the DL PRS is transmitted from the serving cell; otherwise the wireless device may assume/determine that the DL PRS is not transmitted from/via the serving cell (e.g., is transmitted via/from the non-serving cell). If the wireless device assumes/determines that the DL PRS is transmitted from the serving cell, and if the serving cell is the same as the serving cell defined by the SS/PBCH block of the corresponding DL PRS resource, the wireless device may assume/determine that the DL PRS and the SS/PBCH block are transmitted from/via the same serving cell. If the assumes/determines that the DL PRS is not transmitted from the serving cell, and if nr-PhysCellID is provided, and is the same as physical cell ID of the SS/PBCH block from the non-serving cell of the same band as the DL PRS, the wireless device may assume/determine that the DL PRS and the SS/PBCH block are transmitted from/via the same non-serving cell.

The wireless device may assume that the DL PRS from the serving cell is not mapped to any symbol that contains SS/PBCH block from the serving cell. If the time frequency location of the SS/PBCH block transmissions from non-serving cells are provided to the wireless device (e.g., via the LPP messages or RCC messages) then the wireless device may assume that the DL PRS from the non-serving cell is not mapped to any symbol that contains the SS/PBCH block of the same non-serving cell.

Figure 23A:
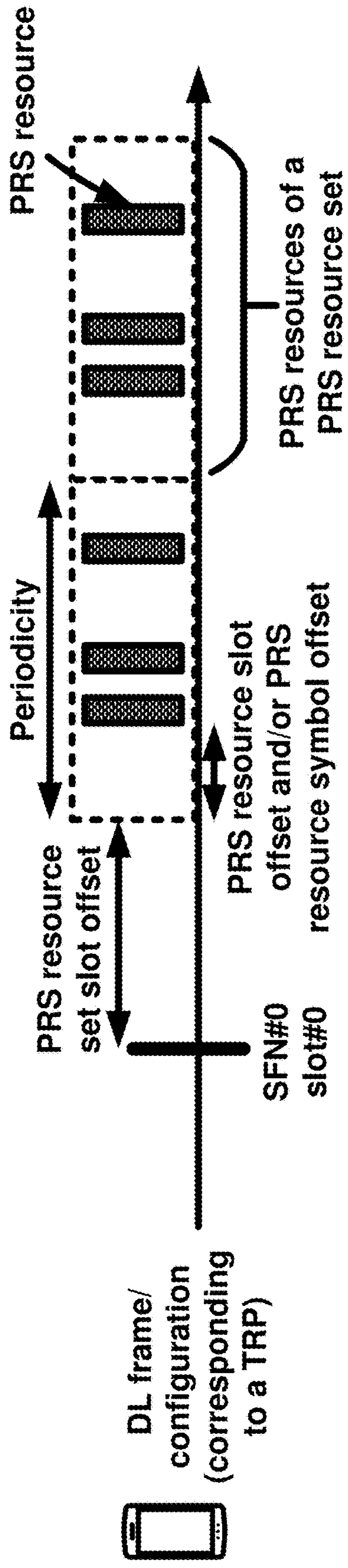
FIG. 23A shows an example of configuration of DL PRS resource set with respect to a DL frame (corresponding to a TRP) of the wireless device.

FIG. 23A shows an example of configuration of DL PRS resource set with respect to a DL frame (corresponding to a TRP) of the wireless device. The PRS resources of a DL PRS resource set (of the collection of the PRS resource sets), corresponding to a TRP (e.g., the reference TRP or a neighbor TRP), may comprise time/frequency resources for measuring the DL PRSs. As shown in FIG. 22, a DL PRS resource set (of the collection of the PRS resource sets) may comprise at least one of the following: a corresponding nr-DL-PRS-ResourceSetID defining/indicating an identity (or ID) of the DL PRS resource set (configuration); and/or a periodicity and resource set slot offset (e.g., dl-PRS-Periodicity-and-ResourceSetSlotOffset); and/or a PRS resource repetition factor (e.g., dl-PRS-ResourceRepetition-Factor) defining/indicating how many times each DL-PRS resource is repeated for a single instance of the DL-PRS resource set (e.g., to improve reliability of measurements); and/or a PRS resource gap (e.g., dl-PRS-ResourceTimeGap) defining/indicating a time/gap (or an offset) in number of slots between two repeated instances of a DL PRS resource with the same nr-DL-PRS-ResourceID within a single instance of the DL PRS resource set; and/or at least one muting option (e.g., dl-PRS-MutingOption1 and/or dl-PRS-MutingOption2) defining/indicating time locations where the DL PRS resource is expected to not be transmitted for a DL PRS resource set; and/or dl-PRS-NumSymbols defining/indicating number of symbols of the DL PRS resource within a slot. As shown in FIG. 23A, the periodicity and resource set slot offset (e.g., dl-PRS-Periodicity-and-ResourceSetSlotOffset) may define/indicate a (DL PRS resource) periodicity (e.g., corresponding to dl-PRS-SubcarrierSpacing) and a slot offset for DL PRS resource set, e.g., with respect to SFN0 slot 0 of a corresponding TRP (e.g., the reference TRP or a neighbor TRP). DL PRS resources (e.g., configured by dl-PRS-ResourceList) within the DL PRS resource set are configured with the same DL PRS resource periodicity. As shown in FIG. 21A, the (corresponding TRP) may be a PRS-only TP/TRP, e.g., when field prs-OnlyTP of the NR-DL-PRS-AssistanceDataPerTRP (of the TRP) presents. When the field prs-OnlyTP of the NR-DL-PRS-AssistanceDataPerTRP (of the TRP) is present, the wireless device may not assume that any other signals or physical channels are present for the TRP other than DL-PRS. A PRS from a PRS-only TP may be treated/consider as PRS from a non-serving cell.

FIG. 22 also shows an example of configuration parameters of a DL PRS resource of a DL PRS resource set of the collection of the PRS resource sets (e.g., NR-DL-PRS-Resource). For example, the of configuration parameters of a DL PRS resource of the DL PRS resource set may comprise at least one of the following: a nr-DL-PRS-ResourceID determining/indicating the DL PRS resource configuration identity; and/or dl-PRS-SequenceID used in pseudo random generator for generation of DL PRS sequence for a given DL PRS resource; and/or dl-PRS-CombSizeN-AndReOffset defining/indicating a starting RE offset of a first symbol within a DL PRS resource in frequency; and/or a PRS resource slot offset (e.g., dl-PRS-ResourceSlotOffset) determining/indicating/defining a starting slot of the DL PRS resource with respect to corresponding DL PRS resource set slot offset (e.g., see FIG. 23A); and/or a PRS resource symbol offset (e.g., dl-PRS-ResourceSymbolOffset) determining/indicating/defining a starting symbol of a slot configured with the DL PRS resource; and/or dl-PRS-QCL-Info defining any quasi co-location information of the DL PRS resource with other reference signals (e.g., SSBs).

Figure 23B:
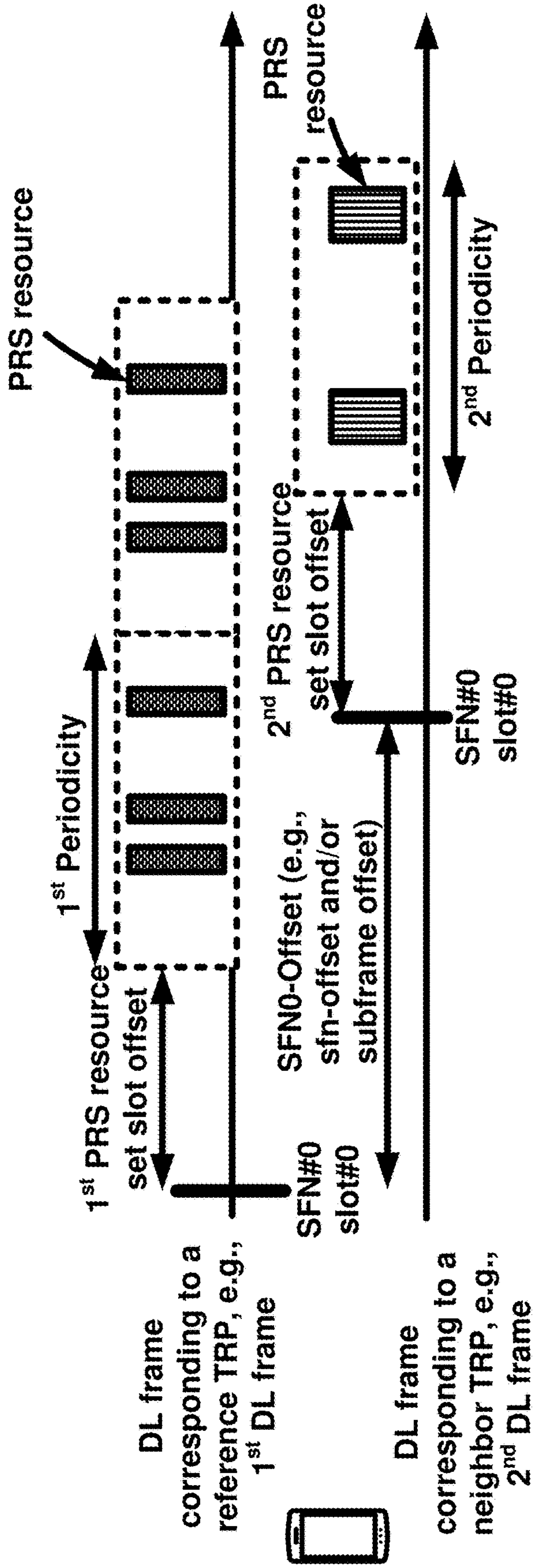
FIG. 23B shows an example of configurations of DL PRS resource sets corresponding to TRPs.

FIG. 23B shows an example of configurations of DL PRS resource sets corresponding to TRPs. For example, a first DL frame of the wireless device may correspond to a first TRP (e.g., the reference TRP). A second DL frame (or configuration) of the wireless device with respect to a second DL frame corresponding to a second TRP (e.g., a neighbor TRP). As shown in FIG. 21A, the one or more PRS configuration parameters (e.g., the DL PRS assistance data) may configure/indicate an SFN0-Offset (e.g., NR-DL-PRS-SFN0-Offset) per a TRP (e.g., the first TRP or the second TRP). As shown in FIG. 21A, the SFN0-Offset may comprise a sfn-offset and/or a subframe offset (e.g., integerSubframeOffset). The sfn-offset of the SFN0-Offset may indicate/specify an SFN offset at the TRP antenna location between the assistance TRP and the neighbor TRP. The sfn-offset of the SFN0-Offset may correspond to a number of full radio frames counted from the beginning/starting/initial/earliest of a radio frame #0 of/associated with the assistance TRP to a beginning starting/initial/earliest of a closest subsequent radio frame #0 of the neighbor TRP. The integerSubframeOffset of the SFN0-Offset may specify/indicate a frame boundary offset at the TRP antenna location between the assistance TRP and the neighbor TRP counted in full subframes. The integerSubframeOffset of the SFN0-Offset may correspond to a number of full subframes counted from the beginning/starting/initial/earliest of a subframe #0 of the assistance TRP to the beginning/starting/initial/earliest of a closest subsequent subframe #0 of the neighbor TRP. The location server may set/configure/determine the value of the SFN0-Offset (e.g., sfn-offset and/or integerSubframeOffset) in accordance with a search window for the wireless device (e.g., using nr-DL-PRS-ExpectedRSTD and nr-DL-PRS-ExpectedRSTD-Uncertainty of the DL PRS assistance data).

For example, for the reference TRP the corresponding SFN0-Offset (or the sfn-offset and/or the subframe offset) may be 0. For each neighbor TRP (e.g., the second TRP) the corresponding SFN0-Offset may indicate a relative SFN offset with respect to the SFN #0 slot #0 (or SFN0 slot 0 or SFN 0) of the reference TRP, e.g., a time offset (e.g., in number of subframes and/or slots) of the SFN0 slot 0 for a DL PRS resource set (corresponding to the second TRP) with respect to SFN0 slot 0 of a reference provided by nr-DL-PRS-ReferenceInfo (e.g., corresponding to the reference TRP). As shown in FIG. 23B, the wireless device may determine SFN0 slot 0 of the neighbor TRP based on the indicated SFN0-offset (corresponding to the neighbor TRP).

As shown in FIG. 21A, the one or more PRS configuration parameters (e.g., the DL PRS assistance data) may configure/indicate per each TRP (e.g., the reference TRP and/or the neighbor TRP) a PRS expected RSTD (e.g., nr-DL-PRS-ExpectedRSTD) and/or a PRS expected-RSTD uncertainty (e.g., nr-DL-PRS-ExpectedRSTD-Uncertainty). For example, corresponding to the reference TRP, the location server (e.g., the network) may signal/configure a value of zero for the nr-DL-PRS-expectedRSTD, and/or nr-DL-PRS-expectedRSTD-uncertainty in nr-DL-PRS-AssistanceDataList. For the neighbor TRP, the corresponding PRS expected RSTD (e.g., nr-DL-PRS-ExpectedRSTD) may indicate/define a time difference with respect to a received DL subframe timing the wireless device is expected to receive DL PRS (e.g., from the neighbor TRP). For example, the PRS expected RSTD of the neighbor TRP may indicate a reference signal time difference (RSTD) value that the wireless device is expected to measure between the neighbor TRP and the assistance TRP. The nr-DL-PRS-ExpectedRSTD field may take into account an expected propagation time difference as well as transmit time difference of PRS positioning occasions between the neighbor TRP and the reference TRP. For example, the nr-DL-PRS-ExpectedRSTD field of the NR-DL-PRS-AssistanceDataPerTRP may indicate a value in range of (−3841 . . . 3841) (e.g., (−0.5 ms, 0.5 ms) considering the resolution R). The resolution of the nr-DL-PRS-ExpectedRSTD may be R=4×Ts, with Ts=1/(15000*2048) seconds.

Figure 24A:
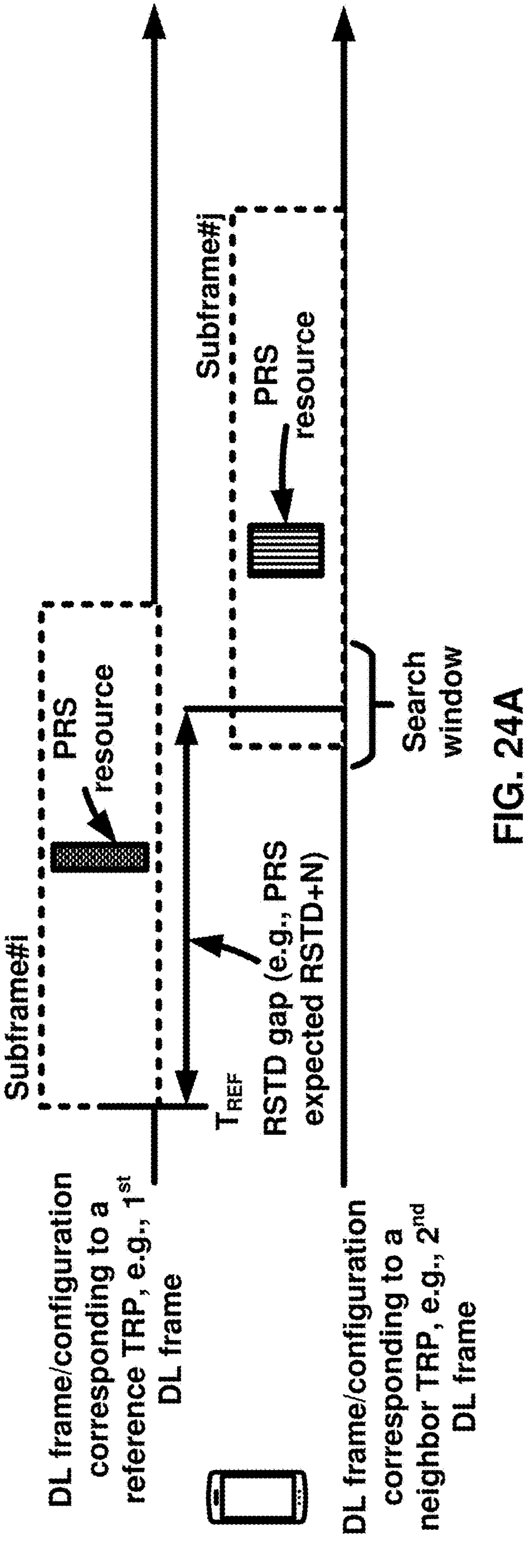
FIG. 24A shows an example of a search window for receiving PRS from a neighbor TRP.

FIG. 24A shows an example of a search window for receiving PRS from a neighbor TRP. As shown in FIG. 24A, the wireless device may (based on the one or more PRS configuration parameters) determine an RSTD gap and/or the search window. The PRS expected-RSTD uncertainty of the neighbor TRP (e.g., nr-DL-PRS-ExpectedRSTD-Uncertainty) may define/indicate a search window around the nr-DL-PRS-ExpectedRSTD, e.g., the nr-DL-PRS-ExpectedRSTD and nr-DL-PRS-ExpectedRSTD-Uncertainty together define the search window for the wireless device. For example, The PRS expected-RSTD uncertainty of the neighbor TRP may indicate an uncertainty in the nr-DL-PRS-ExpectedRSTD value of the neighbor TRP. In some implementations, the indicated uncertainty is related to the location server's a-priori estimate of the wireless device location. For example, the nr-DL-PRS-ExpectedRSTD-Uncertainty field of the NR-DL-PRS-AssistanceDataPerTRP may indicate a value in range of 0 to 246 (e.g., [0 ms, 0.032 ms] considering the resolution R). The resolution of the nr-DL-PRS-ExpectedRSTD-Uncertainty may be R=4×Ts seconds.

For example, as shown in FIG. 24A, the wireless device may assume/determine that a beginning/starting of a (DL) subframe for the PRS (corresponding to/of the neighbor TRP), e.g., subframe #j in FIG. 24A, is received within the search window of size [−nr-DL-PRS-ExpectedRSTD-Uncertainty×R; nr-DL-PRS-ExpectedRSTD-Uncertainty×R] centered at $T_{REF}$+1 millisecond×N+nr-DL-PRS-ExpectedRSTD×4×Ts. $T_{REF}$ is a reception time of a beginning/starting of a subframe for the PRS of the assistance TRP (e.g., subframe #i in FIG. 24A) at the wireless device antenna connector. Parameter N may be calculated (e.g., by the wireless device) based on the nr-DL-PRS-SFN0-Offset (of the neighbor TRP) and/or dl-PRS-Periodicity-and-ResourceSetSlotOffset and/or dl-PRS-ResourceSlotOffset. For example, the RSTD gap may be based on the PRS expected RSTD of the neighbor TRP and parameter N (e.g., the RSTD gap=1 millisecond×N+nr-DL-PRS-ExpectedRSTD×4×Ts after/from the $T_{REF}$).

In some implementations, the positioning procedure may be based on/via gap-based measurements, e.g., measuring DL PRS resources during/within (positioning) measurement gap(s). The wireless device may measure a DL PRS resource outside an active DL BWP or with a numerology different from a numerology of the active DL BWP (e.g., if the measurement is made/performed during a configured measurement gap). For example, the one or more configuration parameters may configure the wireless device with one or more measurement gaps. The one or more measurement gaps may comprise one or more preconfigured measurement gaps (e.g., for positioning) each associated with a measPosPreConfigGapId. In some implementations, the wireless device may (e.g., when the wireless device is expected to measure the DL PRS resource) request from the location server a (preconfigured) measurement gap (e.g., via an LLP message of the LPP messages, e.g., via NR-PRS-MeasurementInfoList message, or by transmitting a MAC CE (e.g., Positioning Measurement Gap Activation/deactivation request MAC CE). The MAC CE may indicate a measPosPreConfigGapId of a preconfigured measurement gap of the one or more preconfigured measurement gaps.

The wireless device may receive a command for a preconfigured Measurement Gap for Positioning activation/deactivation (e.g., Positioning Measurement Gap Activation/Deactivation Command MAC CE), e.g., via the serving cell. The command may indicate a first preconfigured measurement gap. The wireless device may transmit a PUCCH with HARQ-ACK information in slot n corresponding to the PDSCH carrying the command (Positioning Measurement Gap Activation/Deactivation Command MAC CE). For example, the wireless device may activate/deactivate the first preconfigured measurement gap (and apply corresponding assumptions) starting from a first/initial/starting slot that is after slot $$n + 3N_{slot}^{subframe,\mu}$$

where μ is an SCS configuration for the PUCCH.

In some implementations, the positioning procedure may be based on/via gap-less measurements positioning, e.g., measuring DL PRS resources during/within one or more DL PRS processing windows (PPWs). The wireless device may (to perform the positioning procedure) measure the DL PRS outside a measurement gap if a DL PRS is inside the active DL BWP and has the same numerology as the active DL BWP and is within/during the PPW. For example, the one or more configuration parameters (e.g., DL-PPW-PreConfig) configure/indicate the one or more PPWs.

The wireless device may receive a command for PPW (of the one or more PPWs) activation/deactivation (e.g., PPW Activation/Deactivation Command MAC CE), e.g., via the serving cell. The activation command may indicate the PPW. The wireless device may transmit a PUCCH with HARQ-ACK information in slot n corresponding to the PDSCH carrying the command (PPW Activation/Deactivation Command MAC CE). For example, the wireless device may activate/deactivate the PPW (and apply corresponding assumptions) starting from a first/initial/starting slot that is after slot $$n + 3N_{slot}^{subframe,\mu}$$

where μ is an SCS configuration for the PUCCH. The wireless device may not expect to be indicated with more than 4 activated PPWs of the one or mor PPWs across all active DL BWPs and may not expect to be indicated with the activated PPWs that overlap in time.

Inside/within the PPW the wireless device may measure a single DL PRS positioning frequency layer. The wireless device may not expect to measure the DL PRS outside the measurement gap if an expected received timing difference between the DL PRS from the non-serving cell (e.g., the neighbor TRP) and that from the serving cell (e.g., the reference TRP), determined by the nr-DL-PRS-ExpectedRSTD and/or nr-DL-PRS-ExpectedRSTD-Uncertainty corresponding to the neighbor TRP, is larger than a threshold (e.g., a maximum Rx timing difference that is provided by UE capability, e.g., IE prs-MeasurementWithoutMG). The threshold (e.g., THR) may indicate a UE capability for support of Rx timing difference between the serving cell (e.g., the reference TRP) and non-serving cell (e.g., the neighbor TRP) for PRS measurement within the PPW. The wireless device may, for receiving/measuring the DL PRS outside the measurement gap and within the PPW, determine max $|\Delta T| \leq THR$, where ΔT may be a time difference between a start/beginning of a slot/subframe containing PRS from the neighbor cell/TRP (e.g., slot/subframe #j in FIG. 24A) and a start/beginning of a closest slot/subframe from the serving cell/reference TRP (e.g., slot/subframe #i in FIG. 24A). the wireless device may determine a range of ΔT by the expected RSTD (e.g., nr-DL-PRS-ExpectedRSTD) and expected RSTD uncertainty (e.g., nr-DL-PRS-ExpectedRSTD-Uncertainty) in the assistance data.

For receiving/measuring the DL PRS outside the measurement gap and within the PPW, the wireless device may consider a priority between DL PRS and SSB. For example, the one or more configuration parameters may indicate a priority of the DL PRS.

A PPW of the one or more PPWs may be with a tyep1A or type1B or type2. For performing the positioning procedure and when the wireless device is expected to measure the DL PRS outside the measurement gap in a PPW with type1A and if the DL PRS is determined to be higher priority than a DL signal/channel (e.g., CSI-RS/PDCCH/PDSCH) inside the PPW, the wireless device may not receive/measure the DL signal/channel.

For performing the positioning procedure and when the wireless device is expected to measure the DL PRS outside the measurement gap in a PPW with type1B and if the DL PRS is determined to be higher priority than the DL signal/channel inside the PPW, the wireless device may not receive/measure the DL signal/channel.

For performing the positioning procedure and when the wireless device is expected to measure the DL PRS outside the measurement gap in a PPW with type2 if the DL PRS is determined to be higher priority than the DL signal/channel inside the PPW, the wireless device may not receive/measure the DL signal/channel overlapping with the DL PRS.

For example, the one or more positioning configuration parameters (e.g., the LPP messages) may configure the wireless device to measure and report to the location server (e.g., during the positioning procedure) a number of (e.g., up to 4) DL RSTD measurements per pair of dl-PRS-ID with each measurement between a different pair of DL PRS resources or DL PRS resource sets within the DL PRS configured for those dl-PRS-ID. The one or more positioning configuration parameters (e.g., the LPP messages) may configure the wireless device, for performing the positioning procedure, to measure and report (to the location server) a number of (e.g., up to 24) DL PRS-RSRP (and/or DL PRS-RSRPP) measurements on DL PRS resources associated with a same dl-PRS-ID. The one or more positioning configuration parameters (e.g., the LPP messages) may configure the wireless device (e.g., for performing the positioning procedure) to measure and report (to the location server) a number of (e.g., up to 4) UE Rx−Tx time difference measurements corresponding to a single configured SRS resource for positioning (via the one or more SRS configuration parameters of the one or more configuration parameters) or DL PRS resource set. Each measurement may correspond to a single received DL PRS resource or resource set (e.g., from the reference TRP and/or the neighbor TRP) which may be in different DL PRS positioning frequency layers. For example, associated with each RSTD and/or UE Rx−Tx time difference, the wireless device may (e.g., for performing the positioning procedure) measure and report (to the location server) timing and quality metrics of a number of (up to 8) additional detected. In some implementations, the one or more positioning configuration parameters (e.g., the LPP messages) may configure the wireless device, for performing the positioning procedure, to report (e.g., via the LPP messages) to the location server quality metrics NR-TimingQuality corresponding to the DL RSTD and UE Rx−Tx time difference measurements.

For example, to perform the positioning procedure, the wireless device may measure multiple DL RSTD measurements and/or PRS-RSRP(P) measurements and/or UE Rx−Tx time difference measurements during at least one measurement period. The at least one measurement period may, for example, be/comprise an RSTD measurement period ($T_{RSTD,Total}$). The at least one measurement period may, for example, be/comprise an PRS-RSRP measurement period ($T_{PRS-RSRP,total}$) and/or a UE Rx−Tx (time different) measurement period ($T_{UERxTx,Total}$). A length of the at least one measurement period (in ms) may depend on a total number of configured positioning frequency layers and/or a periodicity of the (PRS RSTD and/or PRS-RSRP(P) and/or UE Rx−Tx time difference) measurement in a positioning frequency layer.

The wireless device may start a measurement period of the at least one measurement period after/from receiving an indication from higher layers (e.g., LPP layer) of the wireless device and/or a positioning event occurring. The indication may be in response to receiving (by the higher layers of the wireless device) an LPP message (e.g., NR-TDOA-ProvideAssistanceData message and/or NR-TDOA-RequestLocationInformation message and/or NR-DL-AoD-ProvideAssistanceData message and/or NR-DL-AoD-RequestLocationInformation message and/or NR-Multi-RTT-ProvideAssistanceData message and/or NR-Multi-RTT-RequestLocationInformation message) of the one or more positioning messages from the LMF. The indication may be the delivery of the LPP message from the higher layers to the physical layer of the wireless device. In an example, the wireless device may start the measurement period from/after a first/earliest/starting (configured/activated) measurement gap/PPW instance aligned with a DL PRS resource(s) in the assistance data. The positioning event may correspond to a deferred Mobile Terminated Location Request (MT-LR) and/or Mobile Originated Location Request (MO-LR) and/or Network Induced Location Request (NI-LR) or the like.

In an example, in response to/upon/based on an event of at least one event has occurred during performing the ongoing positioning procedure and/or while performing/measuring one or more measurements (e.g., RSTD/RSRP/UE Rx−Tx time difference, and/or the like) measurements during a measurement period of the at least one measurement period (e.g., the RSTD measurement period), the wireless device may determine whether to continue measurements (e.g., not stop/restart the measurement period and/or complete the on-going RSTD measurements) or restart the measurement period. The determination may be based on the event and/or the measurement period (e.g., whether the measurement period is the RSTD measurement period or the PRS-RSRP measurement period or the UE Rx−Tx time difference measurement period).

An event of the at least one event may correspond to/be (execution/occurrence/performing/triggering) handover, e.g., a handover event, to handover from a first cell/source cell to a second cell/target cell. The first cell may be different than the second cell (e.g., the PCI of the first cell is different than the PCI of the second cell). For example, the handover may comprise layer 3 (e.g., RRC/PDCP/RLC/NAS layers) procedures. For example, the handover may be an RRC reconfiguration procedure. For example, the handover event may occur when the wireless device receives an RRC reconfiguration message (e.g., RRCReconfiguration), e.g., comprising reconfiguration with sync configurations (e.g., reconfigurationWithSync), via the source cell indicating the handover from the source cell to the target cell, e.g., as part of a reconfiguration with sync procedure. In another example, the handover event may occur when the wireless device triggers a conditional handover. The reconfiguration with sync (reconfigurationWithSync) may comprise cell common parameters (spCellConfigCommon) of the target cell, a RNTI (newUE-Identity) identifying the wireless device in the target cell, a value of a handover timer (e.g., T304), a dedicated RACH resource (rach-ConfigDedicated), and/or rach-skip configuration parameters (e.g., per-allocated UL grant(s)).

For example, the RRC reconfiguration message may configure at least one conditional handover (CHO) execution condition. For example, a CHO execution condition (or an RRC reconfiguration condition) of the at least one CHO execution condition may correspond to a candidate target cell of the candidate target cells. CHO execution condition may be an execution condition that needs to be fulfilled in order to trigger the execution of a conditional reconfiguration for CHO, CPA, intra-SN CPC without MN involvement or MN initiated inter-SN CPC. In an example, a CHO execution condition of the at least one CHO execution condition may comprise at least one of the following: a measurement event D1 (e.g., condEventD1) for a candidate cell; and/or a measurement event T1 (e.g., condEventT1) for a candidate cell; and/or a measurement event A3 (e.g., condEventA3) for a candidate cell; and/or a measurement event A4 (e.g., condEventA4) for a candidate cell; and/or a measurement event A5 (e.g., condEventA5) for a candidate cell. For example, a first CHO execution condition (e.g., the measurement event T1) of the at least one CHO execution condition may be a time-based (or time-dependent) event for triggering/executing the (conditional) handover. In some cases, a second CHO execution condition of the at least one CHO execution condition may be a distance-based (or distance-dependent) event for triggering/executing the (conditional) handover. In response to a CHO execution condition of the at least one CHO execution condition being satisfied/fulfilled, the wireless device may start the conditional handover (e.g., the handover event).

The handover procedure may be a RACH-based handover (comprising performing a random access procedure, e.g., using the dedicated RACH resource) or a RACH-less handover (not comprising performing a random access procedure, e.g., using the rach-skip configuration parameters). For example, the wireless device may, based on starting the handover (e.g., the handover event being occurred), start a handover timer (T304). The wireless device may stop the handover timer in response to successfully completing the handover (e.g., successfully completing the random access procedure). The wireless device, after completing the handover, may apply first parts of CQI reporting configuration, SR configuration and/or SRS configuration that do not require the wireless device to know a system frame number (SFN) of the target base station. The wireless device, after completing the handover procedure toward a PCell, may apply second parts of measurement and radio resource configuration that require the wireless device to know the SFN of the target base station (e.g., measurement gaps, periodic CQI reporting, SR configuration, SRS configuration), upon acquiring the SFN of the target gNB.

In an example, if handover occurs (e.g., the handover event occurs) while performing/measuring RSTD measurements (for performing the ongoing positioning procedure) during a first measurement period (e.g., the RSTD measurement period) of the at least one measurement period, the wireless device may continue (e.g., not stop/restart the first measurement period) and complete the on-going RSTD measurements. In another example, if handover occurs while performing/measuring PRS-RSRP(P) measurements (for performing the ongoing positioning procedure) during a second measurement period (e.g., the PRS-RSRP measurement period) of the at least one measurement period, the wireless device may continue (e.g., not stop/restart the measurement period) and complete the on-going PRS-RSRP measurements. In yet another example, the wireless device may, for performing the ongoing positioning procedure, restart a third measurement period (e.g., the UE Rx−Tx time difference measurement period) of the at least one measurement period if handover occurs during the measurement period and after SRS reconfiguration on the target cell is complete.

An event of the at least one event may correspond to/be a cell (e.g., PSCell or SCell) addition/release or a cell change, e.g., a serving cell change. When PSCell or SCell addition or release does not cause SRS reconfiguration during the third measurement period (e.g., when the PSCell/SCell addition/release using the RRC connection reconfiguration message is without (or is not based on) the reconfigurationWithSync message or mobilityControlInfo message), the wireless device may continue the UE Rx−Tx time difference measurement, e.g., not stopping/restarting the third measurement period of the at least one measurement period.

When the cell addition or release causes SRS reconfiguration during the third measurement period (e.g., when the PSCell/SCell addition/release using the RRC connection reconfiguration message is with/based on the reconfigurationWithSync message or mobilityControlInfo message), the wireless device may restart the UE Rx−Tx time difference measurement (e.g., restart the third measurement period) after the SRS reconfiguration on the cell is complete. When the serving cell change occurs during the third measurement period, the wireless device may continue (e.g., not stop/restart the third measurement period) and complete the UE Rx−Tx time difference measurement based on the serving cell change not impacting (e.g., not changing) SRS configuration for the UE Rx−Tx time difference measurement.

An event of the at least one event may correspond to change of the SRS configuration. For example, when SRS is reconfigured without serving cell change during the third measurement period of the at least one measurement period, the wireless device may restart the UE Rx−Tx time difference measurement (e.g., restart the third measurement period) after the SRS reconfiguration is complete.

An event of the at least one event may correspond to a change in an uplink transmission timing of the wireless device. For example, when an uplink transmission timing changes due to receiving a Timing Advance command (e.g., TAC MAC CE) during the third measurement period (e.g., the UE Rx−Tx time difference measurement period), the wireless device may restart the third measurement period after uplink transmission timing changes (e.g., after applying the TAC MAC CE). If the uplink transmission timing changes due to a change in a $N_{TA\text{-}offset}$ (e.g., receiving a new $N_{TA\text{-}offset}$) during the third measurement period, the wireless device may restart the third measurement period after uplink transmission timing changes (e.g., after applying the new $N_{TA\text{-}offset}$). For example, if the uplink transmission timing changes due to (or as a result of or because of) a first autonomous timing adjustment by the wireless device during the third measurement period, the wireless device may restart the third measurement period based on whether a cell (e.g., the serving cell) is a downlink reference cell for SRS transmission or not. The cell may be reference cell.

The wireless device may follow a frame timing change of the reference cell, e.g., in the RRC connected state/mode. The uplink frame (for uplink transmissions) may be $(N_{TA}+N_{TA\text{-}offset}+)\times T_c$ before a reception of a first/earliest detected path (in time) of the corresponding downlink frame from the reference cell. For serving cell(s) in pTAG, the wireless device may use the SpCell as the reference cell for deriving the uplink transmit timing for cells in the pTAG. For serving cell(s) in sTAG, the wireless device may use any of the activated SCells as the reference cell for deriving the UE transmit timing for the cells in the sTAG.

The first autonomous timing adjustment may comprise a first gradual timing adjustment procedure based on (or to achieve/satisfy/fulfill) TA accuracy requirement(s). The TA accuracy requirements may correspond to/comprise a first transmission timing error. The first transmission timing error may be an initial (or first) transmission timing error±T_e. When the transmission timing error (e.g., between the wireless device and a first reference timing exceeds first transmission timing error), the wireless device may (autonomously) adjust a transmission timing to within the first transmission timing error±T_e, e.g., first autonomous timing adjustment. The first reference timing may be $(N_{TA}+N_{TA\text{-}offset}+)\times T_c$ before/prior to the downlink timing of the reference cell. For example, the first autonomous timing adjustment may comprise (autonomously) adjusting the transmission timing such that a maximum amount of the magnitude of the timing change in one adjustment being T_q (e.g., a first maximum autonomous time adjustment step); and/or a minimum aggregate adjustment rate being T_p (e.g., a first aggregate adjustment rate) per second; and/or the maximum aggregate adjustment rate being T_q per 200 ms.

For example, a timing advance command (e.g., the TAC MAC CE) of the at least one TA command may be a TA command of a random access response. The TA command may be an absolute timing advance command MAC CE. The TA command may indicate a value $T_A$ for a TAG $T_A$= 0, 1, 2, . . . , 3846. The wireless device may determine an amount of the time alignment for the TAG with SCS of $2^{\sim}\cdot 15$ kHz based on $N_{TA}=T_A\cdot 16\cdot 64/2^{\mu}$. $N_{TA}$ may be relative to the SCS of the first uplink transmission from the wireless device after the reception of the random access response or the absolute timing advance command MAC CE. In another example, a timing advance command (e.g., the TAC MAC CE), $T_A$, for a TAG indicates adjustment of a current $N_{TA}$ value, $N_{TA\_old}$, to the new $N_{TA}$ value, $N_{TA\_new}$, by index values of $T_A$=0, 1, 2, . . . , 63, where for a SCS of $2^{\mu}\cdot 15$ kHz, $N_{TA\_new}=N_{TA\_old}+(T_A-31)\cdot 16\cdot 64/2^{\mu}$. In response to receiving the TAC MAC CE on/during uplink slot n, the wireless device may apply/adjust an uplink transmission timing (e.g., for transmission of UL signals) from a beginning/start of uplink slot $$n+k+1 \text{ where } k=\left\lceil N_{slot}^{subframe,\mu}\cdot(N_{T,1}+N_{T,2}+N_{TA,max}+0.5)/T_{sf}\right\rceil,$$

$N_{T,1}$ is a time duration in msec of $N_1$ symbols corresponding to a PDSCH processing time for UE processing capability 1 when additional PDSCH DM-RS is configured, $N_{T,2}$ is a time duration in msec of $N_2$ symbols corresponding to a PUSCH preparation time for UE processing capability 1, $N_{TA,max}$ is a maximum timing advance value in msec that can be provided by a TA command field of 12 bits $$N_{slot}^{subframe,\mu}$$

is the number of slots per subframe, $T_{sf}$ is the subframe duration of 1 msec. $N_1$ and $N_2$ are determined with respect to the minimum SCS among the SCSs of all configured UL BWPs for all uplink carriers in the TAG and of all configured DL BWPs for the corresponding downlink carriers. For [=0, the UE assumes $N_1$,0=14. Slot n and $$N_{slot}^{subframe,\mu}$$

are determined with respect to the minimum SCS among the SCSs of all configured UL BWPs for all uplink carriers in the TAG. $N_{TA,max}$ is determined with respect to the minimum SCS among the SCSs of all configured UL BWPs for all uplink carriers in the TAG and for all configured initial UL BWPs provided by initialUplinkBWP. The uplink slot n may be a last/final/ending/latest slot among uplink slot(s) overlapping with the slot(s) of PDSCH reception assuming $T_{TA}$=0, where the PDSCH provides the timing advance command.

Figure 24B:
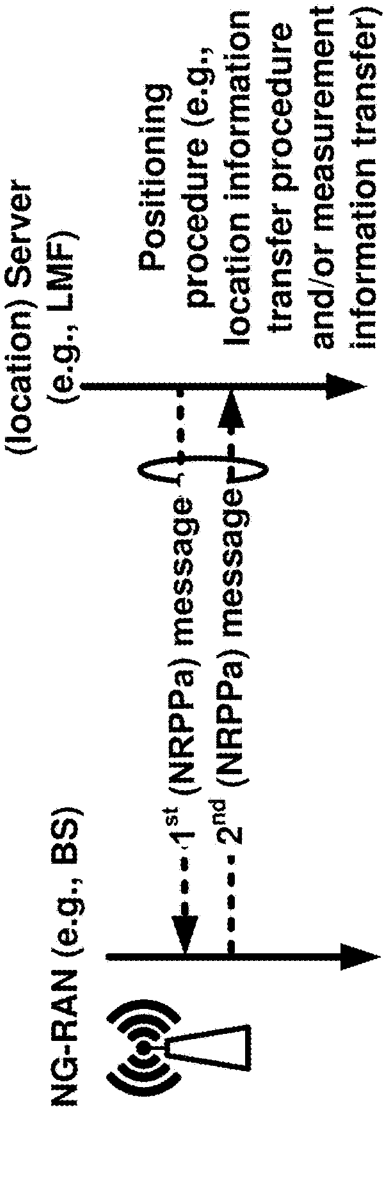
FIG. 24B shows an example of signaling access between the LMF and a base station based on NRPPa protocol.

FIG. 24B shows an example of signaling access between the LMF and the base station based on the NRPPa protocol. For performing the positioning procedure, using NRPPa message(s) (e.g., comprising NRPPa PDUs) of the one or more positioning messages (e.g., first message and/or second message in FIG. 24B), the location server may request the base station for SRS configuration for the wireless device and the base station may accordingly respond with the SRS configuration to the location server. Using NRPPa message(s) of the one or more positioning messages, the base station may provide/transmit an updated SRS configuration to the location server when the SRS configuration changes. For example, if semi-persistent or aperiodic SRS is configured to the wireless device, the LMF may activate/deactivate the SRS (via the NRPPa messages). When the SRS is transmitted (e.g., the uplink signals) by the wireless device, the location server can request multiple TRPs to perform uplink measurements and report/transmit results (e.g., measurements) via the NRPPa messages.

The NRPPa messages (of the one or more positioning messages) may correspond to signaling access between the LMF (e.g., the location server) and the base station for non-UE associated NRPPa procedure (e.g., for transfer of information applicable to the NG-RAN node and associated TRP, including the procedures supporting the OTDOA Information Transfer, Assistance Information Transfer, TRP Information Transfer, and Measurement Information Transfer functions) or UE-associated NRPPa procedure (e.g., for transfer of information for a particular wireless device (e.g., the wireless device), including the procedures supporting Positioning Information Transfer and E-CID Location Information Transfer functions). The location server may obtain TRP information (e.g., geographical locations of the reference TRP and/or the neighbor TRPs) required for multi-RTT positioning.

For example, the NG-RAN (e.g., the base station) may exchange/communicate NRPPa messages (or NRPPa PDUs) with the core network (e.g., AMF/LMF) using/based on NGAP DL UE associated NRPPa transport (e.g., corresponding to UE associated NRPPa procedure) and/or NGAP DL Non UE associated NRPPa transport (e.g., corresponding to non-UE associated NRPPa procedure) and/or NGAP UL UE associated NRPPa transport (e.g., corresponding to UE associated NRPPa procedure) and/or NGAP UL Non UE associated NRPPa transport (e.g., corresponding to non-UE associated NRPPa procedure).

FIG. 25 and FIG. 26 show examples of NRPPa messages and corresponding NRPPa elementary procedure. The first message and/or the second message in FIG. 24B may be one or the NRPPa messages shown in FIG. 25 and/or FIG. 26. For example, an example of an initial (or starting) message in FIG. 25 and/or FIG. 26 may be the first message in FIG. 24B. For example, the response message FIG. 25 and/or FIG. 26 may be the first message or the second message.

FIG. 27 shows an example of functions that the NRPPa protocol may provide. FIG. 27 further shows the mapping between the NRPPa functions and NRPPa elementary procedures. As shown in FIG. 27, the NRPPa protocol (e.g., via the NRPPa messages) may provide at least one of the following functions: E-CID Location Information Transfer (e.g., for the NG-RAN node to exchange location information with LMF for the purpose of E-CID positioning and NR E-CID positioning); and/or OTDOA Information Transfer (e.g., for the NG-RAN node to exchange information with the LMF for the purpose of OTDOA positioning) and/or Reporting of General Error Situations (e.g., for reporting of general error situations, for which function specific error messages have not been defined) and/or Assistance Information Transfer (e.g., for the LMF to exchange information with the NG-RAN node for the purpose of assistance information broadcasting); and/or Positioning Information Transfer (e.g., for the NG-RAN node to exchange positioning information with the LMF for the purpose of positioning) and/or Measurement Information Transfer (e.g., for the LMF to exchange measurement information with the NG-RAN node for the purpose of positioning); and/or TRP Information Transfer (e.g., for the LMF to obtain TRP related information from the NG-RAN node); and/or PRS Information Transfer (e.g., for the LMF to exchange PRS related information with the NG-RAN node); and/or Measurement Preconfiguration Information Transfer (e.g., for the LMF to request the NG-RAN node to preconfigure and activate measurement gap and/or PRS processing window).

Figure 28:
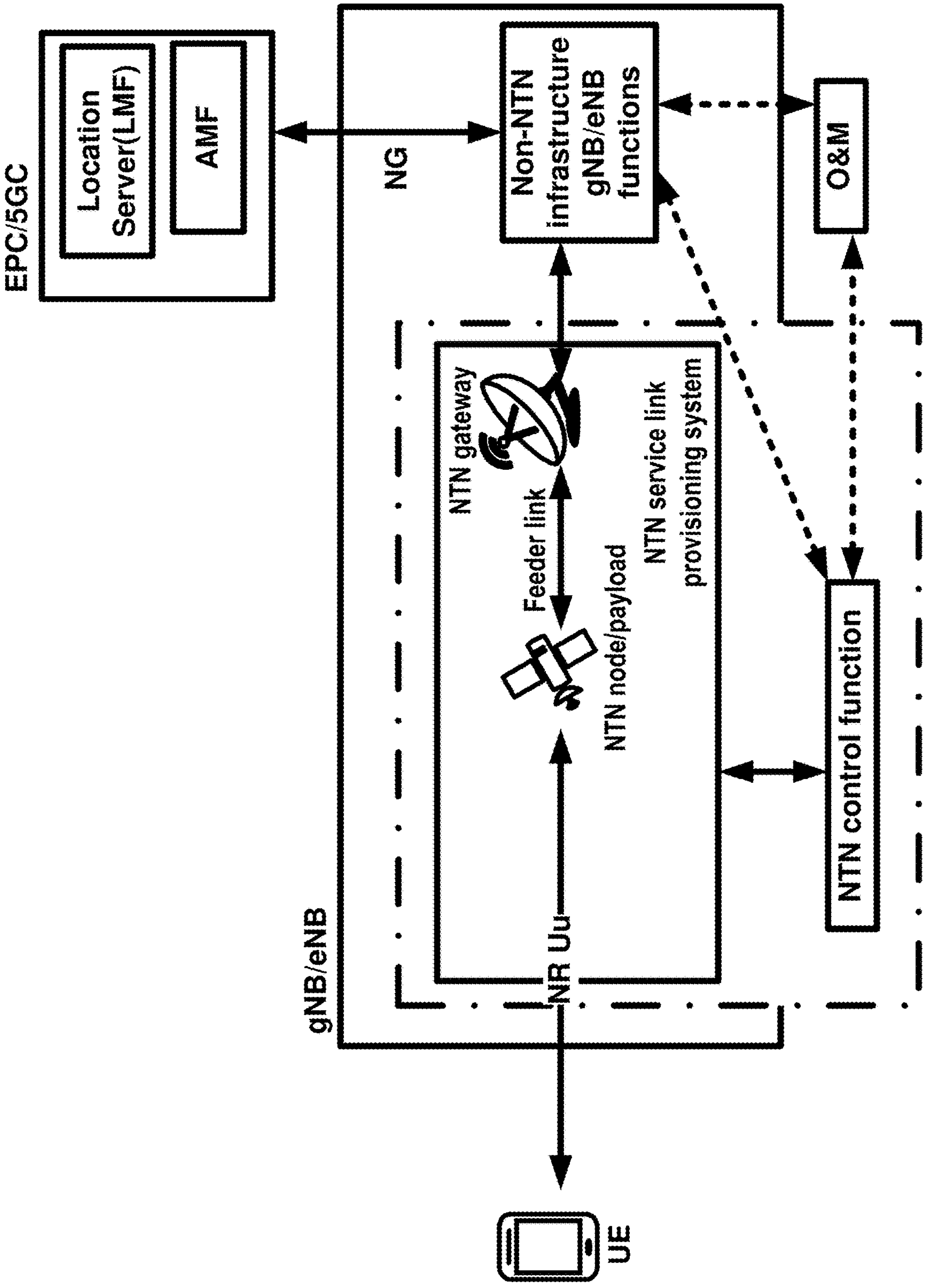
FIG. 28 shows an example of implementation of a non-terrestrial network (NTN).

FIG. 28 shows an example of implementation of a non-terrestrial network (NTN). The non-terrestrial network (NTN) network (e.g., a satellite network) may be a network or network segment (e.g., an NG-RAN consisting of gNBs) for providing non-terrestrial NR access to wireless devices. The NTN may use a space-borne vehicle to deploy a transmission equipment relay node (e.g., radio remote unit or a transparent payload) or a base station (or a regenerative payload). While a terrestrial network is a network located on the surface of the earth, an NTN may be a network which uses an NTN node (e.g., a satellite) as an access network, a backhaul interface network, or both. In an example, an NTN may comprise one or more NTN nodes (or payloads and/or space-borne vehicles), each of which may provide connectivity functions, between the service link and the feeder link.

An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding) and connect to a base station (e.g., a base station of an NTN or the NTN base station or a non-terrestrial access point) via a feeder link. In some examples, the NTN node may be a satellite, a balloon, an air ship, an airplane, an unmanned aircraft system (UAS), an unmanned aerial vehicle (UAV), a drone, or the like. For example, the UAS may be a blimp, a high-altitude platform station (HAPS), e.g., an airborne vehicle embarking the NTN payload placed at an altitude between 8 and 50 km, or a pseudo satellite station. In an example, a satellite may be placed into a low-earth orbit (LEO) at an altitude between 250 km to 1500 km, with orbital periods ranging from 90-130 minutes. From the perspective of a given point on the surface of the earth, the position of the LEO satellite may change. In an example, a satellite may be placed into a medium-earth orbit (MEO) at an altitude between 5000 to 20000 km, with orbital periods ranging from 2 hours to 14 hours. In an example, a satellite may be placed into a geostationary satellite earth orbit (GEO) at 35,786 km altitude, and directly above the equator. From the perspective of a given point on the surface of the earth, the position of the GEO satellite may not change.

As shown in FIG. 28, the base station (e.g., a gNB/eNB) may further comprise the transparent NTN node, the feeder link, and/or a gateway (e.g., an NTN gateway). The base station (e.g., gNB depicted in FIG. 28) may comprise non-NTN infrastructure gNB functions and NTN Service Link provisioning System. As shown in FIG. 28, NTN infrastructure may comprise the NTN Service Link provisioning System and NTN Control function. The NTN Service Link provisioning System may consist of one or more NTN payloads (or nodes) and gateways (or NTN Gateways). The NTN Service Link provisioning System maps the NR-Uu radio protocol over radio resources of the NTN infrastructure (e.g., beams, channels, Tx power). The NTN control function may control the spaceborne (or airborne) vehicles as well as the radio resources of the NTN infrastructure (NTN payload(s) & NTN Gateway(s)). The NTN control function may provide control data, e.g. (satellite) Ephemeris, to the non-NTN infrastructure gNB functions of the gNB. For example, the NTN control function may provide some information to operation and management (O&M). The O&M may provide at least the following NTN related parameters the base station (e.g., gNB): NTN related parameters of Earth fixed beams; and/or NTN related parameters of Quasi Earth fixed beams; and/or NTN related parameters of Earth moving beams. The NTN related parameters may correspond to a beam provided by the NTN node/payload. For example, the NTN related parameters may comprise at least one of the following: a cell identifier (NG and Uu) mapped to a beam (e.g., PCI); and/or a reference location of the cell (e.g. cell's center and range); and/or time window(s) mapped to the beam (e.g., for coverage and/or feeder link switching/switchover and/or service link switching/switchover); and/or an identifier and time window of all serving satellites and NTN-Gateways; and/or a (Uu/physical) Cell identifier (e.g., the PCI) mapped to a beam and mapping information to fixed geographical areas reported on NG, including information about the beams direction and motion of the beam's foot print on Earth.

The gateway may be an earth station that is located at the surface of the earth, providing connectivity to the NTN payload using a feeder link. In some examples, the NTN node with the regenerative payload (e.g., the base station of the NTN or the NTN base station) may comprise functionalities of a base station, e.g., the on-board processing used to demodulate and decode the received signal and/or regenerate the signal before sending/transmitting it back to the earth. In some respects, as shown in FIG. 28, the base station (e.g., the gNB) may further comprise the regenerative NTN node, the feeder link, and/or the gateway (e.g., the NTN gateway).

The NTN node (e.g., the satellite) may forward a received signal from the NTN gateway on the ground back to the earth over the feeder link. In an example, the gateway and the base station may not be collocated. The NTN node may forward a received signal to the wireless device or the base station from another NTN node, e.g., over inter-link satellite communication links. The NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed (e.g., quasi-earth-fixed) with some beam pointing mechanism used by the satellite to compensate for its motion (e.g., a LEO with earth fixed cells). The size of a spotbeam (e.g., diameter of the spotbeam and/or cell and/or coverage area) may range from tens of kilometers (e.g., 50 km-200 km) to a few thousand kilometers (e.g., 3500 km). For example, the size of the spotbeam may depend on the system design.

FIG. 29A shows an example of an NTN. FIG. 29B shows an example of (NTN) assistance information for maintenance of UL synchronization at a wireless device in an NTN. As shown in FIG. 29A, a base station may, via the service link, transmit/send broadcast signals (e.g., SIBx, x=1, 2, . . . , 19, . . . ), multicast signals, and/or dedicated (unicast) signals to wireless devices, e.g., in a cell. FIG. 29A shows an example of an NTN with a transparent NTN platform.

A propagation delay may be an amount of time it takes for the head of the signal to travel from a sender (e.g., the base station or the NTN node) to a receiver (e.g., the wireless device) or vice versa. The propagation delay may vary depending on a change in distance between the sender and the receiver, e.g., due to movement of the NTN node, movement of the wireless device, a change of an inter-satellite link, and/or feeder link switching. One-way latency/delay may be an amount of time required to propagate through a telecommunication system from the sender (e.g., the base station) to the receiver (e.g., the wireless device). For the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or the RTD) may be twice of the one-way delay between the wireless device and the base station. In case of a GEO satellite with the transparent payload, the RTD may be approximately 556 milliseconds. A (maximum) RTD of a LEO satellite with the transparent payload and altitude of 600 km is approximately 25.77 milliseconds and with altitude of 1200 km is approximately 41.77 milliseconds. In an example, the RTD of a terrestrial network (e.g., NR, E-UTRA, LTE) may be negligible compared to the RTD of an NTN scenario (e.g., the RTD of a terrestrial network may be less than 1 millisecond).

A differential delay within a beam/cell of a NTN node may depend on, for example, the maximum diameter of the beam/cell footprint at nadir. The differential delay may imply a maximum difference between communication latency that two wireless devices, e.g., a first wireless device (UE1) that is located close to the center of the cell/beam and a second wireless device (UE2) that is located close to the edge of the cell/beam in FIG. 29A, may experience while communicating with the base station via the NTN node. The first wireless device may experience a smaller RTD compared to the second wireless device. The link with a maximum propagation delay (e.g., the maximum delay link) may experience the highest propagation delay (or the maximum RTD) in the cell/beam. In an example, the differential delay may imply a difference between the maximum delay of the cell/beam and a minimum delay of the cell/beam. In an example, the service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, depending on implementation, the differential delay may be as large as 32 milliseconds.

The base station may transmit to the wireless device NTN assistance information via an NTN-specific SIB (e.g., SIB19) 2900. The NTN assistance information may comprise a first set of NTN configuration parameters. For example, the first set of NTN configuration parameters may comprise at least one NTN-config (e.g., ntn-config-r17 2920). The at least one NTN-config may correspond to a serving cell of the NTN and/or a non-serving cell of the NTN (e.g., a target cell or a neighbor cell). Each NTN-config (e.g., ntn-Config 2920) of the at least one NTN-config may correspond to a cell (e.g., the serving cell or the neighbor cell of the NTN) with a corresponding physical cell ID (PCI). As shown in FIG. 29B, the first set of NTN configuration parameters may comprise NTN-configs of one or more NTN neighbor cells (e.g., via ntn-NeighCellConfigList IE) 2910, e.g., for cell selection/reselection and/or handover. Each NTN neighbor cell of the one or more NTN neighbor cells may have its unique PCI. For example, the at least one NTN-config may comprise the one or more NTN neighbor cells.

In an example, the one or more configuration parameters may comprise common configuration parameters of the serving cell (e.g., IE ServingCellConfigCommon). In one example, the base station may transmit to the wireless device the common configuration parameters of the serving cell via a system broadcast information (e.g., SIB1). For example, the base station may transmit the common configuration parameters of the serving cell via one or more RRC messages (e.g., RRC setup message, RRC establishment message, RRC re-establishment message, and/or RRC reconfiguration message). For example, the base station may transmit the common configuration parameters of the serving cell during the initial access procedure and/or a handover procedure. The common configuration parameters of the serving cell may comprise an NTN-config (e.g., ntn-Config-r17, e.g., corresponding to the serving cell with the first PCI) of the at least one NTN-config. For example, the serving cell may belong to the NTN, e.g., the wireless device may communicate with the base station via the serving cell (of the NTN). The Serving cell may be a first cell (or a source cell) with/identified by a first PCI or a neighbor cell (or a candidate cell or a target cell or a second cell) with/identified by a second PCI.

In one example, the first set of NTN configuration parameters may comprise the NTN-config of the common configuration parameters of the serving cell (e.g., a first NTN configuration parameters). The first NTN configuration parameters (e.g., a first NTN-config of the at least one NTN-config) may correspond to the first PCI or the first cell (e.g., the source cell). When the common configuration parameters of the serving cell correspond to the RRC setup message (and/or the RRC establishment message and/or RRC re-establishment message), the NTN-config of the common configuration parameters of the serving cell may correspond to the source cell.

When the common configuration parameters of the serving cell correspond to the RRC reconfiguration message, the NTN-config of the common configuration parameters of the serving cell may correspond to the target cell (e.g., a second NTN configuration parameters e.g., a second NTN-config, of the at least one NTN-config). The second NTN configuration parameters (e.g., the second NTN-config of the at least one NTN-config) may correspond to the second PCI or the second cell (e.g., the target cell).

In an example, the at least one NTN-config may comprise the first NTN-config and/or the second NTN-config. In an example, the NTN assistance information may comprise the first NTN-config and/or the second NTN-config.

As shown in FIG. 29A, each/an NTN-config of the at least one NTN-config (e.g., NTN-config-r17 2920) may comprise at least one of the following (or a combination of thereof): corresponding ephemeris parameters (or data/information) of an NTN node (e.g., the satellite ephemeris data, e.g., ephemerisInfo); and/or one or more common delay/TA parameters (e.g., ta-Info), e.g., comprising at least one of TACommon, TACommonDrift, TACommonDriftVariation; and/or a cell-specific scheduling offset (e.g., cellSpecificK-offset or Koffset, e.g., $K_{cell,offset}$) in number of slots for a given subcarrier spacing (e.g., [$K_{offset}$), e.g., 15 KHz; and/or MAC-layer scheduling offset (e.g., $k_{mac}$ or kmac or K-Mac or K-mac) in number of slots for a given subcarrier spacing (e.g., $\mu_{Kmac}$), e.g., 15 KHz, indicating a portion of a feeder link delay that the base station may pre-compensate, e.g., when UL/DL configurations are not aligned at the base station (see, FIG. 29A); and/or epoch time for applying the NTN-config (e.g., epochTime); and/or a validity duration of the NTN-config (e.g., ntn-UISyncValidityDuration) indicating a maximum duration (e.g., in seconds or number of subframes/slots/frames) that the NTN-config (e.g., the satellite ephemeris data) stays valid (e.g., a maximum duration that the wireless device stays UL synchronized with the serving cell without (re-)acquiring/reading the SIB19 of the serving cell); and/or one or more antenna polarization mode(s) (e.g., vertical horizontal, right-hand circular, or left-hand circular) for UL/DL communications (e.g., ntn-PolarizationUL/ntn-PolarizationDL); and/or a first indication/parameter (e.g., ta-Report-r17).

For example, the MAC-layer scheduling offset may be 0, e.g., when the K-Mac is absent from (is not indicated/configured by) the NTN config of the serving cell. For example, in an NTN scenario with the transparent NTN node, when the UL frame and the DL frame are aligned at the base station, the K-Mac may be absent from the NTN-config of the serving cell. The K-Mac may indicate a scheduling offset, e.g., when downlink and uplink frame timing are not aligned at the base station. The wireless device may use the K-Mac (if indicated) for determining action and assumption on downlink configuration indicated by a MAC CE command in PDSCH.

The K-Mac may be a scheduling offset for application of downlink configurations, of the serving cell in the NTN, indicated by MAC CE command(s). For example, the Network (e.g., the base station) may indicate the K-Mac in the NTN for MAC CE timing relationships enhancement. One example of MAC CE timing relationships enhancement may comprise the following (e.g., as specified in NR specification 3GPP TS 38.300):

To maintain uplink orthogonality in the serving cell, transmissions from different wireless devices in a cell/beam (e.g., the first wireless device and the second wireless device in FIG. 29B) may need to be time-aligned at the base station and/or the NTN node (e.g., satellite). The cell may be the serving cell. In an example, time alignment/synchronization may be achieved by using different timing advance (TA) values at different wireless devices to compensate for their different propagation delays (or RTDs). As shown in FIG. 29A, for UL transmissions, the first wireless device may use the first TA value (e.g., TA_1) and the second wireless device may use the second TA value (TA_2).

For example, the wireless device (e.g., the first wireless device or the second wireless device) may estimate/determine/measure a (current or a latest) TA value based on the at least one NTN-config. In one case, during communication via the first cell, the wireless device may estimate/determine/measure a (current or a latest) TA value based on the first NTN-config. In other case, during communication via the first cell, the wireless device may estimate/determine/measure a (current or a latest) TA value based on the second NTN-config.

For example, the wireless device may calculate/measure/maintain the current (or latest available) TA (value) of the wireless device $T_{TA}$ (e.g., corresponding to a TAG ID or a primary TAG or a secondary TAG) based on at least a combination of a closed-loop TA value (or a closed-loop TA procedure/control) and/or an open-loop TA value (or an open-loop TA procedure/control). In an example, a combination of the closed-loop TA control and the open-loop TA control may be based on adding/summing the open-loop TA value (e.g., derived/calculated based on the open-loop TA procedure/control) and the closed-loop TA value (or a portion of the closed-loop TA procedure/control). In FIG. 29A, the current TA value of the first wireless device may be TA_1 and the current TA value of the second wireless device may be TA_2. The closed-loop TA procedure/control may be based on receiving at least one (absolute) TA command (TAC) MAC CE indicating a TA value (e.g., $T_A$ corresponding to the TAG ID, e.g., the primary TAG or the secondary TAG) from the base station (e.g., via Msg 2 1312 and/or Msg B 1332 and/or a PDSCH). The TA value may indicate an adjustment of the closed-loop TA value (e.g., $N_{TA}$). In response to receiving the TAC MAC CE on/during uplink slot n, the wireless device may apply/adjust an uplink transmission timing (e.g., for transmission of UL signals) from a beginning/start of uplink slot $$n+k+1+2^{\mu}\cdot K_{offset} \text{ where}$$

$$k=\left\lceil N_{slot}^{subframe,\mu}\cdot(N_{T,1}+N_{T,2}+N_{TA,max}+0.5)/T_{sf}\right\rceil.$$

The open-loop TA procedure/control may require a GNSS-acquired position (or location information) of the wireless device and/or the NTN-config of the serving cell (e.g., the first NTN-config or the second NTN-config). The wireless device may, based on an implemented orbital predictor/propagator model (e.g., the GNSS-acquired position) and/or the NTN-config of the serving cell, may use the ephemeris data (and/or the GNSS-acquired position) to measure/calculate/maintain movement pattern of the satellite (corresponding to the NTN-config of the serving cell), measure/determine/estimate a service link delay (e.g., RTT of the service link), and/or measure/determine/estimate a feeder link delay (e.g., RTT of the feeder link) and/or measure/determine/estimate propagation delay between the wireless device and the base station (e.g., UE-gNB RTT of the serving cell). For example, the wireless device may, based on the GNSS-acquired position and/or the NTN-config of the serving cell, adjust the current TA value (e.g., the TA of the wireless device) via the open-loop TA procedure/control. The open-loop TA procedure/control may comprise determination/estimation calculation of one or more values, e.g., $$N_{TA,adj}^{UE} \text{ and/or } N_{TA,adj}^{common}.$$

In some implementations, the wireless device may determine the open-loop TA value (corresponding to the serving cell) by summing up/adding the $$N_{TA,adj}^{common} \text{ and } N_{TA,adj}^{UE}, \text{ e.g., open-loop } TA=N_{TA,adj}^{common}+N_{TA,adj}^{UE}.$$

The wireless device may (to determine the TA value of the wireless device) determine/estimate $$N_{TA,adj}^{UE}$$

may be based on the propagation delay of the service link (e.g., between the wireless device and the NTN node). The wireless device may determine/measure/estimate $$N_{TA,adj}^{UE}$$

based on the location information of the wireless device (e.g., position and/or GNSS of the wireless device) and the satellite ephemeris data (e.g., the NTN-config) of the serving cell. The wireless device may (to determine the TA value of the wireless device) determine/estimate $$N_{TA,adj}^{common}$$

may be a common delay of the cell (e.g., a portion of the feeder link delay that is not pre-compensated by the base station). The wireless device may determine the $$N_{TA,adj}^{common}$$

based on the one or more common TA parameters (e.g., the NTN-config) of the serving cell.

For example, the wireless device may determine the current TA value as/using/based on $$TA=(N_{TA}+N_{TA-offset}+N_{TA,adj}^{common}+N_{TA,adj}^{UE})\times T_c.$$

The wireless device may follow the frame timing change of the reference cell (e.g., the serving cell), e.g., in the RRC connected state/mode. When the reference cell is part of the NTN, the uplink frame (for uplink transmissions) may be $$(N_{TA}+N_{TA-offset}+N_{TA,adj}^{common}+N_{TA,adj}^{UE})\times T_c$$

before/prior to the reception of the first/earliest detected path (in time) of the corresponding downlink frame from the reference cell. In some examples, when the wireless device is communicating with the base station via the NTN (e.g., when the reference cell is part of the NTN), the wireless device may autonomously adjust the (transmission) timing, e.g., via/based on/using a second autonomous timing adjustment (procedure). In some implementations, the second autonomous timing adjustment may be the first autonomous timing adjustment. In other implementations, the second autonomous timing adjustment may be different than the first autonomous timing adjustment. The second autonomous timing adjustment may comprise a second gradual timing adjustment procedure based on (or to achieve/satisfy/fulfill) TA accuracy requirement(s). The TA accuracy requirements may correspond to/comprise a second transmission timing error. The second transmission timing error may be Te_NTN. For example, Te_NTN may be larger than T_e. Using the second autonomous timing adjustment and when the transmission timing error (e.g., between the wireless device and a second reference timing) exceeds the second transmission timing error, the wireless device may (autonomously) adjust the transmission timing to within the second transmission timing error±Te_NTN. The second reference timing may be $$(N_{TA}+N_{TA-offset}+N_{TA,adj}^{common}+N_{TA,adj}^{UE})\times T_c$$

(e.g., the current TA value) before/prior to the downlink timing of the reference cell. For example, the second autonomous timing adjustment may comprise (autonomously) adjusting the transmission timing such that the maximum amount of the magnitude of the timing change (apart from a change of $$N_{TA,adj}^{UE}$$

due to satellite position update and $$N_{TA,adj}^{common}$$

between a previous transmission and a current transmission) in one adjustment being Tq_NTN (e.g., a second maximum autonomous time adjustment step); and/or a minimum aggregate adjustment rate (apart from a change of $$N_{TA,adj}^{UE}$$

due to the satellite position update and $$N_{TA,adj}^{common}$$

during a last 1 second) being Tp_NTN (e.g., a second aggregate adjustment rate) per second; and/or the maximum aggregate adjustment rate (apart from a change of $$N_{TA,adj}^{UE}$$

due to the satellite position update and $$N_{TA,adj}^{common}$$

during a last 200 ms) being Tq_NTN per 200 ms. For example, Tq_NTN may be larger than T_q and/or Tp_NTN may be larger than T_p. In an example, the second autonomous timing adjustment may not comprise/consider autonomous adjustment of the transmission timing (by the wireless device) as a result of $$N_{TA,adj}^{UE}\text{ and/or }N_{TA,adj}^{common}$$

during an adjustment (or update) window. The adjustment window may comprise a time duration between the previous/preceding transmission (e.g., a first SRS transmission) and the current transmission (e.g., a second SRS transmission). The adjustment window may comprise the last 1 second and/or the last 200 ms.

The base station may transmit a differential Koffset MAC CE to the wireless device. The differential Koffset MAC CE may indicate a differential Koffset in a number of slots using SCS of 15 kHz. The wireless device may use the differential Koffset (indicated by the differential Koffset MAC CE) for determining transmission timing of UL signals and/or activation/deactivation time of one or more MAC CEs at the wireless device. When the differential Koffset is indicated, the wireless device may determine a UE-specific scheduling offset $K_{UE,offset}$ based on the differential Koffset (e.g., the UE-specific scheduling offset is equal to minus the differential Koffset). If the differential Koffset is not indicated, the wireless device may set $K_{UE,offset}=0$. For example, the wireless device may determine $K_{offset}$ based on the cell-specific scheduling offset (e.g., cellSpecificKoffset, e.g., $K_{cell,offset}$) of the serving cell and the UE-specific scheduling offset $K_{UE,offset}$, e.g., $K_{offset}=K_{cell,offset}-K_{UE,offset}$.

The base station may transmit, to the wireless device, a DCI. The wireless device may receive the DCI during a reception occasion/time/interval (e.g., a slot/symbol). For example, the DCI may schedule/indicate/trigger a transmission of an uplink signal/channel (e.g., a PUSCH or a PUCCH or a PRACH or an SRS) to the base station via the NTN. The wireless device may transmit UL data and/or UCI and/or preamble and/or SRS resource via/based on the UL signal to the base station via/during a transmission occasion/time/interval (e.g., slot/symbol).

For example, the DCI may trigger/schedule/indicate a transmission of the PUSCH (e.g., the UL data) and/or the PUCCH (e.g., the UCI, e.g., HARQ-ACK information). The wireless device may use the cell-specific scheduling offset and/or the UE-specific scheduling offset to determine the transmission occasion of the PUSCH/PUCCH. For example, the transmission occasion of the PUSCH may be based on $$K_{offset} \cdot \frac{2^{\mu_{PUSCH}}}{2^{\mu_{K_{offset}}}}, \text{ wherein } K_{offset} = K_{cell,offset} - K_{UE,offset}$$

(corresponding to the serving cell). $M_{PUSCH}$ is the SCS configuration of the PUSCH transmission and $K_{offset}$ is the SCS configuration of the Koffset (e.g., $\mu_{K_{offset}}=0$ for 15 kHz or FR1). For example, the transmission occasion of the PUCCH may be based on $$K_{offset} \cdot \frac{2^{\mu_{PUCCH}}}{2^{\mu_{K_{offset}}}}$$

(corresponding to the serving cell) where $\mu_{PUCCH}$ is the SCS configuration of the PUCCH transmission. The wireless device may apply/use the current TA value (e.g., based on the closed-loop TA value and/or the open-loop TA value) of the wireless device (corresponding to the serving cell) to transmit the PUSCH/PUCCH.

The wireless device may use the NTN-config of a cell (e.g., the serving cell) to calculate/determinate/measurement/maintain an estimate of the UE-gNB RTT between the UE and a base station of the cell. In an example, the wireless device may calculate/measure/estimate the UE-gNB RTT (in ms or in number of slots) of the serving cell based on the current TA value and the K-Mac (if indicated by the NTN-config of the serving cell). For example, the UE-gNB RTT may be the summation of the current TA value and K-Mac (based on subcarrier spacing of the 15 KHz). When the K-Mac is 0, the wireless device may determine/measure the UE-gNB RTT based on the current TA value (of the wireless device), e.g., the UE-gNB RTT is equal to the current TA value. The wireless device may maintain/calculate/update the open-loop TA value (or the UE-gNB RTT) over/during a validity duration of the NTN-config (e.g., T430 timer). The validity duration may indicate (a maximum/longest) validity period of the (satellite) ephemeris data/information and/or the TA parameters of the NTN-config of the serving cell. The wireless device may acquire the SIB19 of the serving cell to receive an update NTN assistance information 2900 (e.g., NTN-config). The wireless device may, by receiving the NTN-config, receive/obtain an update (satellite) ephemeris data/information (e.g., the satellite position update) and/or update common TA parameters. The wireless device may (e.g., due to the satellite position update and/or receiving the NTN-config) change/update (e.g., by calculating/determining)

$$N_{TA,adj}^{UE} \text{ and } N_{TA,adj}^{common}$$

to determine the current TA value.

The wireless device may, prior to an expiry of the validity duration of the serving cell and to reduce interruption in UL transmissions, (re-)acquire the SIB19 in order to have valid (estimate of) the open-loop TA value of the serving cell (valid TA value). The wireless device may set an initial value of the T430 timer by ntn-UlSyncValidityDuration of the NTN-config of the serving cell. The wireless device may (e.g., to perform the handover to handover/switch from the first cell/source cell to the second cell/target cell) stop the validity timer of the serving cell (e.g., the source cell or the first cell) upon reception of the RRCReconfiguration message for the target cell (e.g., the second cell and/or the target serving cell, e.g., the target cell) including reconfigurationWithSync and/or upon conditional reconfiguration execution, e.g., when applying a stored RRCReconfiguration message for the target cell including reconfigurationWithSync. For example, upon or in response to acquiring/receiving the NTN-config of the serving cell (e.g., upon reception of the SIB19 and/or upon reception of RRCReconfiguration message for a target cell including reconfigurationWithSync and/or upon conditional reconfiguration execution, e.g., when applying a stored RRCReconfiguration message for a target cell including reconfigurationWithSync), the wireless device may start/restart the validity (or validation) duration/timer/window/period (e.g., T430 timer) of the serving cell.

Figure 30:
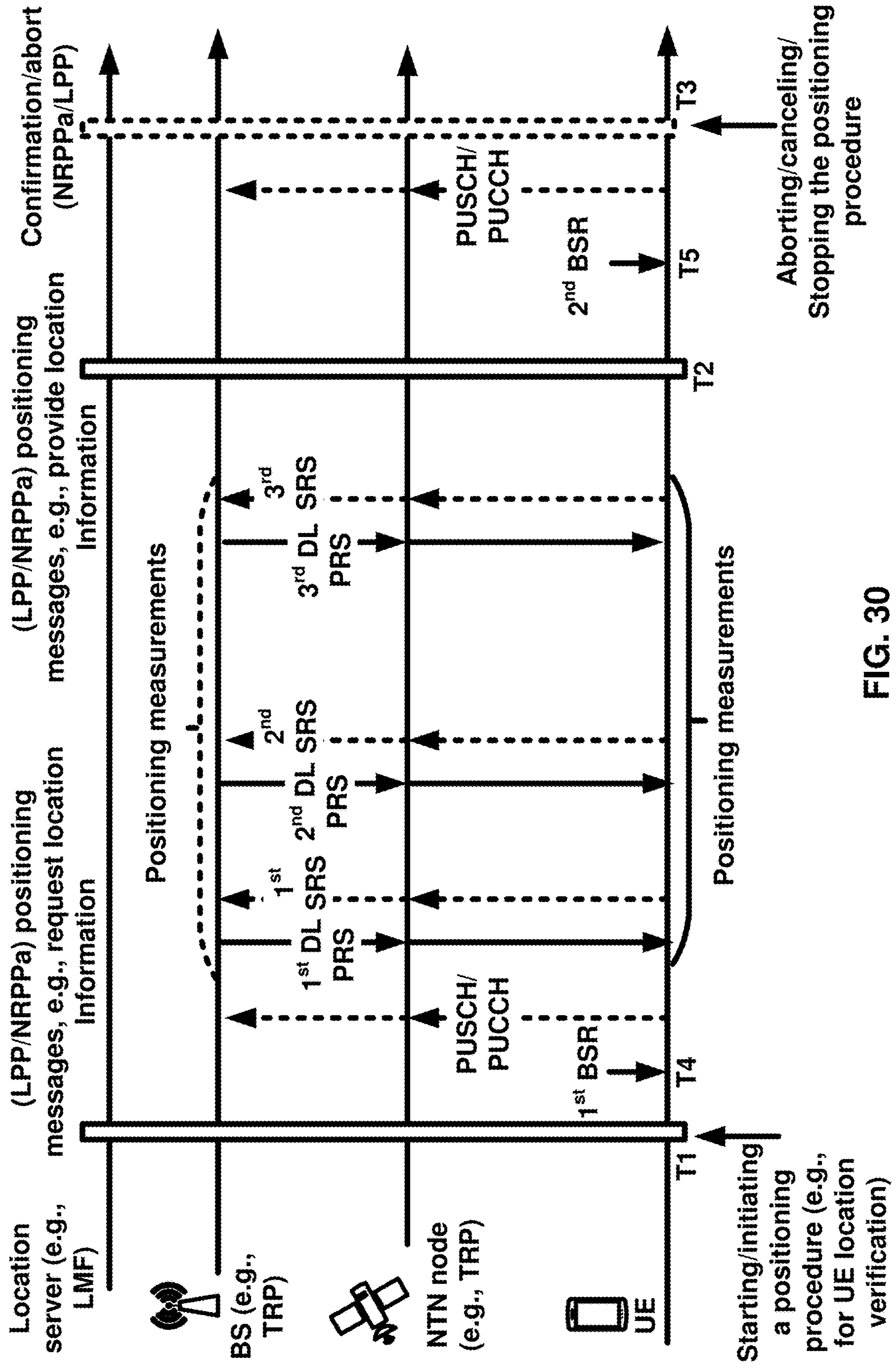
FIG. 30 shows an example of positioning procedure in a non-terrestrial network.

FIG. 30 shows an example of positioning procedure in a non-terrestrial network. For example, an NTN node (e.g., a satellite) may be the reference TRP or the neighbor TRP. In other examples, a base station may comprise (or be) the reference TRP or the neighbor TRP. The wireless device may communicate with the base station via the serving cell of the NTN. The wireless device may be in an RRC connected state or an RRC idle state or an RRC inactive state.

The wireless device may perform the positioning procedure as described above (e.g., with respect to FIG. 17B and/or FIG. 24B) while communicating with the base station via the NTN (e.g., the serving cell is part of the NTN). The location server and/or the wireless device may communicate/exchange (transmit and/or receive) the LPP messages of the one or more positioning messages during the positioning procedure. As also described above in relation to FIG. 24B, the location server and/or the base station may communicate/exchange (transmit and/or receive) the NRPPa messages of the one or more positioning messages during the positioning procedure. As described above with respect to FIG. 17B, the one or more positioning messages may comprise the (LPP) provide assistance data message and/or the (LPP) request location information message. The wireless device may start/initiate the positioning procedure in response to receiving the (LPP) provide assistance data message and/or the (LPP) request location information message of the one or more positioning messages.

The base station may transmit the one or more RRC messages (comprising the one or more configuration parameters) to the wireless device. The one or more RRC messages may comprise the SIB1, and/or SIB19 and/or the positioning SIB.

The positioning procedure may be for verifying location of the wireless device (e.g., verification of UE location, e.g., based on the NI-LR procedure). The verification of the UE location (or a location verification (procedure)) may be used (or be part of or applicable) for Public Warning System, Charging and Billing, Emergency calls, Lawful Intercept, Data Retention Policy in cross-border scenarios and international regions, and/or Network access (satellite access). The positioning procedure may allow the wireless device and/or the location server (LMF) to estimate/measure (or verify/confirm) the locations/position of the wireless device. The AMF may trigger location service procedures to determine a (UE) location verification decision. For example, the AMF may send/transmit a location service response to the wireless device. The UE location verification decision may comprise the location service response. The location service response may comprise a success (or confirmation or verification) indication or a failure (or unsuccessful) indication. The success indication may indicate the core network (e.g., LMF or AMF) is able to successfully verify (e.g., according to expected/required accuracy, e.g., 5-15 km or the like) the (GNSS) location information of the wireless device (e.g., the wireless device is not faking/falsifying its location information). The failure indication may indicate the core network (e.g., LMF or AMF) is not able to successfully verify the location information of the wireless device (e.g., the wireless device is faking/falsifying its location information).

For example, after/in response to the core network successfully verifying the location of the wireless device (e.g., the success indication), the wireless device may receive services (UL/DL data transmissions and/or mobility), e.g., via the satellite access (via the NTN). The failure indication may cause the base station (or AMF) bar (or prohibit or disallow or block) the wireless device to receive services (UL/DL data transmissions and/or mobility) via the satellite access (e.g., the NTN). The failure indication may, for example, cause the base station (or AMF) bar (or prohibit or disallow or block) the satellite access (e.g., the NTN access).

In some other examples, the location service response may comprise location information (e.g., an estimate of the location of the wireless device that is calculated by the LMF). The wireless device may use the location information for UL/DL communications and/or mobility or the like.

The positioning procedure may be (or comprise) the multi-RTT positioning method/procedure and/or the RSTD positioning procedure or carrier phase (difference) positioning procedure or the like. The wireless device may during the at least one measurement period may perform (positioning) measurements (e.g., UE Rx−Tx time difference measurement, PRS-RSRP(P), measurements, RSTD measurements and/or the like) as described above using one or more DL PRS transmissions (e.g., the DL-PRS resource(s) and/or DL PRS resource set(s)) and/or one or more SRS transmissions. For example, as described above, the base station (or the TRPs) may perform (positioning) measurements, e.g., gNB Rx−Tx time difference measurements using the one or more DL PRS transmissions and/or the one or more SRS transmissions. The wireless device may report/send/transmit the (positioning) measurements and location information to the location server (e.g., via the LPP provide location information message of the one or more positioning message) at time/occasion T2. The base station may send/report/transmit the (positioning) measurements via NRPPa messages to the location server.

As shown in FIG. 30, the wireless device may stop/terminate/abort the positioning procedure at time/occasion T3, e.g., based on the one or more positioning messages (e.g., LPP abort message or LPP error message). In other examples, the wireless device may stop/terminate/abort the positioning procedure in response to receiving a message (comprising the location service response) from the AMF/base station. For example, the one or more positioning messages may comprise the UE location verification decision. The UE location verification decision may confirm/verify the location of the wireless device. The UE location verification decision may, for example, comprise the success indication or the failure indication. In another example, the stopping/terminating/aborting the positioning procedure at time/occasion T3 may be based on the receiving the location service.

In existing technologies, the (UE) location verification (procedure) may be started after a completion of an initiating NAS procedure. The location verification may, for example, run in parallel with any other UE related activities, e.g., UL/DL data transmissions and/or mobility (e.g., the handover). For example, the network (e.g., base station and/or the 5GC) may provide no services (e.g., mobility and/or UL/DL data transmission) to the wireless device, e.g., via the satellite access (e.g., the NTN), until the location of the wireless device being verified at initial network attach (e.g., after the wireless device transits from the RRC idle/inactive state to the RRC connected state). However, the lower layers (e.g., the RRC layer and/or the MAC layer) of the wireless device may perform UL/DL transmissions (e.g., due to pending data/arrival of new data) during the positioning procedure (e.g., before the location of the wireless device being verified). For example, the wireless device may (in response to pending data) trigger a first buffer status reporting (BSR) at time/occasion T4 and/or a second BSR at time/occasion T5. The wireless device may, according to existing technologies, transmit one or more UL signals (e.g., PUSCH/PUCCH) to transmit pending data and/or to request UL grants for transmitting the pending data. Enhancements of the positioning procedure may ensure consistent behavior of the wireless device during the (ongoing) positioning procedure.

In existing technologies, the wireless device may start a measurement period of the at least one measurement period after/in response to (or upon/based on) starting the positioning procedure. In an example, the wireless device may start the measurement period from/after the first/earliest/starting (configured/activated) measurement gap/PPW instance aligned with DL PRS resource(s) in the assistance data (e.g., the ProvideAssistanceData message). The measurement gap may be a preconfigured measurement gap of the one or more preconfigured measurement gaps. The one or more measurement gaps may comprise the measurement gap. The one or more PPW may comprise the (activated) PPW. The measurement period may be the UE Rx−Tx time difference measurement period, e.g., for performing periodic/triggered UE Rx−Tx time difference (and/or PRS-RSRP(P)) measurements and/or the RSTD measurement period for RSTD (and/or PRS-RSRP(P)) measurements. For example, the wireless device may (to perform the positioning procedure, e.g., during the measurement period) receive/measure the one or more DL PRS resource(s) (e.g., the one or more DL PRS transmissions) in/of the assistance data (e.g., configured/indicated by the one or more PRS configuration parameters) and/or transmit the one or more SRS transmissions (or one or more SRS resources configured by the one or more SRS configuration parameters). For example, the location server may send/transmit an LPP message (e.g., LPP provide assistance data message and/or LPP request location information) of one or more positioning messages comprising the assistance data to the wireless device.

Figure 33:
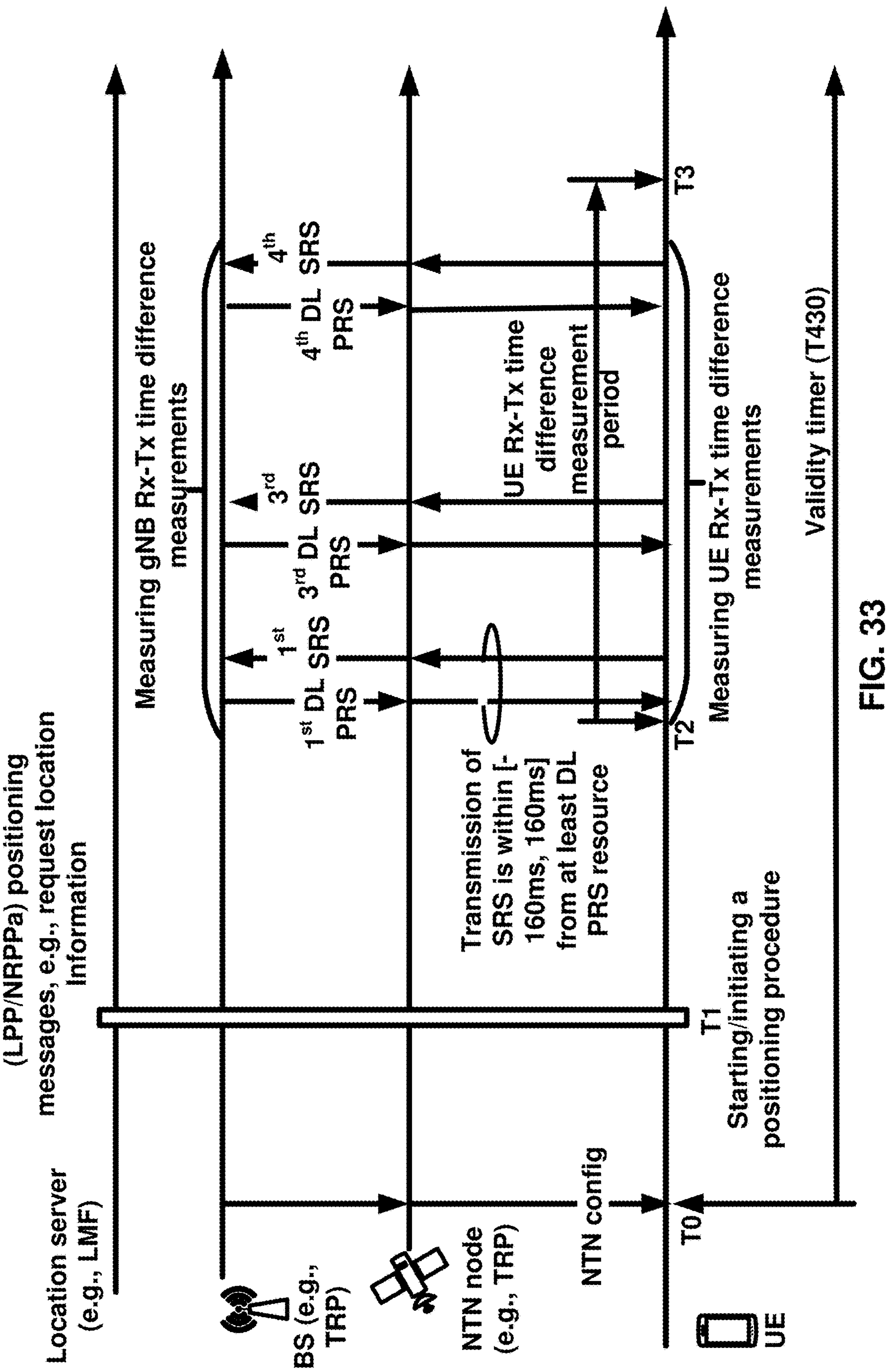
FIG. 33 shows an example of a positioning procedure in a non-terrestrial network per an aspect of the present disclosure.

In existing technologies, the wireless device may, to perform the positioning procedure, be expected (or be requested) to measure/determine/perform the (positioning) measurements (e.g., one or more UE Rx−Tx time difference measurements). The base station may, as part of the positioning procedure, need to measure/determine/perform the (positioning) measurements (e.g., one or more gNB Rx−Tx time difference measurements). As shown in FIG. 33, to accurately measure the one or more gNB Rx−Tx time difference measurements and/or one or more UE Rx−Tx time difference measurements (e.g., for periodic and triggered UE Rx−Tx time difference measurements), an SRS transmission of the one or more SRS transmissions may need to be within an SRS transmission window (e.g., [−X, X] msec for X=40 and/or 80 or 160 or 320 the like) of at least one DL PRS resource (e.g., of each of the TRPs in the assistance data) of the one or more DL PRS resources. When the wireless device is communicating via the NTN, the wireless device may fail to transmit the SRS transmission of the one or more SRS transmissions within the SRS transmission window of the at least one DL PRS resource (e.g., when the UL synchronization of the wireless device is lost or not obtained). By properly starting the measurement period the wireless device may improve the positioning measurements at the wireless device and the base station (e.g., improve the accuracy of the positioning procedure).

Embodiments of the present disclosure are related to an approach for suspending (or halting or stopping or canceling or avoiding) UL/DL (data) transmissions (e.g., in the RRC/MAC/PHY layers) of the wireless device based on (or when) the positioning procedure (e.g., for location verification) being ongoing. The positioning procedure/session may be started by the wireless device in response to receiving an LPP message of the LPP messages (e.g., the LPP request location information message) from the location server. In an example embodiment, the wireless device may suspend (all) UL/DL transmissions that are not related to the ongoing positioning procedure until the location of the wireless device being verified (e.g., by the location server).

In an example embodiment, the wireless device may not transmit PUCCH/(configured grant) PUSCH/PRACH channels/signals during the positioning procedure until the location of the wireless device being verified (e.g., by the location server). In an example embodiment, the wireless device may not monitor/receive PDCCH/(SPS) PDSCH/CSI-RS channels/signals during the positioning procedure until the location of the wireless device being verified (e.g., by the location server).

In an example embodiment, the wireless device may flush one or more HARQ buffers of one or more HARQ processes in response to starting the positioning procedure. These and other features of the present disclosure are described further below. Some embodiments of the present disclosure are related to an approach for determining a starting (time/occasion) of the measurement period of the ongoing positioning procedure, e.g., when the wireless device is positioning with/via the NTN. The wireless device may receive the one or more positioning messages from the location server, (e.g., the LPP request location information, e.g., the NR-Multi-RTT-RequestLocationInformation message and/or NR-Multi-RTT-ProvideAssistanceData message).

Embodiments of the present disclosure are related to an approach for determining a start time/occasion of at least one measurement period (of the ongoing measurement procedure) in the NTN, e.g., based on whether the validity timer/duration (e.g., of the serving cell of the NTN) is running or not. In an example embodiment, based on the validity timer/duration (e.g., of the serving cell of the NTN) is running and the receiving the one or more positioning messages form the location server (e.g., the LPP request location information, e.g., the NR-Multi-RTT-RequestLocationInformation message and/or NR-Multi-RTT-ProvideAssistanceData message), the wireless device may start the UE Rx–Tx time difference measurement period from/after the first/earliest/starting (configured/activated) measurement gap/PPW instance aligned with the DL PRS resource(s) in the assistance data.

In an example embodiment, based on the on the validity timer of the serving cell not being running (or being expired/stopped) and the receiving the one or more positioning messages form the location server (e.g., the LPP request location information, e.g., the NR-Multi-RTT-RequestLocationInformation message and/or NR-Multi-RTT-ProvideAssistanceData message), the wireless device may avoid starting the UE Rx–Tx time difference measurement period until/after acquiring UL synchronization of the serving cell (e.g., until/after starting the validity timer of the serving cell). Example embodiments improve accuracy of the positioning procedure (e.g., by ensuring accurate positioning measurements at the wireless device and/or the base station). These and other features of the present disclosure are described further below.

Example embodiments of the present disclosure may provide enhancement for UL/DL communications during a location verification procedure. For example, the embodiments may restrict access of the wireless device to the network (e.g., for UL/DL data transmissions and/or mobility) before the location of the wireless device being verified. Solutions allow lower layers (e.g., RRC/MAC/PHY) of the wireless device to suspend UL/DL data transmissions while the positioning procedure for the UE location verification procedure is pending (or ongoing).

Example embodiments of the present disclosure may provide enhancement for performing UE Rx–Tx time difference measurement, e.g., by starting the UE Rx–Tx time difference measurement period from/after obtaining UL synchronization of the serving cell of the NTN.

Figure 31:
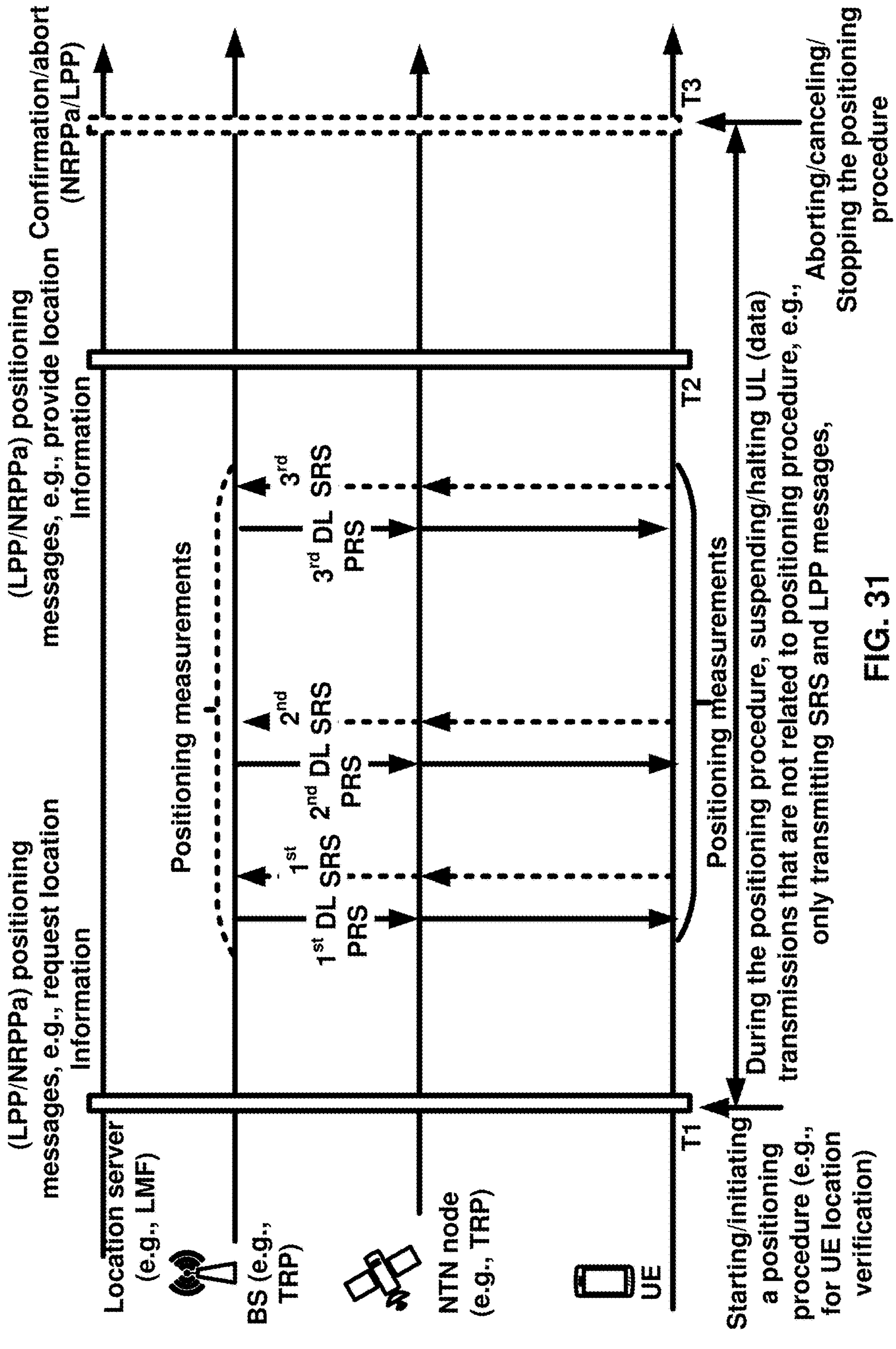
FIG. 31 shows an example of UL/DL communications during a positioning procedure in a non-terrestrial network as per an aspect of the present disclosure.
Figure 32:
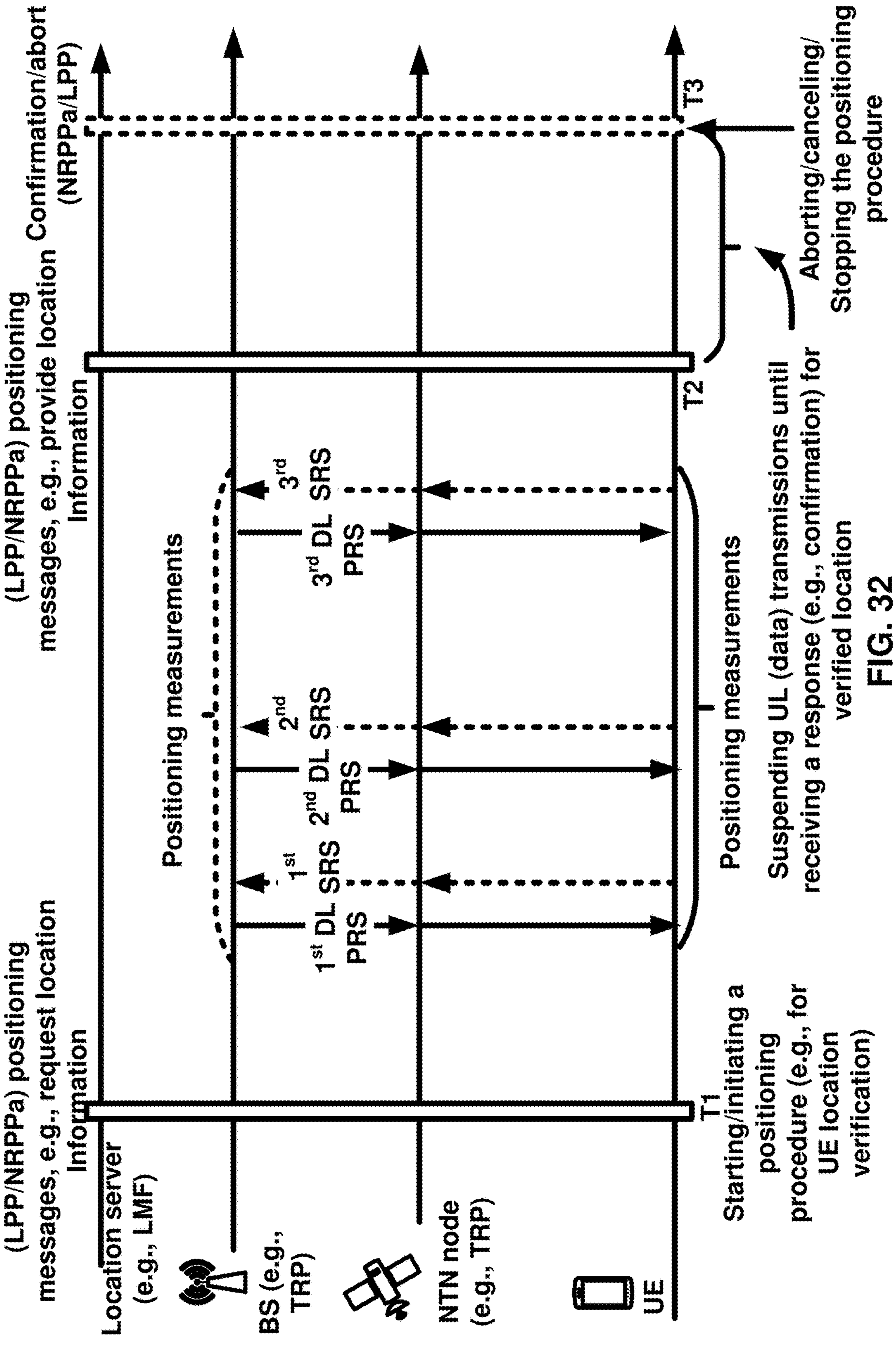
FIG. 32 shows an example of UL/DL communications during a positioning procedure in a non-terrestrial network as per an aspect of the present disclosure.

FIGS. 31-32 show examples of UL/DL communications during a positioning procedure in a non-terrestrial network as per an aspect of the present disclosure. For example, the wireless device may perform the positioning procedure (e.g., for UE location verification) as described above with respect to the embodiment of FIG. 30. The wireless device may be in an RRC inactive/idle state/mode. For example, the wireless device may be in an RRC connected state/mode.

In an example embodiment, as shown in FIG. 31, the wireless device may, during the ongoing positioning procedure (e.g., from time/occasion T1 to time/occasion T3 in FIG. 31), suspend (or stop or cancel) (all) UL/DL transmissions that are not related to the ongoing positioning procedure (or the ongoing LPP/positioning session). The suspended UL/DL transmissions may be for UL/DL data transmissions not related to the positioning procedure. For example, during the ongoing positioning procedure the wireless device may transmit the one or more SRS transmissions. In another example, during the ongoing positioning procedure the wireless device may transmit (or receive) the one or more positioning messages (e.g., the LPP PDUs). UL signals (e.g., PUCCH/PUSCH/PRACH) may not be related to the positioning procedure if the UL signals do not comprise the one or more SRS transmissions and/or being associated with the one or more positioning messages (e.g., not carrying the LPP PDUs). Example embodiments may restrict UL/DL transmissions (activities) of the wireless device before the location verification being completed (e.g., until the location of the wireless device being verified). By restricting UL/DL transmissions (activities) of the wireless device before the location verification being completed, the lower layers of the wireless device may avoid transmitting UL signals or receiving DL signals (UL/DL signals that are not related to the positioning procedure) during the positioning procedure. For example, an UL/DL signal/channel may not be related to the ongoing positioning procedure based on not carrying/comprising one or more LLP PDUs of the LPP messages.

In an example embodiment, the base station may, based on receiving the one or more positioning messages, e.g., NRPPa messages (e.g., requested UL-SRS transmission characteristics information and/or TRP measurement request information and/or Positioning Activation/Deactivation request information or the like), avoid transmitting DL data/signals to the wireless device (or receiving UL data/signals from the wireless device) during the positioning procedure, e.g., until the location of the wireless device being verified. For example, the location service may inform the base station that the location of the wireless device is being verified.

In an example embodiment, the base station may, based on receiving the one or more positioning messages, e.g., NRPPa messages (e.g., requested UL-SRS transmission characteristics information and/or TRP measurement request information and/or Positioning Activation/Deactivation request information or the like), avoid receiving UL data/signals (not related to the positioning procedure) from the wireless device during the positioning procedure, e.g., until the location of the wireless device being verified.

In an example embodiment, the wireless device may during the ongoing positioning procedure receive one or more SIBs (e.g., SIB1 and/or SIB19).

In an example embodiment, upon/in response to starting the positioning procedure (at time/occasion T1), the wireless device may flush one or more HARQ buffers of one or more UL/DL HARQ processes. For example, the one or more configuration parameters may configure a plurality of UL/DL HARQ processes (comprising the one or more UL/DL HARQ processes). By flushing the one or more HARQ buffers, misalignment between the wireless device and the base station (e.g., for determining new UL/DL transmissions or retransmissions), e.g., after the location of the wireless device being verified, may reduce. For example, the one or more UL/DL HARQ processes of the plurality of UL/DL HARQ processes may not correspond to the ongoing positioning procedure (e.g., not used for transmissions/receptions of the one or more positioning messages). In some cases, the one or more configuration parameters may indicate/configure that the one or more UL/DL HARQ processes of the plurality of UL/DL HARQ processes are not associated with the ongoing positioning procedure.

The drawback of embodiments of FIG. 31 may be an increase of the UL/DL data transmission latency and/or a lower UL/DL transmission efficiency (e.g., by suspending all UL/DL transmissions and/or flashing the one or more HARQ buffers during the ongoing positioning procedure). The network (e.g., the LMF/AMF and/or the base station) may reduce impact(s) of the ongoing positioning procedure on the UL/DL data transmission latency and/or the UL/DL transmission efficiency by configuring the wireless device to whether to flash the one or more HARQ buffers during the ongoing positioning procedure (e.g., via a first configuration parameter of the one or more configuration parameters) and/or whether to suspend all UL/DL transmissions (not related to the positioning procedure) during the ongoing positioning procedure (e.g., via a second configuration parameter of the one or more configuration parameters).

In an example embodiment, in response to the second configuration parameter being enabled/configured (or not being absent from the one or more configuration parameters), the wireless device may, during the ongoing positioning procedure and until the location of the wireless device being verified (e.g., from time/occasion T1 to time/occasion T3 in FIG. 31), suspend (or stop or cancel) (all) UL/DL transmissions, e.g., the (all) UL/DL transmissions not related to the ongoing positioning procedure.

In an example embodiment, in response to the second configuration parameter being disabled (or being absent from the one or more configuration parameters or not being configured/enabled), the wireless device may, during the ongoing positioning procedure and until the location of the wireless device being verified (e.g., from time/occasion T1 to time/occasion T3 in FIG. 31), perform (all) UL/DL transmissions, e.g., the (all) UL/DL transmissions not related to the ongoing positioning procedure.

In an example embodiment, in response to the first configuration parameter being enabled/configured (or not being absent from the one or more configuration parameters), in response to/upon/based on initiating/starting the positioning procedure (e.g., at/on/in time/occasion T1 in FIG. 31), the wireless device may flush the one or more HARQ buffers of one or more UL/DL HARQ processes.

In an example embodiment, in response to the first configuration parameter being disabled (or being absent from the one or more configuration parameters or not being configured/enabled), in response to/upon/based on initiating/starting the positioning procedure (e.g., at/on/in time/occasion T1 in FIG. 31), the wireless device may avoid/refuse flushing the one or more HARQ buffers of one or more UL/DL HARQ processes.

FIG. 32 illustrates another solution for reducing impact(s) of the ongoing positioning procedure on the UL/DL data transmission latency and/or the UL/DL transmission efficiency. In an example embodiment, as shown in FIG. 32, the wireless device may, after transmitting the (LPP) provide location information message and until the location of the wireless device being verified (e.g., from time/occasion T2 to time/occasion T3 in FIG. 32), suspend (or stop or cancel) (all) UL/DL transmissions, e.g., the (all) UL/DL transmissions not related to the ongoing positioning procedure. In an example embodiment, upon/in response to transmitting the (LPP) provide location information message (at time/occasion T2), the wireless device may flush the one or more HARQ buffers of one or more UL/DL HARQ processes. Compared to embodiments of FIG. 31, based on embodiments of FIG. 32, the wireless device is only restricted for UL/DL transmissions after transmitting the (LPP) provide location information message and until the location of the wireless device being verified (e.g., from time/occasion T2 to time/occasion T3 in FIG. 32).

In an example embodiment, in response to the second configuration parameter being enabled/configured (or not being absent from the one or more configuration parameters), the wireless device may, after transmitting the LPP provide location information message to the location server and until the location of the wireless device being verified (e.g., from time/occasion T2 to time/occasion T3 in FIG. 32), suspend (or stop or cancel) (all) UL/DL transmissions, e.g., the (all) UL transmissions not related to the ongoing positioning procedure.

In an example embodiment, in response to the second configuration parameter being disabled (or being absent from the one or more configuration parameters or not being configured/enabled), the wireless device may, after transmitting the (LPP) provide location information message and until the location of the wireless device being verified (e.g., from time/occasion T2 to time/occasion T3 in FIG. 32), perform (all) UL/DL transmissions, e.g., the (all) UL/DL transmissions not related to the ongoing positioning procedure.

In an example embodiment, in response to the first configuration parameter being enabled/configured (or not being absent from the one or more configuration parameters), upon/in response to transmitting the (LPP) provide location information message (at time/occasion T2), the wireless device may flush the one or more HARQ buffers of one or more UL/DL HARQ processes.

In an example embodiment, in response to the first configuration parameter being disabled (or being absent from the one or more configuration parameters or not being configured/enabled), upon/in response to transmitting the (LPP) provide location information message (at time/occasion T2), the wireless device may avoid/refuse flushing the one or more HARQ buffers of one or more UL/DL HARQ processes.

In the present disclosure, “serving NTN node” refers to “reference NTN node” or “assistance data reference NTN node” or “serving cell of the NTN” or “reference TRP” or “assistance data reference TRP”.

In the present disclosure, “neighbor NTN node” refers to “non-reference NTN node” or “non assistance data reference NTN node” or “neighbor cell of the NTN” or “neighbor TRP” or “non assistance data reference TRP”.

In the present disclosure, “performing the positioning procedure” refers to “measuring/receiving DL PRS resources/resources sets configured by the DL PRS assistance data” and/or “transmitting SRS resources/resource sets configured by the one or more SRS configuration parameters”.

In the present disclosure, “multi-satellite measurement” refers to “measuring DL-PRS resources/resource sets transmitted from multiple satellites”.

Example embodiments of the present disclosure may provide enhancement for UL/DL communications during a location verification procedure. For example, the embodiments may restrict access of the wireless device to the network (e.g., for UL/DL data transmissions and/or mobility) before the location of the wireless device being verified. Solutions allow lower layers (e.g., RRC/MAC/PHY) of the wireless device to suspend UL/DL data transmissions while the positioning procedure for the UE location verification procedure is pending.

Figure 34:
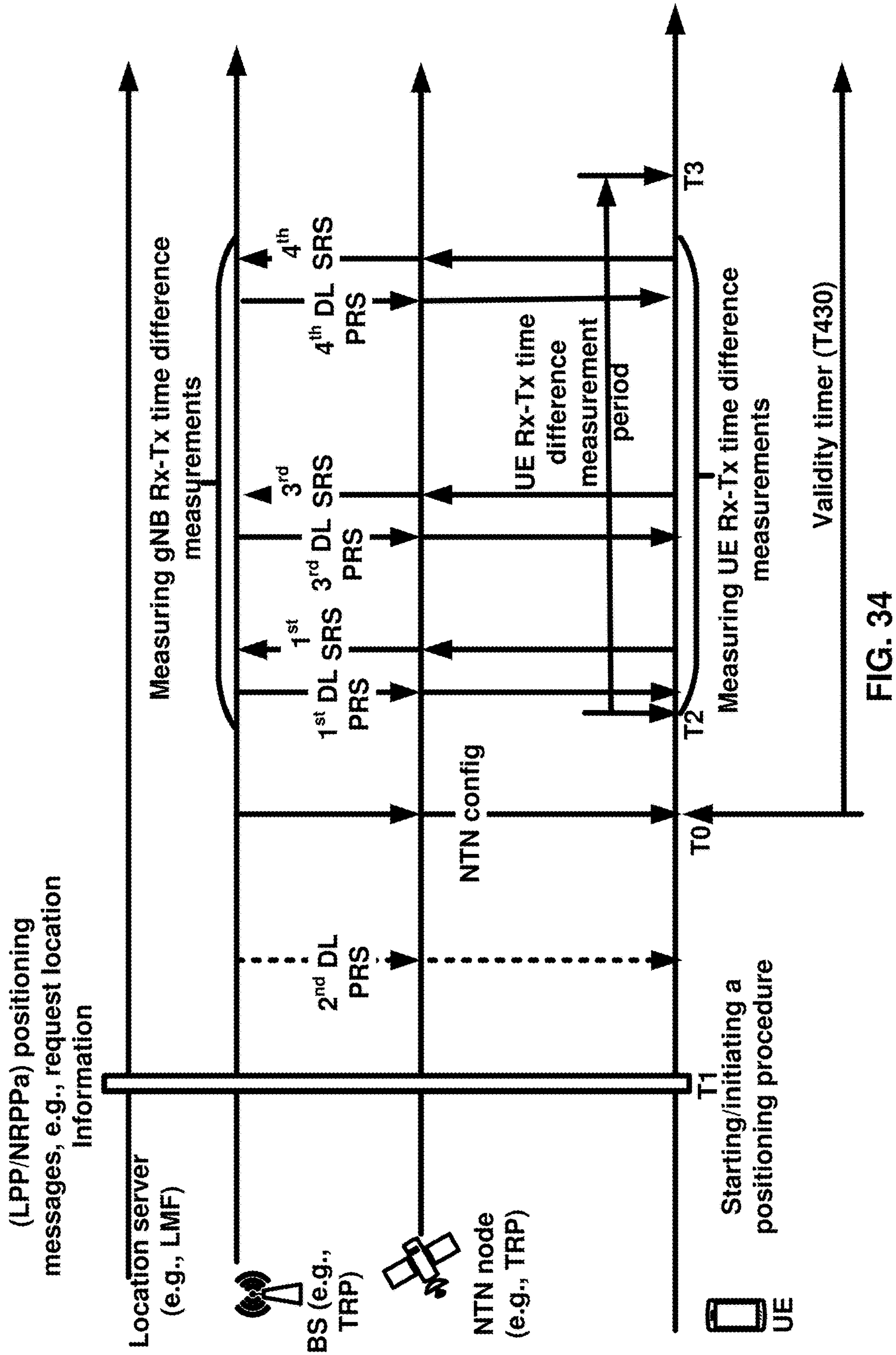
FIG. 34 shows an example of a positioning procedure in a non-terrestrial network per an aspect of the present disclosure.

FIGS. 33-34 show examples of positioning procedure in a non-terrestrial network per an aspect of the present disclosure. Signaling(s) between the wireless device and/or the location server and/or the base station in FIGS. 33-34 may be similar to discussions of FIGS. 30-32 provided above. For example, the wireless device may start/initiate the positioning procedure based on/after/in response to receiving the one or more positioning messages form the location server, (e.g., the LPP request location information, e.g., the NR-Multi-RTT-RequestLocationInformation message and/or NR-Multi-RTT-ProvideAssistanceData message).

As shown in FIGS. 33-34, upon or in response to acquiring/receiving the NTN-config of the serving cell (e.g., upon reception of the SIB19 from the base station via the serving cell), the wireless device may start/restart the validity (or validation) duration/timer/window/period (e.g., T430 timer) of the serving cell (e.g., at time/occasion T0). The time/occasion T0 may correspond to the epoch time of the NTN-config. For example, the wireless device may start the validity timer based the epoch time indicated by the NTN-config of the serving cell, e.g., the wireless device may start the validity timer from a subframe indicated by the epoch time. In other examples, the wireless device may start the validity timer from a subframe that the NTN-config is received.

In the example of FIG. 33, based on the validity timer of the serving cell being running and the receiving the one or more positioning messages form the location server (e.g., at time/occasion T1), the wireless device may start the measurement period from/after the first/earliest/starting (configured/activated) measurement gap/PPW instance aligned with the DL PRS resource(s) in the assistance data. In an example embodiment, based on the on the validity timer of the serving cell not being running (or being expired/stopped), the wireless device may avoid starting the measurement period. In an example embodiment, as shown in FIG. 34, the wireless device may wait to acquire the NTN-config of the serving cell (e.g., by receiving the SIB19) before starting the measurement period. As shown in FIG. 34, after starting the validity timer of the serving cell, the wireless device may start the measurement period from/after the first/earliest/starting (configured/activated) measurement gap/PPW instance aligned with the DL PRS resource(s) in the assistance data.

As shown in FIG. 33 and FIG. 34, as the validity timer of the serving cell is running while the measurement period is started, the wireless device is able to transmit the one or more SRS transmissions and/or measure/determine the positioning measurements (UE Rx−Tx time difference measurements). The base station is able to receive the one or more SRS transmissions and/or measure/determine the positioning measurements (gNB Rx−Tx time difference measurements). Some embodiments may improve the positioning performance and/or reduce latency of location verification procedure.

For example, the wireless device may, from the serving cell of the NTN, receive a command for a preconfigured Measurement Gap for Positioning activation/deactivation (e.g., Positioning Measurement Gap Activation/Deactivation Command MAC CE), e.g., via the serving cell of the NTN. The command may indicate a first preconfigured measurement gap. The wireless device may, from the serving cell of the NTN, transmit a PUCCH with HARQ-ACK information in slot n corresponding to the PDSCH carrying the command (Positioning Measurement Gap Activation/Deactivation Command MAC CE). The wireless device may transmit the PUCCH based on the current TA value of the serving cell and/or the $K_{offset}$ of the serving cell. For example, the wireless device may activate/deactivate the first preconfigured measurement gap (and apply corresponding assumptions) starting from a first/initial/starting slot that is after slot $$n+3N_{slot}^{subframe,\mu}+^{\mu-\mu_{Kmac}}\cdot k_{mac}$$

where μ is an SCS configuration for the PUCCH and $k_{mac}$ may be the K-Mac of the serving cell indicated by the NTN-config. By considering Kmac of the NTN-config of the serving cell misalignment between the wireless device and the base station may reduce (e.g., the base station is aware that the wireless device is activated/deactivated the preconfigured measurement gap by receiving the PUCCH).

The wireless device may, from the serving cell of the NTN, receive a command for PPW (of the one or more PPWs) activation/deactivation (e.g., PPW Activation/Deactivation Command MAC CE), e.g., via the serving cell. The activation command may indicate the PPW (e.g., an ID of the PPW). The wireless device may, via the serving cell of the NTN, transmit a PUCCH with HARQ-ACK information in slot n corresponding to the PDSCH carrying the command (PPW Activation/Deactivation Command MAC CE). The wireless device may transmit the PUCCH based on the current TA value of the serving cell and/or the $K_{offset}$ of the serving cell. For example, the wireless device may (e.g., when the serving cell is part of the NTN) activate/deactivate the PPW (and apply corresponding assumptions) starting from a first/initial/starting slot that is after slot $$n+3N_{slot}^{subframe,\mu}+2^{\mu-\mu_{Kmac}}\cdot k_{mac}$$

where μ is an SCS configuration for the PUCCH and $k_{mac}$ is the Kmac of the NTN-config of the serving cell. By considering Kmac of the NTN-config of the serving cell misalignment between the wireless device and the base station may reduce (e.g., the base station is aware that the wireless device is activated/deactivated the PPW by receiving the PUCCH).

In response to/after the receiving at least one LPP message and the validity duration of NTN assistance data (of a cell of the NTN, e.g., the serving cell) being running (e.g., UL synchronization of the cell being obtained or the validity duration not being expired), the wireless device may start a (positioning) measurement period of the at least one measurement period from a first/earliest (configured/activated) MG/PPW instance that is aligned with DL-PRS resources in the assistance data. For example, the wireless device may receive the one or more positioning messages from the location server (e.g., the NR-TDOA-ProvideAssistanceData message and/or NR-TDOARequestLocationInformation message). In an example embodiment, regardless/irrespective of whether the validity timer/duration (e.g., of the serving cell of the NTN) being running or not and the receiving the one or more positioning messages (e.g., the NR-TDOA-ProvideAssistanceData message and/or NR-TDOARequestLocationInformation message), the wireless device may start the (DL) RSTD measurement period from/after the first/earliest/starting (configured/activated) measurement gap/PPW instance aligned with the DL PRS resource(s) in the assistance data. In some implementations, based on the validity timer/duration (e.g., of the serving cell of the NTN) being running and the receiving the one or more positioning messages (e.g., the NR-TDOA-ProvideAssistanceData message and/or NR-TDOARequestLocationInformation message), the wireless device may start the (DL) RSTD measurement period from/after the first/earliest/starting (configured/activated) measurement gap/PPW instance aligned with the DL PRS resource(s) in the assistance data. In other implementations, based on the validity timer/duration (e.g., of the serving cell of the NTN) being expired/stopped and the receiving the one or more positioning messages (e.g., the NR-TDOA-ProvideAssistanceData message and/or NR-TDOARequestLocationInformation message), the wireless device may avoid starting the RSTD measurement period until/after acquiring UL synchronization of the serving cell (e.g., until/after starting the validity timer of the serving cell).

For example, the wireless device may receive the one or more positioning messages from the location server (e.g., NR-DL-AoD-ProvideAssistanceData message and/or NR-DL-AoDRequestLocationInformation message). In an example embodiment, regardless of/irrespective of whether the validity timer of the serving cell being running or not and the receiving the one or more positioning messages form the location server (e.g., NR-DL-AoD-ProvideAssistanceData message and/or NR-DL-AoDRequestLocationInformation), the wireless device may start the PRS-RSRP measurement period (and/or PRS-RSRPP measurement period) from/after the first/earliest/starting (configured/activated) measurement gap/PPW instance aligned with the DL PRS resource(s) in the assistance data. In some implementations, based on the validity timer/duration (e.g., of the serving cell of the NTN) being running and the receiving the one or more positioning messages (e.g., the NR-DL-AoD-ProvideAssistanceData message and/or NR-DL-AoDRequestLocationInformation message), the wireless device may start the PRS-RSRP measurement period (and/or PRS-RSRPP measurement period) from/after the first/earliest/starting (configured/activated) measurement gap/PPW instance aligned with the DL PRS resource(s) in the assistance data. In other implementations, based on the validity timer/duration (e.g., of the serving cell of the NTN) being expired/stopped and the receiving the one or more positioning messages (e.g., the NR-DL-AoD-ProvideAssistanceData message and/or NR-DL-AoDRequestLocationInformation message), the wireless device may avoid starting the PRS-RSRP measurement period (and/or PRS-RSRPP measurement period) until/after acquiring UL synchronization of the serving cell (e.g., until/after starting the validity timer of the serving cell).

Higher (upper) layers of the wireless device (e.g., LPP layer of the wireless device) may send a first indication to lower layers (e.g., RRC/MAC/PHY) of the wireless device in response to starting a positioning procedure (e.g., for the UE location verification) and/or starting an LPP session (e.g., for the UE location verification). The first indication may indicate (all) UL/DL transmissions that are not related/associated with the ongoing positioning procedure being suspended/halted (e.g., until location of the wireless device being verified) by the lower layers of the wireless device. For example, the lower layers of the wireless device may halt/suspend (all) UL/DL transmissions that are not related/associated with the ongoing positioning procedure, e.g., in response to the first indication (e.g., during the positioning procedure (e.g., for the UE location verification) and/or the ongoing LPP session (e.g., for the UE location verification) and until location of the wireless device being verified (e.g., by AMF/LMF). The higher layer of the wireless device may send a second indication to the lower layers of the wireless device based on location of the wireless device being verified (e.g., by AMF/LMF). The second indication may indicate to the lower layers of the wireless device to resume the UL/DL transmissions. The lower layers of the wireless device may resume/start the (all) UL/DL transmissions based on the second indication.

In some implementations, the MAC layer of the wireless device may flush the one or more HARQ processes in response to the first indication (e.g., discard/delete/remove transport blocks (TBs) and/or medium access control PDUs in the one or more HARQ processes.

FIG. 35A illustrates an example flowchart of UL/DL communications during a positioning procedure for UE location verification as per an aspect of the present disclosure. The wireless device may suspend/halt/cancel, during the positioning procedure (e.g., for the UE location verification) and/or the ongoing LPP session (e.g., for the UE location verification) and until location of the wireless device being verified (e.g., by AMF/LMF), (all) UL/DL transmissions that are not related/associated with the ongoing positioning procedure. For example, during the ongoing positioning procedure for the UE location verification procedure and until location of the wireless device being verified (e.g., by AMF/LMF), the wireless device may only transmit SRSs (resources) for positioning and/or LPP messages. For example, during the ongoing positioning procedure for the UE location verification procedure and until location of the wireless device being verified (e.g., by AMF/LMF), the wireless device may only receive DL PRS resources and LPP messages.

In an example embodiment, the wireless device may resume (all) UL/DL transmissions that are not related/associated with the ongoing positioning procedure in response to the location verification of the wireless device being successful (e.g., the location of the wireless device being verified).

FIG. 35B illustrates an example flowchart of UL/DL communications during a positioning procedure for UE location verification as per an aspect of the present disclosure. The wireless device may suspend/halt/cancel, in response to/after transmitting an LPP provide location information message to location server (e.g., during the positioning procedure for UE location verification) and until location of the wireless device being verified (e.g., by AMF/LMF), (all) UL/DL transmissions that are not related/associated with the ongoing positioning procedure. For example, during the ongoing positioning procedure for the UE location verification procedure and until location of the wireless device being verified (e.g., by AMF/LMF), the wireless device may only transmit SRSs (resources) for positioning and/or LPP messages. For example, during the ongoing positioning procedure for the UE location verification procedure and until location of the wireless device being verified (e.g., by AMF/LMF), the wireless device may only receive DL PRS resources and LPP messages.

FIG. 35C illustrates an example flowchart of UL/DL communications during a positioning procedure for UE location verification as per an aspect of the present disclosure. The wireless device may flush, in response to starting/initiating a positioning procedure/session (e.g., for the UE location verification), the one or more UL/DL HARQ buffers of the (configured) plurality of HARQ buffers. For example, the one or more UL/DL HARQ buffers may not be associated with the ongoing positioning procedure (e.g., not used for transmitting/receiving LPP messages).

FIG. 35D illustrates an example flowchart of UL/DL communications during a positioning procedure for UE location verification as per an aspect of the present disclosure. The wireless device may flush, in response to starting/initiating a positioning procedure/session (e.g., for the UE location verification), the one or more UL/DL HARQ buffers of the (configured) plurality of HARQ buffers.

In an example embodiment, the wireless device may suspend/halt/cancel, during the positioning procedure (e.g., for the UE location verification) and until location of the wireless device being verified (e.g., by AMF/LMF), (all) UL/DL transmissions that are not related/associated with the ongoing positioning procedure.

In an example embodiment, the wireless device may suspend/halt/cancel, during the ongoing LPP session (e.g., for the UE location verification) and until location of the wireless device being verified (e.g., by AMF/LMF), (all) UL/DL transmissions that are not related/associated with the ongoing positioning procedure.

In an example embodiment, during the positioning procedure (e.g., for the UE location verification) and until location of the wireless device being verified (e.g., by AMF/LMF), the wireless device may only transmit SRSs (resources) for positioning and/or LPP messages of the positioning procedure. For example, during the ongoing positioning procedure for the UE location verification procedure and until location of the wireless device being verified (e.g., by AMF/LMF), the wireless device may only receive DL PRS resources and LPP messages of the positioning procedure.

In an example embodiment, during the positioning session (e.g., for the UE location verification) and until location of the wireless device being verified (e.g., by AMF/LMF), the wireless device may only transmit SRSs (resources) for positioning and/or LPP messages of the positioning session. For example, during the ongoing positioning session for the UE location verification procedure and until location of the wireless device being verified (e.g., by AMF/LMF), the wireless device may only receive DL PRS resources and LPP messages of the positioning session.

Figure 36:
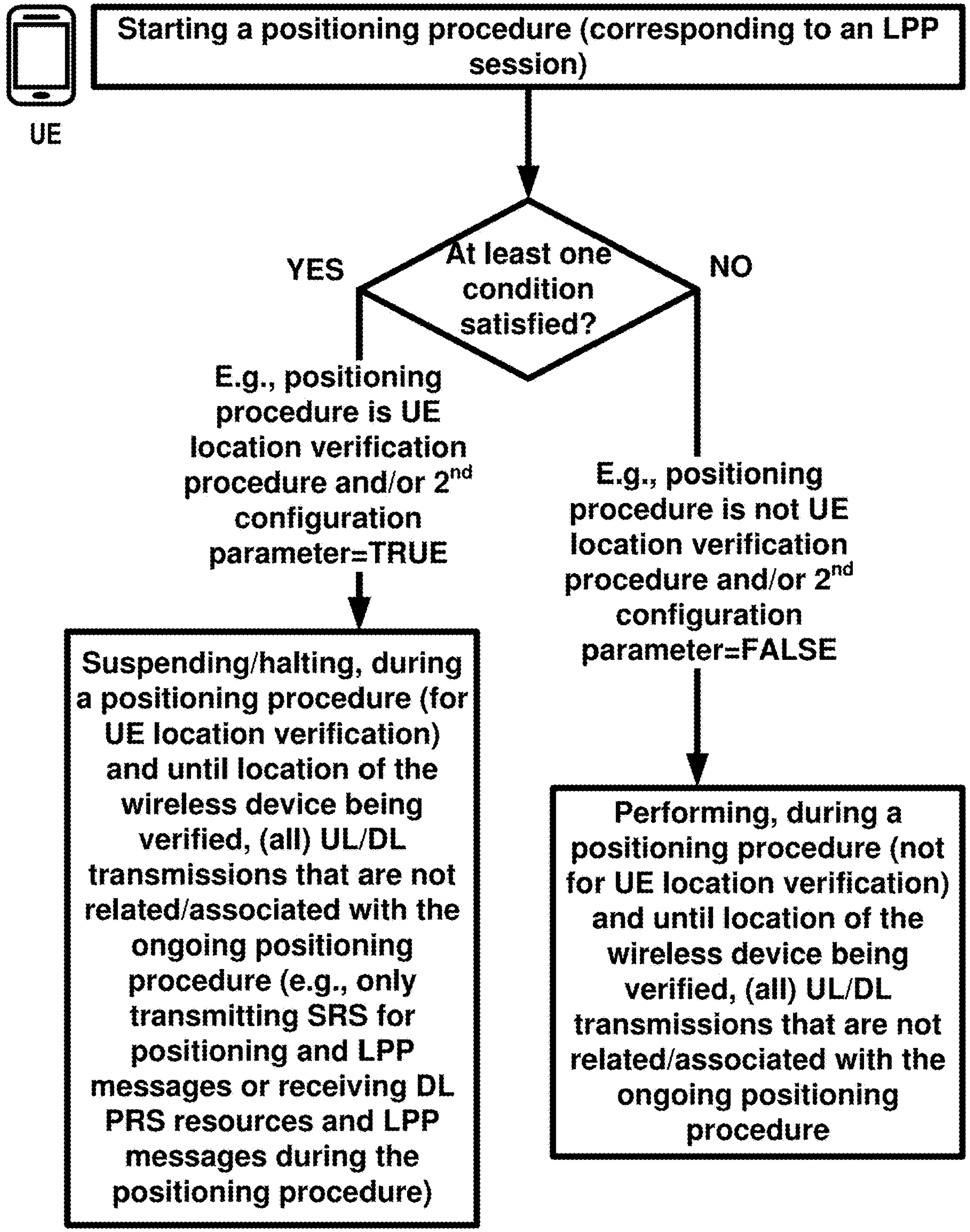
FIG. 36 illustrates an example flowchart of UL/DL communications during a positioning procedure as per an aspect of the present disclosure.

FIG. 36 illustrates an example flowchart of UL/DL communications during a positioning procedure as per an aspect of the present disclosure. For example, the wireless device may start the positioning procedure (corresponding to the LPP session). In an example embodiment, during the ongoing positioning procedure/LPP session, the wireless device may determine whether at least one condition being satisfied or not. In an example embodiment, in response to the second configuration parameter being enabled/configured (or being set to/with value TRUE or not being absent from the one or more configuration parameters) and/or the ongoing positioning procedure/session being for the UE location verification, the wireless device may determine the at least one condition being satisfied. In an example embodiment, in response to the second configuration parameter not being enabled/configured (or being absent from the one or more configuration parameters or being disabled or being set to/with value FALSE) and/or the ongoing positioning procedure/session not being for the UE location verification, the wireless device may determine the at least one condition not being satisfied.

Based on the at least one condition being satisfied (e.g., during the ongoing positioning procedure) and until the location of the wireless device being verified, the wireless device may suspend/halt (or stop or cancel) (all) UL/DL transmissions, e.g., the (all) UL/DL transmissions that are not related to/associated with the ongoing positioning procedure. Based on the at least one condition not being satisfied (e.g., during the ongoing positioning procedure) and until the location of the wireless device being verified, the wireless device may perform (all) UL/DL transmissions, e.g., the (all) UL/DL transmissions that are not related to/associated with the ongoing positioning procedure.

Figure 37:
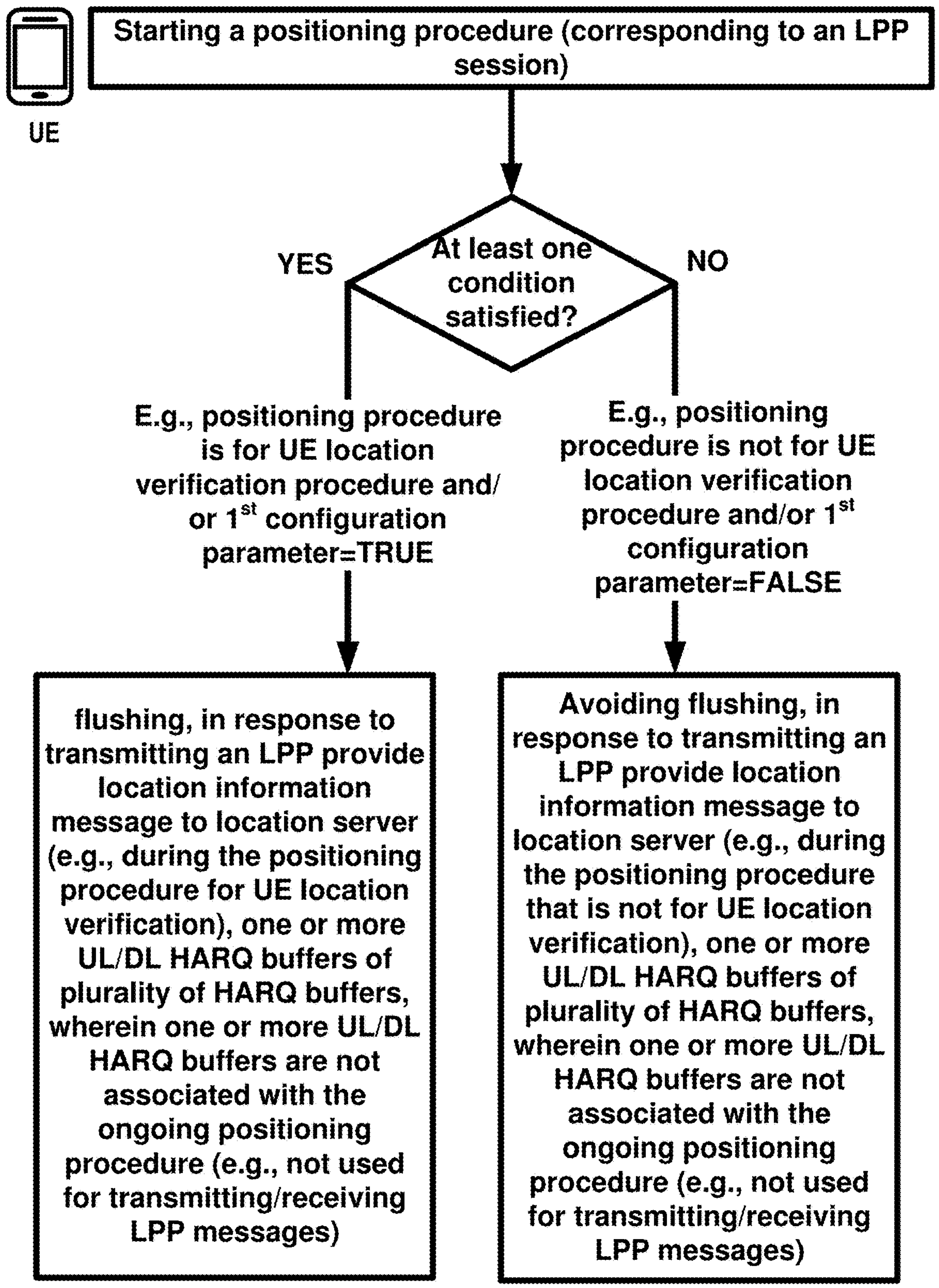
FIG. 37 illustrates an example flowchart of UL/DL communications during a positioning procedure as per an aspect of the present disclosure.

FIG. 37 illustrates an example flowchart of UL/DL communications during a positioning procedure as per an aspect of the present disclosure. For example, the wireless device may start the positioning procedure (corresponding to the LPP session). During the ongoing positioning procedure/LPP session, the wireless device may determine whether at least one condition being satisfied or not. In an example embodiment, in response to the first configuration parameter being enabled/configured (or being set to/with value TRUE or not being absent from the one or more configuration parameters) and/or the ongoing positioning procedure/session being for the UE location verification, the wireless device may determine the at least one condition being satisfied. In an example embodiment, in response to the first configuration parameter not being enabled/configured (or being set to/with value FALSE or being absent from the one or more configuration parameters or being disabled) and/or the ongoing positioning procedure/session being for the UE location verification, the wireless device may determine the at least one condition being satisfied.

Based on the at least one condition being satisfied (e.g., during the ongoing positioning procedure) and in response to/upon/based on initiating/starting the positioning procedure, the wireless device may flush the one or more HARQ buffers of one or more UL/DL HARQ processes. Based on the at least one condition not being satisfied (e.g., during the ongoing positioning procedure) and in response to/upon/based on initiating/starting the positioning procedure, the wireless device may avoid/refuse flushing the one or more HARQ buffers of one or more UL/DL HARQ processes.

FIG. 38A illustrates an example flowchart of positioning procedure in a non-terrestrial network per an aspect of the present disclosure. The wireless device may receive, from the location server (e.g., LMF) and while the validity duration/timer of the NTN assistance data being running, at least one LPP message (e.g., an LPP request location information and/or an LPP provide assistance data) of the LPP messages. The at least one LPP message may indicate a request for the location information of the wireless device (e.g., LPP request location information). The at least one LPP message may indicate/provide assistance data (e.g., LPP provide assistance data).

In response to/after the receiving at least one LPP message and the validity duration of NTN assistance data (of a cell of the NTN, e.g., the serving cell) being running (e.g., UL synchronization of the cell being obtained or the validity duration not being expired), the wireless device may start a (positioning) measurement period of the at least one measurement period from a first/earliest (configured/activated) MG/PPW instance that is aligned with DL-PRS resources in the assistance data. The measurement period may be the RSTD measurement period ($T_{RSTD,Total}$) and/or the PRS-RSRP measurement period ($T_{PRS\text{-}RSRP,total}$) and/or the UE Rx−Tx (time different) measurement period ($T_{UERxTx,Total}$). For example, based on the validity timer being running, a time $T_{RSTD,Total}$ (and/or $T_{PRS\text{-}RSRP,total}$ and/or $T_{UERxTx,Total}$) may start from the first/earliest (configured/activated) MG/PPW instance that is aligned with the DL-PRS resources in the assistance data (e.g., indicated/configured by the LPP messages).

FIG. 38B illustrates an example flowchart of positioning procedure in a non-terrestrial network per an aspect of the present disclosure. The wireless device may receive, from the location server (e.g., LMF) and while the validity duration/timer of the NTN assistance data not being running (or being stopped/expired), the at least one LPP message (e.g., the LPP request location information and/or the LPP provide assistance data) of the LPP messages. In response to/after the receiving at least one LPP message and the validity duration of NTN assistance data (of the cell of the NTN, e.g., the serving cell) not being running (e.g., UL synchronization of the cell being lost), the wireless device may start, after obtaining the UL synchronization of the cell (or starting the validity timer of the cell), the measurement period of the at least one measurement period from a first/earliest (configured/activated) MG/PPW instance that is aligned with DL-PRS resources in the assistance data. In response to/after the receiving at least one LPP message and the validity duration of NTN assistance data (of the cell of the NTN, e.g., the serving cell) not being running (e.g., UL synchronization of the cell being lost), the wireless device may postpone/delay a start time/occasion of the measurement period of the at least one measurement period until obtaining the UL synchronization of the cell. For example, based on the validity timer being started (or obtaining the UL synchronization of the cell), a time $T_{RSTD,Total}$ (and/or $T_{PRS\text{-}RSRP,total}$ and/or $T_{UERxTx,Total}$) may start from the first/earliest (configured/activated) MG/PPW instance that is aligned with the DL-PRS resources in the assistance data (e.g., indicated/configured by the LPP messages).

Figure 39:
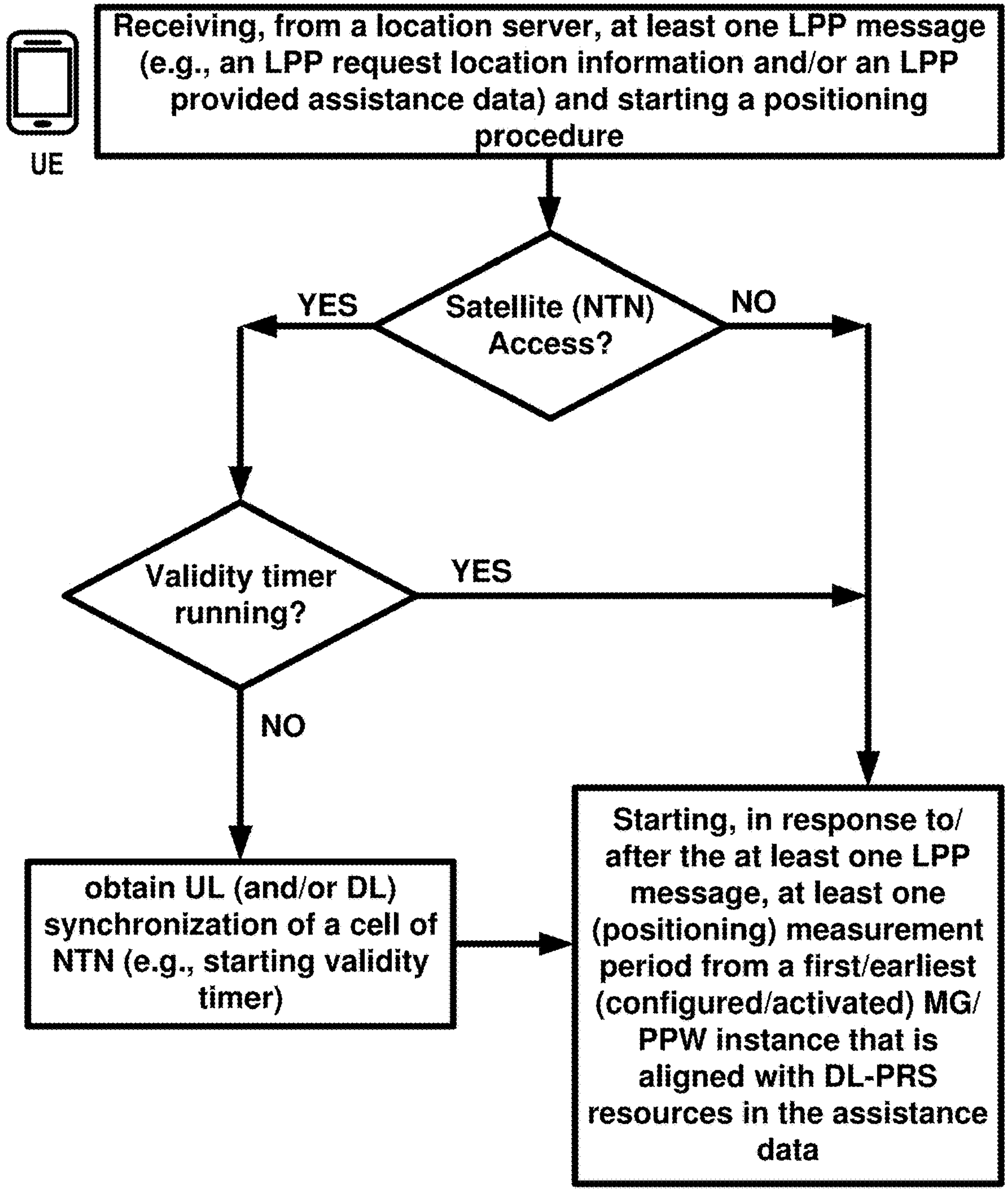
FIG. 39 illustrates an example flowchart of positioning procedure in a non-terrestrial network per an aspect of the present disclosure.

FIG. 39 illustrates an example flowchart of positioning procedure in a non-terrestrial network per an aspect of the present disclosure. The wireless device may receive, from the location server (e.g., LMF), the at least one LPP message (e.g., the LPP request location information and/or the LPP provide assistance data) of the LPP messages. For example, the wireless device may determine whether the access to the network is via the satellite access (e.g., NTN access, e.g., the serving cell is part of the NTN) or not. In response to the access to the network not being the satellite access (e.g., or being the terrestrial networks), the wireless device may start the measurement period of the at least one measurement period from the first/earliest (configured/activated) MG/PPW instance that is aligned with DL-PRS resources in the assistance data. In response to the access to the network not being the satellite access (e.g., or being the terrestrial networks), the wireless device may determine whether the validity timer/duration of the NTN assistance data is expired/stopped or not. In response to the validity timer/duration of the NTN assistance data being running, the wireless device may start the measurement period of the at least one measurement period from the first/earliest (configured/activated) MG/PPW instance that is aligned with DL-PRS resources in the assistance data. In response to the validity timer/duration of the NTN assistance data not being running (or being expired), the wireless device may obtain the UL synchronization of the cell (e.g., to start the validity duration) and then (e.g., after obtaining the UL synchronization of the cell) start the measurement period of the at least one measurement period from the first/earliest (configured/activated) MG/PPW instance that is aligned with DL-PRS resources in the assistance data.

Figure 40:
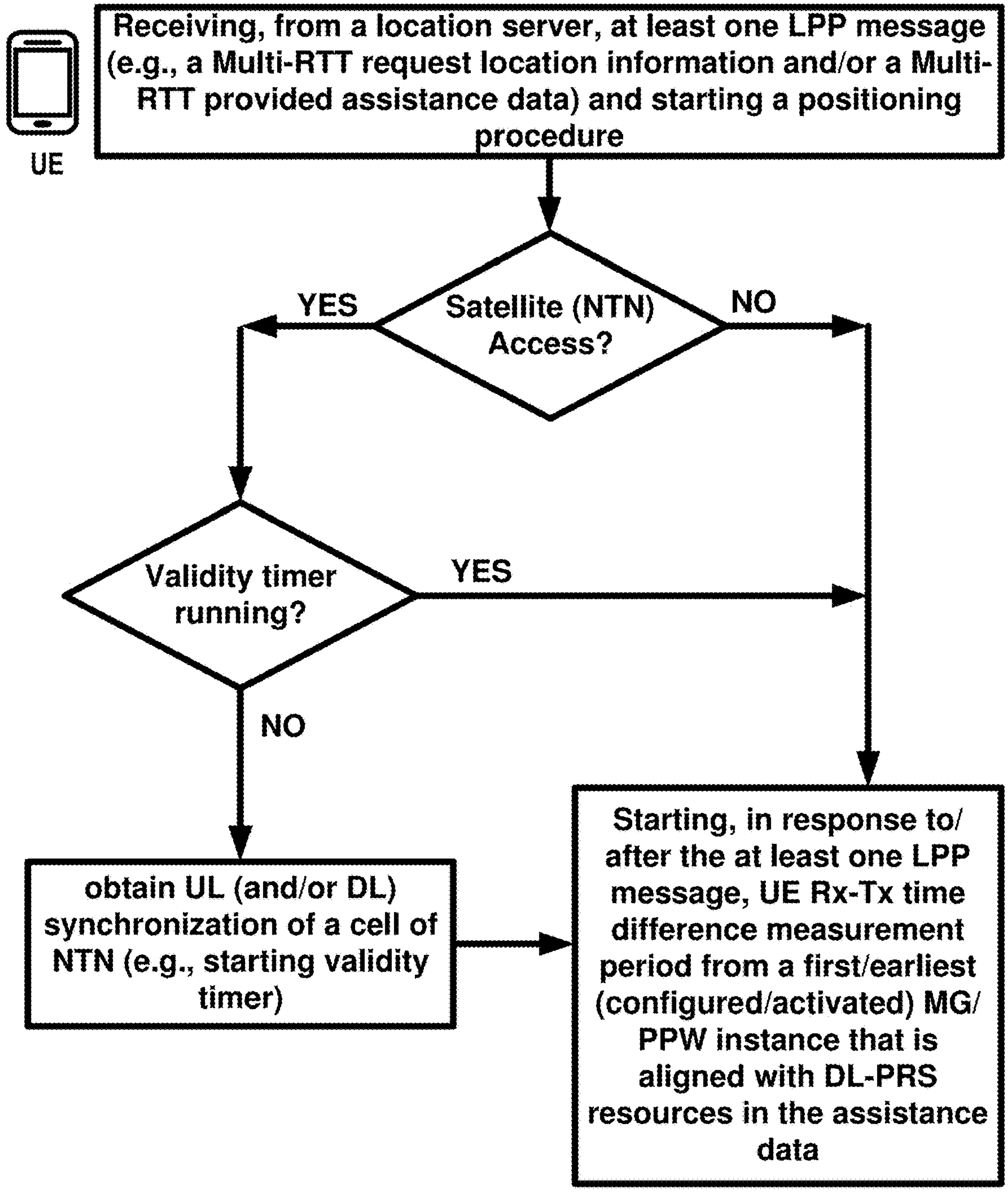
FIG. 40 illustrates an example flowchart of a multi-RTT positioning procedure in a non-terrestrial network per an aspect of the present disclosure.

FIG. 40 illustrates an example flowchart of multi-RTT positioning procedure in a non-terrestrial network per an aspect of the present disclosure. The wireless device may receive, from the location server (e.g., LMF), the at least one LPP message (e.g., the LPP request location information, e.g., the NR-Multi-RTT-RequestLocationInformation message and/or the LPP provide assistance data, e.g., NR-Multi-RTT-ProvideAssistanceData) of the LPP messages, e.g., the positioning procedure is the multi-RTT positioning procedure. For example, based on the positioning procedure being the multi-RTT positioning procedure, the wireless device may determine whether the access to the network is via the satellite access (e.g., NTN access, e.g., the serving cell is part of the NTN) or not. In response to the access to the network not being the satellite access (e.g., or being the terrestrial networks), the wireless device may start the UE Rx−Tx time difference measurement period (e.g., $T_{UERxTx,Total}$) of the at least one measurement period from the first/earliest (configured/activated) MG/PPW instance that is aligned with DL-PRS resources in the assistance data (e.g., NR-Multi-RTT-ProvideAssistanceData). In response to the access to the network not being the satellite access (or being the terrestrial networks) and the positioning procedure being the multi-RTT positioning procedure, the wireless device may determine whether the validity timer/duration of the NTN assistance data is expired/stopped or not. In response to the validity timer/duration of the NTN assistance data being running, the wireless device may start the UE Rx−Tx time difference measurement period of the at least one measurement period from the first/earliest (configured/activated) MG/PPW instance that is aligned with DL-PRS resources in the assistance data. In response to the validity timer/duration of the NTN assistance data not being running (or being expired) and the positioning procedure being the multi-RTT positioning procedure, the wireless device may obtain the UL synchronization of the cell (e.g., to start the validity duration) and then (e.g., after obtaining the UL synchronization of the cell) start the UE Rx−Tx time difference measurement period of the at least one measurement period from the first/earliest (configured/activated) MG/PPW instance that is aligned with DL-PRS resources in the assistance data.

Figure 41:
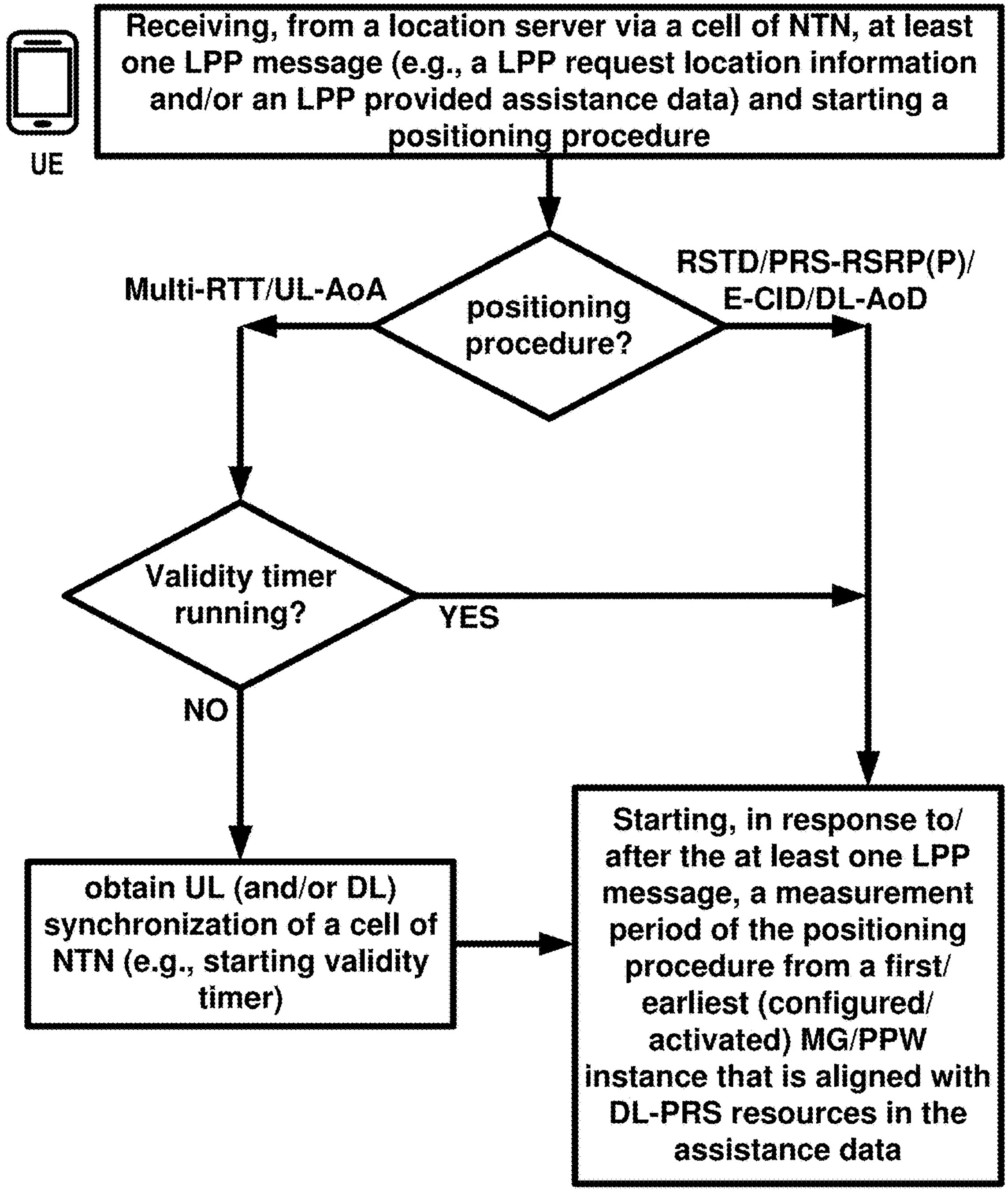
FIG. 41 illustrates an example flowchart of positioning procedure in a non-terrestrial network per an aspect of the present disclosure.

FIG. 41 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. The wireless device may, based on the at least one LPP message, determine a type of the positioning procedure e.g., whether the positioning procedure is (or comprises) the multi-RTT positioning procedure or PRS-RSRP(P) positioning procedure or RSTD positioning procedure or EC-ID positioning procedure.

For example, the type of the positioning procedure is the multi-RTT (e.g., the positioning procedure is (or comprises) the multi-RTT positioning procedure) based on the at least one LPP message comprises the NR-Multi-RTT-RequestLocationInformation message and/or the NR-Multi-RTT-ProvideAssistanceData message.

For example, the type of the positioning procedure is the RSTD (e.g., the positioning procedure is (or comprises) the RSTD positioning procedure) based on the at least one LPP message comprises the NR-TDOA-ProvideAssistanceData message and/or NR-TDOARequestLocationInformation message.

For example, the type of the positioning procedure is the PRS-RSRP(P) (e.g., the positioning procedure is (or comprises) the PRS-RSRP(P) positioning procedure) based on the at least one LPP message comprises the NR-DL-AoD-ProvideAssistanceData message and/or NR-DL-AoDRequestLocationInformation message.

In an example embodiment, as shown in FIG. 41, based on the positioning procedure being (or comprising) the multi-RTT positioning procedure, the wireless device may determine whether the validity timer/duration of the NTN assistance data is expired/stopped or not. In response to the validity timer/duration of the NTN assistance data being running, the wireless device may start the UE Rx–Tx time difference measurement period of the at least one measurement period from the first/earliest (configured/activated) MG/PPW instance that is aligned with DL-PRS resources in the assistance data (e.g., configured/indicated via NR-Multi-RTT-ProvideAssistanceData message). In response to the validity timer/duration of the NTN assistance data not being running (or being expired) and the positioning procedure being the multi-RTT positioning procedure, the wireless device may obtain the UL synchronization of the cell (e.g., to start the validity duration) and then (e.g., after obtaining the UL synchronization of the cell) start the UE Rx–Tx time difference measurement period of the at least one measurement period from the first/earliest (configured/activated) MG/PPW instance that is aligned with DL-PRS resources in the assistance data (e.g., configured/indicated via NR-Multi-RTT-ProvideAssistanceData message).

In an example embodiment, as shown in FIG. 41, based on the positioning procedure not being (or not comprising) the multi-RTT positioning procedure (e.g., the positioning procedure being/comprising the RSTD/RSRP(P)/E-CID positioning procedure), the wireless device may start a measurement period of the at least one measurement period corresponding to the positioning procedure from the first/earliest (configured/activated) MG/PPW instance that is aligned with DL-PRS resources in the assistance data (e.g., configured/indicated via the LPP assistance data message). In an example, the wireless device may start the RSTD measurement period of the at least one measurement period (e.g., corresponding to the RSTD positioning procedure) from the first/earliest (configured/activated) MG/PPW instance that is aligned with DL-PRS resources in the assistance data (e.g., configured/indicated via the NR-TDOA-ProvideAssistanceData message). In another example, the wireless device may start the PRS-RSRP(P) measurement period of the at least one measurement period (e.g., corresponding to the PRS-RSRP(P) positioning procedure) from the first/earliest (configured/activated) MG/PPW instance that is aligned with DL-PRS resources in the assistance data (e.g., configured/indicated via the NR-DL-AoDRequestLocationInformation message).

For example, the wireless device may determine whether the access to the network (network access) is satellite access (e.g., NTN access, e.g., the serving cell is part of the NTN) or not. In response to the access to the network not being the satellite access (e.g., or being the terrestrial networks), the wireless device may start the UE Rx-Tx time difference measurement period (e.g., $T_{UERxTx,Total}$) of the at least one measurement period from the first/earliest (configured/activated) MG/PPW instance that is aligned with DL-PRS resources in the assistance data (e.g., NR-Multi-RTT-ProvideAssistanceData). In response to the access to the network not being the satellite access (or being the terrestrial networks) and the positioning procedure being the multi-RTT positioning procedure, the wireless device may determine whether the validity timer/duration of the NTN assistance data is expired/stopped or not.

Figure 42:
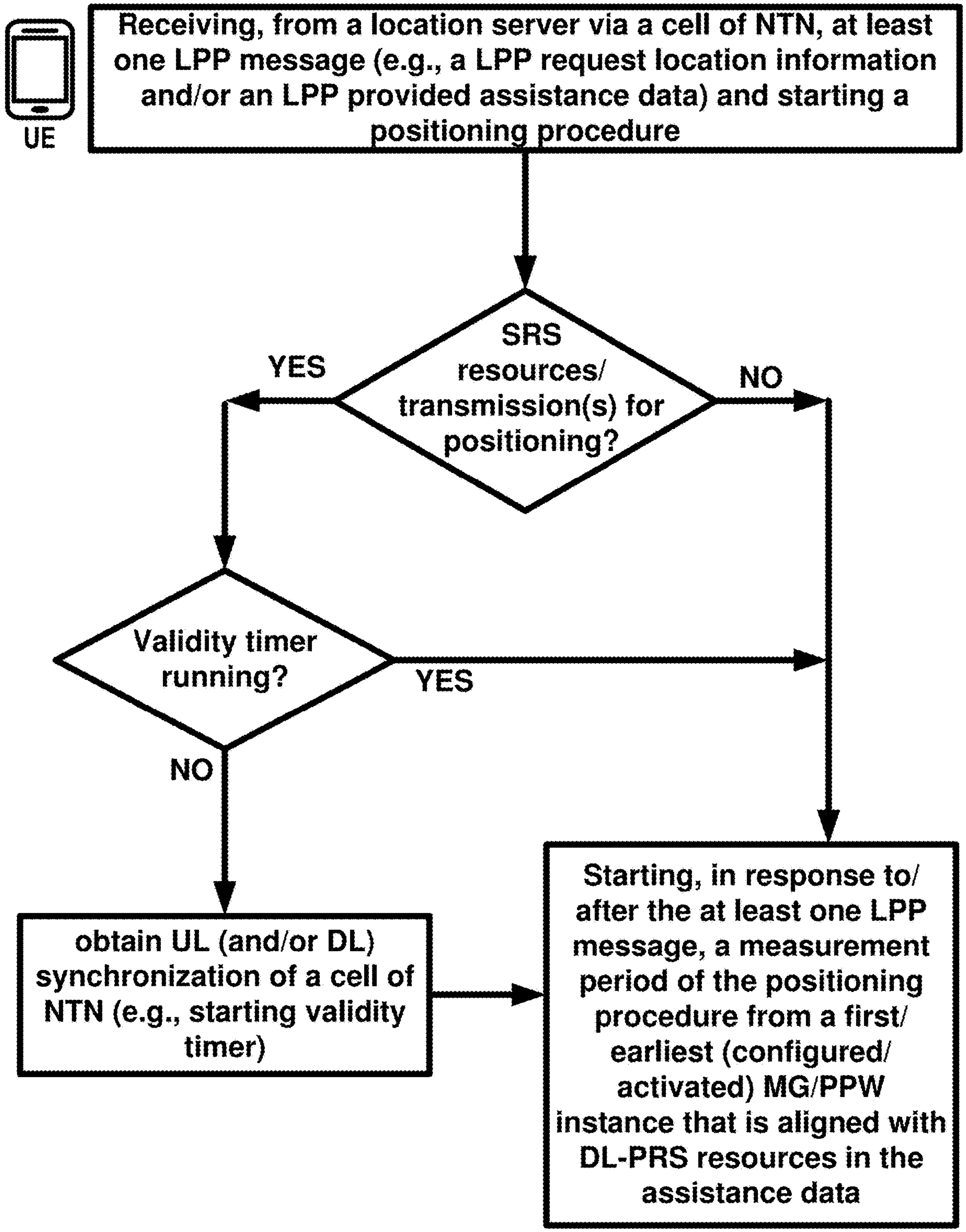
FIG. 42 illustrates an example flowchart of positioning procedure in a non-terrestrial network per an aspect of the present disclosure.

FIG. 42 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. The wireless device may, based on the at least one LPP message, determine whether the positioning procedure is based on SRS transmissions of the SRS resources/resource sets or not, e.g., whether the wireless device is expected/configured/indicated to transmit the SRS resources/resource sets as part of the ongoing positioning procedure.

In response to the positioning procedure not being based on SRS transmissions of the SRS resources/resource sets, the wireless device may start the measurement period of the at least one measurement period from the first/earliest (configured/activated) MG/PPW instance that is aligned with DL-PRS resources in the assistance data. In response to the positioning procedure being based on SRS transmissions of the SRS resources/resource sets, the wireless device may determine whether the validity timer/duration of the NTN assistance data is expired/stopped or not. In response to the validity timer/duration of the NTN assistance data being running and the positioning procedure being based on SRS transmissions of the SRS resources/resource sets, the wireless device may start the measurement period of the at least one measurement period from the first/earliest (configured/activated) MG/PPW instance that is aligned with DL-PRS resources in the assistance data. In response to the validity timer/duration of the NTN assistance data not being running (or being expired) and the positioning procedure being based on SRS transmissions of the SRS resources/resource sets, the wireless device may obtain the UL synchronization of the cell (e.g., to start the validity duration) and then (e.g., after obtaining the UL synchronization of the cell) start the measurement period of the at least one measurement period from the first/earliest (configured/activated) MG/PPW instance that is aligned with DL-PRS resources in the assistance data.

Figure 43:
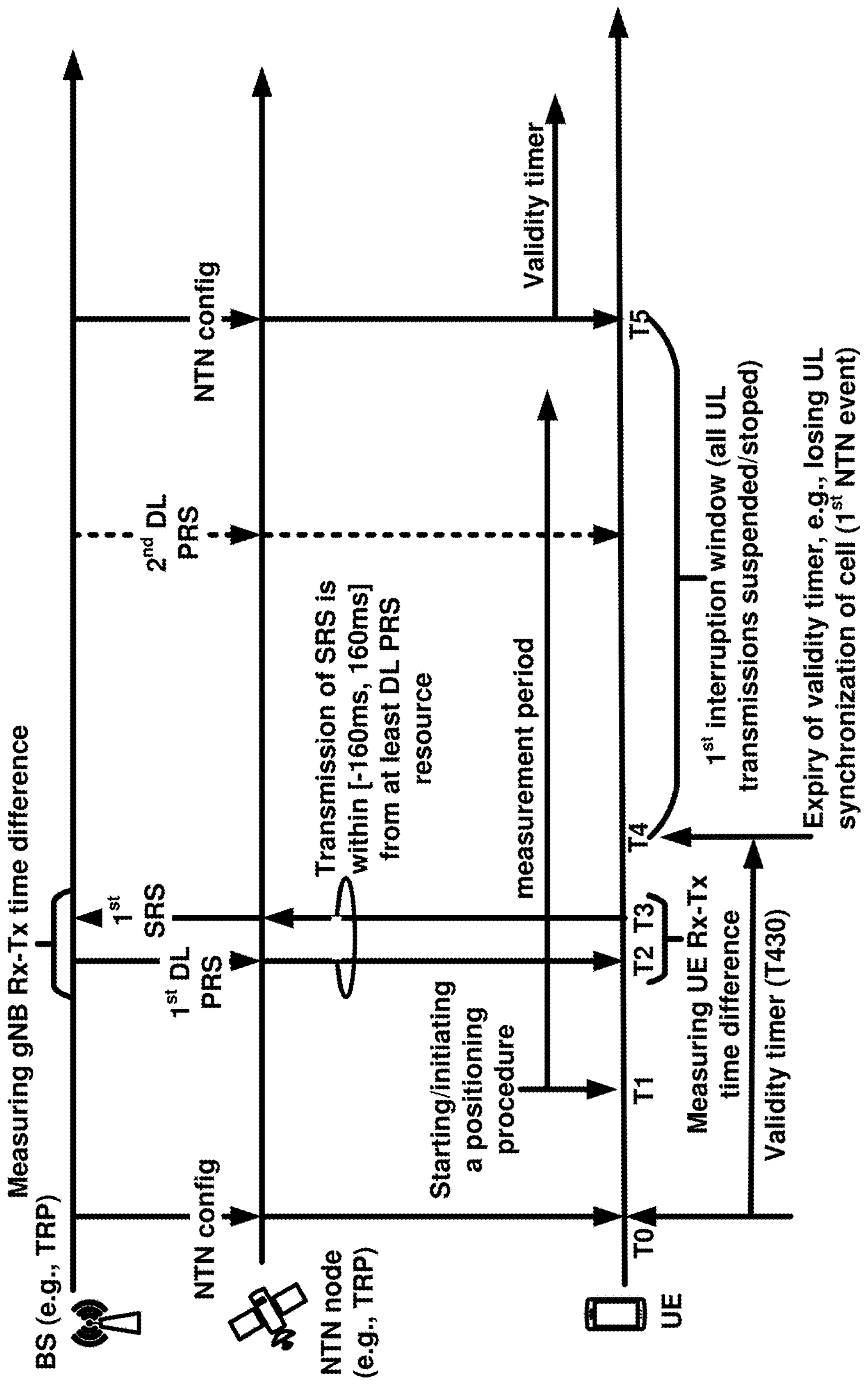
FIG. 43 shows an example of positioning procedure in a non-terrestrial network.
Figure 44:
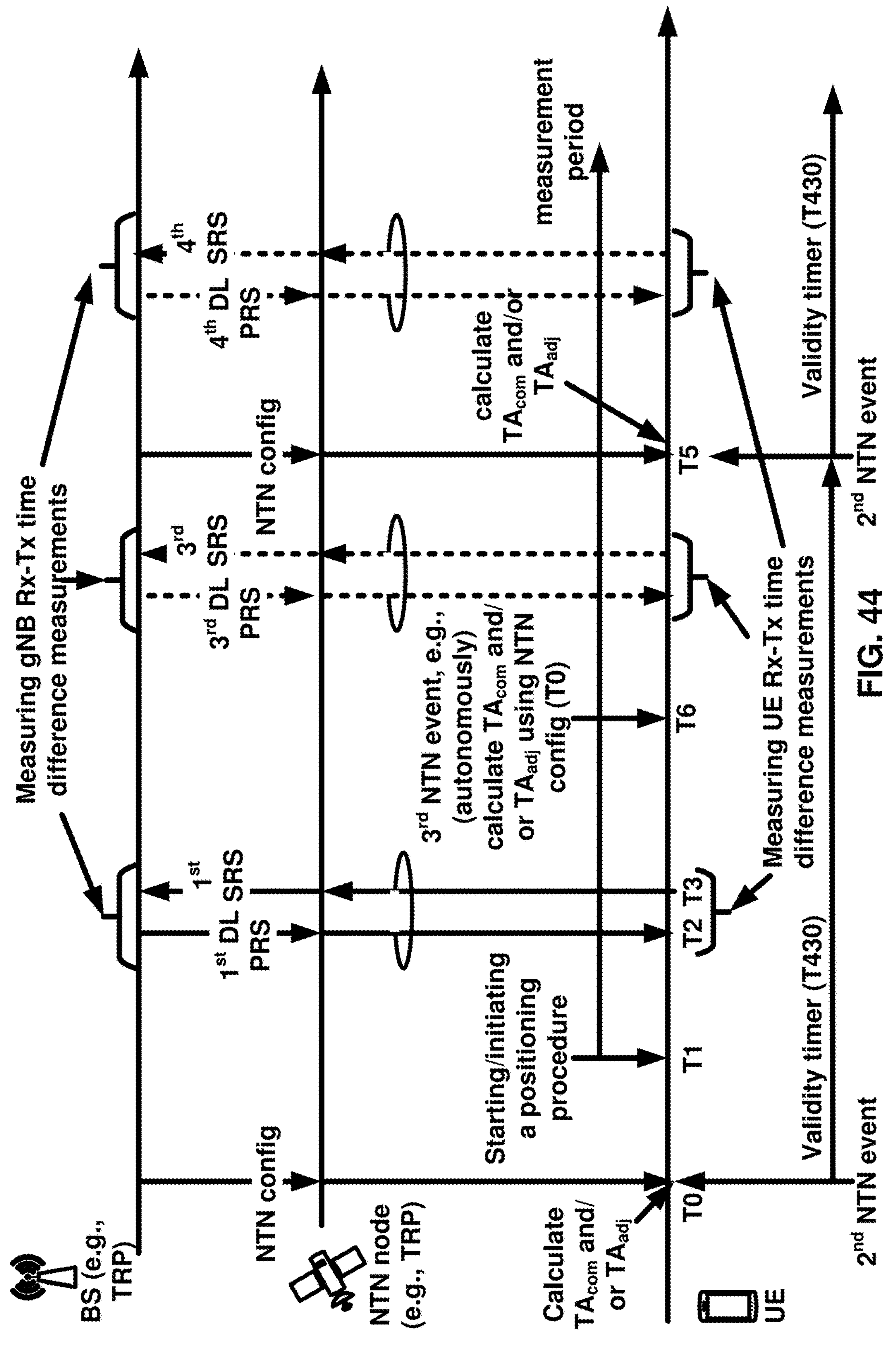
FIG. 44 shows an example of positioning procedure in a non-terrestrial network.
Figure 45:
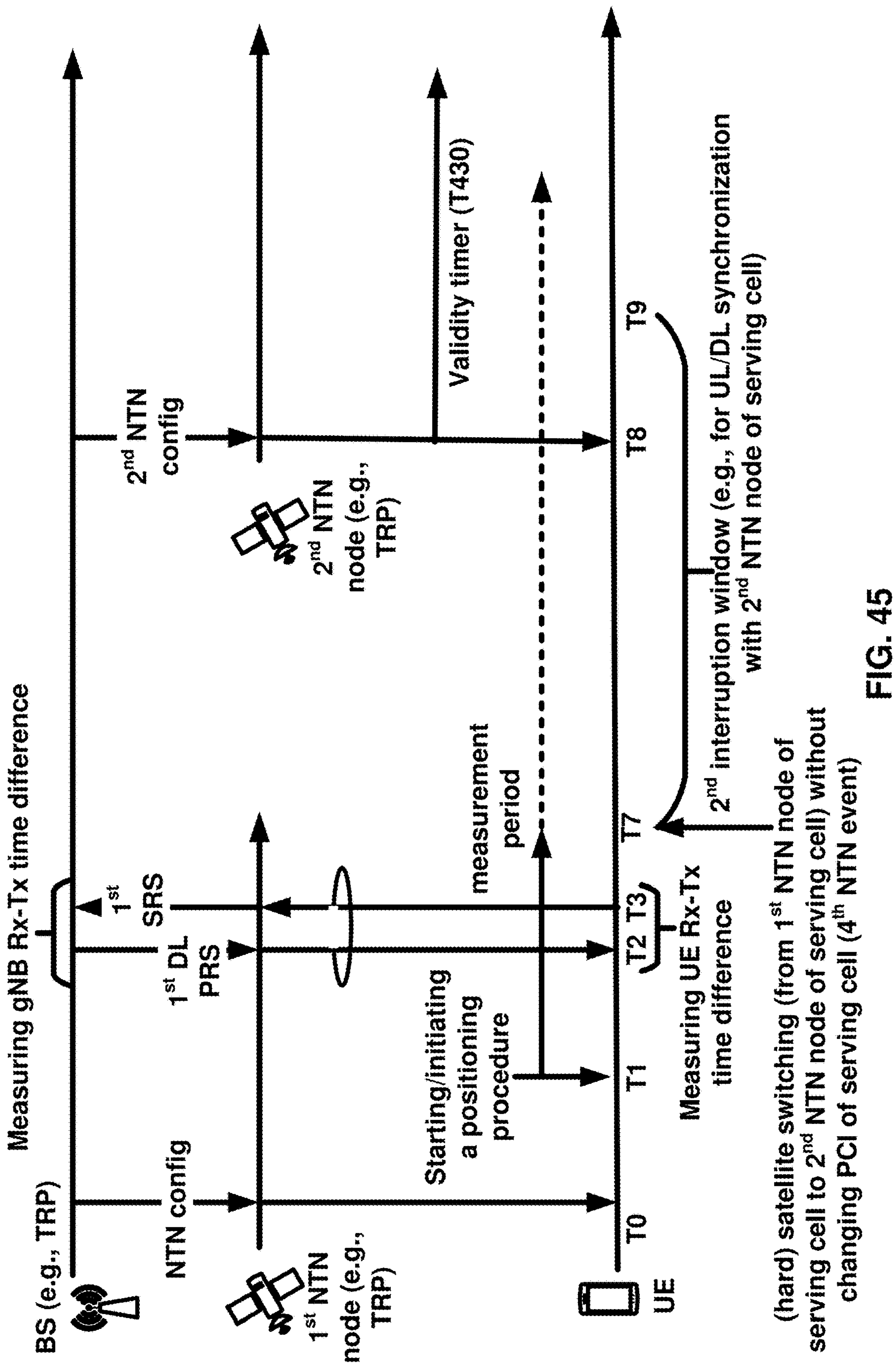
FIG. 45 shows an example of positioning procedure in a non-terrestrial network.

FIGS. 43-45 show examples of positioning procedure in a non-terrestrial network. The wireless device may perform the positioning procedure as described above in accordance with FIGS. 30-34. As shown in FIGS. 43-45, the wireless device may start/initiate the positioning procedure/method at time/occasion T1 (e.g., based on receiving the at least one LPP message of the one or more positioning messages/LPP messages from the location server, e.g., the LPP request location information message). The positioning procedure may be (or comprise) the multi-RTT positioning method/procedure and/or the RSTD positioning procedure or the like. The wireless device may start a measurement period (e.g., the UE Rx–Tx time difference measurement period) of the at least one measurement period after/in response to (or upon/based on) starting the positioning procedure. In existing technologies, as shown in FIG. 43, the wireless device may, while performing the positioning procedure, determine the validity timer of the serving cell (or the NTN assistance data) being expired/stopped (e.g., a first NTN event being occurred). In response to determining that the validity duration (of the serving cell) being expired/stopped (e.g., the first NTN event being occurred, e.g., at time/occasion T4 in FIG. 43), the wireless device may stop/halt/suspend (all) UL transmissions (e.g., PRACH, PUSCH, SR, PUCCH, SRS, or the like) via the serving cell (and/or flush HARQ buffers of the plurality of HARQ buffers) during a first interruption window (or duration or time). During the first interruption window the wireless device may suspend all UL transmissions (e.g., PRACH, PUSCH, SR, PUCCH, SRS, or the like). A start of the first interruption window may correspond to an expiry of the validity timer of the serving cell (e.g., an occurrence of the first NTN event), e.g., when the wireless device becomes UL unsynchronized with the base station of the serving cell. For example, upon the expiry of the validity duration of the serving cell and when the wireless device is not able to (re-)acquire the SIB19 (of the serving cell), the wireless device may become UL unsynchronized with the base station of the serving cell, e.g., for UL communication with the base station via the serving cell. As shown in FIG. 45, an end/expiry of the first interruption window may correspond to an occasion/time of acquiring/obtaining UL synchronization (e.g., receiving/reading the SIB19) of a cell (e.g., the serving cell or a source cell of the NTN or a target cell of the NTN), e.g., a starting of the validity timer of the cell (e.g., the serving cell). As shown in FIG. 43, the wireless device may, during the first interruption window, refrain from transmitting an SRS resource for positioning (e.g., corresponding to second DL PRS of the one or more DL PRS resources).

The implementation of the existing technologies may result in a degradation of accuracy/performance of the (ongoing) positioning procedure, e.g., due to the expiry of the validity time of the serving cell (e.g., the first NTN event has occurred) while performing the positioning procedure. For example, the wireless device may not be able to transmit SRS via the serving cell within the SRS transmission window (e.g., [−160, 160] msec) of the at least one DL PRS resource (e.g., of each of the TRPs in the assistance data). The wireless device may, when SRS transmissions are suspended during the first interruption window, fail to accurately measure/perform the UE Rx–Tx time difference measurements. The base station may, when SRS transmissions are suspended (by the wireless device) during the first interruption window, fail to accurately measure/perform the gNB Rx–Tx time difference measurements. The base station may not know whether the first NTN event being occurred. The location server may not be able to obtain/determine the position of the wireless device using the UE Rx–Tx time difference measurements and/or the gNB Rx–Tx time difference measurements.

In existing technologies, as shown in FIG. 44, the wireless device may, to determine the current TA value for UL transmissions (e.g., the one or more SRS transmissions during the measurement period), calculate/determine open-loop TA value comprising a common TA $$\left(\text{or TA\_com, e.g., } N_{TA,adj}^{common}\right)$$

and/or a service link delay $$\left(\text{or TA\_adj, e.g., } N_{TA,adj}^{UE}\right)$$

For example, at time/occasion T0 and/or T5 and in response to receiving SIB19 (e.g., the NTN-config), the wireless device may determine (or calculate/recalculate) the TA_com and/or the TA_adj (e.g., a first calculation/determination of the TA_com and/or the TA_adj). As shown in FIG. 44, the time/occasion T5 may be within the measurement period of the ongoing position procedure. The wireless device may, while the validity timer is running (not expired), determine a second NTN event being occurred during the measurement period. The second NTN event may correspond to receiving/acquiring SIB19 (e.g., a first calculation of TA value of the serving cell, e.g., based on the first calculation/determination of the TA_com and/or the TA_adj) during the measurement period. In existing technologies, the second (or the first) autonomous timing adjustment may not comprise (or fail to capture impact(s) of) the first calculation of the TA_com and/or the TA_adj, e.g., during the adjustment window prior/before an SRS transmission (e.g., the fourth SRS transmission in FIG. 44) of the one or more SRS transmissions.

In another example, as shown in FIG. 44, the wireless device may determine (or calculate/recalculate) the TA_com and/or the TA_adj at time/occasion T6, e.g., due to acquiring new GNSS-fix (e.g., a new location information of the wireless device) and/or using the NTN-config (receiving at time/occasion T0) to autonomously update/adjust the TA (e.g., TA_com and/or the TA_adj), e.g., a second calculation/determination (or adjustment or update) of the TA_com and/or the TA_adj. As shown in FIG. 44, time/occasion T6 may be within the measurement period of the ongoing position procedure. The wireless device may, while the validity timer is running (not expired), determine a third NTN event being occurred during the measurement period. The third NTN event may correspond to a second calculation of the TA based on the second calculation of the TA_com and/or the TA_adj (e.g., using the available/existing NTN-config and/or acquiring the GNSS-fix during the measurement period). In existing technologies, the second autonomous timing adjustment may not comprise (or fail to capture impact(s) of) the second calculation of the TA_com and/or the TA_adj, e.g., during the adjustment window prior/before an SRS transmission (e.g., the third SRS transmission in FIG. 44) of the one or more SRS transmissions.

Based on implementation of existing technologies, in the NTN, during the measurement period, the wireless device may use different TA_com and/or TA_adj (e.g., after/based on the first calculation of the TA_com and/or TA_adj and/or after/based on the second calculation of the TA_com and/or TA_adj). For example, the base station (or the location server) may not be aware that during the ongoing positioning procedure the second NTN event and/or the third NTN event being occurred at the wireless device. In implementation of existing technologies, as also shown in FIG. 44, the base station may (unknowingly) measure the gNB Rx−Tx time difference measurements while the wireless device is using different TA values across the one or more SRS transmissions. For example, the wireless device may use a different TA value for the second SRS transmission compared to a TA value used for the first SRS transmission. In some cases, the base station may use the first and the second SRS transmissions with respect to a same DL PRS resource (or different DL PRS resources) to measure gNB Rx−Tx time difference measurements. The location server may fail to (accurately) obtain/determine the position of the wireless device using the UE Rx−Tx time difference measurements and/or the gNB Rx−Tx time difference measurements, e.g., n (e.g., 3) UE Rx−Tx time difference measurements and/or the n gNB Rx−Tx time difference measurements may not be enough to provide sufficient robustness/accuracy.

In existing technologies, as shown in FIG. 45, the wireless device may, while performing the positioning procedure, determine that a satellite switching/switchover (or service link switching/switchover) being occurred (e.g., a fourth NTN event being occurred). The satellite switching may be a hard satellite switching or a soft satellite switching. As shown in FIG. 45, before the fourth NTN event has occurred (e.g., before/prior to the satellite switching procedure is triggered/initiated/started), the wireless device may communicate with the base station via a first NTN node/payload of the serving cell. After the satellite switching procedure being completed/triggered/initiated, the wireless device may communicate with the base station via a second NTN node of the serving cell. For example, during the satellite switching procedure (e.g., a second interruption time/window/period), the wireless device may acquire UL/DL synchronization/timing of the serving cell (e.g., of the second NTN node of the serving cell), e.g., acquiring SIB19 comprising a second NTN-config corresponding to the second NTN node at time/occasion T8. The second NTN-config (comprising ephemeris info/data of the second NTN node) may be different than the NTN-config received/acquired at time/occasion T0 (comprising ephemeris info/data of the first NTN node). In some examples, during the second interruption window the wireless device may halt/suspend/cancel (all) UL (or DL) transmissions via the serving cell. The second interruption window may comprise the first interruption window. For example, the satellite switching may not comprise reconfiguration of UL resources (e.g., the one or more SRS configuration parameters may be valid after the satellite switching at time/occasion T9).

The satellite switching may not be/comprise the handover procedure (e.g., reconfiguration of the one or more SRS configuration parameters). For example, the serving cell before the satellite switching and after the satellite switching is the same (e.g., the same PCI), e.g., PCI unchanged satellite switching. The satellite switching may be an inter/intra-satellite switching without base station/gateway change. The satellite switching may be a service link switching of the serving cell. In some examples, the one or more configuration parameters may stay unchanged due to the satellite switching, e.g., the satellite switching may not cause a reconfiguration of the UL/DL resources (e.g., DL-PRS resources/resource sets and/or SRS resources/resource sets).

In existing technologies, in response to determining that the fourth NTN event being occurred (e.g., at time/occasion T7 in FIG. 45), the wireless device may stop/halt/suspend (all) UL transmissions (e.g., PRACH, PUSCH, SR, PUCCH, SRS, or the like) via the serving cell during the second interruption window (or duration or time). As shown in FIG. 45, the wireless device may, during the second interruption window, refrain from transmitting an SRS (e.g., corresponding to second DL PRS of the one or more DL PRS resources). The implementation of the existing technologies may result in a degradation of accuracy/performance of the (ongoing) positioning procedure, e.g., due to the satellite switching in the serving cell (e.g., the fourth NTN event has occurred) while performing the positioning procedure. For example, the wireless device may not be able to transmit SRS via the serving cell within the SRS transmission window (e.g., [−160, 160] msec) of the at least one DL PRS resource (e.g., of each of the TRPs in the assistance data). The wireless device may, when SRS transmissions are suspended during the second interruption window, fail to accurately measure/perform the UE Rx−Tx time difference measurements. The base station may, when SRS transmissions are suspended during the second interruption window, fail to accurately measure/perform the gNB Rx−Tx time difference measurements. The location server may not be able to obtain/determine the position of the wireless device using the UE Rx−Tx time difference measurements and/or the gNB Rx−Tx time difference measurements.

Improvements in the positioning procedure in the NTN may improve accuracy of the positioning procedure or reduce latency of verifying the location of the wireless device (e.g., reduce latency of the positioning procedure).

Example embodiments of the present disclosure may provide enhancement for determining whether to restart a measurement period (e.g., $T_{RSTD,Total}$ and/or $T_{PRS\text{-}RSRP,total}$ and/or $T_{UERxTx,Total}$) when the wireless device is performing a positioning procedure in the NTN. For example, as compared to a terrestrial network scenario, in the NTN, measurements of the positioning procedure may depend on the open-loop TA value of the wireless device and/or ephemeris information/data of a serving NTN node, solutions of the present disclosure allow the wireless device to properly restart the measurement period in response to at least one NTN event (e.g., the first NTN event and/or the second NTN event and/or the third NTN event and/or the fourth NTN event) being occurred. Decision to restart the measurement period in response to at least one NTN event may further depend on a type of the positioning procedure. Embodiments of the present disclosure improve reliability/diversity of the measurements (e.g., the gNB/UE may use different instances of measurements across the measurement period to improve reliability of the measurements). By restarting the measurement period as a result of an NTN event, the wireless device and/or the base station are able to perform new measurements to improve the reliability of the measurements.

The wireless device may receive from the location server via a cell (e.g., the serving cell) of NTN, the at least one LPP message (e.g., the LPP request location information and/or the LPP provide assistance data). For example, the wireless device may start, in response to/after the at least one LPP message, the at least one (positioning) measurement period (corresponding to the ongoing positioning procedure/session), e.g., from/after a first/earliest (configured/activated)

MG/PPW instance that is aligned with DL-PRS resources in the assistance data, e.g., the time $T_{RSTD,Total}$ (and/or $T_{PRS-RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message). In an example embodiment, the wireless device may, in response to (or after or based on) occurring an NTN event (e.g., the first NTN event and/or the second NTN event and/or the third NTN event and/or the fourth NTN event), restart the at least one (positioning) measurement period.

In an example embodiment, the wireless device may, during the at least one measurement period (e.g., during the time $T_{RSTD,Total}$ and/or $T_{PRS-RSRP,total}$ and/or $T_{UERxTx,Total}$), determine the first NTN event being occurred in response to/based on the validity timer of the serving cell (or the NTN assistance data) being expired/stopped.

In an example embodiment, the wireless device may, during the at least one measurement period (e.g., during the time $T_{RSTD,Total}$ and/or $T_{PRS-RSRP,total}$ and/or $T_{UERxTx,Total}$), determine the fourth NTN event being occurred in response to/based on a service link switching/switchover/switch (procedure) being initiated/triggered/started.

In an example embodiment, the wireless device may, during the at least one measurement period (e.g., during the time $T_{RSTD,Total}$ and/or $T_{PRS-RSRP,total}$ and/or $T_{UERxTx,Total}$), determine the second NTN event being occurred in response to/based on receiving/acquiring SIB19 (e.g., NTN assistance information) via the cell of the NTN (e.g., while the validity timer/duration of the cell is running and/or when the UL synchronization of the cell is obtained).

In an example embodiment, the wireless device may, during the at least one measurement period (e.g., during the time $T_{RSTD,Total}$ and/or $T_{PRS-RSRP,total}$ and/or $T_{UERxTx,Total}$), determine the third NTN event being occurred in response to/based on a GNSS-fix (e.g., obtaining/acquiring a new GNSS location information of the wireless device), e.g., while the validity timer is running (not expired). For example, the wireless device may, during the at least one measurement period (e.g., during the time $T_{RSTD,Total}$ and/or $T_{PRS-RSRP,total}$ and/or $T_{UERxTx,Total}$), determine the second NTN event being occurred in response to/based on (autonomously) (re-)calculating/(re-)determining the open-loop TA value of the wireless device (e.g., the TA_com and/or the TA_adj) using the acquired NTN assistance information/data of the cell.

Example embodiments may allow the wireless device to use the same open-loop TA value (e.g., TA_com and/or TA_adj) during the at least one measurement period. By using the same open-loop TA value (e.g., TA_com and/or TA_adj) during the at least one measurement period, the UE/gNB Rx−Tx time difference measurements during the at least one measurement period may improve diversity/reliability of the measurements (positioning).

In an example embodiment, the wireless device may, when/if the first NTN event occurs, restart the at least one (positioning) measurement period after obtaining UL synchronization of the cell (e.g., after starting the validity timer of the cell). For example, the time $T_{RSTD,Total}$ (and/or $T_{PRS-RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after obtaining UL synchronization of the cell (e.g., after starting the validity timer of the cell).

In an example embodiment, the wireless device may, when/if the fourth NTN event occurs, restart the at least one (positioning) measurement period after the (ongoing) service link switch procedure being performed/finished. For example, the time $T_{RSTD,Total}$ (and/or $T_{PRS-RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after an expiry (or a stopping) of the second interruption window. In another example, the time $T_{RSTD,Total}$ (and/or $T_{PRS-RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after obtaining UL (or DL) synchronization of the second NTN node of the cell.

In an example embodiment, the wireless device may, in response to starting an interruption window (e.g., the first interruption window, e.g., when the first NTN event has occurred or the second interruption window, e.g., when the second NTN event has occurred), restarting the at least one (positioning) measurement period based on a length of the interruption window being larger than a first threshold (e.g., 160 ms). The first threshold may be based on the SRS transmission window (e.g., [−160, 160] msec). The one or more configuration parameters may indicate the first threshold. For example, the LPP messages may indicate the first threshold. In some cases, the first threshold is predefined. In an example embodiment, when the length of the interruption window is smaller than the first threshold, the wireless device may continue and complete the ongoing measurements of the positioning procedure, e.g., UE Rx−Tx time difference measurements, (e.g., avoid restarting the measurement period). In an example embodiment, when the length of the interruption window is greater than the first threshold, the wireless device may stop with the ongoing measurements (e.g., by restarting the measurement period).

In an example embodiment, the wireless device may, in response to starting an interruption window (e.g., the first interruption window, e.g., when the first NTN event has occurred or the second interruption window, e.g., when the second NTN event has occurred), restart the at least one (positioning) measurement period based on a time (or time difference or a time gap) from measuring/receiving a latest/final DL PRS resource (before the starting the interruption window) being greater than the second threshold (e.g., 160 ms). The second threshold may be based on the SRS transmission window (e.g., [−160, 160] msec). The one or more configuration parameters may indicate the second threshold. For example, the LPP messages may indicate the second threshold. In some cases, the second threshold is pre-defined.

In an example embodiment, the wireless device may, in response to an NTN event (e.g., the first NTN event or the second NTN event) occurring, restart the at least one (positioning) measurement period based on a time (or time difference or a time gap) from measuring/receiving a latest/final DL PRS resource (before the occurring the NTN event) being greater than the second threshold. The wireless device may, in response to occurring an NTN event (e.g., the first NTN event or the second NTN event), avoid restarting the at least one (positioning) measurement period (e.g., continue and complete the measurements of the positioning procedure, e.g., UE Rx−Tx time difference measurements) based on the time (or time difference or the time gap) from measuring/receiving the latest/final DL PRS resource (before the occurring the NTN event) being smaller than the second threshold.

In an example embodiment, the wireless device may, in response to occurring an NTN event (e.g., the first NTN event or the second NTN event), restarting the at least one (positioning) measurement period based on a time (or time difference or a time gap) from transmitting a latest/final SRS resource (before the occurring the NTN event) being greater than the second threshold. The wireless device may, in response to occurring an NTN event (e.g., the first NTN event or the second NTN event), avoid restarting the at least one (positioning) measurement period (e.g., continue and complete the measurements of the positioning procedure, e.g., UE Rx−Tx time difference measurements) based on the time (or time difference or the time gap) from measuring/receiving the latest/final SRS resource (before the occurring the NTN event) being smaller than the second threshold.

In an example embodiment, based on at least one of the third NTN event and/or the second NTN event being occurred during the UE Rx−Tx time different measurement period (e.g., $T_{UERxTx,Total}$), the wireless device may restart the UE Rx−Tx time different measurement period. Based on at the first NTN event being occurred during the UE Rx−Tx time different measurement period (e.g., $T_{UERxTx,Total}$), the wireless device may restart the UE Rx−Tx time different measurement period after obtaining the UL synchronization of the cell of the NTN (e.g., after starting the validity timer of the cell and/or after the expiry of the first interruption window). Based on at the fourth NTN event being occurred during the UE Rx−Tx time different measurement period (e.g., $T_{UERxTx,Total}$), the wireless device may restart the UE Rx−Tx time different measurement period after obtaining the UL (and/or DL) synchronization of the second NTN node of the cell (e.g., after starting the validity timer of the cell corresponding to the second NTN-config and/or after the expiry of the second interruption window. In an example embodiment, based on the fourth NTN event being occurred during the measurement period (e.g., $T_{RSTD,Total}$ and/or $T_{PRS\text{-}RSRP,total}$), the wireless device may restart the measurement period (e.g., $T_{RSTD,Total}$ and/or $T_{PRS\text{-}RSRP,total}$) after obtaining the DL (and/or UL) synchronization of the cell (via the second NTN node) of the NTN (e.g., after the expiry of the second interruption window).

In an example embodiment, based on the fourth NTN event being occurred during the measurement period (e.g., $T_{RSTD,Total}$ and/or $T_{PRS\text{-}RSRP,total}$), the wireless device may continue and complete the measurements (e.g., avoid restarting the measurement period $T_{RSTD,Total}$ and/or $T_{PRS\text{-}RSRP,total}$).

In an example embodiment, based on at least one of the first NTN event and/or the second NTN event and/or the third NTN event being occurred during the measurement period (e.g., $T_{RSTD,Total}$ and/or $T_{PRS\text{-}RSRP,total}$), the wireless device may continue and complete the measurements (e.g., avoid restarting the measurement period $T_{RSTD,Total}$ and/or $T_{PRS\text{-}RSRP,total}$).

These and other features of the present disclosure are described further below.

FIG. 46 illustrates an example flowchart of positioning procedure in a non-terrestrial network per an aspect of the present disclosure. The wireless device may receive from the location server via a cell (e.g., the serving cell) of NTN, the at least one LPP message (e.g., the LPP request location information and/or the LPP provide assistance data). For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message).

In an example embodiment, the wireless device may, in response to (or after or based on) occurring an NTN event, restart the at least one (positioning) measurement period. The NTN event (as discussed with respect to FIGS. 43-45 above) may be at least one of the following: the first NTN event, e.g., an expiry of validity duration/timer (of the NTN assistance data/information) of the cell (and/or losing UL synchronization of the cell); and/or the second NTN event, e.g., (re-)calculating/(re-)determining/updating/(re-measuring) the open-loop TA value (e.g., at least one of TA_com and/or TA_adj) in response to acquiring SIB19 (e.g., the NTN assistance data) via the cell while the validity duration of the cell is running; and/or the NTN event, e.g., (autonomously) updating the open-loop TA value using the acquired SIB19 of the cell while the validity duration of the cell is running; and/or the fourth NTN event, e.g., switching from the first NTN node of the cell to the second NTN node of the cell for the serving link switch (e.g., with unchanged PCI of the cell). For example, the NTN event may not correspond to the handover and/or addition of a second cell (SCell/PSCell) and/or release of a third cell (SCell/PSCell). For example, the NTN event may not correspond to a reconfiguration of the SRS resources/resource sets (e.g., in response to receiving an RRC reconfiguration/release message).

The wireless device may, during the at least one measurement period (e.g., during the time $T_{RSTD,Total}$ and/or $T_{PRS\text{-}RSRP,total}$ and/or $T_{UERxTx,Total}$), determine the first NTN event being occurred in response to/based on the validity timer of the serving cell (or the NTN assistance data) being expired/stopped. For example, the wireless device may, during the at least one measurement period (e.g., during the time $T_{RSTD,Total}$ and/or $T_{PRS\text{-}RSRP,total}$ and/or $T_{UERxTx,Total}$), determine the first NTN event being occurred in response to/based on the UL synchronization of the cell being lost. In another example, the wireless device may, during the at least one measurement period (e.g., during the time $T_{RSTD,Total}$ and/or $T_{PRS\text{-}RSRP,total}$ and/or $T_{UERxTx,Total}$), determine the first NTN event being occurred in response to/based on the NTN assistance data/information (of the cell) become invalid for UL transmissions via the cell. In another example, the wireless device may, during the at least one measurement period (e.g., during the time $T_{RSTD,Total}$ and/or $T_{PRS\text{-}RSRP,total}$ and/or $T_{UERxTx,Total}$), determine the first NTN event being occurred in response to/based on the first interruption window/duration being started.

The wireless device may, during the at least one measurement period (e.g., during the time $T_{RSTD,Total}$ and/or $T_{PRS\text{-}RSRP,total}$ and/or $T_{UERxTx,Total}$), determine the second NTN event being occurred in response to/based on receiving/acquiring SIB19 (e.g., NTN assistance information) via the cell of the NTN (e.g., while the validity timer/duration of the cell is running and/or when the UL synchronization of the cell is obtained). For example, the wireless device may, during the at least one measurement period (e.g., during the time $T_{RSTD,Total}$ and/or $T_{PRS\text{-}RSRP,total}$ and/or $T_{UERxTx,Total}$), determine the second NTN event being occurred in response to/based on calculating/determining (using the acquired SIB19 and/or the NTN assistance information) the open-loop TA value (of the cell of the NTN), e.g., calculating/determining the common TA $$\left(\text{or TA\_com, e.g., } N_{TA,adj}^{common}\right)$$

and/or the service link delay $$\left(\text{or TA\_adj, e.g., } N_{TA,adj}^{UE}\right).$$

In another example, the wireless device may, during the at least one measurement period (e.g., during the time $T_{RSTD,Total}$ and/or $T_{PRS\text{-}RSRP,total}$ and/or $T_{UERxTx,Total}$), determine the second NTN event being occurred in response to/based on the first calculation/determination of the TA_com and/or the TA_adj, e.g., while the validity timer is running (not expired).

The wireless device may, during the at least one measurement period (e.g., during the time $T_{RSTD,Total}$ and/or $T_{PRS\text{-}RSRP,total}$ and/or $T_{UERxTx,Total}$), determine the third NTN event being occurred in response to/based on a GNSS-fix (e.g., obtaining/acquiring a new GNSS location information of the wireless device), e.g., while the validity timer is running (not expired). For example, the wireless device may, during the at least one measurement period (e.g., during the time $T_{RSTD,Total}$ and/or $T_{PRS\text{-}RSRP,total}$ and/or $T_{UERxTx,Total}$), determine the second NTN event being occurred in response to/based on (autonomously) (re-)calculating/(re-)determining the open-loop TA value of the wireless device (e.g., the TA_com and/or the TA_adj) using the acquired NTN assistance information/data of the cell. In another example, the wireless device may, during the at least one measurement period (e.g., during the time $T_{RSTD,Total}$ and/or $T_{PRS\text{-}RSRP,total}$ and/or $T_{UERxTx,Total}$), determine the second NTN event being occurred in response to/based on the second calculation/determination (or adjustment or update) of the TA_com and/or the TA_adj.

Example embodiments may allow the wireless device to use the same open-loop TA value (e.g., TA_com and/or TA_adj) during the at least one measurement period.

The wireless device may, during the at least one measurement period (e.g., during the time $T_{RSTD,Total}$ and/or $T_{PRS\text{-}RSRP,total}$ and/or $T_{UERxTx,Total}$), determine the fourth NTN event being occurred in response to/based on a service link switching/switchover/switch (procedure) being initiated/triggered/started. In another example, the wireless device may, during the at least one measurement period (e.g., during the time $T_{RSTD,Total}$ and/or $T_{PRS\text{-}RSRP,total}$ and/or $T_{UERxTx,Total}$), determine the first NTN event being occurred in response to/based on the second interruption window/duration being started. The wireless device may initiate/trigger/start the service link switching/switchover/switch procedure for switching from the first NTN node of the cell to the second NTN node of the cell without changing the PCI of the cell (e.g., without performing/initiating/triggering the handover and/or adding/removing/releasing a second cell of the NTN). The service link switching/switchover/switch procedure may be for disconnecting from the first NTN node of the cell and connecting to the second NTN node of the cell without changing the PCI of the cell (e.g., without performing/initiating/triggering the handover and/or adding/removing/releasing a second cell of the NTN).

The service link switching/switchover/switch procedure may, for example, be the satellite switching/switchover procedure. The service link switching/switchover/switch procedure may, for example, be different than a feeder link switching/switchover procedure. The service link switching/switchover/switch procedure may be a hard service link switching/switchover/switch procedure (e.g., the hard satellite switching) or a soft service link switching/switchover/switch procedure (e.g., the soft satellite switching).

In some implementations, the wireless device may start the service link switching/switchover/switch procedure (and/or the second interruption window) based on receiving a message (e.g., an RRC message and/or a MAC CE and/or a DCI) from the base station indicating/triggering the service link switching/switchover/switch procedure.

In other implementations, the wireless device may start the service link switching/switchover/switch procedure (and/or the second interruption window) based on the NTN assistance data (of the cell), e.g., a t-Service and/or t-Start and the like.

In an example, the SRS resources/resource sets (configured by the one or more SRS configuration parameters) and/or the DL PRS resources/resource sets (configured by the LPP messages) may not be reconfigured as a result of the service link switching/switchover/switch procedure, e.g., the SRS resources/resource sets for the positioning (e.g., the ongoing positioning procedure) stays valid after the service link switching/switchover/switch procedure being performed. Compared to the handover, the service link switching may not result in reconfiguration of the SRS resources/resource sets. The wireless device may restart the at least one measurement period in response to occurring of the fourth NTN event as during the service link switching UL/DL timing of the wireless device may change (e.g., due to acquiring the second NTN-config of the second NTN node).

The service link switchover procedure (e.g., a service link switching procedure) may be for changing the service link from a first service link to a second service link. For example, based on the service link switchover, the wireless device may switch from the first NTN node to the second NTN node. For example, the second NTN node may connect to the source NTN Gateway. In one example, the second service link may be associated with the Gateway/base station. In another example, the second service link may be associated with the second/target Gateway/base station. For a hard service link switchover (compared to a soft service link switchover), the wireless device may connect to only one NTN node (e.g., the first NTN node or the second NTN node) at any given time, i.e., a radio link interruption (e.g., the second interruption window) may occur during the transition between the service links (e.g., during the service link switchover procedure). Under/based on the soft service link switchover procedure, the wireless device may simultaneously communicate with both the first NTN node (e.g., via the first cell) and the second NTN node (e.g., via the second cell).

The source (first) cell and/or the target (second) cell may be quasi-earth-fixed cells. In some other cases, the source cell and/or the target cell may be earth-moving cells.

For example, a handover (HO) procedure may comprise switching from a first NTN node/payload to a second NTN node/payload. For example, the first NTN node (and/or the second NTN node) may be a LEO satellite (e.g., an NGEO satellite) or an MEO satellite or a GEO satellite. In some implementations, the HO procedure may correspond for a (hard or soft) service link switching/switchover procedure. In other implementations, the HO procedure may correspond to a (hard or soft) feeder link switching/switchover procedure. For example, the one or more configuration parameters (e.g., an RRC reconfiguration message) may indicate (e.g., via a configured parameter) whether a (hard or soft) service link switching/switchover procedure is based on the HO procedure or not. A handover command may indicate the configured parameter.

In an example, based on the configured parameter being configured/enabled (or not being disabled or not being absent from the one or more configuration parameters), the wireless device may not perform/trigger/initiate a handover procedure in response to starting/triggering/initiating (or for performing) the feeder link switching/switchover procedure. Based on the configured parameter not being configured/enabled (or being disabled or being absent from the one or more configuration parameters), the wireless device may perform/trigger/initiate the handover procedure in response to starting/triggering/initiating (or for performing) the feeder link switching/switchover procedure.

In another example, based on the handover command indicating a second PCI (e.g., PCI of the target cell) that is different than a first PCI (e.g., PCI of the source cell), the wireless device may perform/trigger/initiate the handover procedure in response to starting/triggering/initiating (or for performing) the feeder link switching/switchover procedure. Based on the handover command indicating the second PCI (e.g., PCI of the target cell) that is the same as the first PCI (e.g., PCI of the source cell), the wireless device may avoid performing/triggering/initiating the handover procedure in response to starting/triggering/initiating (or for performing) the feeder link switching/switchover procedure.

A serving cell (e.g., the first cell and/or the second cell) may have a (unique) cell ID/identification/index (e.g., physical cell ID, PCI). The source cell may correspond to a first PCI (e.g., PCI 1) and the target cell may correspond to a second PCI (e.g., PCI 2). The PCI of the source cell (e.g., the first PCI, e.g., PCI 1) and the PCI of the target cell (e.g., the second PCI, e.g., PCI 2) may (depending on NW configuration) be different (e.g., a PCI changed scenario, or a PCI changed HO procedure) or be the same (e.g., PCI unchanged scenario, e.g., a PCI unchanged HO procedure). In one example, based on the service link switching procedure (or being started or being completed), the cell ID/identification/index of the serving cell may not change, e.g., the source cell and the target cell may have the same PCI, e.g., the PCI unchanged (or fixed) scenario (or scheme or case or protocol or method), e.g., no handover procedure. In another example, based on the handover procedure, the source cell and the target cell may have different PCIs (e.g., PCI 1 corresponding to the source cell and PCI 2 corresponding to the target cell may not be equal), e.g., the PCI changed scenario.

In some cases, the HO procedure may correspond to at least one of the following scenarios: an intra-satellite handover with the same feeder link (i.e., with same NTN gateway/base station or without NTN gateway/base station switch); or an intra-satellite handover with different feeder links (i.e., with NTN gateway/base station switch); or inter-satellite handover with the NTN gateway/base station switch; or inter-satellite handover without the NTN gateway/base station switch.

In some other cases, the HO procedure may not comprise at least one of the following scenarios: the intra-satellite handover (e.g., the service link switching) with the same feeder link (i.e., with same NTN gateway/base station or without NTN gateway/base station switch); and/or the inter-satellite handover without the NTN gateway/base station switch.

The wireless device may, prior to performing the HO procedure (e.g., for receiving the HO command via the source cell), communicate (transmit/receive) with a source base station (e.g., of the source cell) via the non-terrestrial network (NTN), e.g., the wireless device and the source base station may operate in the NTN and/or the source base station may be an NTN base station and/or the source cell (e.g., a source serving cell) may be part of the NTN.

For example, the wireless device may communicate via the first NTN node with the source base station. The first NTN node may have (or be associated with) a unique identification number. The first NTN node may correspond to a first ephemeris data/information (e.g., first ephemeris info of a first NTN-config).

The wireless device may, by performing the HO procedure, communicate with a target base station (e.g., of the target cell or a second cell) via the non-terrestrial network (NTN), e.g., the wireless device and the target base station may operate in the NTN and/or the target base station may be an NTN base station and/or the target cell (e.g., a target serving cell) may be part of the NTN. The wireless device may, for example, switch from the first NTN node to the second NTN node for communicating with the target cell (or the target base station).

In some scenarios of the HO procedure, the second NTN node may be different than the first NTN node. For example, the second NTN node may have (or be associated with) a unique identification number that is different than the identification number of the first NTN node.

In some implementations of the HO procedure, the source base station and the target base station may be a same base station (e.g., connecting to the first NTN node and/or the second NTN node via a same NTN gateway), e.g., the intra-satellite handover with the same feeder link. In other implementations of the HO procedure, the source base station and the target base station may not be a same base station (e.g., the source base station is connecting to the first NTN node via a first NTN gateway and/or the target base station is connecting to the second NTN node via a second NTN gateway), e.g., an intra-satellite handover with different feeder links and/or inter-satellite handover with NTN gateway/base station switch.

The wireless device may communicate (transmit/receive) with the source base station (and/or a source NTN Gateway) on the serving cell (e.g., the first cell) of the NTN. For example, the communication (or connection) between the wireless device and the source base station (and/or the source NTN Gateway) may be via an NTN node/payload (e.g., the first NTN node or the second NTN node) of the NTN. The communication between the NTN node and the source NTN Gateway is through/via a first feeder link. The source NTN Gateway may be associated (or correspond to or communicate with) the source base station and/or the first feeder link.

The feeder link switchover procedure (e.g., a feeder link switching procedure) may be ongoing/started (e.g., by/at the NTN node), e.g., in order to change the feeder link from the first feeder link to a second feeder link. For example, based on the feeder link switchover, the NTN node may switch from the source NTN Gateway to a target NTN Gateway (and/or from the source base station to the target base station). The second feeder link may be associated with the target Gateway/base station. By performing/terminating the feeder link switchover, the wireless device's communication with the target base station (and/or the target NTN Gateway) is through the NTN node and the second feeder link (e.g., the NTN node connects to the target NTN Gateway and/or the target base station).

For a hard feeder link switchover (compared to a soft feeder link switchover), the NTN node connects to only one NTN Gateway at any given time, i.e., a radio link interruption may occur during the transition between the feeder links (e.g., during the feeder link switchover procedure). For example, for the hard feeder link switchover, the NTN node only connects to the source NTN Gateway prior to starting the feeder link switchover and after finishing/performing the (hard) feeder link switchover, the NTN node only connects to the target NTN gateway. The radio link interruption time/window/duration may correspond for a duration/window for performing the (hard) feeder link switchover at the NTN node (and/or the network side). Under/based on the soft feeder link switchover procedure, the wireless device may simultaneously communicate with both the source base station (e.g., on/via a source serving cell, e.g., the source cell), e.g., and the target base station (e.g., on/via the target serving cell, e.g., the target cell), e.g., during the soft feeder link switchover procedure (being ongoing).

For example, based on switching from the first NTN node to the second NTN node, the wireless device may determine whether to send/transmit to the location server the LPP request assistance data message or not. For example, in response to the PCI of the serving cell being changed based on/in response to/after the switching from the first NTN node to the second NTN node, the wireless device may send/transmit to the location server the LPP request assistance data message. In an example embodiment, in response to the PCI of the serving cell being unchanged based on/in response to/after the switching from the first NTN node to the second NTN node (in response to the fourth NTN event being occurred), the wireless device may avoid transmitting/sending to the location server via an LLP message (e.g., the LPP request assistance data message) of the LPP messages.

FIG. 47A illustrates an example flowchart of positioning procedure in a non-terrestrial network per an aspect of the present disclosure. The wireless device may receive from the location server via a cell (e.g., the serving cell) of NTN, the at least one LPP message (e.g., the LPP request location information and/or the LPP provide assistance data). For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message). In an example embodiment, the wireless device may, when/if the first NTN event occurs, restart the at least one (positioning) measurement period after obtaining UL synchronization of the cell (e.g., after starting the validity timer of the cell).

For example, the time $T_{RSTD,Total}$ (and/or $T_{PRS\text{-}RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after obtaining UL synchronization of the cell (e.g., after starting the validity timer of the cell). In another example, the time $T_{RSTD,Total}$ (and/or $T_{PRS\text{-}RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after an expiry (or a stopping) of the first interruption window.

FIG. 47B illustrates an example flowchart of positioning procedure in a non-terrestrial network per an aspect of the present disclosure. The wireless device may receive from the location server via a cell (e.g., the serving cell) of NTN, the at least one LPP message (e.g., the LPP request location information and/or the LPP provide assistance data). For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message). In an example embodiment, the wireless device may, when/if the fourth NTN event occurs, restart the at least one (positioning) measurement period after the (ongoing) service link switch procedure being performed/finished. For example, the time $T_{RSTD,Total}$ (and/or $T_{PRS\text{-}RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after an expiry (or a stopping) of the second interruption window. In another example, the time $T_{RSTD,Total}$ (and/or $T_{PRS\text{-}RSRP,total}$ and/or $T_{UERxTx,Total}$) may start from a first/earliest (configured/activated) MG/PPW instance that is aligned with the DL-PRS resources in the assistance data (e.g., indicated/configured by the LPP messages, e.g., the at least one LPP message) and is after obtaining UL (or DL) synchronization of the second NTN node of the cell.

FIG. 48A illustrates an example flowchart of positioning procedure in a non-terrestrial network per an aspect of the present disclosure. The wireless device may receive from the location server via a cell (e.g., the serving cell) of NTN, the at least one LPP message (e.g., the LPP request location information and/or the LPP provide assistance data). For example, the wireless device may (using embodiments of FIGS. 38A-42 described above) start, in response to/after the at least one LPP message, the at least one (positioning) measurement period (e.g., the UE Rx–Tx time difference measurement $T_{UERxTx,Total}$), e.g., from/after a first/earliest (configured/activated) MG/PPW instance that is aligned with DL-PRS resources in the assistance data, e.g., the time $T_{UERxTx,Total}$ may start from the first/earliest (configured/activated) MG/PPW instance that is aligned with the DL-PRS resources in the assistance data (e.g., indicated/configured by the LPP messages, e.g., the at least one LPP message). In an example embodiment, the wireless device may, in response to starting an interruption window (e.g., the first interruption window, e.g., when the first NTN event has occurred or the second interruption window, e.g., when the second NTN event has occurred), restarting the at least one (positioning) measurement period based on a length of the interruption window being larger than a first threshold (e.g., 160 ms). The first threshold may be based on the SRS transmission window (e.g., [−160, 160] msec). The one or more configuration parameters may indicate the first threshold. For example, the LPP messages may indicate the first threshold. In some cases, the first threshold is pre-defined.

For example, when the length of the interruption window is smaller than the first threshold, the wireless device may be able to transmit during the measurement period SRS via the serving cell within the SRS transmission window (e.g., [−160, 160] msec) of/from the at least one DL PRS resource. In an example embodiment, when the length of the interruption window is smaller than the first threshold, the wireless device may continue and complete the ongoing measurements of the positioning procedure, e.g., UE Rx−Tx time difference measurements, (e.g., avoid restarting the measurement period). As the SRS transmissions are suspended during the interruption window (with a small length, e.g., smaller than the first threshold), the wireless device is able to accurately measure/perform the UE Rx−Tx time difference measurements and/or the base station is able to accurately measure/perform the gNB Rx−Tx time difference measurements.

In an example embodiment, when the length of the interruption window is greater than the first threshold, the wireless device may stop with the ongoing measurements (e.g., by restarting the measurement period). As the SRS transmissions are suspended during the interruption window (with a larger length, e.g., greater than the first threshold), the wireless device is not able to accurately measure/perform the UE Rx−Tx time difference measurements and/or the base station is not able to accurately measure/perform the gNB Rx−Tx time difference measurements.

FIG. 48B illustrates an example flowchart of positioning procedure in a non-terrestrial network per an aspect of the present disclosure. The wireless device may receive from the location server via a cell (e.g., the serving cell) of NTN, the at least one LPP message (e.g., the LPP request location information and/or the LPP provide assistance data). For example, the wireless device may (using embodiments of FIGS. 38A-42 described above) start, in response to/after the at least one LPP message, the at least one (positioning) measurement period (e.g., the UE Rx−Tx time difference measurement $T_{UERxTx,Total}$), e.g., from/after a first/earliest (configured/activated) MG/PPW instance that is aligned with DL-PRS resources in the assistance data, e.g., the time $T_{UERxTx,Total}$ may start from the first/earliest (configured/activated) MG/PPW instance that is aligned with the DL-PRS resources in the assistance data (e.g., indicated/configured by the LPP messages, e.g., the at least one LPP message). In an example embodiment, the wireless device may, in response to starting an interruption window (e.g., the first interruption window, e.g., when the first NTN event has occurred or the second interruption window, e.g., when the second NTN event has occurred), restart the at least one (positioning) measurement period based on a time (or time difference or a time gap) from measuring/receiving a latest/final DL PRS resource (before the starting the interruption window) being greater than the second threshold (e.g., 160 ms). The second threshold may be based on the SRS transmission window (e.g., [−160, 160] msec). The one or more configuration parameters may indicate the second threshold. For example, the LPP messages may indicate the second threshold. In some cases, the second threshold is pre-defined.

In an example embodiment, the wireless device may, in response to an NTN event (e.g., the first NTN event or the second NTN event) occurring, restart the at least one (positioning) measurement period based on a time (or time difference or a time gap) from measuring/receiving a latest/final DL PRS resource (before the occurring the NTN event) being greater than the second threshold. The wireless device may, in response to occurring an NTN event (e.g., the first NTN event or the second NTN event), avoid restarting the at least one (positioning) measurement period (e.g., continue and complete the measurements of the positioning procedure, e.g., UE Rx−Tx time difference measurements) based on the time (or time difference or the time gap) from measuring/receiving the latest/final DL PRS resource (before the occurring the NTN event) being smaller than the second threshold.

In an example embodiment, the wireless device may, in response to occurring an NTN event (e.g., the first NTN event or the second NTN event), restarting the at least one (positioning) measurement period based on a time (or time difference or a time gap) from transmitting a latest/final SRS resource (before the occurring the NTN event) being greater than the second threshold. The wireless device may, in response to occurring an NTN event (e.g., the first NTN event or the second NTN event), avoid restarting the at least one (positioning) measurement period (e.g., continue and complete the measurements of the positioning procedure, e.g., UE Rx−Tx time difference measurements) based on the time (or time difference or the time gap) from measuring/receiving the latest/final SRS resource (before the occurring the NTN event) being smaller than the second threshold.

FIG. 49 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. For example, the wireless device may start the positioning procedure based on the at least one LPP message. For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message).

As shown in FIG. 49, the wireless device may, based on the at least one LPP message, determine the type of the positioning procedure e.g., whether the positioning procedure is (or comprises) the multi-RTT positioning procedure or PRS-RSRP(P) positioning procedure or RSTD positioning procedure or EC-ID positioning procedure or the like.

In an example embodiment, in response to the positioning procedure being the multi-RTT positioning procedure (and/or the UL-AoA positioning procedure), the wireless device may determine whether at least one of the third NTN event and/or the second NTN event has occurred during the UE Rx−Tx time different measurement period (e.g., $T_{UERxTx,Total}$). Based on at least one of the third NTN event and/or the second NTN event being occurred during the UE Rx−Tx time different measurement period (e.g., $T_{UERxTx,Total}$), the wireless device may restart the UE Rx−Tx time different measurement period.

In an example embodiment, in response to the positioning procedure being the multi-RTT positioning procedure (and/or the UL-AoA positioning procedure), the wireless device may determine whether at least one of the first NTN event and/or the fourth NTN event has occurred during the UE Rx−Tx time different measurement period (e.g., $T_{UERxTx,Total}$). Based on at the first NTN event being occurred during the UE Rx−Tx time different measurement period (e.g., $T_{UERxTx,Total}$), the wireless device may restart the UE Rx−Tx time different measurement period after obtaining the UL synchronization of the cell of the NTN (e.g., after starting the validity timer of the cell and/or after the expiry of the first interruption window). Based on at the fourth NTN event being occurred during the UE Rx−Tx time different measurement period (e.g., $T_{UERxTx,Total}$), the wireless device may restart the UE Rx−Tx time different measurement period after obtaining the UL (and/or DL) synchronization of the second NTN node of the cell (e.g., after starting the validity timer of the cell corresponding to the second NTN-config and/or after the expiry of the second interruption window.

In an example embodiment, in response to the positioning procedure not being the multi-RTT positioning procedure (and/or the UL-AoA positioning procedure), e.g., the positioning procedure being at least one of the RSTD positioning procedure and/or the PRS-RSRP(P) positioning procedure and/or the DL-AoD positioning procedure and/or the E-ICD positioning procedure, the wireless device may determine whether the fourth NTN event has occurred during the measurement period (e.g., $T_{RSTD,Total}$ and/or $T_{PRS\text{-}RSRP,total}$). Based on the fourth NTN event being occurred during the measurement period (e.g., $T_{RSTD,Total}$ and/or $T_{PRS\text{-}RSRP,total}$), the wireless device may restart the measurement period (e.g., $T_{RSTD,Total}$ and/or $T_{PRS\text{-}RSRP,total}$) after obtaining the DL (and/or UL) synchronization of the cell (via the second NTN node) of the NTN (e.g., after the expiry of the second interruption window).

In some implementations, based on the fourth NTN event being occurred during the measurement period (e.g., $T_{RSTD,Total}$ and/or $T_{PRS\text{-}RSRP,total}$), the wireless device may continue and complete the measurements (e.g., avoid restarting the measurement period $T_{RSTD,Total}$ and/or $T_{PRS\text{-}RSRP,total}$).

Based on at least one of the first NTN event and/or the second NTN event and/or the third NTN event being occurred during the measurement period (e.g., $T_{RSTD,Total}$ and/or $T_{PRS\text{-}RSRP,total}$), the wireless device may continue and complete the measurements (e.g., avoid restarting the measurement period $T_{RSTD,Total}$ and/or $T_{PRS\text{-}RSRP,total}$).

Figure 50:
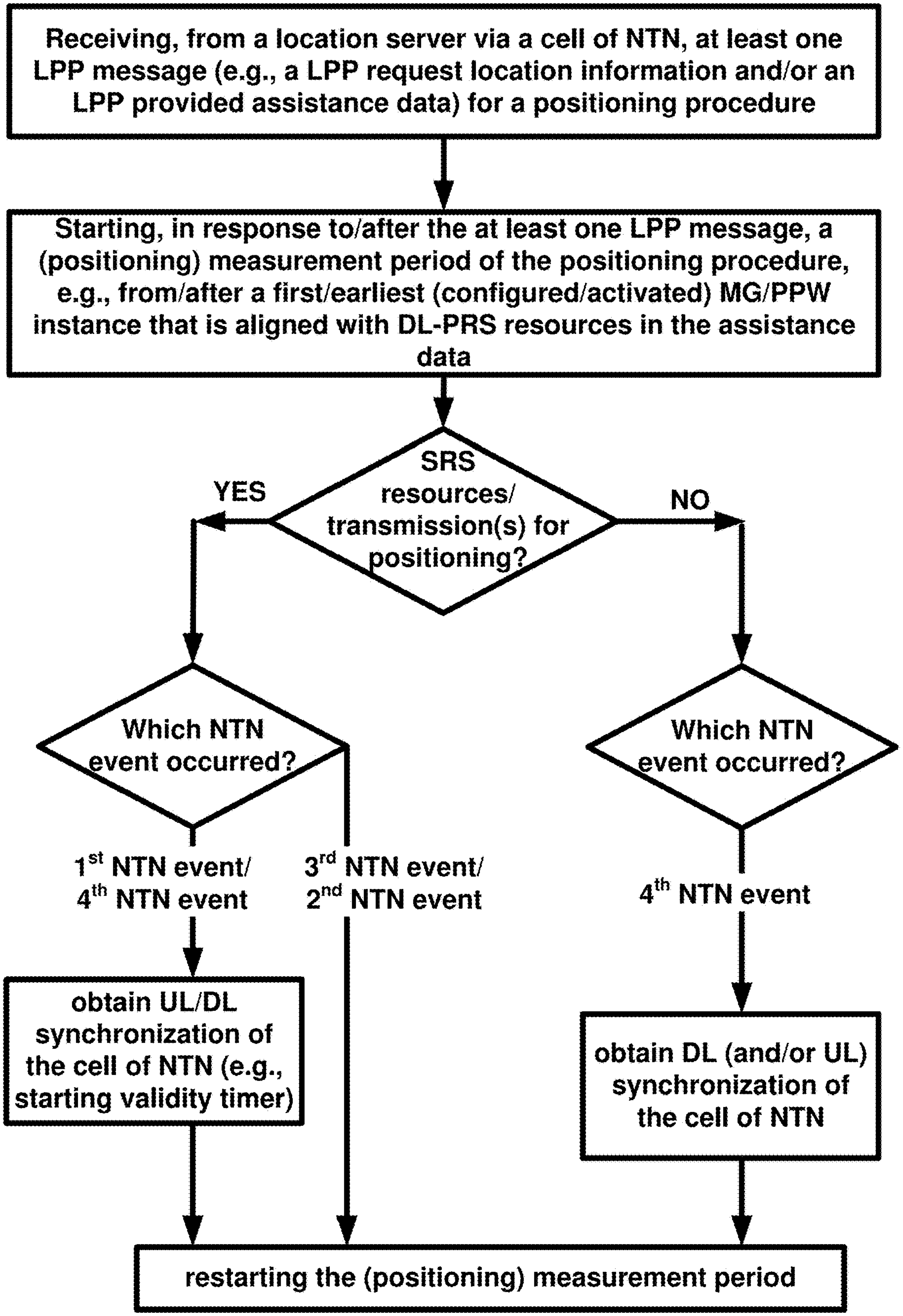
FIG. 50 illustrates an example flowchart of positioning procedure in a non-terrestrial network per an aspect of the present disclosure.

FIG. 50 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. The wireless device may start the positioning procedure based on the at least one LPP message. For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message).

As shown in FIG. 50, the wireless device may determine whether the positioning procedure is based on transmission(s) of the SRS resources/resources set(s) for positioning or not. In an example embodiment, in response to the positioning procedure being based on transmission(s) of the SRS resources/resources set(s) for positioning, the wireless device may determine whether at least one of the third NTN event and/or the second NTN event has occurred during the measurement period (e.g., $T_{UERxTx,Total}$). Based on at least one of the third NTN event and/or the second NTN event being occurred during the measurement period, the wireless device may restart the measurement period.

In an example embodiment, in response to the positioning procedure being based on transmission(s) of the SRS resources/resources set(s) for positioning, the wireless device may determine whether at least one of the first NTN event and/or the fourth NTN event has occurred during the measurement period (e.g., $T_{UERxTx,Total}$). Based on at the first NTN event being occurred during the measurement period, the wireless device may restart the measurement period after obtaining the UL synchronization of the cell of the NTN (e.g., after starting the validity timer of the cell and/or after the expiry of the first interruption window). Based on at the fourth NTN event being occurred during the measurement period, the wireless device may restart the measurement period after obtaining the UL (and/or DL) synchronization (of the second NTN node) of the cell (e.g., after starting the validity timer of the cell corresponding to the second NTN-config and/or after the expiry of the second interruption window).

In an example embodiment, in response to the positioning procedure not being based on transmission(s) of the SRS resources/resources set(s) for positioning, the wireless device may determine whether the fourth NTN event has occurred during the measurement period (e.g., $T_{RSTD,Total}$ and/or $T_{PRS\text{-}RSRP,total}$). Based on the fourth NTN event being occurred during the measurement period (e.g., $T_{RSTD,Total}$ and/or $T_{PRS\text{-}RSRP,total}$), the wireless device may restart the measurement period (e.g., $T_{RSTD,Total}$ and/or $T_{PRS\text{-}RSRP,total}$) after obtaining the DL (and/or UL) synchronization of the cell (via the second NTN node) of the NTN (e.g., after the expiry of the second interruption window). In some implementations, based on the fourth NTN event being occurred during the measurement period (e.g., $T_{RSTD,Total}$ and/or $T_{PRS\text{-}RSRP,total}$), the wireless device may continue and complete the measurements (e.g., avoid restarting the measurement period $T_{RSTD,Total}$ and/or $T_{PRS\text{-}RSRP,total}$). For example, based on at least one of the first NTN event and/or the second NTN event and/or the third NTN event being occurred during the measurement period (e.g., $T_{RSTD,Total}$ and/or $T_{PRS\text{-}RSRP,total}$), the wireless device may continue and complete the measurements (e.g., avoid restarting the measurement period $T_{RSTD,Total}$ and/or $T_{PRS\text{-}RSRP,total}$).

Figure 51:
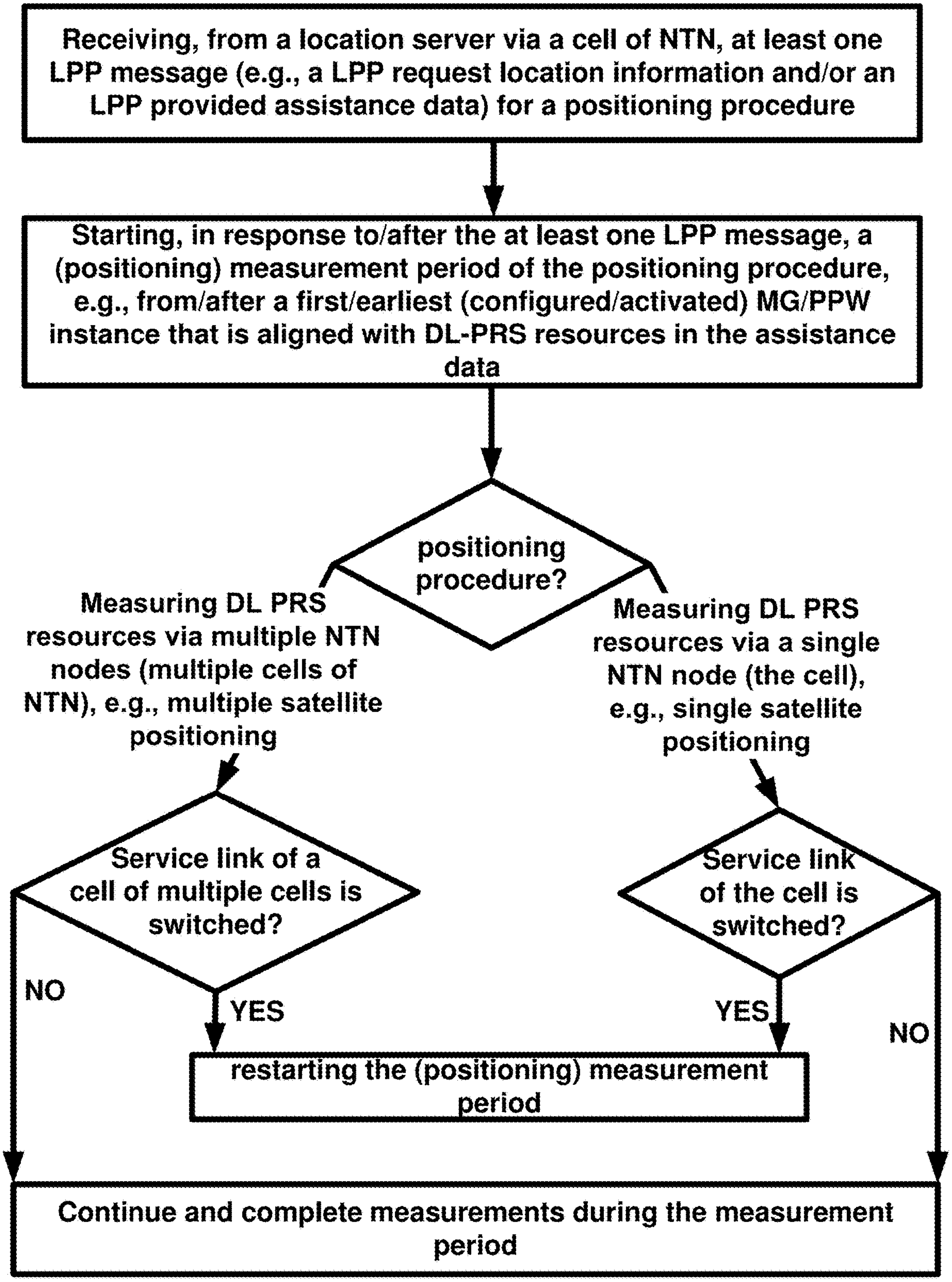
FIG. 51 illustrates an example flowchart of positioning procedure in a non-terrestrial network per an aspect of the present disclosure.

FIG. 51 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. The wireless device may start the positioning procedure based on the at least one LPP message.

For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message).

As shown in FIG. 51, the wireless device may determine whether the positioning procedure is a multi-NTN nodes (or multi-satellite) positioning procedure or a single NTN node (or single satellite) positioning procedure. The multi-NTN nodes (or multi-satellite) positioning procedure may be based on measuring/receiving DL PRS resources/resource sets via multiple NTN nodes (e.g., the first NTN node and the second NTN node) and/or multiple cells of the NTN (e.g., comprising the serving cell of the NTN and neighbor cells of the NTN). For example, the DL PRS assistance data configure/indicate DL PRS resources/resource sets of/corresponding to the multiple NTN nodes and/or multiple cells of the NTN. The multi-NTN nodes (or multi-satellite) positioning procedure may comprise the multi-RTT positioning procedure and/or the RSTD positioning procedure and/or the PRS-RSRP(P) positioning procedure or the like.

The single NTN node (or single satellite) positioning procedure may be based on measuring/receiving DL PRS resources/resource sets via a single NTN node (e.g., the first NTN node or the second NTN node) and/or a single cell of the NTN (e.g., the serving cell of the NTN). For example, the DL PRS assistance data configure/indicate DL PRS resources/resource sets of the single NTN node and/or the serving cell of the NTN. The single NTN node (or single satellite) positioning procedure may comprise the multi-RTT positioning procedure and/or the RSTD positioning procedure and/or the PRS-RSRP(P) positioning procedure or the like.

In an example embodiment, as shown in FIG. 51, for the ongoing the multi-NTN nodes (or multi-satellite) positioning procedure, the wireless device may determine whether a service link of a cell of the multiple cells of the NTN node is switched or not. For example, based on the fourth NTN event occurring in the serving cell of the NTN and/or a neighbor cell of the NTN, the wireless device may determine the service link of a cell of the multiple cells of the NTN node being switched. Based on the service link of a cell of the multiple cells of the NTN node being switched, the wireless device may restart the at least one (positioning) measurement period (corresponding to the ongoing positioning procedure/session). Based on none of the service link of the multiple cells of the NTN node being switched (e.g., the fourth NTN event not being occurred in the serving cell of the NTN and/or a neighbor cell of the NTN during the at least one positioning period), the wireless device may continue and complete measurements during the at least one (positioning) measurement period (corresponding to the ongoing positioning procedure/session).

In an example embodiment, as shown in FIG. 51, for the ongoing single NTN node (or single satellite) positioning procedure, the wireless device may determine whether the service link of the serving cell of the NTN node is switched or not. For example, based on the fourth NTN event occurring in the serving cell of the NTN, the wireless device may determine the service link of the serving cell of the NTN node is switched. Based on t the service link of the serving cell of the NTN node being switched, the wireless device may restart the at least one (positioning) measurement period (corresponding to the ongoing positioning procedure/session). Based on the service link of the serving cell of the NTN node not being switched (e.g., the fourth NTN event not being occurred during the at least one positioning period), the wireless device may continue and complete measurements during the at least one (positioning) measurement period (corresponding to the ongoing positioning procedure/session).

Figure 52:
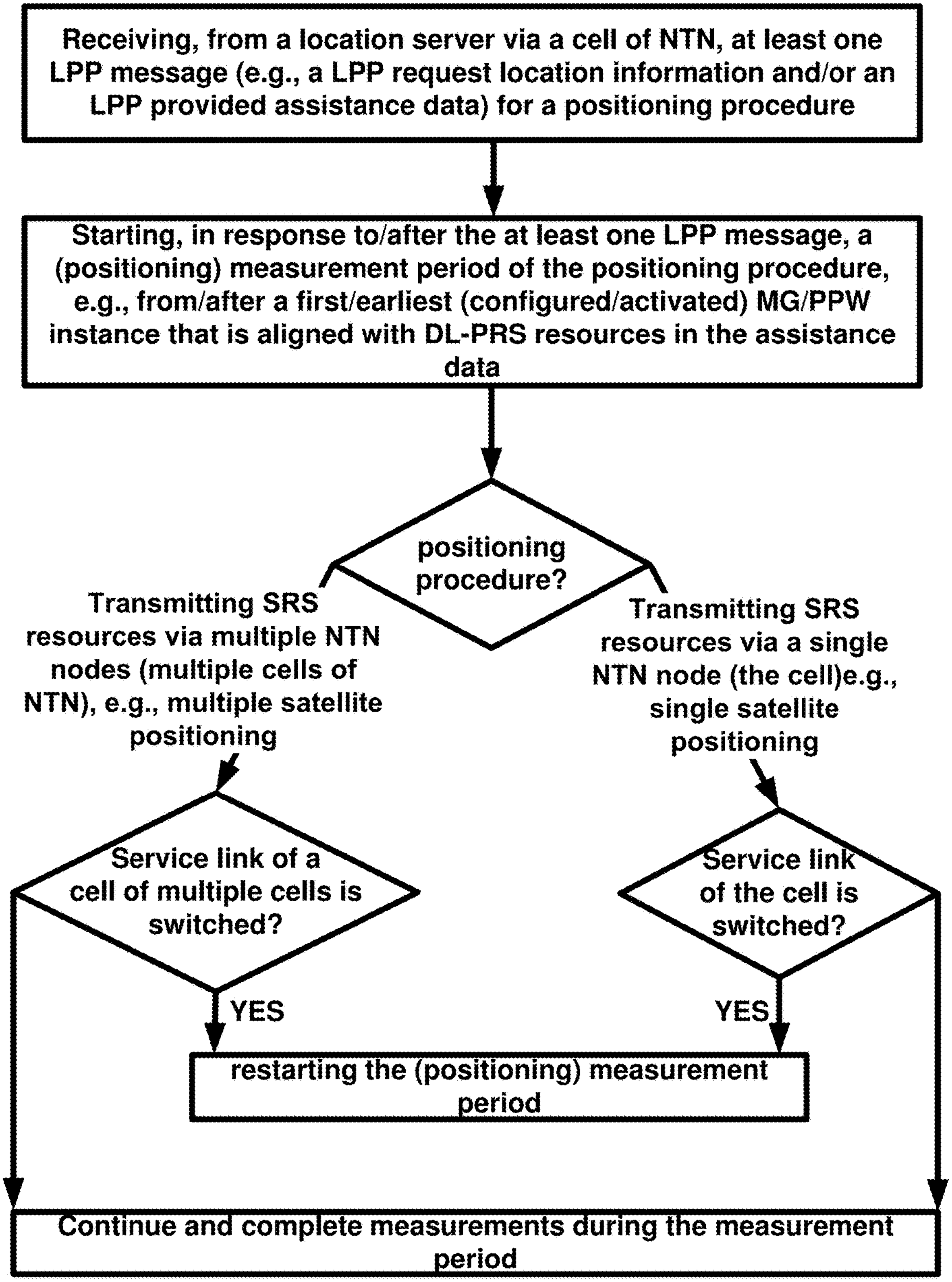
FIG. 52 illustrates an example flowchart of positioning procedure in a non-terrestrial network per an aspect of the present disclosure.

FIG. 52 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. The wireless device may start the positioning procedure based on the at least one LPP message. For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message).

As shown in FIG. 52, the wireless device may determine whether the positioning procedure is the multi-NTN nodes (or multi-satellite) positioning procedure or the single NTN node (or single satellite) positioning procedure. The multi-NTN nodes (or multi-satellite) positioning procedure may be based on transmitting the SRS resources/resource sets via multiple NTN nodes (e.g., the first NTN node and the second NTN node) and/or multiple cells of the NTN (e.g., comprising the serving cell of the NTN and neighbor cells of the NTN). For example, the one or more SRS configuration parameters may configure/indicate SRS resources/resource sets of/corresponding to the multiple NTN nodes and/or multiple cells of the NTN. The multi-NTN nodes (or multi-satellite) positioning procedure may comprise the multi-RTT positioning procedure. The multiple NTN nodes and/or multiple cells of the NTN may belong to a validity area for the SRS transmissions. The validity area of the SRS transmissions may comprise a list of NTN node and/or a list of cells of the NTN.

The single NTN node (or single satellite) positioning procedure may be based on transmitting SRS resources/resource sets via the single NTN node (e.g., the first NTN node or the second NTN node) and/or the single cell of the NTN (e.g., the serving cell of the NTN). For example, the one or more SRS configuration parameters may configure/indicate SRS resources/resource sets of the single NTN node and/or the serving cell of the NTN. The single NTN node (or single satellite) positioning procedure may comprise the multi-RTT positioning procedure.

In an example embodiment, as shown in FIG. 52, for the ongoing the multi-NTN nodes (or multi-satellite) positioning procedure, the wireless device may determine whether a service link of a cell of the multiple cells of the NTN node is switched or not. For example, based on the fourth NTN event occurring in the serving cell of the NTN and/or a neighbor cell of the NTN, the wireless device may determine the service link of a cell of the multiple cells of the NTN node being switched. Based on the service link of a cell of the multiple cells of the NTN node being switched, the wireless device may restart the at least one (positioning) measurement period (corresponding to the ongoing positioning procedure/session). Based on none of the service link of the multiple cells of the NTN node being switched (e.g., the fourth NTN event not being occurred in the serving cell of the NTN and/or a neighbor cell of the NTN during the at least one positioning period), the wireless device may continue and complete measurements during the at least one (positioning) measurement period (corresponding to the ongoing positioning procedure/session).

In an example embodiment, as shown in FIG. 52, for the ongoing single NTN node (or single satellite) positioning procedure, the wireless device may determine whether the service link of the serving cell of the NTN node is switched or not. For example, based on the fourth NTN event occurring in the serving cell of the NTN, the wireless device may determine the service link of the serving cell of the NTN node is switched. Based on t the service link of the serving cell of the NTN node being switched, the wireless device may restart the at least one (positioning) measurement period (corresponding to the ongoing positioning procedure/session). Based on the service link of the serving cell of the NTN node not being switched (e.g., the fourth NTN event not being occurred during the at least one positioning period), the wireless device may continue and complete measurements during the at least one (positioning) measurement period (corresponding to the ongoing positioning procedure/session).

Figure 53:
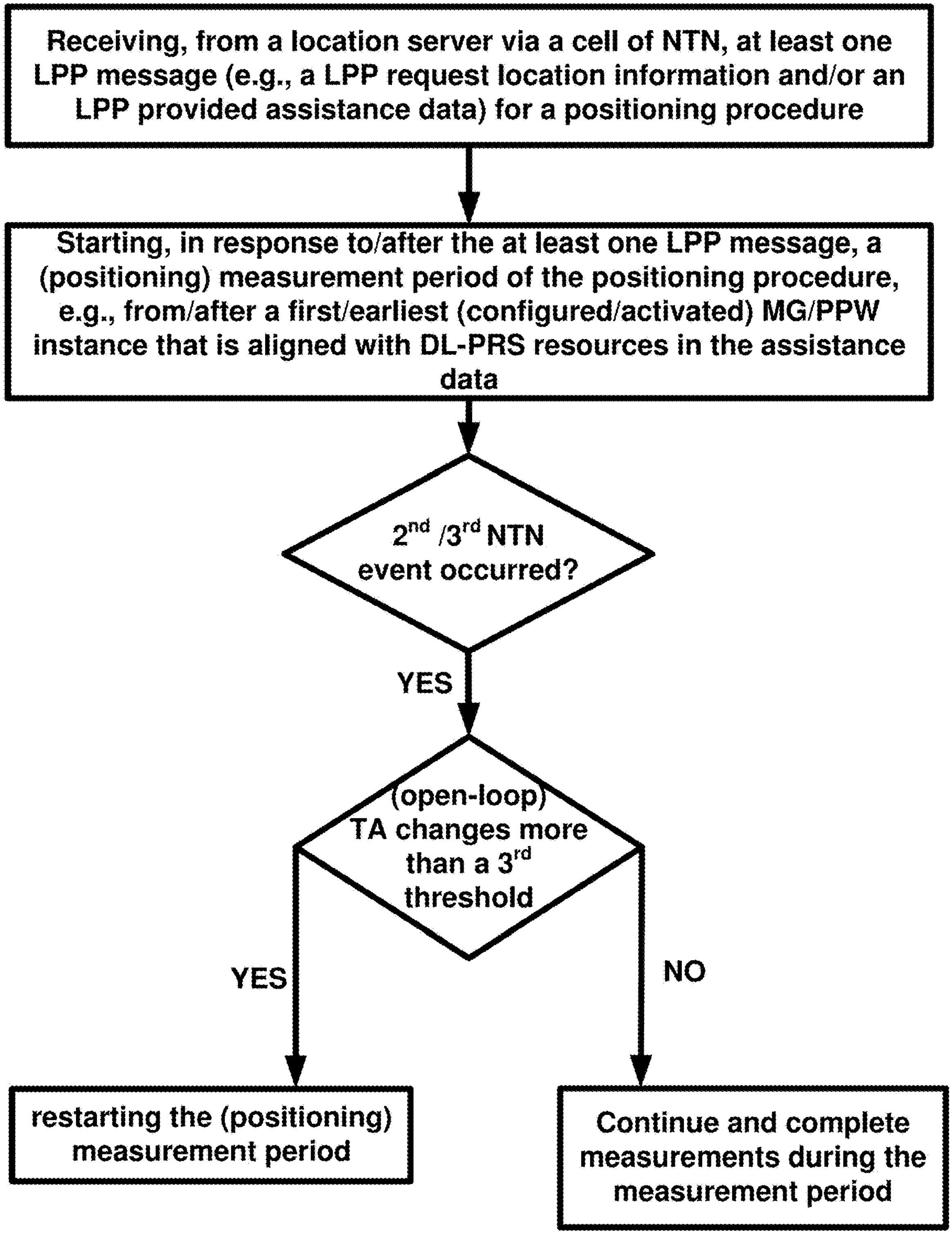
FIG. 53 illustrates an example flowchart of positioning procedure in a non-terrestrial network per an aspect of the present disclosure.

FIG. 53 illustrates an example flowchart of positioning procedure in a non-terrestrial network per an aspect of the present disclosure. The wireless device may receive, from the location server (e.g., LMF) and via a cell (e.g., the serving cell) of the NTN (e.g., satellite access), the at least one LPP message (e.g., the LPP request location information message and/or the LPP provide assistance data message) of the LPP messages. The wireless device may start the positioning procedure based on the at least one LPP message. For example, the wireless device may (using embodiments of FIGS. 38A-42 described above) start, in response to/after the at least one LPP message, the at least one (positioning) measurement period (corresponding to the ongoing positioning procedure/session), e.g., from/after a first/earliest (configured/activated) MG/PPW instance that is aligned with DL-PRS resources in the assistance data, e.g., the time $T_{RSTD,Total}$ (and/or $T_{PRS\text{-}RSRP,total}$ and/or $T_{UERxTx,Total}$) (of the at least one (positioning) measurement period) may start from the first/earliest (configured/activated) MG/PPW instance that is aligned with the DL-PRS resources in the assistance data (e.g., indicated/configured by the LPP messages, e.g., the at least one LPP message).

As shown in FIG. 53, the wireless device may determine whether (during the at least one measurement period) at least one of the second NTN event and/or the third NTN event has occurred or not. In response to at least one of the second NTN event and/or the third NTN event being occurred, the wireless device may determine whether the (open loop) TA value of the wireless device is changed/varied/fluctuated (increased or decreased) more than a third threshold or not. The one or more configuration parameters may indicate/configure the third threshold. For example, the LPP messages may indicate/configure the third threshold. In some cases, the second threshold is pre-defined.

As shown in FIG. 53, in response to at least one of the second NTN event and/or the third NTN event being occurred and/or the (open loop) TA value of the wireless device being changed/varied/fluctuated (increased or decreased) more than (or greater than or equal to) the third threshold, the wireless device may restart the at least one measurement period. In response to at least one of the second NTN event and/or the third NTN event being occurred and/or the (open loop) TA value of the wireless device being changed/varied/fluctuated (increased or decreased) less than the third threshold, the wireless device may avoid restarting the at least one measurement period (e.g., continue and complete the measurements).

The wireless device (e.g., to determine whether the (open loop) TA value of the wireless device is changed/varied/fluctuated (increased or decreased) more than a third threshold or not) may determine a change/variation/fluctuation (or increase or decrease) the (open loop) TA value of the wireless device between a current time/occasion (e.g., corresponding to the triggering time/occasion that at least one of the second NTN event and/or the third NTN event is pending) and a previous time/occasion (e.g., corresponding to a last/latest time/occasion that at least one of the second NTN event and/or the third NTN event has occurred. For example, (e.g., to determine whether the (open loop) TA value of the wireless device is changed/varied/fluctuated (increased or decreased) more than a third threshold or not) the wireless device may determine the current time/occasion occurred during the at least one measurement period. For example, (e.g., to determine whether the (open loop) TA value of the wireless device is changed/varied/fluctuated (increased or decreased) more than a third threshold or not) the wireless device may determine the pervious time/occasion occurred during the at least one measurement period.

In some implementations, the wireless device may report to the location server (e.g., via the LPP messages, e.g., the LPP provide location information) corresponding (open-loop) TA value of the wireless device for each measurement (e.g., UE Rx−Tx time different measurement) of measurements (e.g., UE Rx−Tx time different measurements) of the positioning procedure/the at least one measurement period. For example, when the wireless device uses a first (open-loop) TA value a first measurement (e.g., UE Rx−Tx time different measurement) of measurements (e.g., UE Rx−Tx time different measurements), the wireless device may report the first measurement (e.g., UE Rx−Tx time different measurement) of measurements (e.g., UE Rx−Tx time different measurements) and (or along with) the first (open-loop) TA value. When the wireless device uses a second (open-loop) TA value a second measurement (e.g., UE Rx−Tx time different measurement) of measurements (e.g., UE Rx−Tx time different measurements), the wireless device may report the second measurement (e.g., UE Rx−Tx time different measurement) of measurements (e.g., UE Rx−Tx time different measurements) and (or along with) the second (open-loop) TA value. For example, the wireless device may determine a change/variation of the (open loop) TA value (e.g., between the first (open loop) TA value and the second (open loop) TA value) being larger than the third threshold.

An example method comprising: receiving, by a wireless device from a location server and via a first non-terrestrial network (NTN) node/payload of a cell, a message indicating a request for location information of the wireless device (e.g., the at least one LPP message, e.g., the LPP request location information message); starting, based on the message, a positioning measurement period for measuring user equipment (UE) reception-transmission (Rx–Tx) time difference measurements; and in response to/after switching from the first NTN node to a second NTN node of the cell for a service link switch (and/or as a service link), restarting the positioning measurement period.

The above-example method, wherein the switching from the first NTN node to the second NTN node does not comprise a handover procedure.

One or more of the above-example methods, wherein a physical cell identification (PCI) of the serving cell does not change in response to the switching from the first NTN node to the second NTN node.

One or more of the above-example methods further comprising receiving one or more radio resource control (RRC) configuration parameters comprising one or more sounding reference signal (SRS) configuration parameters via the first NTN node of the serving cell, wherein the switching from the first NTN node to the second NTN node does not comprise a reconfiguration of the one or more SRS configuration parameters.

One or more of the above-example methods, wherein the switching from the first NTN node to the second NTN node is during a first window (e.g., the second interruption window).

One or more of the above-example methods, further comprising not transmitting at least one SRS resource during the first window.

One or more of the above-example methods, wherein a length of the first window is larger than a first threshold.

One or more of the above-example methods, wherein a first downlink timing of the serving cell before the switching is different than a second downlink timing of the serving cell after the switching.

One or more of the above-example methods, wherein a difference between the first downlink timing and the second downlink timing is greater than a second threshold.

One or more of the above-example methods, wherein: the first downlink timing is based on an ephemeris information/data of the first NTN node; and the second downlink timing is based on an ephemeris information/data of the second NTN node.

One or more of the above-example methods, further comprising determining uplink transmission timing of the serving cell being changed in response to the switching, wherein a first uplink transmission timing of the serving cell before the switching is different than a second uplink timing of the serving cell after the switching.

One or more of the above-example methods, wherein: the first uplink transmission timing is based on an ephemeris information/data of the first NTN node; and the second uplink transmission timing is based on an ephemeris information/data of the second NTN node.

One or more of the above-example methods, wherein the determining is not based on a network-controlled timing advance (TA) command.

One or more of the above-example methods, wherein N_TA before and after the switching is the same.

One or more of the above-example methods, wherein the determining is not based on n-TimingAdvanceOffset.

One or more of the above-example methods, wherein the n-TimingAdvanceOffset before and after the switching is equal.

One or more of the above-example methods, further comprising: receiving, via a third NTN node of the serving cell, a second request location information message from the location server; starting, in response to the second request location information message, a second positioning measurement period for measuring user equipment (UE) Rx–Tx time difference measurements; and continuing, after switching from the third NTN node to a fourth NTN node of the serving cell, the positioning measurement period.

One or more of the above-example methods, wherein the request location information message is a long-term evolution (LTE)-based positioning protocol (LPP) message.

One or more of the above-example methods, wherein a UE Rx–Tx time difference measurement of the UE Rx-Tx time difference measurements is based on: a receiving time of a downlink subframe corresponding to a downlink positioning reference signal (DL PRS) resource; and a transmitting time of an uplink subframe corresponding to an SRS resource.

An example method comprising: receiving, by a wireless device from a base station, a first system information block (SIB) indicating a value for a validity duration of a non-terrestrial network (NTN) assistance information; starting, based on the first SIB, the validity duration; receiving, from a location server, a request location information message; starting, in response to the request location information message, a positioning measurement period for measuring user equipment (UE) Rx–Tx time difference measurements; and restarting, in response to an expiry of the validity duration and after receiving a second SIB, the positioning measurement period.

An example method comprising: receiving, by a wireless device from a base station, one or more configuration parameters indicating a value for a validity duration of a non-terrestrial network (NTN) assistance information; starting the validity duration; receiving, from a location server, a request location information message; and starting, in response to the request location information message and during the validity duration, a positioning measurement period for measuring user equipment (UE) Rx–Tx time difference measurements.

The above-example method may further comprise in response to an expiry of the validity duration, stopping the positioning measurement period.

One or more of the above-example methods further comprising in response to the expiry of the validity duration, restarting the positioning measurement period after validity duration being started.

One or more of the above-example methods further comprising in response to the validity duration being stopped, restarting the positioning measurement period after the validity duration being started.

One or more of the above-example methods wherein the starting the validity duration is based on obtaining uplink synchronization of a serving cell, wherein the wireless device communicates with the base station via the serving cell of an NTN.

One or more of the above-example methods wherein the obtaining uplink synchronization of the serving cell is based on one or more NTN configuration parameters, wherein the one or more configuration parameters comprise one or more NTN configuration parameters.

One or more of the above-example methods further comprising: receiving, from the location server, a second request location information message; avoiding, in response to the second request location information message, starting a second positioning measurement period based on the validity duration being running.

One or more of the above-example methods, further comprising: receiving, from the location server, a third request location information message; in response to the third request location information message and the validity duration not being running, starting a third positioning measurement period after the validity duration being started.

One or more of the above-example methods further comprising determining a time alignment timer being running, wherein the validity duration is different than the time alignment timer.

One or more of the above-example methods wherein the positioning procedure is a multiple round trip transmission delay (multi-RTT) positioning procedure.

In an example embodiment, the base station may, in response to occurring an NTN event (e.g., the NTN event being occurred), e.g., during the positioning procedure/session, transmit/send the NTN assistance information (corresponding to the SIB19) via an NRPPa message of the NRPPa messages to the location server. The NTN event may occur based on at least one of the following: a handover procedure being initiated/started/triggered (or completed or performed); and/or the feeder link switching procedure being initiated/started/triggered (or completed or performed); and/or the service link switching procedure being initiated/started/triggered (or completed or performed). The base station may transmit, e.g., in response to the NTN event being occurred, the NTN assistance data (comprising the NTN-config of the second NTN node and/or the NTN node of the second cell) via the second NRPPa message to the location server. Example embodiments may allow the base station to properly inform the location server with NTN assistance information of the NTN (when the NTN event has occurred).

In an example embodiment, during a positioning information exchange (elementary) procedure (see FIG. 25), the base station may, in response to occurring an NTN event (e.g., the NTN event being occurred), transmit/send a positioning information failure (via an NRPPa message of the NRPPa messages) to the location server. The NTN event may occur based on at least one of the following: a handover procedure being initiated/started/triggered (or completed or performed); and/or the feeder link switching procedure being initiated/started/triggered (or completed or performed); and/or the service link switching procedure being initiated/started/triggered (or completed or performed). For example, the positioning information exchange procedure may comprise receiving from the location server (by the base station) a positioning information request.

In an example embodiment, during the positioning information exchange (elementary) procedure, the base station may, in response to occurring the fourth NTN event (e.g., the fourth NTN event being occurred), avoid (or refrain from) transmitting/sending the positioning information failure to the location server. For example, the base station may, based on the length of the second interruption window being smaller than a threshold (e.g., the first threshold or the second threshold), avoid (or refrain from) transmitting/sending the positioning information failure to the location server. The base station may, based on the length of the second interruption window being greater than or equal to the threshold (e.g., the first threshold or the second threshold), transmit/send the positioning information failure to the location server. As the service link switching may not trigger/initiate (or be) the handover, by refraining from transmitting/sending the positioning information failure to the location server, e.g., during the positioning procedure/session, the location server may avoid reconfiguring the DL PRS resources/resource sets and/or SRS resources/resource sets. Embodiments of the present disclosure may improve efficiency of the positioning procedure in the NTN.

In an example embodiment, during the positioning information exchange (elementary) procedure, the base station may, in response to a handover from the first cell with the first PCI to the second cell with the second PCI (e.g., the PCI changed scenario), transmit/send the positioning information failure to the location server. The handover procedure may comprise the feeder link switching procedure.

In an example embodiment, during the positioning information exchange (elementary) procedure, the base station may, in response to a handover from the first cell with the first PCI to the second cell with the first PCI (e.g., the PCI unchanged scenario), avoid (or refrain from) transmitting/sending the positioning information failure to the location server. The handover procedure may comprise the feeder link switching procedure.

In an example embodiment, in response to/after occurring the fourth NTN event (e.g., switching from the first NTN node of a cell to the second NTN node of the cell without changing the PCI of the cell (e.g., service link switching), e.g., during the positioning procedure/session, the wireless device may transmit/send to the location server an LPP message of the LPP messages comprising (assistance) information of the service link switching. The information of the service link switching may comprise at least one of the following: time/occasion (e.g., NR time stamp, e.g., SFN, slot, subframe or the like) of the service link switching being triggered/started/performed/initiated; and/or length of the second interruption window; and/or identification of the second NTN node; and/or NTN assistance data of the second NTN node. The information of the service link switching may provide assistance information to the location server, e.g., for using the measurements.

In an example embodiment, in response to occurring the fourth NTN event (e.g., switching from the first NTN node of a cell to the second NTN node of the cell without changing the PCI of the cell (e.g., service link switching), e.g., during the positioning procedure/session, the base station may transmit/send to the location server (and during the positioning procedure/session) an NRPPa message of the NRPPa messages comprising information of the service link switching.

In an example embodiment, the location server may transmit to the wireless device an LPP message of the LPP messages comprising the request location information message. The request location information message (e.g., CommonIEsRequestLocationInformation) may indicate/carry common IEs for the request location information LPP message (e.g., a message indicating a request for location information of the wireless device). The LPP message may comprise/indicate an indication. The indication may indicate a criterion for triggering reporting (e.g., triggeredReporting). The indication may correspond to (or be conditioned on) the service link switch (e.g., a satellite change and/or NTN node change, e.g., satelliteChange). Based on the indication being set to TRUE (or being configured or being enabled), the wireless device may transmit/send to the location server (requested) location information each time (or in response to/after) a serving (and/or neighbor) NTN node (e.g., satellite) of the serving cell changes (e.g., without the handover and/or without changing the PCI of the cell), e.g., when the fourth NTN event occurs. Based on the indication being set to TRUE (or being configured or being enabled), the wireless device may transmit/send to the location server (requested) location information (or in response to/after) the service link of the cell changes (e.g., service link switching occurs), e.g., when the fourth NTN event occurs. Based on the indication not being set to TRUE (or being set to FALSE or not being configured or being absent from the LPP message), the wireless device may avoid (or refrain from) transmitting/sending to the location server (requested) location information each time (or in response to/after) the service link of the cell changes (e.g., service link switching occurs), e.g., when the fourth NTN event occurs. Embodiments may allow the location server to configure a trigger (via the criterion) for (automatic) reporting of the location information of the wireless device whenever the service link of the cell changes without changing the PCI of the cell.

In some implementations, the LPP message may (further) comprise/indicate a second indication. The second indication may be different than the indication. The second indication may be the indication. The second indication may indicate a second criterion for triggering reporting (e.g., triggeredReporting). The second indication may correspond to (or be conditioned on) a cell change (e.g., handover, e.g., feeder link switching, and/or gateway change). Based on the second indication being set to TRUE, the wireless device may transmit/send to the location server (requested) location information each time the serving NTN node (e.g., satellite) of the serving cell changes (e.g., with the handover and/or with changing the PCI of the cell). Based on the second indication not being set to TRUE (or being set to FALSE or not being configured or being absent from the LPP message), the wireless device may avoid (or refrain from) transmitting/sending to the location server (requested) location information each time (or in response to/after) the serving NTN node (e.g., satellite) of the serving cell changes (e.g., with the handover and/or with changing the PCI of the cell).

In other implementations, the LPP message may (further) comprise/indicate a reporting duration (e.g., reportingDuration). The reporting duration may indicate a maximum duration of triggered reporting (e.g., in seconds). A value of zero for the reporting duration corresponds to an unlimited (i.e., "infinite") duration, e.g., the wireless device may continue triggered reporting (e.g., based on the cell change and/or the service link change or handover or the like) for the reportingDuration or until an LPP Abort or LPP Error message is received from the location server. In an example embodiment, in the NTN, the location server may configure/determine the reporting duration based on t-Service of the serving NTN node/satellite (and/or the neighbor NTN node/satellite) of the cell/serving cell, e.g., length of the reporting duration may be based on the t-Service, e.g., equal to the t-Service. For example, the NTN assistance data (e.g., SIB19) (transmitted from the base station to the location server via NRPPa) may indicate the t-Service of the serving NTN node. The t-Service of the SIB19 may indicate a time information on when a cell provided via NTN (e.g., an NTN quasi-Earth fixed system) stops serving an area it is currently covering (e.g., coverage of the serving cell that the wireless device is residing). By configuring the reportingDuration based on the t-Service of the serving NTN node/cell, the wireless device may trigger reporting the location information to the location server prior to losing the coverage of the serving satellite (e.g., prior to the service link switching is triggered). The embodiment may allow the wireless device to timely/properly trigger reporting the location information to the location server prior to losing the coverage of the serving satellite (e.g., prior to the service link switching is triggered).

The location server (instead of configuring/determining the reporting duration based on the t-Service) may configure the reporting duration by the value zero and indicate the indication corresponding to the service link switch (e.g., the satellite change and/or NTN node change, e.g., satelliteChange). The wireless device may continue triggered reporting (e.g., based on the cell change and/or the service link change or handover or the like) until the LPP Abort or the LPP Error message is received from the location server.

In other implementations, the LPP message may comprise/indicate a response time (e.g., ResponseTime IE) and/or a scheduled location request (e.g., ScheduledLocationRequest IE). The response time may indicate a maximum response time (in seconds or milliseconds or ten-seconds or ten-milli-seconds or the like) between receiving (by the wireless device from the location server) the LPP message of the LPP messages (e.g., RequestLocationInformation) and a transmission (by the wireless device) of a first LPP message (e.g., LPP provide location information message, e.g., ProvideLocationInformation) of the LPP messages to the location server. The location server may configure/determine the repose time based on the t-Service of the serving NTN node/satellite (and/or the neighbor NTN node/satellite) of the cell/serving cell, e.g., length of the reporting time may be based on (e.g., smaller than) the t-Service, e.g., equal to the t-Service.

The scheduled location request may indicate that the wireless device is requested (by the location server) to obtain location measurements or location estimate valid at a scheduled location time (e.g., scheduledLocationTime) T. The scheduled location time may comprise at least one of the following: a UTC time and/or GNSS time and/or a network time and/or a relative time. The network time may indicate/comprise SFN of a cell (e.g., the serving cell) and/or a slot of the cell; and/or a cell identity/ID of the cell. For example, the location server may determine/configure the scheduled location time based on the t-Service of the serving NTN node/satellite (and/or the neighbor NTN node/satellite) of the cell/serving cell. For example, the network time may be based on a time/occasion (SFN/slot) of the service link switching and/or a time occasion that the serving NTN node stops covering the serving cell (e.g., t-Service). In another example, the relative time may be based on the t-Service of the NTN node/satellite (and/or the neighbor NTN node/satellite) of the cell/serving cell. The scheduled location time may further indicate one or more IDs/indexes/identifications of NTN nodes (e.g., NTN nodes that are serving the serving cell). By configuring/determining the scheduled location request based on the NTN assistance data (e.g., t-Service), the location server may allow the wireless device to transmit the LPP provide location information message prior to the service link switching procedure.

In other implementations, the LPP message may comprise/indicate a third indication. The third indication may correspond to a periodic/periodical reporting (of the location information of the wireless device), e.g., periodicalReporting IE. The third indication may enable or disable the wireless device to periodically report the location information (e.g., the LPP provides location information message) to the location server in the NTN. Based on the third indication being set to TRUE (or being configured or being enabled), the wireless device may transmit/send periodically (as configured by the periodicalReporting IE) the provide location information message to the location server until/before the service link of the cell changes (e.g., service link switching occurs), e.g., when the fourth NTN event occurs. In an example, based on the third indication being set to TRUE (or being configured or being enabled), the wireless device may stop/terminate/suspend/cancel transmitting/sending periodically (as configured by the periodicalReporting IE) the provide location information message to the location server in response to/after the service link of the cell changes (e.g., service link switching occurs), e.g., when the fourth NTN event occurs. Based on the third indication not being set to TRUE (or being set to FALSE or not being configured or being absent from the LPP message), the wireless device may continue periodical reporting/transmitting/sending the provide location information message to the location server (as configured by the periodicalReporting IE) irrespective/regardless of the service link switching being triggered/occurred/performed.

What is claimed is:

1. A method comprising:

receiving, by a wireless device from a base station, a system information block (SIB) indicating time information for when a cell, provided via non-terrestrial network, stops serving an area;

receiving, from a location management function (LMF), a provide assistance data message, for a multi-round transmission time (RTT) positioning, indicating at least one downlink positioning reference signal (DL PRS) resource;

starting a measurement period for measuring user-equipment (UE) reception-transmission (Rx-Tx) time difference measurements, wherein the UE Rx-Tx time difference measurements are based on measuring the at least one DL PRS resource;

initiating, based on the time information indicated by the SIB, a satellite switch, wherein the satellite switch is to switch satellites without changing a physical cell identifier (PCI); and in response to the satellite switch occurring during the measurement period, suspending, during an interruption time for the satellite switch, measuring the at least one DL PRS resource.

2. The method of claim 1, wherein the interruption time is less than a threshold.

3. The method of claim 1, wherein the satellite switch is for switching from a first satellite to a second satellite.

4. The method of claim 3, wherein the interruption time is for synchronizing with the second satellite.

5. The method of claim 1, wherein the satellite switch is a hard satellite switch.

6. The method of claim 1, further comprising resuming measuring the at least one DL PRS resource after the interruption time.

7. The method of claim 6, wherein the resuming of the measuring is during the measurement period.

8. A wireless device comprising:

one or more processors; and memory storing instructions that, when executed by the one or more processors, cause the wireless device to:

receive, from a base station, a system information block (SIB) indicating time information for when a cell, provided via non-terrestrial network, stops serving an area;

receive, from a location management function (LMF), a provide assistance data message, for a multi-round transmission time (RTT) positioning, indicating at least one downlink positioning reference signal (DL PRS) resource;

start a measurement period for measuring user-equipment (UE) reception-transmission (Rx-Tx) time difference measurements, wherein the UE Rx-Tx time difference measurements are based on measuring the at least one DL PRS resource;

initiate, based on the time information indicated by the SIB, a satellite switch, wherein the satellite switch is to switch satellites without changing a physical cell identifier (PCI); and in response to the satellite switch occurring during the measurement period, suspend, during an interruption time for the satellite switch, measuring the at least one DL PRS resource.

9. The wireless device of claim 8, wherein the interruption time is less than a threshold.

10. The wireless device of claim 8, wherein the satellite switch is for switching from a first satellite to a second satellite.

11. The wireless device of claim 10, wherein the interruption time is for synchronizing with the second satellite.

12. The wireless device of claim 8, wherein the satellite switch is a hard satellite switch.

13. The wireless device of claim 8, wherein the instructions further cause the wireless device to resume measuring the at least one DL PRS resource after the interruption time.

14. The wireless device of claim 13, wherein resuming measuring of the at least one DL PRS resource is during the measurement period.

15. A non-transitory computer-readable medium comprising instructions that, when executed by one or more processors of a wireless device, cause the wireless device to:

receive, from a base station, a system information block (SIB) indicating time information for when a cell, provided via non-terrestrial network, stops serving an area;

receive, from a location management function (LMF), a provide assistance data message, for a multi-round transmission time (RTT) positioning, indicating at least one downlink positioning reference signal (DL PRS) resource;

start a measurement period for measuring user-equipment (UE) reception-transmission (Rx-Tx) time difference measurements, wherein the UE Rx-Tx time difference measurements are based on measuring the at least one DL PRS resource;

initiate, based on the time information indicated by the SIB, a satellite switch, wherein the satellite switch is to switch satellites without changing a physical cell identifier (PCI); and in response to the satellite switch occurring during the measurement period, suspend, during an interruption time for the satellite switch, measuring the at least one DL PRS resource.

16. The non-transitory computer-readable medium of claim 15, wherein the interruption time is less than a threshold.

17. The non-transitory computer-readable medium of claim 15, wherein the satellite switch is for switching from a first satellite to a second satellite.

18. The non-transitory computer-readable medium of claim 17, wherein the interruption time is for synchronizing with the second satellite.

19. The non-transitory computer-readable medium of claim 15, wherein the satellite switch is a hard satellite switch.

20. The non-transitory computer-readable medium of claim 15, wherein the instructions further cause the wireless device to resume measuring the at least one DL PRS resource after the interruption time.

* * * * *